United States Patent [19]

Burns et al.

[11] Patent Number: 5,189,606
[45] Date of Patent: Feb. 23, 1993

[54] TOTALLY INTEGRATED CONSTRUCTION COST ESTIMATING, ANALYSIS, AND REPORTING SYSTEM

[75] Inventors: Thomas J. Burns, Callaway; Edward C. Page, Lynn Haven; Rita A. Gregory; George M. Pryor, both of Panama City, all of Fla.

[73] Assignee: The United States of America as represented by the Secretary of the Air Force, Washington, D.C.

[21] Appl. No.: 702,345

[22] Filed: May 14, 1991

Related U.S. Application Data

[63] Continuation of Ser. No. 400,764, Aug. 30, 1989, abandoned.

[51] Int. Cl.$^5$ .............................................. G06F 15/20
[52] U.S. Cl. .................................. 364/401; 395/923; 395/925
[58] Field of Search ...................... 364/400, 408, 401; 395/923, 925, 926

[56] References Cited

U.S. PATENT DOCUMENTS

| | | | |
|---|---|---|---|
| 4,006,345 | 2/1977 | Bengston | 434/108 |
| 4,019,027 | 4/1977 | Kelley | 434/108 |
| 4,108,356 | 8/1978 | Bengston | 434/108 |
| 4,181,954 | 6/1980 | Rosenthal et al. | 364/512 |
| 4,275,449 | 6/1981 | Aish | 364/512 |
| 4,578,768 | 3/1986 | Racine | 364/560 |
| 4,642,780 | 2/1987 | Thomson | 364/521 |
| 4,700,318 | 10/1987 | Ockman | 434/108 |
| 4,744,034 | 5/1988 | Milstein | 364/562 |
| 4,782,448 | 11/1988 | Milstein | 364/562 |
| 4,862,345 | 8/1989 | Lekron | 364/188 |

Primary Examiner—Gail O. Hayes
Attorney, Agent, or Firm—Bernard E. Franz; Donald J. Singer

[57] ABSTRACT

CCMAS is an integrated construction cost generator which may be used to develop costs for construction projects; to analyze and estimate facilities associated with major weapons programs; for administrative, medical and support facilities as well as runway/taxiways; and for developing the life cycle costs for various construction projects. Its uses parametric estimating techniques with a finite field of both codified and unstructured data elements in a unique process which may be accomplished with or without detailed plans or specifications. The system contains more than 900 types of Air Force facilities as well as the quantities of each product required to complete each building type. Estimating tools used include direct costs, life cycle costs and modifiers. Direct costs are further broken down into generic models, a comparative system, and a quantity takeoff (QTO) system. CCMAS has been found to be three times more accurate than conventional architectural and engineering costing techniques.

17 Claims, 31 Drawing Sheets

Microfiche Appendix Included
(38 Microfiche, 9 Pages)

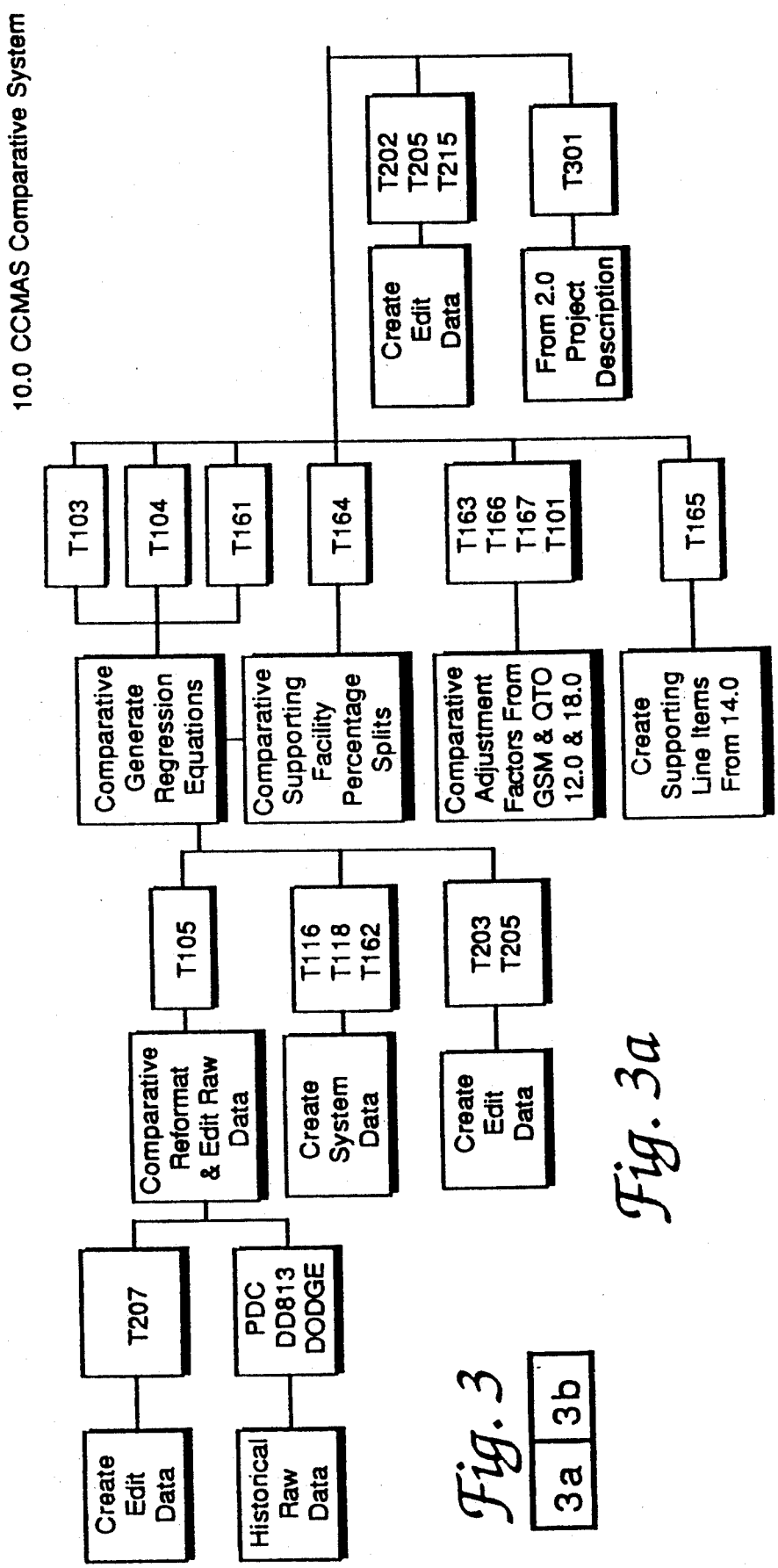

| 4a | 4b |

| 5a | 5b |

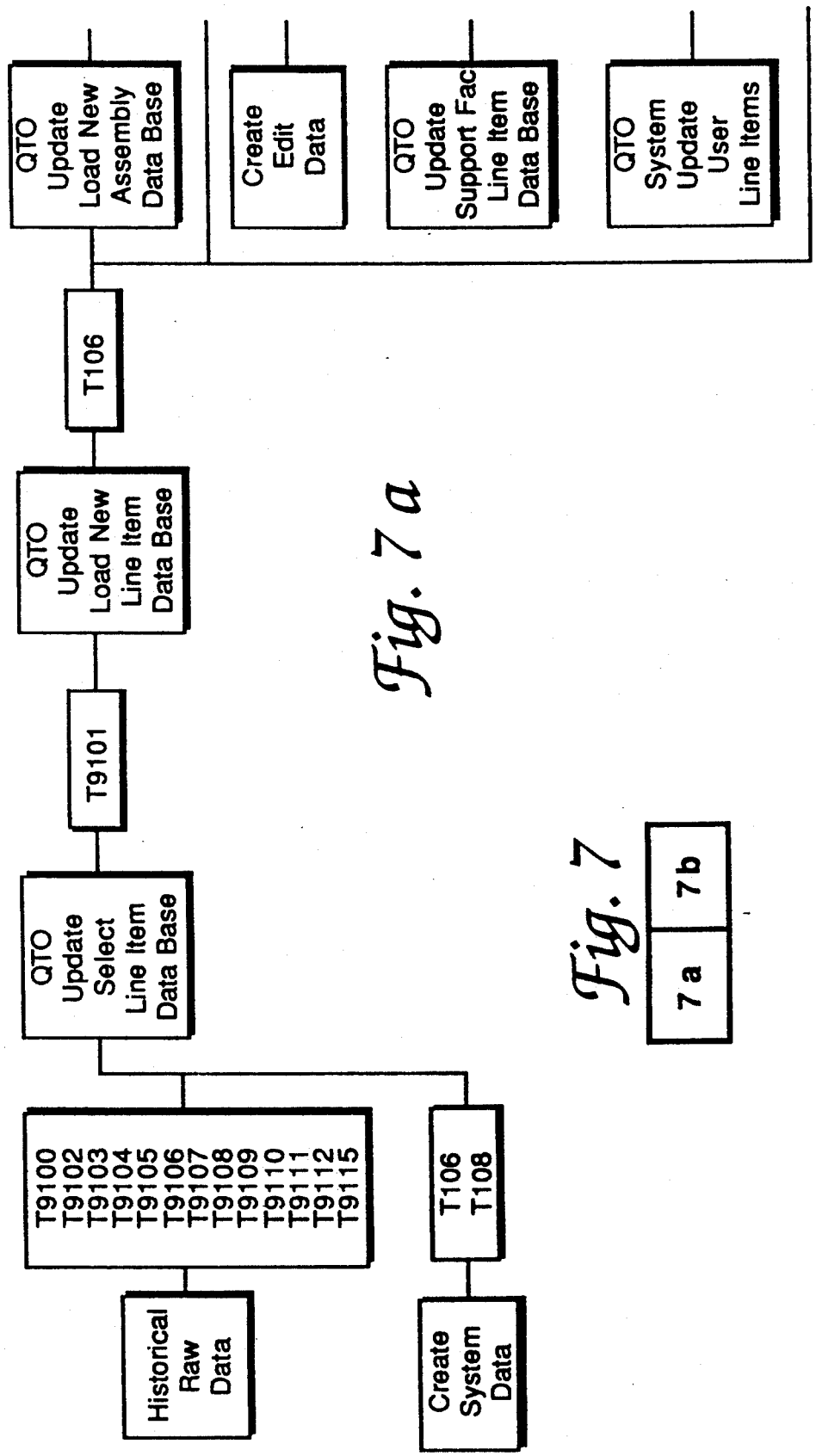

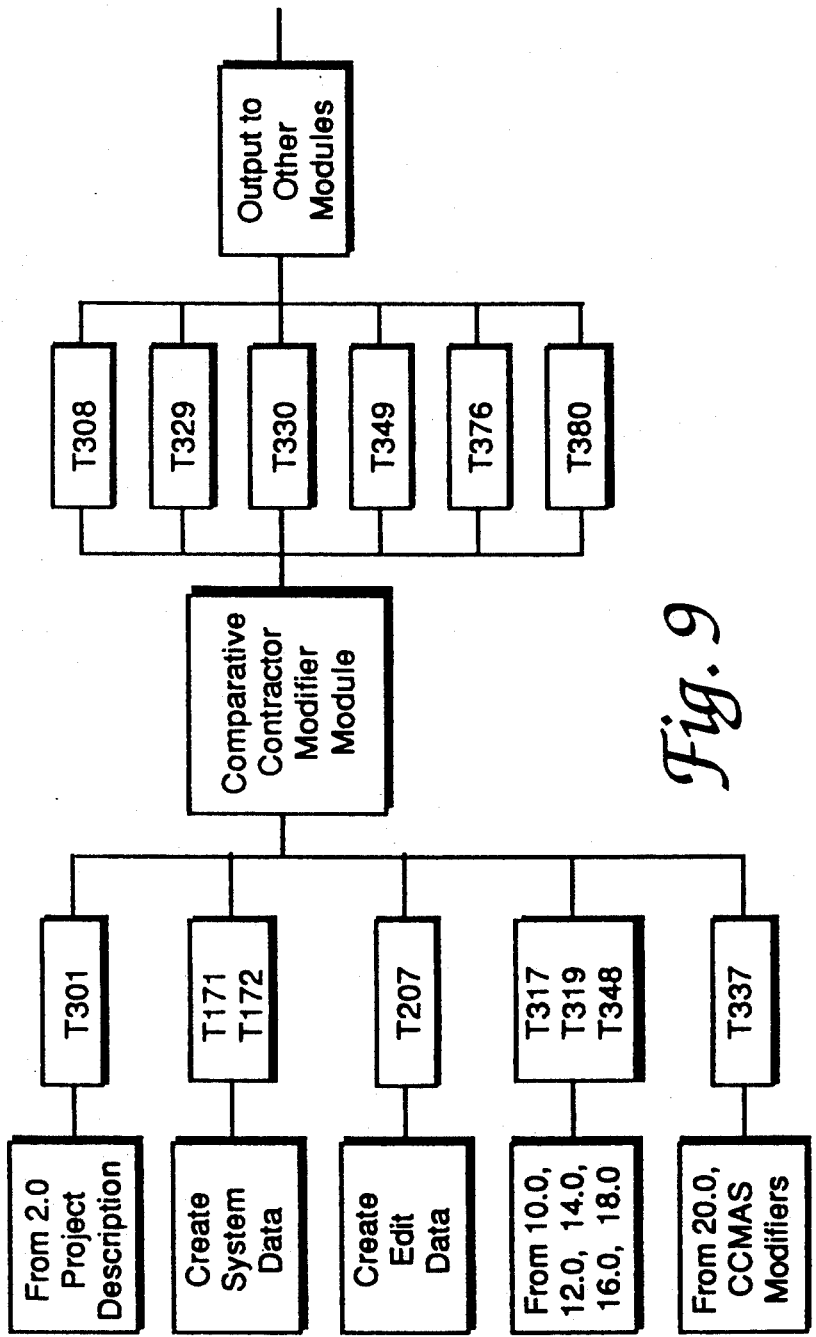

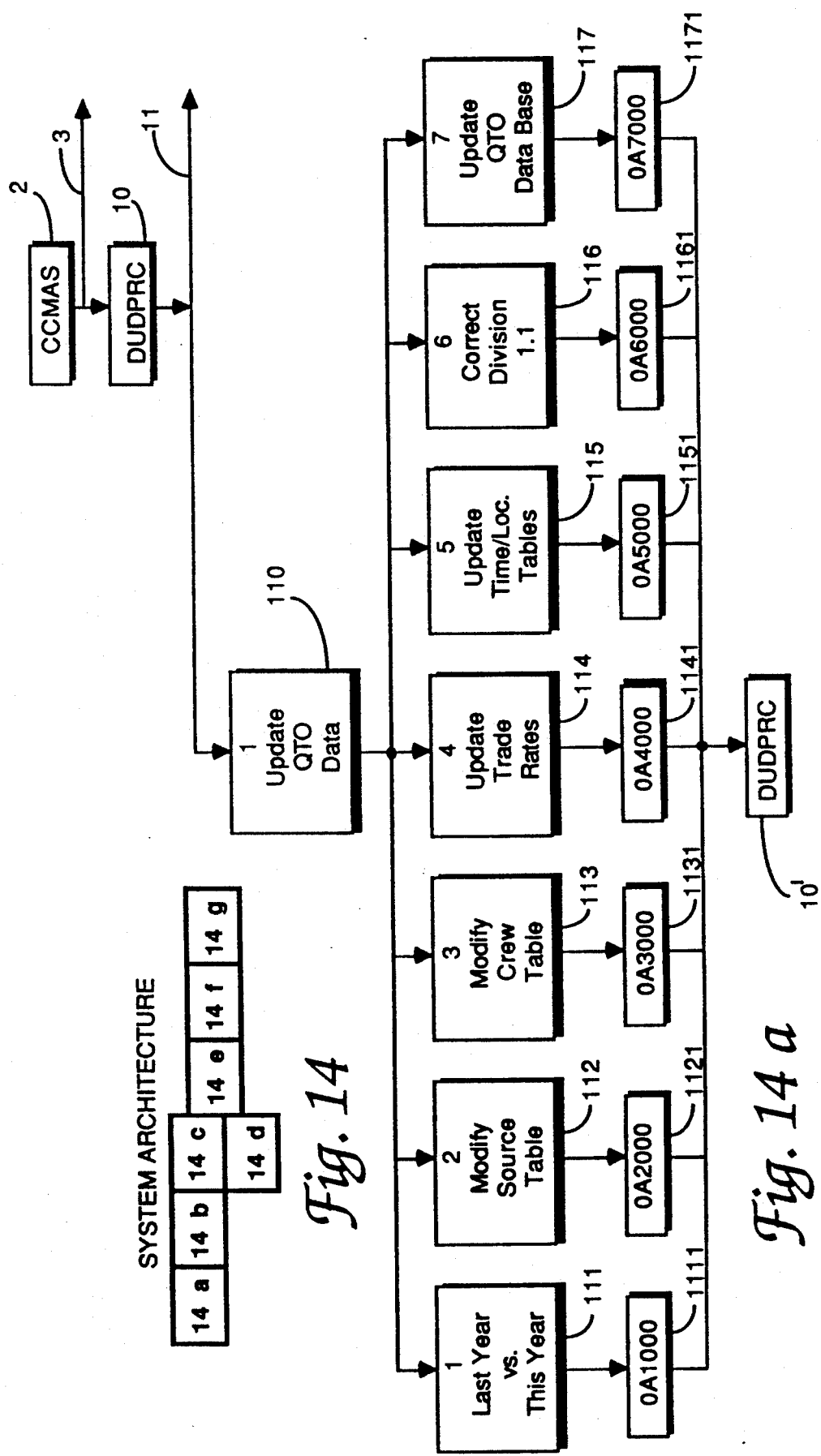

TOTALLY INTEGRATED CONSTRUCTION COST ESTIMATING, ANALYSIS, AND REPORTING SYSTEM

RIGHTS OF THE GOVERNMENT

The invention described herein may be manufactured and used by or for the Government of the United States for all governmental purposes without the payment of any royalty.

This application is a continuation of application Ser. No. 07/400,764, filed Aug. 30, 1989, now abandoned.

MICROFICHE APPENDIX

This application includes a microfiche appendix comprising computer program and data files.

BACKGROUND OF THE INVENTION

The present invention relates generally to artificial intelligence, with an expert knowledge-based system having an inference engine, applied to a Construction Cost Management and Analysis System (CCMAS), and more particularly to a comprehensive cost estimating computer system for construction projects all over the country, and even all over the world.

In the construction industry, progress has been made in leaps and bounds away from the age old post and lintel system of construction. Today, the industry marries all elements of architecture and engineering with electronics, chemistry, law and most importantly, economics.

Despite the plethora of technological advances, the construction industry has experienced a virtual explosion of cost overruns and claims totaling in the billions of dollars. This is due to the fact that the common method used for estimating the average construction project today is still with paper and pen (or perhaps a computerized spreadsheet to simplify the calculations), cost data manual, and the requirement for enormous amounts of detail prior to beginning the estimate. This method fails to address the numerous concerns facing the construction estimator of the 1990's.

First of all, the prices in the manuals are based on certain variables and conditions not normally known by the average estimator. Therefore, used incorrectly, devastating errors in pricing will occur. Additionally, the data manuals require an up-front, clear definition of every aspect of the project including size, power, heating, cooling and exhaust requirements, type of construction, special construction needs, unique problems due to site location, and the anticipation of unknown areas of risk during the project.

This detail generates vast uncertainties and potential omission in the estimating process because the estimate is often performed at a point in time when nothing more than an idea transpired. The Quantity Take Off (QTO) method has been traditionally used to identify and estimate this level of detail. It involves, for example, counting every two-by-four stud required for each wall as well as the number and size of nails that will be used to secure each stud. Attempting to do this with negligible or partial plans or specifications is, to put it simply, rife with the risks of double counting or conversely, omitting project requirements.

Estimates produced using the QTO method clearly lack a high degree of reliability and their effectiveness is further diminished as a project becomes more complex. Also, crucial factors, such as risk forecasting and lift cycle cost estimating, are not able to be adequately treated by the traditional, almost anachronistic, method of estimating.

An objective of the invention is to address the aforementioned concerns and to provide the construction industry with the means to incorporate economic issues of the future into the estimates of today.

United States patents of interest include U.S. Pat. No. 4,700,318, to Ockman which discloses a computer system for construction projects such as buildings, bridges, dams, industrial plants, means of transport and the like. The patented system may use an appropriately programmed general-purpose computer or an otherwise similar computer especially dedicated to such purpose. Storage and retrieval of structural information, work activities and other data are conveniently machine-assisted. In Thompson U.S. Pat. No. 4,642,780 a computer system is used in fields such as architecture, space planning, interior design and corporate facility management for efficiently designing and allocating space to the various subdivisions of an organization. The system of this patent operates by gathering answers to a series of questions to the user to elicit information such as project data, identification of departments, available floor space, furniture and equipment, affinities between departments, staffing personnel priorities, etc. In U.S. Pat. No. 4,782,448, Milstein uses a computer 38 as an aid in contract estimating. He is concerned with the building construction trades where there is the necessity to provide accurate estimates of the cost of constructions for use in competitive bidding. In estimating, he takes into account the costs of a vast multitude of structural, plumbing, electrical, heating and other types of purchased equipment and components. Racine in U.S. Pat. No. 4,578,768 describes a computer aided system used in construction, planning, land survey, real estate and many other industries. Aish in U.S. Pat. No. 4,275,449 mentions a Computer Aided Architectural Design (CAAD) system. Cox et al in U.S. Pat. No. 3,927,948 discuss a method and apparatus for designing structures such as industrial plants.

However, none of the above references teach a comprehensive cost estimating computer system for construction projects all over the country, and even all over the world.

SUMMARY OF THE INVENTION

An objective of the invention is to provide a totally integrated system designed to estimate, analyze, and report the complete life cycle cost of facilities.

This invention is directed to an expert knowledge-based computer system having an inference engine, applied to an integrated construction cost generator which may be used to develop costs for construction projects; to analyze and estimate facilities associated with major weapons programs; for administrative, medical and support facilities as well as runway/taxiways; and for developing the life cycle costs for various construction projects. It uses parametric estimating techniques with a finite field of both codified and unstructured data elements in a unique process which may be accomplished with or without detailed plans or specifications. The system contains more than 900 types of Air Force facilities as well as the quantities of each product required to complete each building type. Estimating tools used include direct costs, life cycle costs and modifiers. Direct costs are further broken down into generic models, a comparative system and a quantity takeoff (QTO) system. The invention has been found to be three times more accurate than conventional architectural and engineering costing techniques.

ADVANTAGES

CMMAS is the first automated, integrated, and comprehensive construction cost management tool which can be used from project inception through completion. It lets even an unskilled estimator accurately estimate and analyze a facility construction project in less than four hours without plans or specifications. It eclipses the traditional method of designing, measuring drawings, counting pieces, then manually extracting cost data of each piece to create an estimate, and finally analyzing the product; a process that can take a group of skilled estimators up to six months.

The integration provides unprecedented reliability and validity to construction estimating that results in significant improvement in accuracy and reductions in manpower.

With CMMAS, value engineering becomes real management incentive at all stages from concept formulation through construction change proposals. Previous systems tend to devalue a project rather than get the most value for the dollar.

NEW FEATURES

Coalesces the functional UNIFORMAT work breakdown structure with the material/trade CSI work breakdown structure to form a single integrated work breakdown structure for multiple cost estimating methodologies.

Automatically disaggregates total facility cost data into the systems for construction; breaks down those system costs into their material, labor, and equipment components; adjusts the individual component costs for economics of scale and geological and/or climatological variations; then creates the facility construction cost.

Automatically generates detailed material, labor, and equipment list, and labor and equipment hours required for construction based solely on the facility type, size and descriptive parameters.

Automatically ascribes in a single factor the impacts on the contractor costs and profit associated with type and complexity of work, bidding climate, site conditions, performance period, and material/labor rates.

Automatically adjusts the cost of each material, labor, and equipment item used in construction for regional price variations.

Automatically adds and/or deletes material, labor, and equipment items needed to satisfy construction requirements because of geological and/or climatological variations.

Automatically generates prime and subcontractor overheads/profit in the United States, developed overseas locations, and third work nations based solely on dollar value and type of construction.

Automatically creates and compares cost estimates using multiple cost estimating techniques operating in a single unique work breakdown structure and drawing from a specially constructed data bases.

KNOWLEDGE BASES

The "knowledge bases" are assimilations of expert judgements, historical data, algorithms, engineering principles, building codes and regulations, and statistical methods that can be manipulated and combined automatically in the CCMAS expert system.

FEATURE LIST

The Construction Cost Management Analysis System (CCMAS) claims the following features:

1. It is a totally integrated process designed to estimate, analyze, and report the complete life cycle cost of facilities.

2. It includes a means according to feature 1 to describe the facility; estimate and analyze the direct construction cost; identify, apply and analyze modifiers and/or adjustments to the facility for location, escalation, method of construction, and schedule of construction; estimate and analyze the contractors overhead and profit; calculate the construction cost or applying the modifiers to the direct cost; estimate and analyze supervision, inspection, and overhead associated with construction management; estimate and analyze design costs; print reports; estimate and analyze the cost to operate, maintain, and repair the facility over its life; and delete the estimate data from the system after it is no longer needed.

3. It includes a means according to feature 1 to add modules to each section to enhance the overall system capability.

4. It includes a means according to feature 1 for storing and retrieving data in tables by a unique building Work Breakdown Structure Hierarchy as factors for algorithms, to select more specific data from another table, and to store user input to the process. It includes a unique CCMAS facility Work Breakdown Structure Hierarchy with 11 levels to collect, analyze, store, and retrieve data. The 11 levels in the hierarchy include Facility Family, Facility Type, Facility Category, Facility Functional Space (if applicable), CCMAS unique UNIFORMAT (CCMAS-UNIFORMAT) System, CCMAS-UNIFORMAT Subsystem, CCMAS unique Assembly Category, CCMAS unique Assembly, Construction Specification Institute (CSI) Division, CSI Composite Item Number, and Resource Elements (material cost, labor cost, equipment cost, labor hours, and equipment hours).

5. It includes a means according to feature 2 to get key information from the user that describes the project including the type of work, location, start date, need date, funding source, project name, construction agency, design agency, and facility category code. It includes a means to check to insure the user input is valid against the system data files. It includes a means according to feature 4 to store the information input by the user for retrieval by other sections.

6. It includes a knowledge base according to feature 5 which contains a construction agency code that links the construction agency used to manage the construction to the cost of supervising and inspecting the construction contractor's work and the cost for additional engineering and design required during construction. It includes a process which shows the user the available codes and allows the user to enter only valid codes. It includes a means of determining the relationship between the agency used and cost of supervising and inspecting the construction contractor's work and the cost for additional engineering and design required during construction based on historical data, storing the information, and retrieving the information for use in calculating the construction cost.

7. It includes a knowledge base according to feature 5 which contains a type of construction code that links the type of construction to the cost of unforeseen conditions during construction. It includes a process which shows the user the available codes and allows the user to enter only valid codes. It includes a means of determining the relationship between the type of construction and cost of unforeseen conditions experienced during construction based on historical data, storing the information, and retrieving the information for use in calculating the facility cost.

8. It includes a knowledge base according to feature 5 which contains an escalation code that links the facility to the correct escalation factors. It includes a process which shows the user the available codes and allows the user to enter only valid codes. It includes a means of storing the codes and retrieving the correct escalation factors for use in calculating the construction cost.

9. It includes a knowledge base according to feature 5 which contains a design agency code that links the design agency used to manage the design to the cost of designing the facility. It includes a process which shows the user the available codes and allows the user to enter only valid codes. It includes a means of determining the relationship between the agency used and cost of design based on historical data, storing the information, and retrieving the information for use in calculating the facility cost.

10. It includes a knowledge base according to feature 5 which contains a type of work code that links the type of work to knowledge bases for determining the facility schedule; facility activities durations; split of work between prime contractors, major subcontractors, and minor subcontractors; and factors used for contractors overhead and profit calculations. It includes a process that shows the user the available codes and allows the user to enter only valid codes. It includes a means of storing the codes and retrieving the information from the appropriate knowledge bases for use in calculating the facility cost.

11. It includes a knowledge base according to feature 5 which contains a facility category code that links the facility category to knowledge bases for determining the regression equations to use for the primary and supporting facility costs for the comparative process; the resource distribution factors to use to distribute the costs to the CCMAS-UNIFORMAT System, CCMAS-UNIFORMAT Subsystem, CCMAS unique Assembly, CSI Divisional level of the hierarchy by materials, labor, equipment, for the comparative process; the facility energy use code; and links to the facility type and facility family codes. It includes a process which shows the user the available codes and allows the user to enter only valid codes. It includes a means of storing the codes and retrieving the information from the appropriate data files for use in calculating the facility cost.

12. It includes a knowledge base according to feature 5 which contains a location code that links the facility location to knowledge bases for determining the adjustment factors for labor rates, material prices, and equipment costs; air conditioning load; heating load; workmen's compensation and amount subcontracted; seismic zone; frost penetration; insulation levels; rainfall intensity; degree days; energy costs; contractors' overhead and profit factors; insurance, bonds, permits, and taxes; climate conditions; and productivity factors. It includes a process that shows the user the available codes and allows the user to enter only valid codes. It includes a means of storing the codes and retrieving the information from the appropriate knowledge bases for use in calculating the facility cost.

13. It includes a knowledge base according to feature 5 that is used to store all of the user inputs and selections during the project description process and is used by the other sections to link the various knowledge bases together during the process to retrieve key factors and information.

14. It includes a means according to feature 2 to calculate the direct cost of construction including all of the work necessary to build the facility in the location specified using any one or a combination of three estimating methods. It includes a comparative method based on historical costs of projects at the facility type level of the hierarchy with adjustment factors that break the costs down to the Element level of the hierarchy. It includes a series of three generic model methods based on construction practices, engineering equations, expert judgements, and safety codes that determines the requirements at each level of the hierarchy from the facility type to the Element level of the hierarchy. It includes a generic building systems model that covers primary facilities to the five foot line, a series of generic models that cover supporting facilities outside the five foot line; and a specialized series of supporting facility models for a complete airfield. It includes a Quantity Take-Off method that can be used in conjunction with the other two methods or by itself that allows the user to identify the requirements or adjust any of the requirements from the CCMAS unique Assembly level through the Element level of the hierarchy.

15. It includes a comparative method according to feature 14 based on historical costs of projects at the facility category level of the hierarchy with adjustment factors that break the costs down to the CCMAS-UNIFORMAT System, CSI Division level then distribution factors that further break the cost out at the Element level of the hierarchy for both the primary facility and supporting facilities (work outside the five foot line of the building). It includes a process that takes historical facility construction costs from completed facilities from commercial and government sources and puts them together into a common knowledge base; assigns facility category codes to each facility; location, units of measure, scope, award date, location adjustment factor at award, and costs for the primary facility and supporting facilities.

16. It includes a process according to feature 15 which combines facility categories together into facility types; allows the user to select limits on facility size, location, data sources, and units of measure; selects the facility family to assign to this facility type; allows the user to select the escalation rates used; and then performs a regression on the data using one of the following equations at the users option to determine the equation coefficients for the primary facility:

| | |
|---|---|
| Non-Linear: | $y = a * x^b$ |
| Department of Defense Non-Linear: | $y = a * e^{(-bx)}$ |
| Linear: | $y = a + b * x$ |

17. It includes a process according to feature 15 which shows the user all available equations for the particular facility category identified in the project description phase of the process; gets the appropriate parameter from the user; and calculates the results of the equation. It also includes a process that automatically adjust the primary facility costs to account for different seismic conditions, climates, number of stores, subsurface conditions, number of basement levels, exterior closure type, interior layout (open offices vs individual offices), elevators, sprinklers, central plant heating vs boilers, emergency generators, uninterruptible power, shielding for TEMPEST and HEMP, and clean room requirements at the facility type level of the hierarchy based on the location selected during the project description process and answers to questions on applicability of each item to the facility being analyzed. It includes a knowledge base according to feature 7 that contains seismic and climate codes that link the location to an adjustment factor that is used in a process to adjust the results of the equation for seismic and climate effects on the facility construction cost. It includes a means of determining the relationship between the seismic and climate zones and cost of construction based on historical data, expert judgement, and results of analysis from the generic models; storing the information; retrieving the information; and calculating the adjustment to the facility cost. It includes two knowledge bases according to feature 7 that contain questions, answers, and adjustment factors for the remaining adjustments to the primary facility costs. It includes a process that shows the user the questions and all possible answers, gets the user answers, stores the results, and retrieves the appropriate adjustment factor. It includes a means of determining the relationship between the adjustment items and cost of construction based on historical data, expert judgement, and results from analysis of from the generic models; storing the information; retrieving the information; and calculating the adjustment to the facility cost at the facility type level of the hierarchy.

18. It includes a process according to feature 15 that creates regression equations coefficients for the non-linear equation for three general categories of supporting facility work (outside the five foot line of the building) and an overall split of costs between the three major categories of supporting facilities (pavements, utilities, and site improvements) by System level of the hierarchy using historical data. This process includes a means that links the facility type to the proper equations for determining the costs associated with these three major categories of supporting facilities, calculates the costs based on the equation, and stores the results at the CCMAS-UNIFORMAT System level of the hierarchy. In addition to the three general categories of supporting facilities, it includes a knowledge base of construction items at the CSI Division level of the hierarchy to cover work not included in the three general categories of supporting facilities for demolition of buildings and pavement, extensions to aircraft parking aprons, communications ducts, extensions to primary utility distribution systems, special power suppression systems, special system furniture, special power systems, special heating and Air Conditioning systems, and special soil conditions. It includes a process that shows the user the available items groups by the System level of the hierarchy, gets the quantity from the user, and stores the results. It includes a means of determining the cost for these items based on historical data, expert judgement, and results from analysis or from the generic models; storing the information; retrieving the information; and calculating the cost at the CSI Divisional level of the hierarchy.

19. It includes a process and knowledge base according to feature 15 that breaks the facility type level costs generated from the regression equations down to the CCMAS-UNIFORMAT System level, the CCMAS-UNIFORMAT System level, and CCMAS unique assembly costs down tot he CSI Division level. It includes a process and knowledge base that further breaks the CSI division level costs down to the Element level of the hierarchy to be completely compatible with the other direct cost methods. It includes a process where these adjustment factors are developed based on historical information, expert judgements, and results of the generic models; storing the information; retrieving the information; calculating the cost at the Element level of the hierarchy; and storing the results for use by the other process in CCMAS.

20. It includes a series of generic building models according to feature 14 that use a series of knowledge bases and algorithms to generate quantities at each level of the hierarchy from the Facility Functional Space level down to the Element level with just the project description information, the facility type, and facility quantity for work inside the five foot line of the facility. It includes a process that shows the user the results at each level of the hierarchy down to the assembly level and allows the user to modify the default factors calculated and automatically follow the hierarchy structure based on the default factors or user modification. It includes the capability to easily change the factors and algorithms at any level because of new construction methods and materials and automatically incorporate those new features into the process without having to modify any other parts of the process. It includes a feature to take the results of the generic models and use them in the comparative process to develop knowledge bases and factors for that process.

21. It includes knowledge bases according to feature 20 which contains geographical location adjustment factors that are linked to the location code input as part of the project description. It includes a process to extract the correct data from the knowledge bases based on the project description information to adjust the facility for seismic zone, frost penetration, climate, heating and cooling degree days, and insulation levels at the appropriate level of the hierarchy. It includes a means of determining the relationship between the requirements at each level of the hierarchy and the location parameters based on historical data, building safety codes, expert judgement, and engineering principles; storing the information; and retrieving the information for use in calculating the quantities at each level of the hierarchy. This process includes the ability to adjust factors as well as change the specific hierarchy path used for the facility.

22. It includes knowledge bases according to feature 20 which contain the default factors used at the Facility Functional Space and CCMAS-UNIFORMAT System levels of the hierarchy. It includes a process which uses a series of algorithms along with the default factors to describe the facility to the user. The process shows the results to the user, gets user modifications, processes the modifications, and stores the results to be used in the next level of the hierarchy or for additional processing at this level. The process includes a means for show the user the results in a set precedence order so that results computed for one algorithm that are used as input to another algorithms are computed first. It includes default parameters and algorithms for functional space requirements by space usage; stories above and below grade; floor and ceiling heights above and below grade; footprint, perimeter; roof area; exterior wall area; exterior window area, heating and cooling load; electric load; number of stairwells; exterior door density; domestic water and sanitary waste densities; special plumbing density; soil type; superstructure type; bay size; stair type; roof type and slope; exterior wall type; heat generation type; cooling generation type; interior partition, door, window, finish, and plumbing fixture densities by functional space type. It includes a means of determining the relationship between the requirements at each level of the hierarchy and the functional space parameters based on historical data, building safety codes, expert judgement, and engineering principles; storing the information; and retrieving the information for use in calculating the quantities at each level of hierarchy. This process includes the ability to adjust factors as well as change the specific hierarchy path used for the facility.

23. It includes knowledge bases according to feature 20 which contain the default factors used at the CCMAS-UNIFORMAT Subsystem, CCMAS unique Assembly Category, and CCMAS unique Assembly levels of the hierarchy. It includes a process that uses a series of algorithms along with the default factors to describe the facility to the user. The process shows the results to the user, gets user modifications, processes the modifications, and stores the results to be used in the next level of the hierarchy. It includes a means of determining the relationship between the requirements at one level of the hierarchy and the next higher level parameters based on historical data, building safety codes, expert judgement, and engineering principles; storing the information; and retrieving the information for use in calculating the quantities at each level of the hierarchy. This process includes the ability to adjust factors as well as change the specific hierarchy path used for the facility. It includes processes and data to alter the hierarchy structure used for the facility at each level of the hierarchy. It includes a means where the hierarchy path is altered by a series of knowledge bases that modify the factors and alter the path throughout the hierarchy to properly model the facility.

24. It includes a knowledge base according to features 21 and 23 which contains a seismic zone code along with an altered hierarchy path and factors that is linked to the facility location specified in the project description. It includes a process that checks this knowledge base at each of the hierarchy levels from the CCMAS-UNIFORMAT Subsystem down to the CCMAS unique Assembly level for adjustments to the hierarchy path and factors for the algorithms. The process gets the adjustments from the knowledge base, makes the adjustment, and shows the user the new path and factors.

25. It includes a knowledge base according to features 21 and 23 which contains a frost penetration zone code along with an altered hierarchy path and factors that is linked to the facility location specified in the project description. It includes a process that checks this knowledge base at each of the hierarchy levels from the CCMAS-UNIFORMAT Subsystem down to the CCMAS unique Assembly level for adjustments to the hierarchy path and factors for algorithms. The process gets the adjustments from the knowledge base, makes the adjustment, and shows the user the new path and factors.

26. It includes a knowledge base according to features 21 and 23 which contains a heat/insulation code along with an altered hierarchy path and factors that is linked to the facility location specified in the project description. It includes a process that checks this knowledge base at each of the hierarchy levels from the CCMAS-UNIFORMAT Subsystem down to the CCMAS unique Assembly level for adjustment to the hierarchy path and factors for the algorithms. The process gets the adjustments from the knowledge base, makes the adjustment, and shows the user the new path and factors.

27. It includes a knowledge base according to feature 23 which contains a selection process to choose the correct Assembly in the hierarchy to use based on up to three descriptive parameters and one set of ranges. It includes a process that automatically searches the knowledge base at the CCMAS unique Assembly Category level for Assembly Categories with alternate paths identified in this knowledge base; extracts the descriptive and range parameters codes; uses these codes to extract the parameter values entered by the user (or default values if the user did not change the default values); makes the correct selection of the Assembly to use based on these parameter values; and extracts the adjustment factor to use for the Assembly. It includes a means of determining the relationship between the requirements at the assembly level of the hierarchy and the facility parameters based on historical data, building safety codes, expert judgement, and engineering principles; storing the information; and retrieving the information for use in calculating the quantities at the CCMAS Assembly level of the hierarchy. This process includes the ability to adjust factors as well as change the specific hierarchy path used for the facility. It includes the capability to select items based on what is typically available and typically used in the construction of a facility for items such as air conditioning, boilers, electrical panels and transformers, and elevators. This process includes a list of typically available items such as a 200 Ton Centrifugal Air Conditioning System and the process to select this item if the Air Conditioning system type parameter is Centrifugal and the Cooling Load Parameter is between 151 and 200 tons. It also includes the ability to select items based on multiple parameters where the quantity from the next higher level in the hierarchy and one selection parameter is not adequate to make the selection of the correct item such as for the foundation, superstructure, roof system, and exterior closure where the selection may be based on parameters such as the bay size, superstructure type, soil type, and number of stories. It includes the capability to add additional selection parameters and the process will automatically use them in the selection process.

28. It includes knowledge bases according to feature 20 which contain the default factors used at the CSI Division, CSI Composite Item Number, and Element levels of the hierarchy. It includes a process that uses a series of algorithms along with the default factors to describe the facility to the user. The process shows the results to the user and stores the results. It includes a means of determining the relationship between the requirements at one level of the hierarchy and the next higher level parameters based on historical data, building safety codes, expert judgement, and engineering principles; storing the information; calculating the cost at the Element level of the hierarchy; and storing the results for use by the other process in CCMAS.

29. It includes a series of generic supporting facility models according to feature 14 which use a series of knowledge bases and algorithms to generate quantities at each level of the hierarchy from the Facility Type level down to the Element level with just the project description information, the facility type, and facility quantity for work outside the five foot line of a facility for earthwork, roads and parking, bridges and structures, sewer systems, gas and water distribution, heat distribution, site electrical, treatment plants and lift stations, and other facilities. It includes a process which shows the user the results at each level of the hierarchy down to the CCMAS Assembly level and allows the user to modify the default factors calculated and automatically follow the hierarchy structure based on the default factors or user modification. It includes the capability to easily change the factors and algorithms at any level because of new construction methods and materials and automatically incorporate those new features into the process without having to modify and other parts of the process. It includes a feature to take the results of the generic models and use them in the comparative process to develop knowledge bases and factors for that process.

30. It includes knowledge bases according to feature 29 which contain the default factors used at the Facility Category, CCMAS-UNIFORMAT System, CCMAS-UNIFORMAT Subsystem, and CCMAS Assembly Category levels of the hierarchy. It includes a process that uses a series of algorithms along with the default factors to describe the facility to the user. The process shows the results to the user, gets user modifications, processes the modifications, and stores the results to be used in the next level of the hierarchy or for additional processing at this level. This process includes a means to show the user the results in a set precedence. order so that results computed for one algorithm that are used as input to another algorithm are computed first. It includes a means of determining the relationship between the requirements at each level of the hierarchy based on historical data, building safety codes, expert judgement, and engineering principles; storing the information; and retrieving the information for use in calculating the quantities at each level of the hierarchy. This process includes the ability to adjust factors as well as change the specific hierarchy path used for the facility.

31. It includes knowledge bases according to feature 29 which contain the default factors used at the CCMAS Assembly level of the hierarchy. It includes a process that uses a series of algorithms along with the default factors to describe the facility to the user. The process shows the results to the user, gets user modifications, processes the modifications, and stores the results to be used in the next level of the hierarchy. It includes a means of determining the relationship between the requirement at one level of the hierarchy and the next higher level parameters based on historical data, building safety codes, expert judgement, and engineering principles; storing the information; and retrieving the information for use in calculating the quantities at the CCMAS Assembly level of the hierarchy. This process includes the ability to adjust factors as well as change the specific hierarchy path used for the facility. It includes processes and data to alter the hierarchy structure used for the facility at the CCMAS Assembly level of the hierarchy. It includes a means where the hierarchy path is altered by a series of knowledge bases that modify the factors and alter the path throughout the hierarchy to properly model the facility.

32. It includes a knowledge base according to feature 31 which contains a list of available pipe assemblies based on type and size for each of the various pipe models. It includes a process that shows the user the available pipe types and sizes based on the facility type chosen; retrieves the new default factors for the algorithms; shows the values to the user for modification; stores the user modifications; calculates the CCMAS Assembly quantity; and stores the results for the quantity and altered hierarchy path chosen. It includes a means of determining the relationship between the requirements at the CCMAS Assembly level of the hierarchy and the facility parameters based on historical data, building safety codes, expert judgement, and engineering principles; storing the information; and retrieving the information for use in calculating the quantities at the CCMAS Assembly level of the hierarchy. This process includes the ability to adjust factors as well as change the specific hierarchy path used for the facility. It includes the capability to add additional pipe types and sizes to the knowledge base and the process will automatically use them in the selection process.

33. It includes knowledge bases according to feature 29 which contain the default factors used at the CSI Division, CSI Composite Item Number, and Element levels of the hierarchy. It includes a process that uses a series of algorithms along with the default factors to describe the facility to the user. This process shows the results to the user and stores the results. It includes a means of determining the relationship between the requirements at one level of the hierarchy and the next higher level parameters based on historical data, building safety codes, expert judgement, and engineering principles; storing the information; calculating the cost at the Element level of the hierarchy; and storing the results for use by the other process in CCMAS.

34. It includes a specialized series of supporting facility models for a complete airfield according to feature 14 which use a series of knowledge bases and algorithms to generate quantities at each level of the hierarchy from the Facility Type level down to the Element level with just the project description information and the aircraft type for all work to construct an airfield consisting of the runways, taxiways, parking aprons, pads, lighting, markings, fencing, power, barrier, revetments, and control tower. It includes a process which shows the user the results at each level of the hierarchy down to the CCMAS Assembly level and allows the user to modify the default factors calculated and automatically follows the hierarchy structure based on the default factors or user modifications. It includes the capability to easily change the factors and algorithms at any level because of new construction methods and materials and automatically incorporate those new features into the process without having to modify any other parts of the process. It includes a feature to take the results of the generic model and use them in the comparative process to develop knowledge bases and factors for that process.

35. It includes knowledge bases according to feature 34 which contain the default factors used at the Facility Category, CCMAS-UNIFORMAT System, CCMAS-UNIFORMAT Subsystem, and CCMAS Assembly Category levels of the hierarchy. It includes a process that uses a series of algorithms along with the default factors to describe the facility to the user. The process shows the results to the user, gets user modifications, processes the modifications, and stores the results to be used in the next level of the hierarchy or for additional processing at this level. The process includes a means to show the user the results in a set precedence order so that results computed for one algorithm that are used as input to another algorithm are computed first. It includes a means of determining the relationship between the requirements at each level of the hierarchy based on historical data, building safety codes, expert judgement, and engineering principles; storing the information; and retrieving the information for use in calculating the quantities at each level of the hierarchy. This process includes the ability to adjust factors as well as change the specific hierarchy path used for the facility.

36. It includes a series of knowledge bases according to feature 35 that contains the basic dimensions and runway loading for each Air Force aircraft and several commercial U.S. aircraft. It includes a process that retrieves the CCMAS-UNIFORMAT System and CCMAS-UNIFORMAT Subsystem level hierarchy structure and factors to use for the basic airfield load type (heavy, medium, light, or shortfield) and traffic area, airfield dimensions, aircraft clearances, number of aircraft per squadron, and number of squadrons based on the aircraft selected. It includes a means of determining the relationship between the aircraft type and airfield requirements based on Air Force and FAA regulations, building safety codes, expert judgement, and engineering principles; storing the information; and retrieving the information for use in calculating the quantities. This process includes the ability to adjust factors as well as change the specific hierarchy path used for the facility.

37. It includes a knowledge base according to feature 35 that contains the basic earthwork dimensions for excavation for different terrains and airfield load type. It includes a process that retrieves the CCMAS-UNIFORMAT System and CCMAS-UNIFORMAT Subsystem level hierarchy structure and factors to use for the basic airfield lengths, widths, slope, cut and fill, and undercut factors based on the airfield load type (heavy, medium, light, or shortfield). It includes a means of determining the relationship between the airfield load type and earthwork requirements based on Air Force and FAA regulations, building safety codes, expert judgement, and engineering principles; storing the information; and retrieving the information for use in calculating the quantities. This process includes the ability to adjust factors as well as change the specific hierarchy path used for the facility.

38. It includes a series of knowledge bases according to feature 35 that contain the pavement factors for different pavement types and climates. It includes a process which retrieves the CCMAS-UNIFORMAT System and CCMAS-UNIFORMAT Subsystem level hierarchy structure and factors to use for the pavement based on the airfield load type, traffic area, soil bearing ratio, type of pavement, degree days, and frost zone. It includes a means of determining the relationship between the airfield pavement factors for subbase, base, sand layer, prime coat, binder, wearing surface, joints, and reinforcing for all types of pavements used for airfields for all types of existing soil conditions and climates including subartic based on Air Force and FAA regulations, building safety codes, expert judgement, and engineering principles; storing the information; and retrieving the information for use in calculating the quantities. This process includes the ability to adjust factors as well as change the specific hierarchy path used for the facility.

39. It includes two knowledge bases according to feature 35 which contain the basic storm drainage requirements for different rainfall intensities. It includes a process that retrieves the CCMAS-UNIFORMAT System and CCMAS-UNIFORMAT Subsystem level hierarchy structure and factors to use for the storm drainage pipe sizes, headwalls, based on the rainfall intensity for the location specified in the project description part of the process. It includes a means of determining the relationship between the storm drainage pipe sizes based on Air Force, building safety codes, expert judgement, and engineering principles; storing the information; and retrieving the information for use in calculating the quantities. This process includes the ability to adjust factors as well as change the specific hierarchy path used for the facility.

40. It includes a knowledge base according to feature 35 which contains the basic storm drainage structure requirements for different rainfall intensities. It includes a process which retrieves the CCMAS-UNIFORMAT System and CCMAS-UNIFORMAT Subsystem level hierarchy structure and factors to use for the storm drainage pipe sizes based on the rainfall intensity for the location specified in the projection description part of the process. It includes a means of determining the relationship between the storm drainage pipe sizes based on Air Force, building safety codes, expert judgement, and engineering principles; storing the information; and retrieving the information for use in calculating the quantities. This process includes the ability to adjust factors as well as change the specific hierarchy path used for the facility.

41. It includes knowledge bases according to feature 34 which contain the default factors used at the CCMAS Assembly level of the hierarchy. It includes a process which uses a series of algorithms along with the default factors to describe the facility to the user. The process shows the results to the user, gets user modifications, processes the modifications, and stores the results to be used in the next level of the hierarchy. It includes a means of determining the relationship between the requirements at one level of the hierarchy and the next higher level parameters based on historical data, Air Force and FAA regulations, building safety codes, expert judgement, and engineering principles; storing the information; and retrieving the information for use in calculating the quantities at the CCMAS Assembly level of the hierarchy. This process includes the ability to adjust factors as well as change the specific hierarchy path used for the facility. It includes processes and data to alter the hierarchy structure used for the facility at the CCMAS Assembly level of the hierarchy. It includes a means where the hierarchy path is altered by a series of knowledge bases that modify the factors and alter the path throughout the hierarchy to properly model the facility.

42. It includes knowledge bases according to feature 34 which contain the default factors used at the CSI Division, CSI Composite Item Number, and Element levels of the hierarchy. It includes a process that uses a series of algorithms along with the default factors to describe the facility to the user. This process shows the results to the user and stores the results. It includes a means of determining the relationship between the requirements at one level of the hierarchy and the next higher level parameters based on Air Force and FAA regulations, historical data, building safety codes, expert judgement, and engineering principles; storing the information; calculating the cost at the Element level of the hierarchy; and storing the results for use by the other process in CCMAS.

43. It includes a Quantity Take-Off method according to feature 14 that can be used in conjunction with the other two direct cost methods or by itself that allows the user to identify the requirements or adjust any of the requirements from the CCMAS Assembly level through the Element level of the hierarchy. It includes a series of processes that allows the user to select CCMAS Assemblies, CSI Composite Items, or Elements from the various data files, or copy in items from other estimates to form a new combined estimate. It also includes a process to use CCMAS Assembly level data created for the generic models by getting the quantity from the user and calculating the CSI Composite level quantities based on the factors stored. It includes the capability to add user defined items from the System to Element level of the hierarchy. It also includes the capability for the user to redefine the hierarchy structure for the project by either modifying the existing structure or adding to the existing structure.

44. It includes a means according to feature 2 to identify and apply modifiers to the direct costs for different construction methods; for risk associated to the project; to adjust the project schedule; to adjust the cost for differences in material, labor and equipment prices at different locations; for the effects of inflation over time; to account for supervision and inspection of the construction; pay for the design; and pay for unforeseen conditions that may be encountered during construction. It includes a process that links the modifiers to the direct cost at different levels of the hierarchy structure.

45. It includes a knowledge base according to feature 44 which contains a location code that links the project description information to adjust costs by the 18 CSI Divisions and five CCMAS Elements (material cost, labor cost, equipment cost, labor hours, and equipment hours) by location to account for differences in construction materials and the mix of labor and equipment used by different states and countries. It includes a means of determining the relationship between the average United States construction methods and methods at other places in the world based on historical data, building safety codes, expert judgement, and engineering principles; storing the information; applying the adjustment factors; and storing the results for use by the other processes.

46. It includes a series of knowledge bases and algorithms according to feature 44 that link the facility type, cost, stage of design, and information known about the project to the risk associated with the project to account for unknown requirements. It includes a means of determining the relationship between the information known about the facility and the possible range of costs for the project based on historical data and expert judgement; storing the information; applying the adjustment factors; and storing the results for use by the other processes.

47. It includes a series of knowledge bases and algorithms according to feature 44 that link the type of work, construction type, scope, and cost to the schedule associated with the project at the CCMAS-UNIFORMAT System level of the hierarchy. It includes a means of determining the relationship between the information known about the project and the possible range of schedules for the project based on historical data and expert judgement; storing the information; applying the factors; and storing the results for use by the other processes.

48. It includes a series of knowledge bases and algorithms according to feature 44 that link the type of work, construction type, and location to the schedule to account for costs at different locations for material, labor, and equipment; to account for escalation; to account for the cost for supervising the contractor; to account for typical unforeseen requirements; and to account for the cost to design the project. It includes a means of determining the relationship between the information known about the project and the possible factors based on historical data, Air Force regulations, and expert judgement; storing the information; applying the factors; and storing the results for use by the other processes.

49. It includes a means according to feature 2 to calculate the direct cost for the contractors overhead and profit including all of the work necessary for the contractor to manage the workforce in the location specified using any one or a combination of three estimating methods. It includes a comparative method based on historical overhead and profit requirements of projects at the facility type level of the hierarchy with adjustment factors that break the costs down to the Element level of the hierarchy. It includes a generic model method based on construction practices, engineering equations, expert judgements, and safety codes that determines the requirements at each level of the hierarchy from the facility type to the Element level of the hierarchy. It includes a Quantity Take-Off method that can be used in conjunction with the other two methods or by itself that allows the user to identify the requirements or adjust any of the requirements from the CCMAS Assembly level through the Element level of the hierarchy.

50. It includes a comparative method according to features 49 based on historical projects at the facility category level of the hierarchy with adjustment factors that break the costs down to the CSI Division level and distribution factors that further break the cost out at the Element level of the hierarchy for mobilization cost; bidding climate for competition; availability of manpower, materials, and equipment; weather effects on constructing the building; project complexity; working conditions; workmen's compensation; and amount subcontracted. It includes a series of knowledge bases and algorithms that link the project direct cost, type of project, location, and working conditions to the contractor overhead and profit requirements. It includes a means of determining the relationship between the information known about the project and the contractor overhead and profit costs based on historical data and expert judgement; storing the information; applying the factors; and storing the results for use by the other processes.

51. It includes a generic building model according to feature 49 which uses a series of knowledge bases and algorithms to generate quantities at each level of the hierarchy from the Facility Category level down to the Element level with the project description information, the direct costs, and modifiers. It includes a process that shows the user the results at each level of the hierarchy down to the CCMAS Assembly level and allows the user to modify the default factors calculated and automatically follow the hierarchy structure based on the default factors or user modification. It includes the capability to easily change the factors and algorithms at any level because of new methods and automatically incorporate those new features into the process without having to modify any other parts of the process. It includes a features to take the results of the generic model and use it in the comparative process to develop knowledge bases and factors for that process.

52. It includes knowledge bases according to feature 51 which contains geographical location adjustment factors that are linked to the location code input as part of the projection description. It includes a process to extract the correct data from the knowledge bases based on the project description information to adjust the overhead and profit for mobilization, construction camps, material plants, heating and cooling, transportation, insurance, bonds, taxes, and workmen's compensation at the appropriate level of the hierarchy. It includes a means of determining the relationship between the requirements at each level of the hierarchy and the location parameters based on historical data, building safety codes, expert judgement, and engineering principles; storing the information; and retrieving the information for use in calculating the quantities at each level of the hierarchy. This process includes the ability to adjust factors as well as change the specific hierarchy path used for the facility.

53. It includes knowledge bases according to feature 51 which contain the default factors to split the direct cost by CSI Division and by material, labor, and equipment for the prime contractor, major subcontractor, and minor subcontractors based on type of work. The process shows the factors to the user, gets user modifications, processes the modifications, and stores the results to be used in the next level. It includes a means of determining the relationship between the type of work and who will accomplish the work based on historical data and expert judgement; and storing the information.

54. It includes knowledge bases according to feature 51 which contain the default factors used at the CCMAS-UNIFORMAT Subsystem, CCMAS Assembly Category, and Assembly levels of the hierarchy by location and type of work. It includes a process that uses a series of algorithms along with the default factors to describe the work to the user. The process shows the results to the user, gets user modifications, processes the modifications, and stores the results to be used in the next level of the hierarchy. It includes a means of determining the relationship between the requirements at one level of the hierarchy and the next higher level parameters based on historical data, building safety codes, expert judgement, and engineering principles; storing the information; and retrieving the information for use in calculating the quantities at each level of the hierarchy. This process includes the ability to adjust factors as well as change the specific hierarchy path used for the facility. It includes processes and data to alter the hierarchy structure used for the facility at each level of the hierarchy. In includes a means where the hierarchy path is altered by a series of knowledge bases that modify the factors and alter the path throughout the hierarchy to properly model the contractor overhead and profit requirements.

55. It includes a series of knowledge bases according to features 52 and 54 which contain a location code along with an altered hierarchy path and factors that is linked to the facility location specified in the project description and the direct cost to determine the bond, insurance, tax, workmen's compensation, and permits requirements by prime contractor and major and minor subcontractors. The process gets the adjustments from the knowledge base, makes the adjustment, and shows the user the new path and factors. It includes a means of determining the relationship between the location and bond, insurance, tax, workmen's compensation, and permits requirements by prime contractor and major and minor subcontractors based on historical data and state and country requirements; and storing the information.

56. It includes knowledge bases according to feature 51 which contain the default factors used at the CSI Division, CSI Composite Item Number, and Element levels of the hierarchy. It includes a process that uses a series of algorithms along with the default factors to describe the facility to the user. This process shows the results to the user and stores the results. It includes a means of determining the relationship between the requirements at one level of the hierarchy and the next higher level parameters based on historical data, building safety codes, expert judgement, and engineering principles; storing the information; calculating the cost at the Element level of the hierarchy; and storing the results for use by the other process in CCMAS.

57. It includes a Quantity Take-Off method according to feature 49 that can be used in conjunction with the other two contractor overhead and profit direct cost methods or by itself that allows the user to identify the requirements of adjust any of the requirements from the CCMAS Assembly level through the Element level of the hierarchy. It includes a series of processes that allows the user to select CCMAS Assemblies, CSI Composite Items, or Elements from the various data files, or copy in items from other contractor overhead and profit estimates to form a new combined estimate. It also includes a process to use CCMAS Assembly level data created for the contractor overhead and profit generic model by getting the quantity from the user and calculating the CSI Composite level quantities based on the factors stored. It includes the capability to add user defined items from the System to Element level of the hierarchy. It also includes the capability for the user to redefine the hierarchy structure for the project by either modifying the existing structure or adding to the existing structure.

58. It includes a process according to feature 2 that takes the data from the previous four processes and produces the estimated cost of construction for the time and location specified for the expected cost and the standard deviation about the expected cost based on the information in the project definition modifier. It uses a process that includes the application of the Tchebyscheff Inequality model to calculate an expected cost at 50% confidence along with a high cost at 95% confidence based on the information provided in the project definition section of the modifiers and a series of algorithms that identify the correlation between the various components of construction costs. It includes a means of determining the correlation between the various cost components based on historical data, expert judgement, and engineering principles; storing the information; calculating the expected cost, standard deviation, and 95 percent confidence cost; and storing the results for use by the other process in CCMAS.

59. It includes a process according to feature 2 which produces several analysis reports that allow the user to compare two estimates at the Facility Category level for direct cost and each modifier for total cost, scope, and unit cost; at the CCMAS-UNIFORMAT System, CCMAS-UNIFORMAT Subsystem, CCMAS Assembly, or Line Item Level by Resource Element; and allows the user to combine facilities to form programs to compare program differences for individual facilities, by year, by appropriation, by location, and by project.

60. It includes a means according to feature 2 to calculate the cost to operate, maintain, and repair a facility over its life. It uses a series of knowledge bases and algorithms to generate quantities at each level of the hierarchy from the Facility Category level down to the Element level with the project description information, the direct costs, and modifiers. It includes a process that shows the user the results and allows the user to modify the default factors calculated and automatically follow the hierarchy structure based on the default factors or user modification. It includes the capability to easily change the factors and algorithms at any level because of new methods and automatically incorporate those new features into the process without having to modify any other parts of the process.

61. It includes a knowledge base according to feature 60 which contains the default factor used to escalate the construction, operations, maintenance, repair, energy, and cleaning costs based on year, type of cost, and region of the world. It includes a means of determining the relationship between the projected cost at future times and the cost type and region of the work based on historical data, Department of Energy projections, expert judgement, and Department of Defense projections; storing the information; calculating the time value of the cost at the Element level of he hierarchy; and storing the results for use by the other process in CCMAS.

62. It includes series of knowledge bases according to feature 60 that contain the link between the Facility Category, Department of Energy Use Profiles, and location of the project and the energy use for heating, Air Conditioning, lights, and fans. It also includes a linkage between the life expectancy of the item and location that is used in a process to adjust the life expectancy of energy generating components based on amount of use of the item. It includes a process that uses the degree days heating and cooling and facility operating schedule by building type to adjust the life expectancy. It includes a means of determining the relationship between the energy use, facility type, Department of Energy Building Profiles, and location based on historical data, Department of Energy projections, and expert judgement; storing the information; calculating the energy use; and storing the results for use by the other process in CCMAS.

63. It includes series of knowledge bases according to feature 60 which contain the link between amount of time maintenance is deferred and the change in cost for maintenance, repair, and operations; life expectancy of the building components; and energy use of the building components by CSI Composite level of the hierarchy. It includes a process that identifies each facility component by its usage in the building based on whether it is used as a dynamic exterior, dynamic interior, transport exterior, transport interior, static exterior, or static interior item to determine the effect of deferred maintenance on the item by how it is used in the building. It includes a means of determining the relationship between deferred maintenance and the cost to operate, maintain, and repair items; their life expectancy; and their energy usage by how the item is used in the facility based on historical data and expert judgement; storing the information; calculating the effect of deferred maintenance; and storing the results for use by the other process in CCMAS.

64. It includes series of knowledge bases according to feature 60 which contain the link between the facility CSI Composite level of the hierarchy, how the item is used in the facility, and the operations, maintenance, and repair requirements and life expectancy for the item. It includes a means of determining the relationship between the construction item and cost to operate, maintain, and repair the item over its life and its life expectancy based on historical data, trade associations, government agencies, manufacturers recommendations, and expert judgement; storing the information; calculating the costs; and storing the results for use by the other process in CCMAS.

65. It includes a series of knowledge bases and algorithms according to feature 60 that determines the cost for the facility by CSI Component level of the hierarchy by linking all of the processes in the Life Cycle Cost module together along with the cleaning cost and financing information input by the user and the construction cost calculated in other section of CCMAS. It includes a process that calculates the cost for each component based on all of the variables input by the user accounting for energy use, building schedule, deferred maintenance, location, life expectancy by component, salvage value, discount rate, and escalation rates to determine the total life cycle cost for the facility. It includes a process that shows the user the default cleaning requirements and financing information, allows the user to select alternative, stores the information, and uses it in several reports available to show the results of the process or to compare LCC analyses for two facilities.

BRIEF DESCRIPTION OF THE DRAWING

FIGS. 1–13 inclusive are flow charts of the CCMAS system, in which:

FIG. 1 shows the eight sections of steps of the computer program;

FIG. 2 shows the first section for Project Description;

FIGS. 3a & 3b, when arranged as shown in FIG. 3 shows the Comparative System;

FIGS. 4a & 4b, when arranged as shown in FIG. 4 shows the Generic System Model;

FIGS. 5a & 5b, when arranged as shown in FIG. 5 shows the Supporting Facility Models;

FIGS. 7a & 7b, when arranged as shown in FIG. 7 shows the QTO System;

FIGS. 8a, 8b, 8c, 8d, 8e & 8e, when arranged as shown in FIG. 8 shows the Modifiers;

FIG. 9 shows the Comparative Contractor Modifier;

FIGS. 10a & 10b, when arranged as shown in FIG. 10 shows the Generic Contractor Modifier Model;

FIG. 11 shows the Contractor Modifier QTO System;

FIG. 12 shows the Calculate Construction Costs Section;

FIG. 13 shows the Life Cycle Cost Model; and

DETAILED DESCRIPTION

The micofiche appendix comprises:
1. Source Code/File Listing.
2. Data Files.
3. Subschema.

OPERATIONS MANUAL

Figure 1:
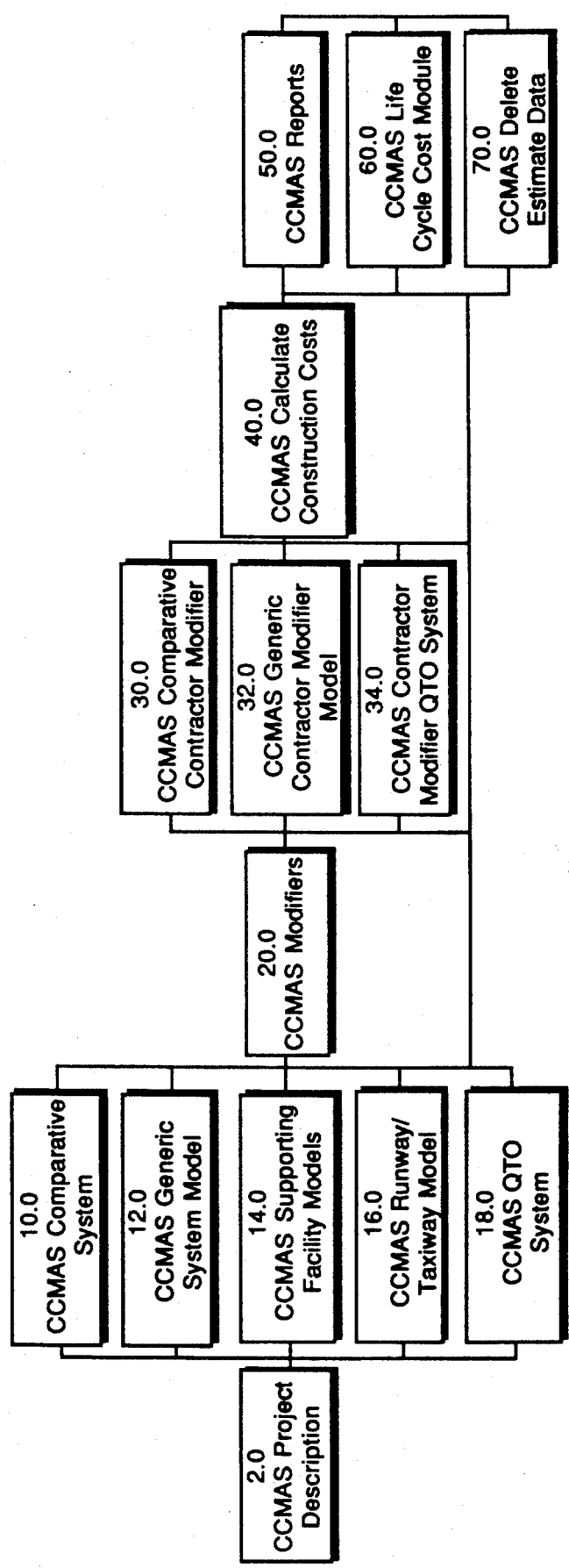

1. General. CCMAS is a totally integrated process designed to estimate and analyze the life cycle cost of facilities anywhere and anytime. The process is set up in a series of eight sections or steps as shown in FIG. 1 (comprising FIGS. 1a & 1b). The process is further broken down into a series of modules under each section. The system was designed to be able to add modules to each section to enhance the overall system capability. However, the addition of new or improved capabilities in one section does not require modifications to the other sections. All sections use the new capabilities automatically. The overall process starts with describing the project (2.0); then estimating and analyzing the direct cost (10.0 through 18.0); identification of modifiers or adjustments to the project for location, time, and other features (20.0); estimating the contractors overhead and profit (30.0, 32.0 and 34.0); calculating the construction cost or applying the modifiers to the direct cost (40.0); printing reports from the first five sections (50.0); estimating and analyzing the life cycle costs (60.0), and deleting the estimate data from the system (70.0). CCMAS uses knowledge bases stored in tables as factors for algorithms, to select more specific knowledge base from another table, and to store user input to the process. Additionally, CCMAS organizes the analysis by a building hierarchy structure. Following is an overall description of how the knowledge base tables are organized and the CCMAS Hierarchy structure.

a. CCMAS knowledge bases are organized by table number. Tables in the 100 series (T101, T103, etc.) contain the system factors, algorithm coefficients, and cost data used by all of the CCMAS modules. Tables in the 200 series (T203, T205, etc.) contain edit criteria for user input. They provide the allowable codes such as location codes, facility type codes or category codes, etc. CCMAS is designed so additional codes and factors are automatically available to the user. The 300 and 400 series tables (T301, T401, etc.) are project tables. This is where all of the project specific information entered by the user and calculated by CCMAS is stored for other modules to use or for the user to change. The 300 series tables are used by the construction cost portion of CCMAS while the 400 series tables are used by the Life Cycle Cost portion of CCMAS. Other tables and knowledge bases are used by CCMAS for specific functions. Most of these are intermediate processes where the data is discarded after the process is complete. For example, the 9000 series tables are used to update the QTO Data Base (Table T106).

b. CCMAS is organized along two Work Breakdown Structures (WBS). They are the UNIFORMAT WBS developed for the General Services Administration and the Construction Specifications Institute (CSI) WBS. UNIFORMAT breaks a building down by its systems to show where in the building the items are used. For example, it uses systems such as Superstructure, Interior Finishes. etc. without specifying the materials used. CSI is organized by building trades such as Metals, Masonry, Concrete, etc. CCMAS has developed a hybrid WBS code which effectively identifies both the building trade aspect (CSI) and the building system classification (CCMAS-UNIFORMAT). CCMAS-UNIFORMAT is used to group the line items into facility systems, subsystems, and CCMAS assemblies. CSI is used to apply adjustment factors for labor rates, workmen's compensations, etc. Therefore, each item used in a project has an identification code that contains both CCMAS-UNIFORMAT and CSI identification for the item. An example is concrete for a floor slab. Its character code may be 02010107033111165. This code is broken apart as follows:

| WBS Level | Code | Description |
| --- | --- | --- |
| System | 02 | Superstructure |
| Subsystem | 01 | Floor Construction |
| Assembly | 0305 | Composite Floor Slab, Large Span |
| CSI Division | 03 | Concrete |
| CSI Subdiv | 3 | Cast in Place Concrete |
| CSI Category | 11 | Normal Weight Structural Concrete |
| CSI Composite | 1165 | Less than 6" Pumped |

Following is a full description of the CCMAS Hierarchy:

| WBS LEVEL | DESCRIPTION |
| --- | --- |
| I | FACILITY-A facility encompasses an entire building or civil work needed to perform a function. |
| II | SYSTEM-A system is a general area of work required to construct a facility, e.g., the foundation, superstructure, mechanical or electrical system, etc. |
| III | SUBSYSTEM A subsystem is a distinguishable part of a system, e.g., pilings and footings are subsystems of foundations. |
| IV | ASSEMBLY-An assembly is a measurable portion of a subsystem, e.g., 50 LF of 2' × 4' continuous footing. |
| V | COMPOSITE A composite is the parts and tasks required to build an assembly, e.g., a foot of the 2' × 4' continuous footing requires specific materials and the tasks are excavate, set forms, place rebar, pour concrete, and strip forms. |
| VI | ELEMENT-An element divides each composite into the material, labor, and equipment required. | c. CCMAS Line Items. A CCMAS line item can be either at the composite or element level. All CCMAS composite items contain three element level costs. One for material, labor, and equipment. The difference between composite and elements is the labor and equipment cost included in the composites are expressed in terms of the material quantity. For example, a composite item for a square yard of concrete for an 8" slab will have the labor cost expressed in terms of cost per square yard based on the makeup of the crew (laborers, skilled workers, and foremen), and their productivity. The same is true for the equipment used by the crew. Their may be 10 element level items that are needed to equal the information expressed in one composite item. All composite items can be broken down to their elements in CCMAS.

Figure 2:
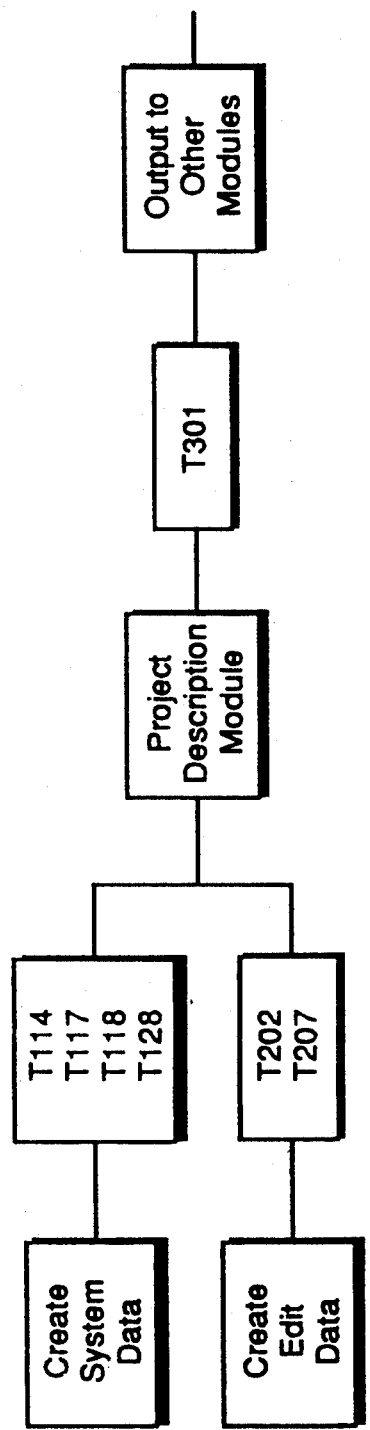

2.0 Project Description. (FIG. 2) This first section of CCMAS is used to get the key information on the project that is used throughout the process. This section gets the information from the user, checks to insure the user input is valid, and stores the information for use by the other sections of CCMAS. This section allows the user to copy data from previous projects or build a new description from scratch. Some of the basic project description information required includes the type of work, location, start date, need data, funding source, project name, and facility category code. CCMAS edits the data to insure it is in the knowledge bases. For example, the user can only enter locations that are stored in the location table because the other sections of CCMAS require information stored in these tables to operate. CCMAS is designed to be flexible and allows the user to select a general location if their specific location is not currently in the knowledge base. The user then enters the required information for their location. The CCMAS process is designed to allow the user to add or modify data in the system as necessary to accurately analyze the costs. Following is a description of the knowledge bases used by this module showing what is included, how it is developed, and how it is used by this process;

a. CCMAS Construction Management Factors Table—T114. This table contains information used by the modifiers section (3.0) to account for the cost of supervising and inspecting the construction contractors' work and to pay for any additional engineering and design required during construction. This information is tied to the specific construction agent used to mange the project. The project description module checks to insure the user enters a valid construction agent. Historical factors are used to develop this knowledge base.

b. Construction Management Contingency Factors Table—T117. This table contains information used by the modifiers section (3.0) to account for the cost of unforeseen conditions during construction. This information is tied to the type of construction code. The project description module checks to insure the user enters a valid type of construction code. Historical factors are used to develop this knowledge base.

c. Escalation Modifiers Factors Table—T118. This table contains information used by several CCMAS sections to account for cost differences for different time frames. The escalation tables are used to normalize data from several sources to the same point in time and then take that normalized data out to the point in time specified for the analysis. CCMAS is designed to be able to use escalation factors from several sources. This is especially useful as part of the Life Cycle Cost Analysis portion of the process where different escalation rates for the different components of the project can result in completely different economical solutions. CCMAS is designed to allow different escalation tables to be stored and used by the process. The project description module checks to insure the user selects a valid escalation table. Escalation factors are currently developed from several sources including the Department of Defense and commercial sources. Any source of escalation data can be loaded into CCMAS.

d. Design Modifier Factors Table—T128. This table contains information used by the modifiers section (3.0) to account for the cost of designing the project. This information is tied to the specific design agent used to manage the project design. The project description module checks to insure the user enters a valid design agent. Historical factors are used to develop this knowledge.

3. Type of Work Edit Table—T202. This table contains edit checks on the type of work. The type of work is a key piece of information used in several CCMAS tables in the other sections. By requiring the user to enter the type of work at the beginning of the process, the system insures a valid code is entered and the other modules can automatically select the correct data from the tables used by the other sections of CCMAS without asking the user to enter the code again. The project description module checks to insure the user enters a valid type of work.

f. Facility Category Code Edit Table—T203. This is one of the most important tables used by CCMAS. The facility category code identifies the use and a general description of the facility. The facility category code links several CCMAS processes together. The facility category code function is used to group facilities by similar features or parameters. For example, regression equations are developed using historical cost information based on grouping facilities with similar features. Creating these groupings by similar parameters and linking them together by the facility category code allows the system to get the correct knowledge base without the user having to search through several sources. Facility Category codes are based on Air Force codes and cover over 900 facility types. The project description module checks to insure the user enters a valid facility category code.

g. Geographic Location Edit Table—T207. This is another one of the most important tables used by CCMAS. The location code identifies where the facility is going to be built. But, more importantly, it is used to link several CCMAS tables and processes together. For example, the location code is used to adjust the facility for climate; seismic zone; material, labor, and equipment cost differences; building practices used at different locations, etc. Location differences, like differences in facility type, are automatically included in all CCMAS modules. The project description module checks to insure the user enters a valid location code.

h. CCMAS Project Description Table—T301. This table is used to store all of the user inputs and selections during the project description process. This information is used by the other CCMAS sections to link the various data files together during the process.

Figure 3B:
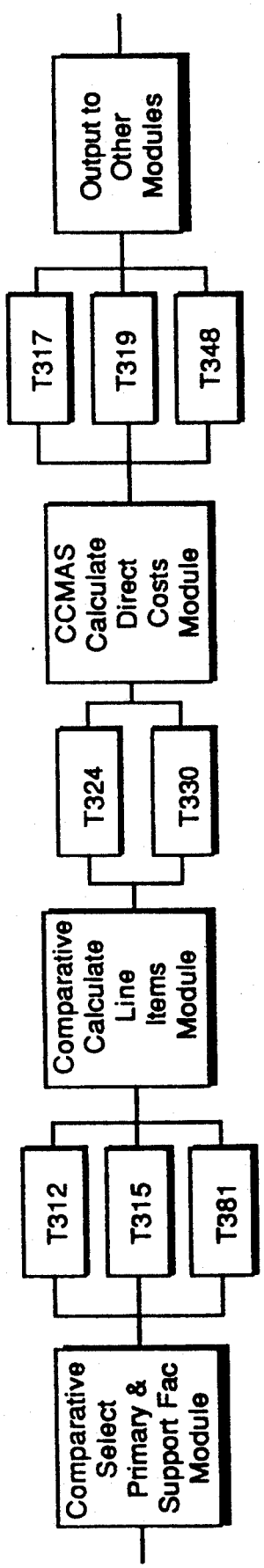

3. Create Direct Cost. This is the most extensive section in CCMAS. This section is used to create the direct cost of construction without adjustments for contractor overhead and profit, escalation, or location specific costs for labor, materials, and equipment. The other sections of CCMAS make these adjustments. This section does include all of the work necessary to build the facility in the location specified in terms of insulation levels, seismic considerations, heating and cooling loads, rainfall, etc. CCMAS has three estimating processes. They were developed to handle different levels of detail known about a project and the time required to accomplish the analysis. These processes are the comparative, generic models, and quantity take off. The generic models are further broken out into Generic Systems Models for typical building systems out to the five foot line, generic supporting facility models for work outside the five foot line of the building, and generic runway/taxiway models. The processes are not independent, but, linked together to share information and validate the other processes. Following is a description of how these processes work.

a. Comparative Process. This section (FIG. 3, comprising FIGS. 3a & 3b) requires the least amount of user input and time to execute. It uses historical information or information developed from the other process as a comparison to estimate a facility's cost. This process starts with costs at the facility level of the CCMAS Hierarchy and uses factors to break these costs down to the CCMAS-UNIFORMAT System, CCMAS-UNIFORMAT Subsystem, CCMAS Assembly, and CSI Division, then distributes the costs to the element level. The primary source of data used by this module is historical costs of actual executed projects. This historical cost is used to develop regression equations and cost adjustment factors. Additionally, the generic models and QTO processes described in the paragraphs below are used to develop additional cost adjustment factors for this process that are not readily available from historical cost information. Following is a description of how the knowledge bases are created for this process and how they are used.

(1) Historical Building Cost Knowledge Base Table—T105. This table is updated by a process that takes raw historical facility construction costs from completed construction projects from commercial and government sources and puts it together into a common knowledge base (T105). The process assigns standard Air Force codes to identify the facility type, location, units of measure, scope, award date, location adjustment factor at award, and costs for the primary building and work outside the five foot line of the building (supporting facilities). The process produces an error listing identifying all records that did not meet certain criteria such as size of project, identifiable location, data in all fields, etc. The user can them either ignore the faulty data, thus leaving it out of the CCMAS knowledge base, or get the information corrected from the source. The output from this process is a knowledge base (T105) of completed projects with data is all required fields. CCMAS uses raw historical construction costs from DoD and commercial sources. There are currently over 25,000 completed construction projects stored in CCMAS. The following Tables (knowledge bases) are used by this module:

| Table | Description |
|---|---|
| T105 | Comparative Historical Knowledge Base Table |
| T207 | CCMAS Geographical Location Edit Table |
| DODGE | F.W. Dodge Historical Cost File |
| DD813 | Department of Defense Historical Cost File |
| PDC | Air Force Historical Cost File |

(2) Comparative Regression Equations Table—T103. This table is created through a series of processes that allows the user to select which projects from Table T105 are used based on location, size, category code, and date of the project and what type or regression equation to use.

(a) The process starts with the user identifying a name for the facility type to be processed and selecting the regression method. Two types of non-linear regression equations are available along with linear regression as shown below:

| | |
|---|---|
| Non-Linear: | $y = a * x^b$ |
| Department of Defense Non-Linear: | $y = a * e^{(-bx)}$ |
| Linear: | $y = a + b * x$ |

These types were chosen based on an extensive analysis using curve fitting techniques. The Department of Defense non-linear is approved by the Department of Defense Tri-Service Cost Engineering Committee. This committee has Air Force, Army, and Navy experts in cost engineering.

(b) Next, the user selects which category codes to include, what facility sizes, which locations, which sources, and units of measure. All of the selection information is stored in tables so that process can easily be changed and reaccomplished or displayed to the user. The Category Codes selected are stored in table T161. The location selection information is stored in table T104. The remaining information is stored in table T103 with the final regression equations.

(c) Next, the user identifies a family category code to assign to this facility name. This is used during the estimating process to extract adjustments to the basic facility and supporting facility costs on effects of seismic zone, exterior closure, climate, etc. on this family of facilities. The family category code is an overall facility type such as maintenance facilities, housing facilities, warehouses, training facilities, etc.

(d) Next, the user is shown the size of the sample and can adjust the selection criteria and the escalation rates used to normalize the knowledge base to a common point in time. The common time reference is stored in table T116.

(e) Finally, the system performs the regression analysis and shows the user the results. At this time the process is complete unless the user wants to make further adjustments and rerun the regression. This process involves performing the regressions on the primary facility to compute the regression coefficients. Additionally, the process calculates average supporting facility percentages. These percentages are for the work outside the five foot line of the building for pavements, utilities, and site improvements. These percentages are based on the raw data supplied from the DoD and Air Force. The raw data provided only contains an overall cost for work outside the five foot line. The split between pavements, utilities, and site improvements is based on a separate analysis shown below. The following Tables (knowledge bases) are used to create Table T103:

| Table | Description |
|---|---|
| T103 | Comparative Regression Equations Table |
| T104 | Comparative Location Selection Table |
| T105 | Comparative Historical Knowledge Base Table |
| T116 | CCMAS Data Base Catalog Table |
| T118 | CCMAS Escalation Modifier Factors Table |
| T161 | Comparative Category Code Grouping Table |
| T162 | Comparative DoD Size Adjustment Curve Factors |
| T203 | CCMAS Facility Category Code Edit Table |
| T205 | Comparative Family Category Code Edit Table |

(3) Comparative Supporting Facility Regression Equations and Supporting Facility Percentage Breakout Table—T164. This table is created through a process that involves creating regression equations for three general categories of work outside the five foot line of the building and an overall split of costs between the three major categories of supporting facilities (pavements, utilities, and site improvements). This process creates regression equations and supporting facility percentage breakouts by family category code. Data is gathered separately for representative facilities within each family category code. For example, administrative facilities include buildings in the 600000 series of category codes. The knowledge bases include a breakout of costs by facility component. These costs are then separated into the following general categories:

| Category | Description |
|---|---|
| Facility within the five foot line: | |
| Primary Facility | This includes common building components such as the structure, exterior closure HVAC systems, etc. |
| Special Facility | This includes uncommon requirements such as emergency generators, shielding, special foundation requirements, etc. |
| Supporting Facilities outside the five foot line: | |
| Pavements | This includes all pavement work for access roads, parking, walks, etc. |
| Utilities | This includes all electric, gas, heat, water, sewage, and sanitary sewer work. |
| Site Improvements | This includes clearing, landscaping, etc. |
| Demolition | This includes all demolition. |
| Other Outside | This includes all other work outside the five foot line of the building. |

A regression analysis is performed for the three major supporting facility categories by family category code using the following nonlinear equation:

Non-Linear: $y = a * x^b$

Additionally, averages for each of the three major supporting facility categories are taken to determine the percentage split between them. This is stored in table T164.

(4) Comparative Facility Adjustment Factors Tables. There are three tables used to adjust the common facility costs to account for different conditions and construction requirements. These adjustment factors are developed along with a series of questions and answers for the user to make the selection. There are five sets of adjustment factors. The factors are developed from a detailed analysis of construction requirements and their cost for different conditions. Hundreds of facility cost estimates were analyzed to develop these factors. The factors are normalized to typical Air Force construction. For example, a typical Air Force building has its heat supplied from within the building, therefore, heat supplied from a central plant is a negative adjustment because it will cost less for heat exchanges vs boilers. This factor is just for work within the five foot line of the building, therefore, cost differences for work outside the five foot line are handled as part of the supporting facility analysis. Following is a description of what each of these five sets of adjustments cover:

(a) Seismic and Climate Factor. These factors adjust the facility costs for seismic and climate effects on the construction. For example, extra insulation is required for buildings constructed in cold climates. Every location stored in CCMAS has a seismic and climate zone assigned based on Air Force criteria. These factors are automatically extracted from the knowledge base based on the zones selected.

(b) Structural Features. Adjustment factors are developed for number of stores, subsurface conditions, and number of basement levels. For example, typical Air Force construction has no basement, therefore, the number of basement level factor is 0.0 for zero, 0.058 for one story, 0.130 for two stories, and 0.227 for three stories. This means a building with three basement levels will have an additional cost of 22.7% of the common primary facility for the extra foundation and excavation required.

(c) Architectural Features. These include the type of exterior closure and interior layout (open offices vs individual offices).

(d) Mechanical/Electrical. These include elevators, sprinklers, central plant heating vs boilers, emergency generators, and uninterruptible power.

(e) Special Items. These include TEMPEST and HEMP shielding as well as clean room requirements.

The building adjustment factors and questions are stored in the following Tables (knowledge bases):

| Table | Description |
|---|---|
| T163 | Comparative Climate/Seismic Factors |
| T166 | Comparative Adjustment Factors Questions |
| T167 | Comparative Adjustment Factors Answers/Factors |

(5) Comparative CSI/Resource Distribution Factors Table —T101. To maintain the consistency of all estimating systems, the costs developed are all broken down to the Element level of the CCMAS Hierarchy. This table breaks all of the comparative costs down to the Element level by CSI Division. These factors are developed by family category code based on an analysis of actual projects. The comparative process takes the costs developed from T103 and the adjustment factors and produces line item quantities (T324) and costs (T330) using the factors from T101.

(6) Comparative Supporting Facility Line Items Table—T165. This is a set of individual line items at the Element Level of the CCMAS Hierarchy for work outside the five foot line. These provide additional items for work not included in the standard supporting facility percentages or supporting facility regression equations shown above. Examples include cost for demolition of buildings and pavement, for extensions to aircraft parking aprons, for communications ducts, for extensions to primary electrical distribution systems, etc. These items are developed using the supporting facility models shown below.

Figures 4, 4A:
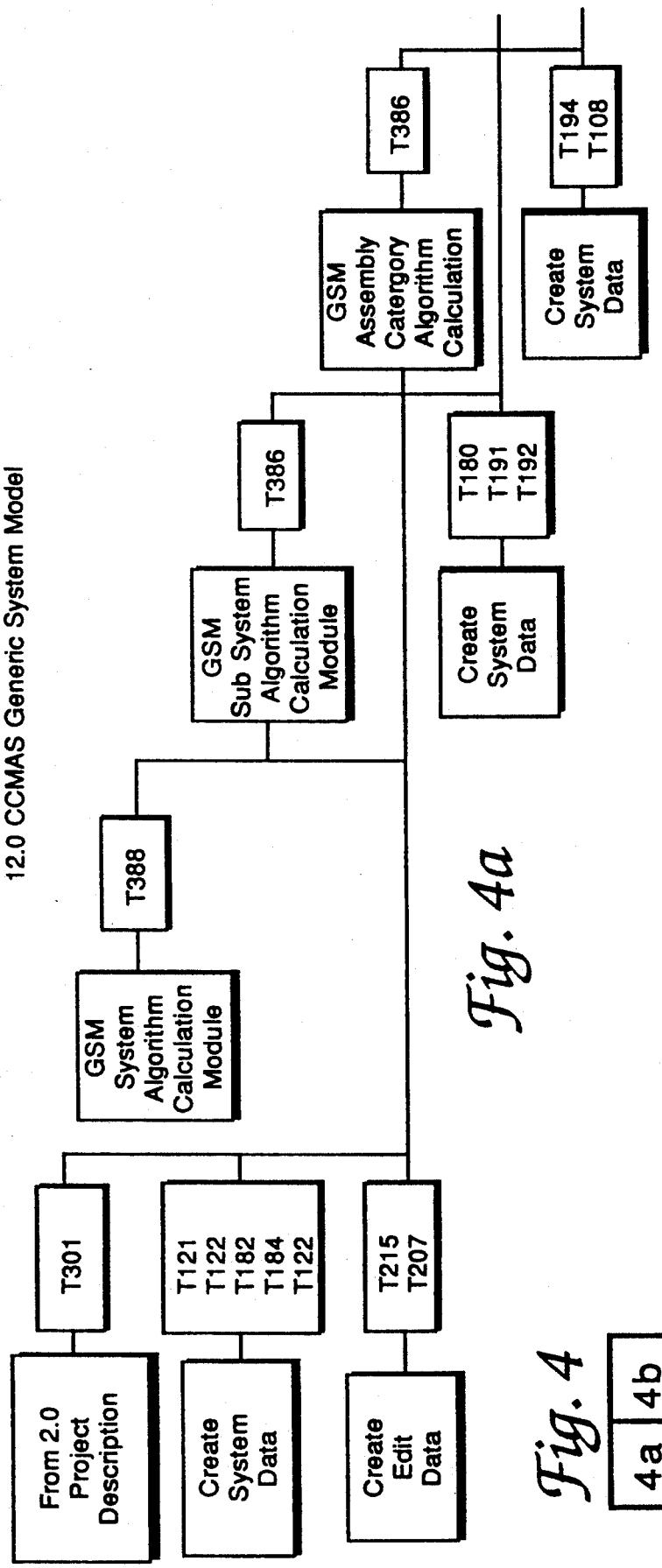
Figure 4B:
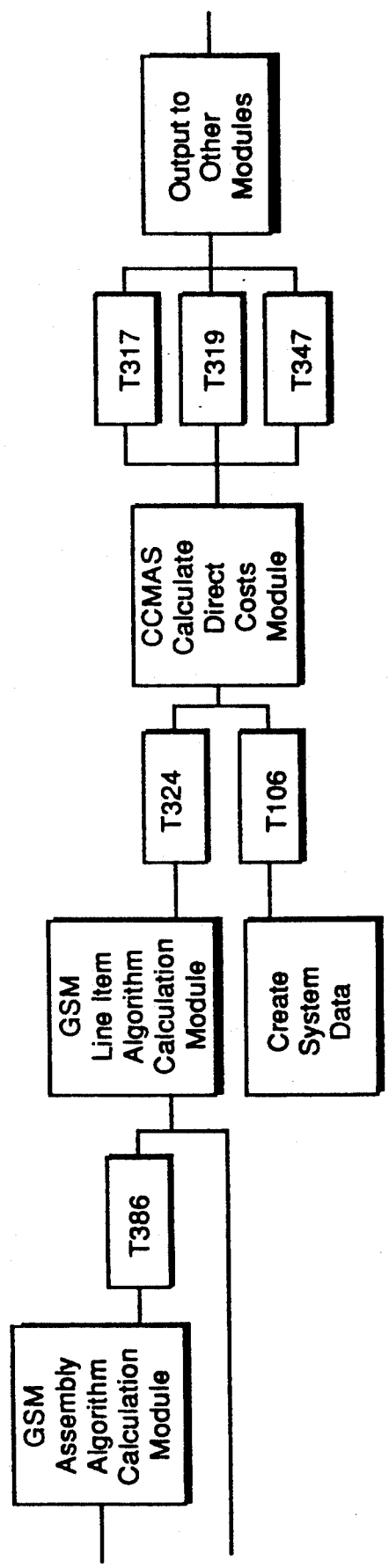

(7) Comparative Input/Output Tables. There are several tables used by the model to store the user selections and output from the model and to edit user input. Additionally, the final step in the process is to calculate the direct cost. The calculation consists of multiplying the line item quantities stored in table T324 by the appropriate costs from tables T106, T165, or T330. The results are stored in table T319 with a summary of CSI Division stored in table T348. Following is a list of the additional tables used by this model:

| Table | Description |
|---|---|
| T202 | CCMAS Type of Work Edit Table |
| T205 | Comparative Family Category Code Edit Table |
| T215 | CCMAS Uniformat WBS Code Edit Table |
| T301 | CCMAS Project Description Table |
| T312 | Comparative Input/Output Table |
| T315 | CCMAS Project Default Confidence Factor Table |
| T317 | CCMAS Direct Cost Run Number Table |
| T319 | CCMAS Direct Cost Output Table |
| T324 | CCMAS Line Item Quantities Table |
| T330 | CCMAS Project QTO Line Items Table |
| T348 | CCMAS Direct Cost by CSI Division Table |
| T381 | Comparative Factors Table | b. Generic System Models (GSM). This section (FIG. 4, comprising FIGS. 4a & 4b) uses a series of knowledge bases and algorithms to accomplish a full Quantity Take Off for a building without plans and specifications. The output from this module is a complete list of items at the Element Level of the CCMAS Hierarchy. All the user has to input is just the building type, total size in square feet, and location. The model starts at the Facility level of the CCMAS Hierarchy and breaks the building down using algorithms and factors throughout the CCMAS-UNIFORMAT System, CCMAS-UNIFORMAT Subsystem, CCMAS Assembly, Composite, and Element levels of the CCMAS Hierarchy. The user is given the opportunity to edit the default factors at each level. The cost data is at the composite or element level of the CCMAS Hierarchy. These models cover a wide range of building types and are developed based on actual projects. However, since they work with quantities of items rather than cost until the Element level, the models can and do incorporate current construction methods and materials. For example, when asbestos tiles were outlawed, the model was easily changed to use vinyl tile. The model factors and algorithms chose the amount of tile as before, but, we were able to easily change the item selected to vinyl tile at the composite level without having to make any changes to the model. Since the building models are developed based on actual historical project data, they are also used to assist in the development of the Comparative Data Base Tables on resource distribution factors (T101) and building adjustment factors (T167). Following is a description of each knowledge base, how it is developed, and how it is used by the models:

(1) CCMAS Geographic Location Edit Table—T207. This table contains location codes and key information used by every CCMAS module. Information on seismic zone, heating zone, Air Conditioning zone, and Frost Penetration zone are used by the generic systems models. This information is developed from Air Force Regulations containing the data. The model uses this information to determine what superstructure to use for the building (seismic), heating loads and insulation levels (heating zone), Air Conditioning loads (A/C zone), and depth of the foundation (frost penetration). Table T207 provides the codes that are used to extract factors from other tables. For example, the Air Conditioning (A/C) Zone is used in Table T121 to extract a factor used in the calculation of the number of tons of Air Conditioning required for the building.

(2) GSM Air Conditioning Modifier Table—T121. This table contains factors for each A/C Zone to adjust the Air Conditioning load for the building. This data is developed based on an analysis of Air Force buildings and engineering principles.

(3) GSM Heating/Insulation Modifier Table—T122. This table contains factors for each heating zone to adjust the heating load and insulation levels for the building. This data is developed based on an analysis of Air Force buildings and engineering principles.

(4) GSM Building System Parameter Defaults Table—T182. This table contains the default parameters used with the building system algorithms in the next paragraph to determine the initial building system values. There are over 150 parameters per building type in this table. Some of the default parameters include floor to floor height, exterior door density, exterior window area, superstructure type, functional space areas, etc. These initial defaults are used with the building system algorithms to describe the building to the user. The user can then override any of the defaults to tailor the building to their project. These defaults were developed based on an analysis of existing Air Force construction for each facility type. For example, the default value for the Floor to Floor Height above grade for an administrative facility is 14 feet and 15 feet for a medical facility. The parameters were also chosen so each model can be used for several different facility types. There are two types of parameters used throughout the model. They are overall building parameters and functional space parameters. Overall building parameters are used for parts of the building that are the same throughout the building such as the exterior closure, superstructure, heating generation system, etc. Functional space parameters are used for parts of the building that are different depending on what that part of the building is being used for. For example, floor covering, wall finishes, electrical outlets, heat distribution system, etc. will vary in a building depending upon what that functional space is being used for. Some functional spaces are open office area, computer rooms, closed office area, surgical rooms, radiology, dining rooms, etc. Table T182 contains the initial default factors for the functional spaces for items such as partition densities, plumbing fixtures, interior windows, interior finishes, etc. Again, these initial defaults are used with the building system algorithms described below to describe the building to the user.

(5) GSM Building System Algorithms. These are a series of over 150 algorithms used with the default parameters in Table T182 to set the initial building values. They are based on the facility type, size, and location. For example, the Footprint of the building is based on an algorithm that uses that facility type, Stories Above and Below Grade, and Gross Floor Area of the building. Following is an example of a Building System Algorithm:

Parameter Algorithm

Footprint $FTPe = FTPdb \cdot \frac{(SAGdb + SBGdb)}{(SAGu + SBGu)} \cdot \frac{GFAdb}{GFAu}$ FTPe = Calculated Footprint of the Building
FTPdb = Footprint from Table T182 for this building type
SAGdb = Stories Above Grade from T182
SBGdb = Stories Below Grade from T182
GFAdb = Gross Floor Area from T182
SAGu = Computed or Used entered Stories Above Grade
SBGu = Computed or User entered Stories Below Grade
GFAu = User entered Gross Floor Area The model uses an algorithm to compute the value, then the user can either accept the value or provide their own value. The only exceptions to this process are the initial parameters of facility type, Gross Floor Area, and location. These are required from the user. As can be seen from the above algorithm, the calculations are accomplished in a specific order because previous values are used in several algorithms. These algorithms are based on engineering equations and Air Force construction criteria. This example is an engineering equation that take the ratio of this building dimensions to the data base value to determine the initial value for the footprint. The actuation selection of which algorithms are necessary was based on an extensive analysis of building costs by building systems to determine what are the cost drivers for a building.

(6) GSM Functional Space Area Table—T184. This table contains a list of valid functional space area codes and their description. It is used to show the user the functional space description rather than the code during the operation of the model.

(7) GSM Building Subsystem Algorithms. These are a series of over 500 algorithms used to calculate parameter values for the Subsystem level of the CCMAS Hierarchy. For example, the algorithm for Basement Excavation (System 01—Substructure, Subsystem 04) is as follows:

| Subsystem | Algorithm |
| --- | --- |
| 0104 | 0104e = FTPu * FFBu * SBGu |

0104e = Calculated Excavation for the Basement(s)
FTPu = Computed or User entered Footprint
FFBu = Computer or User entered Floor to Floor Height Below Grade
SBGu = Computed or User entered Stories Below Grade These algorithms were developed along with the Building System Algorithms described above. They are based on actual Air Force construction.

(8) GSM Facility Hierarchy and Factors Table—T180. This table contains over 20,000 factors for the CCMAS Assembly Level of the Hierarchy. The assembly level is broken out into an intermediate level called the Assembly Category, which is the first two digits of the assembly. This intermediate level was included to account for major differences in units of measure for assemblies. For example, Subsystem 0101 (System 01—Substructure, Subsystem 01—Standard Foundations) has both Wall Foundations (Assembly Category 01) and Column Foundations and Pile Caps (Assembly Category 02) included under it. Wall foundations are in units of linear feet while column foundations and pile caps are in units of each. For each of user interaction, CCMAS was developed to include this intermediate level in the calculations. This tables includes factors for both the CCMAS Assembly Category and Assembly. Factors are developed by facility type and functional space area based on actual Air Force construction.

(9) GSM Seismic Modifier Table—TT190. This table contains adjustment factors for each seismic zone. The seismic zone comes from Table T207 described above for the location selected. The factors identify either alternative factors to use or alternatively assembly Categories and Assemblies. This table modifies the factors in Table T180 to adjust for different seismic zones. An example is to increase the amount of vertical reinforcing and grouting used on a Concrete Masonary Unit Backup Wall for seismic zones 2, 3, and 4. This table modifies the Substructure, Superstructure, and Exterior Closure to meet seismic requirements.

(10) GSM Frost Penetration Modifier Table—T191. This table contains adjustment factors for different levels of frost penetration. The frost penetration zone comes from Table T207 described above for the location selected. The factors identify either alternative factors to use or alternative Assembly Categories and Assemblies. This table modifies the factors in Table T180 to adjust for different levels of frost penetration. An example is to increase the amount of excavation and height of the foundation wall to account for a frost penetration of 80 inches vs 12 inches. This table modifies the Substructure portion of the building.

(11) GSM Insulation Modifier Table—T192. This table contains adjustment factors for different levels of insulation required by Air Force regulation for different climates. The insulation zone comes from Table T207 described above for the location selected. The factors identify either alternative factors to use or alternative Assembly Categories and Assemblies. This table modifies the factors in Table T180 to adjust for different levels of insulation required. An example is to increase the R-Factor of the wall insulation for colder climates. This table modifies the Exterior Closure Portion of the building.

(12) CCMAS-UNIFORMAT WBS Code Edit Table—T215. This table contains the codes, description, and standard units of measure for the CCMAS-UNIFORMAT Hierarchy used by the CCMAS models. These descriptions and units of measure are shown to the user along with the factors at each stage of the model process.

(13) GSM Assembly Category Algorithms. These are a series of algorithms used to calculate parameters values for the Assembly Categories. These algorithms are set up for either total building calculations of for Functional Space area calculations. The actual algorithm is the same. The difference is whether the model gets a total building parameter value or a functional space parameter value. Following is an example of the algorithm:

| Assembly Category | Algorithm |
| --- | --- |
| A11 | ACQe = ACFdb * SSQu |

ACQe = Calculated Assembly Category Quantity
ACFdb = Assembly Category Data Base Value from Table T180
SSQu = Computed or User entered Subsystem Quantity

(14) GSM Density Parameter Assembly Selection Table—T194. This table contains over 2,000 assemblies and factors used to select assemblies based on several building parameters. This table is set up to handle selection of alternate assemblies based on building parameters either selected by the model or the user. This selection process is used where a straight application of a factor will not get correct costs or select the correct items. Examples are for heating system, cooling system, electric service, etc. For example, if a building required 500 tons of Air Conditioning and the model was based on 100 tons, a straight factor would give 5–100 ton systems to satisfy the requirement. This would result in an incorrect cost because the one 500 ton unit is less cost than five 100 ton units. This table allows the models to pick the correct item in these cases. This process is also used where the user can make a selection between alternative items. For example, one of the basic building parameters input at the beginning is the exterior wall closure material. The user is given a list of available choices. The model uses this selection at this time to pick the correct assembly. The factors developed to this point determine the quantity of the item, while this table contains what kind of item is required. The table can accept up to three descriptive parameters and one set of ranges for each selection. For example, the selection of the proper superstructure for the building uses all three descriptive parameters and the range. The selection of the superstructure is based on the Bay Size, Superstructure Type, and Soil Type as the descriptive parameters and the number of stories as the range. The descriptive parameter an me and range values are used in a process that returns an assembly identification and quantity factor. Another example is the selection of the assembly used for the building electrical service entrance. Just the range parameter is used for this process. The range name (Electric) and quantity in amps are processed. The output is an assembly and amount of the assembly. If you have a building with a requirement for a 570 amp service, the model uses an assembly for a 600 amp service. This is because this is the next largest size available on the system and representative of what would be used in the building based on available materials.

(15) GSM Assembly Algorithms. These are a series of algorithms used to calculate parameters value for the Assemblies. These algorithms are set up for either total building calculations or for Functional Space area calculations. The actual algorithm is the same. The difference is whether the model gets a total building parameter value or a functional space parameter value. These algorithms operate just like the Assembly Category Algorithms. Following is an example of the algorithm:

| Assembly | Algorithm |
|---|---|
| All | AQe = AFdb * ACQu |

AQe = Calculated Assembly Quantity
AFdb = Assembly Data Base Value from Table T180
ACQu = Computed or User entered Assembly Category Quantity

(16) CCMAS Library of Assemblies—T108. This table is used by all of the CCMAS models. It contains all of the model assemblies and Composite/Element factors. This table links the CCMAS-UNIFORMAT and CSI Work Breakdown Structures together. The models output assembly quantities and this table is used to convert the assembly quantities into quantities of items at the Composite or Element level to match Table T106 items, the actual costed data base. This table contains over 3,000 assemblies with each assembly having from 1 to over 100 line-items associated with it. An example of an assembly for a $4\frac{3}{4}'' \times 7'0'' \times 3'0''$ Fire Rated Hollow Metal Door (Assembly—05020402 is as follows:

| QTO Item | Factor | Description |
|---|---|---|
| 081105400 | 1.0000 | Steel Frame 16 Ga. up to 5¼" 7' H 4' W |
| 081230080 | 1.0000 | Fire Door, Steel, 20 Ga., 3'-0" × 7'-0" |
| 087331000 | 1.5000 | Hinges, Full Mortise-High Freq. per pair |
| 087400400 | 1.0000 | Cylinder Lockset, Knob, Handles |
| 098171000 | 2.0000 | Paint Door & Frame per Side |

(17) CCMAS Line Item Algorithms. These are a series of algorithms used to calculate parameters values for the QTO Line Items. The results are stored in table T324. These algorithms operate just like the Assembly Algorithms. Following is an example of the algorithm:

| Line Item | Algorithm |
|---|---|
| All | LIe = LIdb * AQu |

LIe = Calculated QTO Line Item Quantity
LIdb = Line Item Data Base Value from Table T108
AQu = Computed or User entered Assembly Quantity

(18) CCMAS Line-Items Table—T106. This table contains over 40,000 individual Composites or Elements using the CSI WBS. These are the actual costed items used by the models and QTO system. These items are at what we call the Quantity Take Off one item level of detail. A more detailed description of how this table is developed is one the QTO section below.

(19) Generic System Model Input/Output Tables. There are several tables used by the model to store the user selections and output from the model. Additionally, the final step in the process is to calculate the direct cost. The calculation consists of multiplying the line item quantities stored in table T324 by the appropriate costs from table T106. The results are stored in table T319 with a summary by CSI Division stored in table T348. Following is a list of the additional tables used by this model:

| Table | Description |
|---|---|
| T215 | CCMAS WBS Hierarchy Table |
| T301 | CCMAS Project Description Table |
| T317 | CCMAS Direct Cost Run Number Table |
| T319 | CCMAS Direct Cost Output Table |
| T324 | CCMAS Line Item Quantities Table |
| T348 | CCMAS CSI Direct Cost Summary Table |
| T386 | GSM Project Facility Assembly Quantity Table |
| T388 | GSM Project Facility Parameter Table |

Figures 5, 5A:
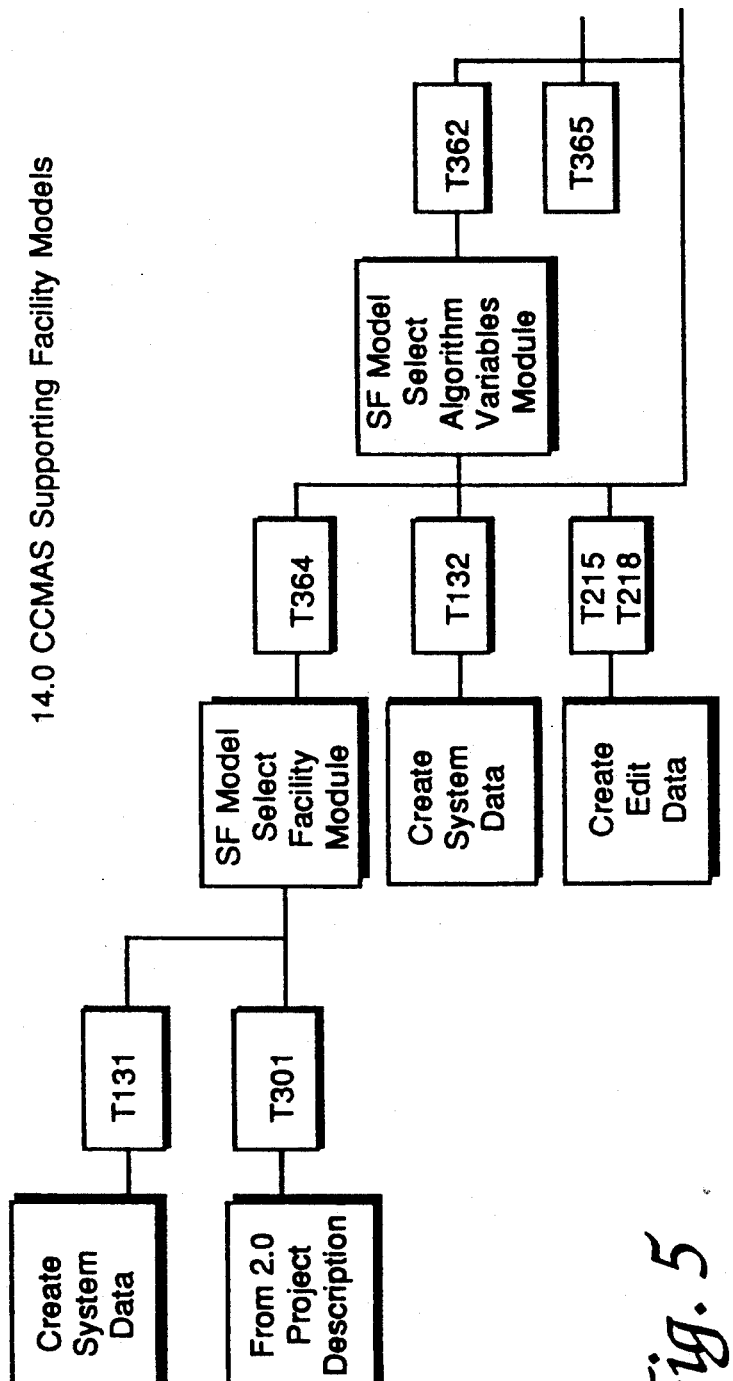
Figure 5B:
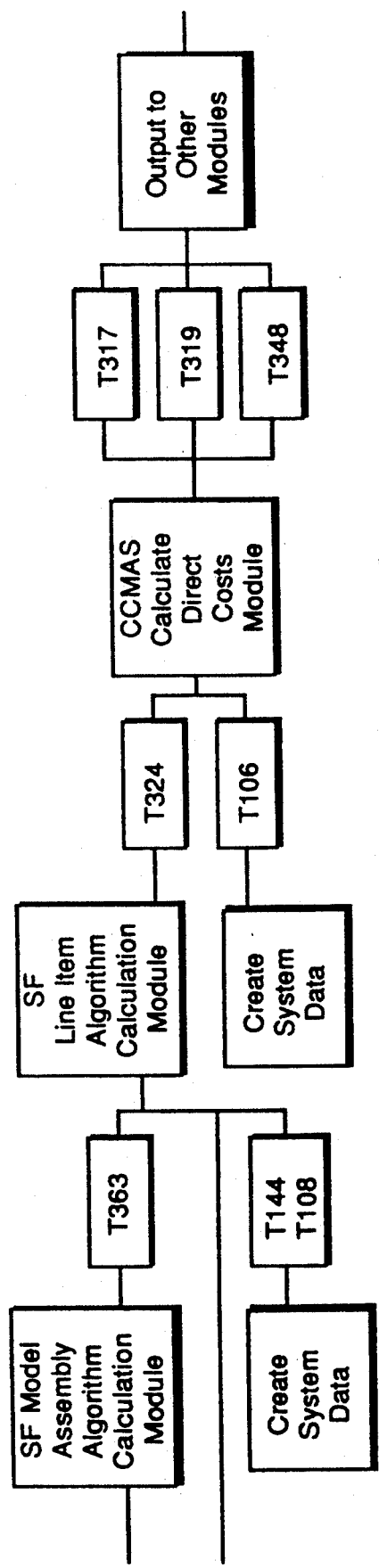

The first six tables are used by other models in CCMAS. The last two are used only by the GSM model to store all information specific to this model. This allows the user to edit the input and rerun the model or to copy the parameters for a different project.

c. Supporting Facility Generic Models (SF). This section (FIG. 5, comprising FIGS. 5a & 5b) is a series of over 90 separate models. These models cover work outside the five foot line of the building. They cover items such as roads, parking lots, utility connections, clearing, excavation, etc. These models use a series of knowledge bases and algorithms to accomplish a full Quantity Take Off for a specific supporting facility without plans and specifications. These models operate similar to the Generic Building Models shown above. All the user has to input is just the model type and facility quantity. These models are also used to create the supporting facility line items (T165) used by the Comparative system shown above. Following is a description of each knowledge base, how it is developed, and how it is used by these models:

(1) SF Design Options Table—T131. This table contains a list of supporting facility models available grouped by major category and subcategory. The major categories are Earthwork, Roads/Parking, Bridges/Structures, Sewer Systems, Gas/Water Distribution, Site Electrical, Treatment Plants/Lift Stations, and Other facilities. This table is used as a menu table to show the user the available models in a logical sequence. It is also used by the model to keep track of where the model is in the process. It is easily expandable by adding additional models.

(2) SF Option Criteria Table—T132. This table contains all of the default values and options available for each model for the CCMAS-UNIFORMAT System, CCMAS-UNIFORMAT Subsystem, and CCMAS Assembly levels of the CCMAS hierarchy. The initial default values are based on typical Air Force construction. The options are based on CCMAS-UNIFORMAT WBS for facilities. This WBS breaks each model down by work units. For example, a road is broken down as follows:

| WBS Level | Code | Description |
|---|---|---|
| System | 51 | Roads |
| Subsystem | 5101 | Access Roads |
| Assembly | 51014110 | Clearing-Light Brush W/O Grub |
| | 51014112 | Clearing-Medium Brush W/Avg Grub |

The user can accept the defaults or be shown the hierarchy and override the defaults. This model operates differently from the generic systems models because there are fewer levels in the hierarchy for each model and the factors and algorithms are all at the CCMAS Assembly level. The hierarchy and default values were developed based on typical Air Force construction. For example, the default for the road models is no clearing and grubbing. This is because the clearing and grubbing is usually accomplished for the entire site as part of the Clearing and Grubbing model.

(3) SF Algorithm Variables Table—T133. This table contains the algorithm variables for the assembly algorithms. The variables chosen were based on an analysis of the cost drivers for each assembly. Default values were developed based on an analysis of Air Force construction. The user can change any of the variables. This table is used in conjunction with the algorithms shown below.

(4) SF Assembly Algorithms. These are a series of algorithms used to calculate the assembly quantities. The algorithms are based on engineering equations. Following is an example of one of the algorithms used to calculate the amount of excavation required in normal soil for a Large Pipe Arch:

| Assembly | Algorithm |
|---|---|
| 40024333 | $(L/27) * ([ID/12] + 2 * T]) * D + [1.5 * (D - h) * (D - h)])$ |

L = Model Quantity—Length of Pipe
ID = Inside Diameter of Pipe
T = Distance between outside of pipe and trench wall
D = One of the following depth of trench equations
  = $d + [(ID/12) / 12] + SS + 0.5$ for RCP or CO pipe
  = $d + (1/12) + 0.5 + SS$ for VCP, AC, DIP, CIP & PVC pipe
  $d + 0.5 + SS$ for BS or CM pipe
d = depth to bottom of pipe
SS = Seal Slab depth
h = Height of vertical portion of trench
h = Height of vertical portion of trench There are over 3,000 algorithms developed for the supporting facility models. Additional algorithms can be easily added to the system to cover additional requirements.

(5) SF Pipe Size Line Item Table—T144. This table is used by the pipe models to change pipe types and sizes. Several pipe models were developed based on different ranges of pipe sizes. The user can change the default pipe type and size using the pipe edit table shown below. Based on the user selection, this table is used to adjust the default algorithm variables and pipe composite line item codes in the assemblies. There are over 500 different pipes available on CCMAS. The pipes selected were based on typical Air Force construction.

(6) SF Pipe Edit Table—T218. This table is used to show the user the various pipe types and sizes available for each pipe model. This table only shows pipes that can be used by each available model. This table is used with T144 above to select the correct pipe line item from the knowledge base and to adjust the algorithm variables.

(7) CCMAS Library of Assemblies—T108. This table is used by all of the CCMAS models. It contains all of the model assemblies and Composite/Element factors. This table links the CCMAS-UNIFORMAT and CSI Work Breakdown Structures together. The models output CCMAS Assembly quantities and this table is used to convert the assembly quantities into quantities of items at the Composite or Element level to match Table T106 items, the actual costed knowledge base. This table contains over 3,000 assemblies with each CCMAS Assembly having from 1 to over 100 line-items associated with it. An example of an assembly for a 4" Black Steel Pipe with Threaded Joints (Assembly—37013510) is as follows:

| QTO Item | Factor | Description |
|---|---|---|
| 185094160 | 1.00000 | 4" Black Steel Threaded Joints |
| 180050370 | 0.01067 | 1 CY Backhoe |
| 180909070 | 0.03200 | Laborer-Heavy |
| 180909290 | 0.01067 | Pipe Fitter |

(8) CCMAS Line Item Algorithms. These are a series of algorithms used to calculate parameters values for the QTO Line Items. The line items are stored in table T324. These algorithms operate just like the CCMAS Assembly Algorithms. Following is an example of the algorithm:

| Line Item | Algorithm |
|---|---|
| All | LIe = LIdb * AQu |

LIe = Calculated QTO Line Item Quantity
LIdb = Line Item Data Base Value from Table T108
AQu = Computed or User entered Assembly Quantity (9) CCMAS Line-Items Table—T106. This table contains over 40,000 individual Composites or Elements using the CSI WBS. These are the actual costed items used by the models and QTO system. These items are at what we call the Quantity Take Off level of detail.

(10) Supporting Facility Model Input/Output Tables. There are several tables used by the model to store the user selections and output from the model. Additionally, the final step in the process is to calculate the direct cost. The calculation consists of multiplying the line item quantities stored in table T324 by the appropriate costs from table T106. The results are stored in table T319 with a summary by CSI Division stored in table T348. Following is a list of the additional tables used by this model:

| Table | Description |
|---|---|
| T215 | CCMAS WBS Hierarchy Table |
| T301 | CCMAS Project Description Table |
| T317 | CCMAS Direct Cost Run Number Table |
| T319 | CCMAS Direct Cost Output Table |
| T324 | CCMAS Line Item Quantities Table |
| T348 | CCMAS CSI Direct Cost Summary Table |
| T362 | SF Model Algorithm Variables Table |
| T363 | SF Model Assembly Quantity Table |
| T364 | SF Model Facility Quantity Table |
| T365 | SF Model Pipe ID Table |

Figure 6A:
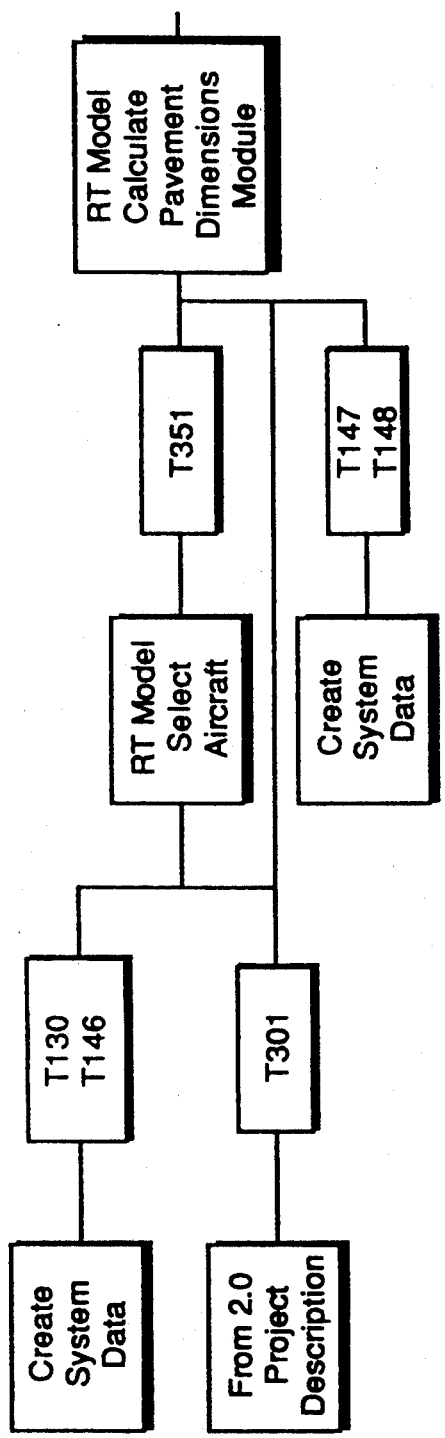
FIGS. 6a, 6b & 6c, when arranged as shown in FIG. 6 shows the Runway/Taxiway Model.
Figure 6:
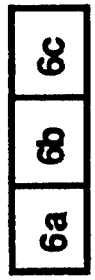
Figure 6B:
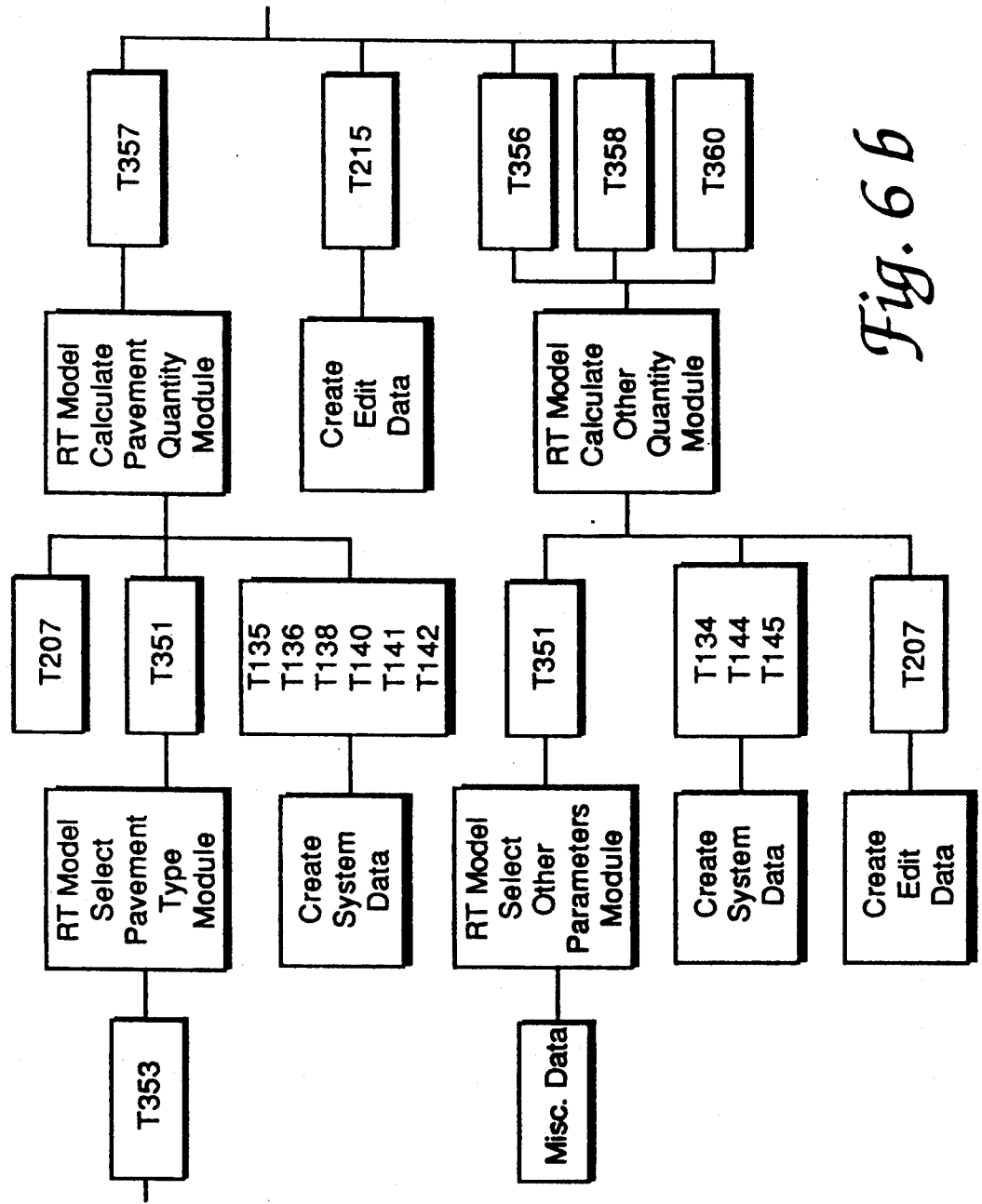
Figure 6C:
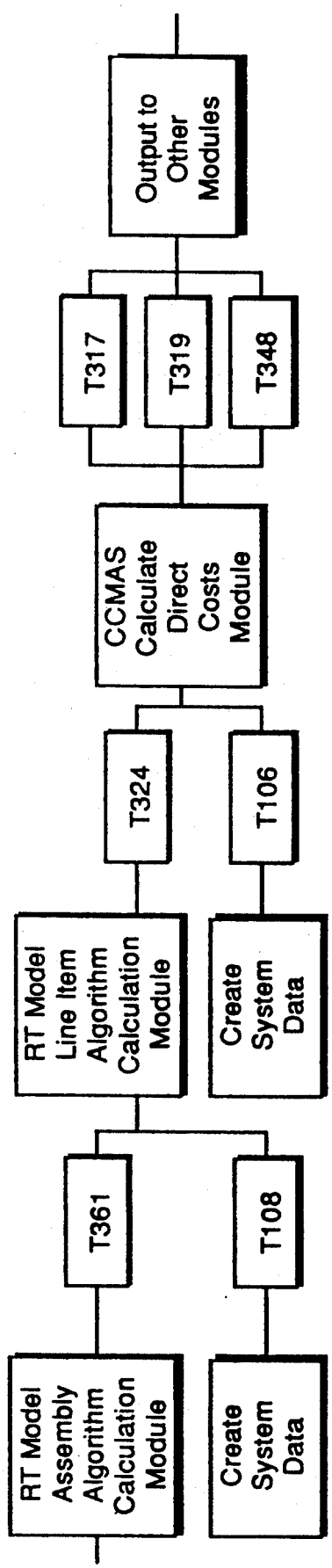

The first six tables are used by other models in CCMAS. The last four are used only by the SF model to store all information specific to this model. This allows the user to edit the input and rerun the model or to copy the parameters for a different project. The models are designed to the user can pick any combination of the models up to 100 separate runs of each model in the same estimate. This allows the user to develop all of the supporting facility items together. The model Work Breakdown Structure is set up to each individual models output is stored in a separate subsystem of the CCMAS Hierarchy.

d. Runway/Taxiway Generic Model (RT). This section (FIG. 6, comprising FIGS. 6a-6d) is a series of several models linked together. These models cover work required to build a complete runway, taxiway, aircraft parking aprons, aircraft pads, lighting systems, storm drainage, blast deflectors, aircraft arresting systems, and markings. The model also includes the electrical and emergency power requirements for the runway lighting system. The user just needs to enter the aircraft type and location as the minimum parameters required for this model. This model operates similar to the Supporting Facility models. It is also used to create some of the supporting facility line items (T165) for the comparative system. Following is a description of each knowledge base used by this module, how it is developed, and how it is used by the models.

(1) RT Aircraft Dimensions Table—T130. This table contains the basic dimensions and runway loading for each Air Force aircraft and several commercial US aircraft. This data is compiled from Air Force regulations and commercial publications. The data is used by the model to select the basic airfield load type (heavy, medium, light, or shortfield) and determine the parking apron dimensions.

(2) RT Earthworks Quantities Table—T134. This table contains the default dimensions for excavation for different terrains and airfield load type. It includes lengths, widths, slope, cut and fill, and undercut factors developed from engineering analysis and Air Force regulations. The model uses this data with the Runway/Taxiway algorithm to calculate the amount of excavation required.

(3) RT Basic Flexible Pavement Design Table—T135. This table contains the default assembly quantity factors for flexible pavements based on airfield load type, airfield traffic area, and bearing ratio of the soil. This data was developed from Air Force regulations. It is used along with the RT algorithms to calculate the CCMAS Assembly quantities for areas using flexible pavements.

(4) RT Basic Rigid Pavement Design Table—T136. This table contains the default CCMAS Assembly quantity factors for rigid pavements based on airfield load type, airfield traffic area, bearing ratio of the soil, pavement type, and base course depth. This data was developed from Air Force regulations. It is used along with the RT algorithms to calculate the CCMAS Assembly quantities for areas using rigid pavements.

(5) RT Frost Zone Flexible Pavement Design Table—T138. This table contains adjustment factors to the default CCMAS Assembly quantity factors for flexible pavements based on airfield load type, airfield traffic area, bearing ratio of the soil, and frost zone. This data was developed from Air Force regulations. It is used along with the RT algorithms to calculate the CCMAS Assembly quantities for areas using flexible pavements in frost zones.

(6) RT Frost Zone Rigid Pavement Design Table—T140. This table contains the adjustments to the default assembly quantity factors for rigid pavements based on airfield load type, airfield traffic area, bearing ratio of the soil, pavement type, base course depth, and degree days. This data was developed from Air Force regulations. It is used along with the RT algorithms to calculate the CCMAS Assembly quantities for areas using rigid pavements in frost zones.

(7) RT Artic & Subartic Flexible Pavement Design Table —T141. This table contains the default assembly quantity factors for flexible pavements based on frost group, airfield load type, airfield traffic area, and bearing ratio of the soil. This data was developed from Air Force regulations. It is used along with the RT algorithms to calculate the CCMAS Assembly quantities for areas in artic and subartic climates using flexible pavements.

(8) RT Artic & Subartic Rigid Pavement Design Table—T142. This table contains the default CCMAS Assembly quantity factors for rigid pavements based on frost group, airfield load type, airfield traffic area, bearing ratio of the soil, pavement type, and base course depth. This data was developed from Air Force regulations. It is used along with the RT algorithms to calculate the CCMAS Assembly quantities for areas in artic and subartic climates using rigid pavements.

(9) RT Pipe Size Table—T144. This table contains the storm drainage pipe sizes for different areas of the runway based on rainfall intensity. This data was developed based on engineering equations. It is used to select the correct storm drainage assemblies based on the 2-year 1-hour rainfall intensities contained in the geographical location edit table (T207).

(11) RT Storm Drainable Structure Size Table—T145. This table contains the storm drainage structure sizes for junction boxes and headwalls for different areas of the runway based on the pipe sizes. This data was developed based on engineering equations. It is used to select the correct storm drainage assemblies based on the pipe sizes selected above.

(12) RT Design Aircraft & Dimensional Table—T146. This table contains the design aircraft used for each airfield load type along with its dimensions, clearances, number of aircraft per squadron and number of squadrons. This data is compiled from Air Force regulations. The data is used by the model to determine the apron size required for the aircraft.

(13) RT Airfield Dimensions Table—T147. This table contains the basic airfield dimensions for length, width, and shoulder width for runways, taxiways, aprons, and overruns by airfield load type and design aircraft. This data is compiled from Air Force regulations. The data is used by the model to determine the square yards of pavements required.

(14) RT Aircraft Pad Dimensions Table—T148. This table contains the basic airfield dimensions for length, width, taxiway length and width, shoulder width, and number for each pad required by airfield load type, traffic area, design aircraft, and type of pad. This data is complied from Air Force regulations. The data is used by the model to determine the square yards of pavements required for pads.

(15) CCMAS Library of Assemblies—T108. This table is used by all of the CCMAS models. It contains all of the model assemblies and Composite/Element factors. This table links the CCMAS-UNIFORMAT and CSI Work Breakdown Structures together. The models output assembly quantities and this table is used to convert the assembly quantities into quantities of items at the Composite or Element level to match Table T106 items, the actual costed data base. This table contains over 3,000 assemblies with each CCMAS Assembly having from 1 to over 100 line-items associated with it. An example of an assembly for Placing and Finishing Jointed Reinforced Concrete 13"-27" (Assembly—50032931) is as follows:

| QTO Item | Factor | Description |
| --- | --- | --- |
| 180055500 | 0.00610 | Flatbed Truck 3 Ton |
| 180102000 | 0.00160 | Power Mixer 16 CF Motor & Concrete |
| 180157100 | 0.00610 | ¾ Ton Pickup Truck |
| 180202800 | 0.00380 | 5 Ton self-Propelled Crane |
| 180909050 | 0.00223 | Carpenters |
| 180909060 | 0.01334 | Cement Finishers |
| 180909100 | 0.00383 | Crane Equipment Operators |
| 180909110 | 0.00446 | Medium Equipment Operators |
| 180909120 | 0.00666 | Light Equipment Operators |
| 180909160 | 0.00606 | Average Foremen |
| 180909180 | 0.03306 | Helpers |
| 180909380 | 0.01086 | Skilled Workers |
| 180909430 | 0.00606 | Heavy Truck Drivers |
| 182302601 | 0.00223 | Mesh Bridge Forms |
| 182304500 | 0.00440 | Paver/Spreader Forms |
| 189041403 | 0.56000 | Curing Compound (White) |
| 189041404 | 0.56000 | Curing Paper |
| 189041405 | 0.56000 | Joint Sealers |
| 189041406 | 0.56000 | Longitudinal Joints |
| 189041407 | 0.56000 | Transverse Joints |
| 189042001 | 0.56000 | Reinforcement |
| 189042506 | 0.00229 | Paving Forms-8000 LF-20" |
| 189250400 | 0.00220 | Curing Bridge W/Spray-Forma |
| 189250700 | 0.00220 | Finishing Screed-Forms |

This CCMAS Assembly includes all of the materials, labor, and equipment to place and finish one square yard of jointed reinforced concrete that is from 13 to 27 inches thick. Other CCMAS Assemblies cover mixing the concrete, the concrete and reinforcement, and hauling the concrete to the paver. This CCMAS Assembly just deals with placing the concrete.

(16) CCMAS Line-Items Table—T106. This table contains over 40,000 individual Composites or Elements using the CSI WBS. These are the actual costed items used by the models and QTO system. These items are at what we call the Quantity Take Off level of detail.

(17) RT Assembly Algorithms. These are a series of algorithms used to calculate the CCMAS Assembly quantities. The algorithms are based on engineering equations. Following is an example of one of the algorithms used to calculate the amount of square feet of apron is required without revetments:

$$Apron\ Area = (DACWS*DACL*NAC*NSW)/AAF$$

DACWS = Design Aircraft Wing Span
DACL = Design Aircraft Length
NAC = Number of Aircraft per Squadron
NSQ = Number of Squadrons
AAF = Apron Area Factor based on Design Aircraft Type There are over 1,000 algorithms developed for the runway/taxiway models.

(18) CCMAS Line Item Algorithms. These are a series of algorithms used to calculate parameters values for the QTO Line Items. The line items are stored in table T324. These algorithms operate just like the CCMAS Assembly Algorithms. Following is an example of the algorithm:

| Line Item | Algorithm |
| --- | --- |
| All | LIe = LIdb * AQu |

LIe = Calculated QTO Line Item Quantity
LIdb = Line Item Data Base Value from Table T108
AQu = Computed or User entered Assembly Quantity

(19) Runway/Taxiway Model Input/Output Tables. There are several tables used by the model to store the user selections and output from the model. Additionally, the final step in the process is to calculate the direct cost. The calculation consists of multiplying the line item quantities stored in table T324 by the appropriate costs from table T106. The results are stored in table T319 with a summary by CSI Division stored in table T348. Following is a list of the additional tables used by this model:

| Table | Description |
| --- | --- |
| T301 | CCMAS Project Description Table |
| T317 | CCMAS Direct Cost Run Number Table |
| T319 | CCMAS Direct Cost Output Table |
| T324 | CCMAS Line Item Quantities Table |
| T348 | CCMAS CSI Direct Cost Summary Table |
| T351 | RT Model Facility Parameter Table |
| T353 | RT Model Pavement Dimensions Table |
| T355 | RT Model Pad Dimensions Table |
| T356 | RT Model Site Works Table |
| T357 | RT Model Pavement Design Table |
| T358 | RT Model Storm Drainage Table |
| T360 | RT Model Other Supporting Facilities Table |
| T361 | RT Model Assembly Quantities Table |

Figure 7B:
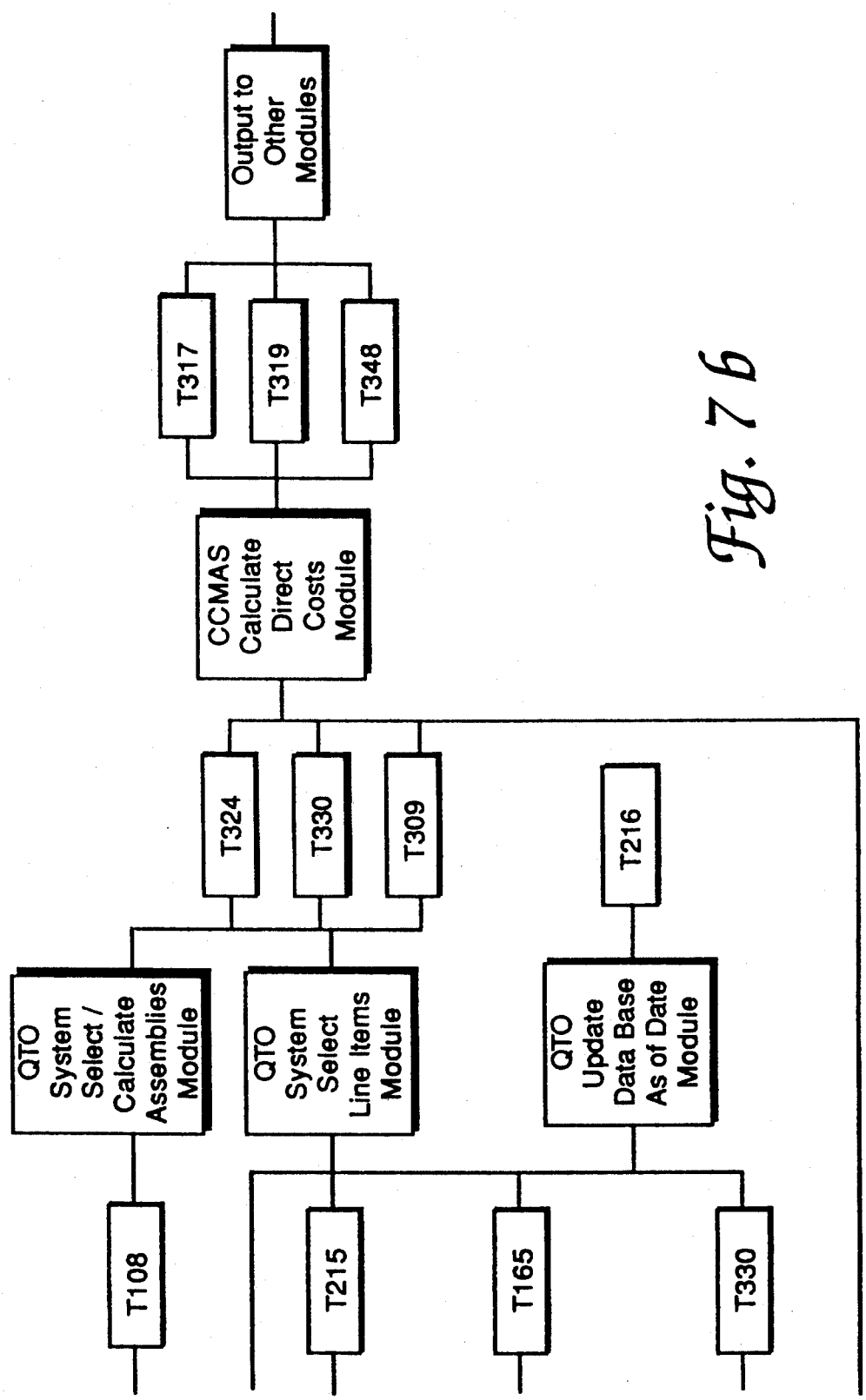

The first five tables are used by other models in CCMAS. The last eight are used only by the RT model to store all information specific to this model. This allows the user to edit the input and rerun the model or to copy the parameters for a different project.

e. Quantity Take Off (QTO) System. This section (FIG. 7, comprising FIGS. 7a & 7b) is a series of processes that allow the user to select Assemblies, Composites, or Elements from the CCMAS line item knowledge bases (T108, T106, T165, and T330). The user provides the basic quantities of the items. The user can select any of the over 3,000 per-built assemblies from the CCMAS Library of Assemblies (T108) and the QTO system will produce the line items. This module was developed to allow the user to modify the model output at the composite or element level of the CCMAS Hierarchy. Additionally, the user can combine output from several models into one estimate using the QTO system module.

The user can also develop their own line items and new or modified WBS Hierarchy descriptions. Following is a description of how tables T106, T108, T165, and T330 are developed for use by this and all other CCMAS modules:

(1) CCMAS QTO Line Items—Table T106. This table is the main cost knowledge base for the CCMAS models and QTO system. It contains over 40,000 line items. Each line item is either a composite with the associated element level costs or just the element level cost for an item. For example, line item 033111165 used in the WBS description in paragraph 1.b. above, is at the composite level of the CCMAS Hierarchy. The item describes all of the labor, material, and equipment required and the cost for each. The cost of this item is at the element level of the CCMAS Hierarchy. However, line item 180909060 used in the example in paragraph 3.d.(15) above is at the element level of the CCMAS Hierarchy. This item just describes the cost required for labor. Because of the linkage between the CCMAS line items in this table with other CCMAS tables, the process to update the line items is designed to keep the integrity of the system. The update process involves obtaining the data from the over 100 sources used, reformatting all of the data to match the CCMAS format, normalizing the data to the same location and point in time, and checking to insure all data referenced by other CCMAS processes is included in this table. The last step is the most critical because it insures CCMAS integrity is maintained. This step is accomplished by a process that checks all other CCMAS tables and processes that reference items in table T106 and reports and items missing from the table. At this point a new item is created to satisfy the linkage required. Several examples of this linkage were shown above in the assembly examples. Several temporary data files are created during this process as shown below. However, the final result is an updated table T106. The following Tables (knowledge bases) are used by this module:

| Table | Description |
|---|---|
| T9100 | Last Years Processed QTO Knowledge Base |
| T9101 | This Years Processed QTO Knowledge Base |
| T9102 | Miscellaneous User Defined Data Item Table |
| T9103 | Deleted Items Table |
| T9104 | Added Items Table |
| T9105 | Source Code Table |
| T9106 | QTO Crew Table |
| T9107 | Trade Rate Table |
| T9108 | Location Normalization Table |
| T9109 | Time Normalization Table |
| T9110 | Standard Deviation Table |
| T9111 | Added Crew Table |
| T9112 | Raw QTO Data Tape |
| T9115 | User Defined Cost Increase for T106 |
| T106 | CCMAS QTO Knowledge Base Table |

(2) CCMAS Library of Assemblies Table—T108. This is one of the most important tables in CCMAS. This table does three main things. First, it provides the linkage between the CCMAS-UNIFORMAT and CSI Work Breakdown Structures described above. Second, it provides the generic models with the line item quantity factors for the line item algorithms described in paragraph 3.b.(17) above. Third, it combines multiple line items together to make it easier and quicker to estimate and analyze the facility costs. This table is developed based on an extensive analysis of building construction. CCMAS Assemblies are created to identify all line items required to construct a part of a building. For example CCMAS Assembly 05020402 for a $4\frac{3}{4}'' \times 7'-0'' \times 3'-0''$ Fire Rated Hollow Metal Door is build as follows:

| QTO Item | Factor | Description |
|---|---|---|
| 081105400 | 1.0000 | Steel Frame 16 Ga. up to $5\frac{3}{4}''$ 7' H 4' W |
| 081230080 | 1.0000 | Fire Door, Steel, 20 Ga., 3'-0" × 7'-0" |
| 087331000 | 1.5000 | Hinges, Full Mortise-High Freq. per pair |
| 087400400 | 1.0000 | Cylinder Lockset, Knob, Handles |
| 098171000 | 2.0000 | Paint Door & Frame per Side |

CCMAS is designed so additional assemblies are automatically available to the user in the generic models as well as the QTO system.

(3) Comparative Supporting Facility Line Items Table—T165. This is a series of special line items in the same format as the QTO line items table (T106). These items are used to identify work not covered by the historical comparative cost knowledge base. These items are created from QTO line items, CCMAS Library of Assembly Items, or CCMAS Generic Models. An example is a parking lot cost per space. The generic supporting facility model for parking lots is used to create an overall cost per space. This cost is loaded into Table T165 to be used by the Comparative Supporting Facility section of CCMAS. This table is used to maintain the consistency of CCMAS by giving the user a comparative cost at the system level without having to execute the full model. These items are also available for use in the QTO system.

(4) CCMAS User Defined Line Items Table—T330. This table consists of line item costs created by the user to identify items not currently available in any of the CCMAS data bases, or to provide different cost information for the system to use for a specific project. Each of these items are input by the user and edited by the system to insure the correct format is used. The format of the table matches table T106, but, the items are only used for the project specified.

(5) QTO Input/Output Tables. There are several tables used by the QTO Module to store the user selections and output from the model. Additionally, the final step in the process is to calculate the direct cost. The calculation consists of multiplying the line item quantities stored in table T324 by the appropriate costs from tables T106, T165, or T330. The results are stored in table T319 with a summary by CSI Division stored in table T348. Following is a list of the additional tables used by this module:

| Table | Description |
|---|---|
| T215 | CCMAS Uniformat WBS Code Edit Table |
| T301 | CCMAS Project Description Table |
| T309 | CCMAS User Defined Hierarchy Description Table |
| T315 | CCMAS Project Default Confidence Factor Table |
| T317 | CCMAS Direct Cost Run Number Table |
| T319 | CCMAS Direct Cost Output Table |
| T324 | CCMAS Line Item Quantities Table |
| T348 | CCMAS CSI Direct Cost Summary Table |

Figures 8, 8A:
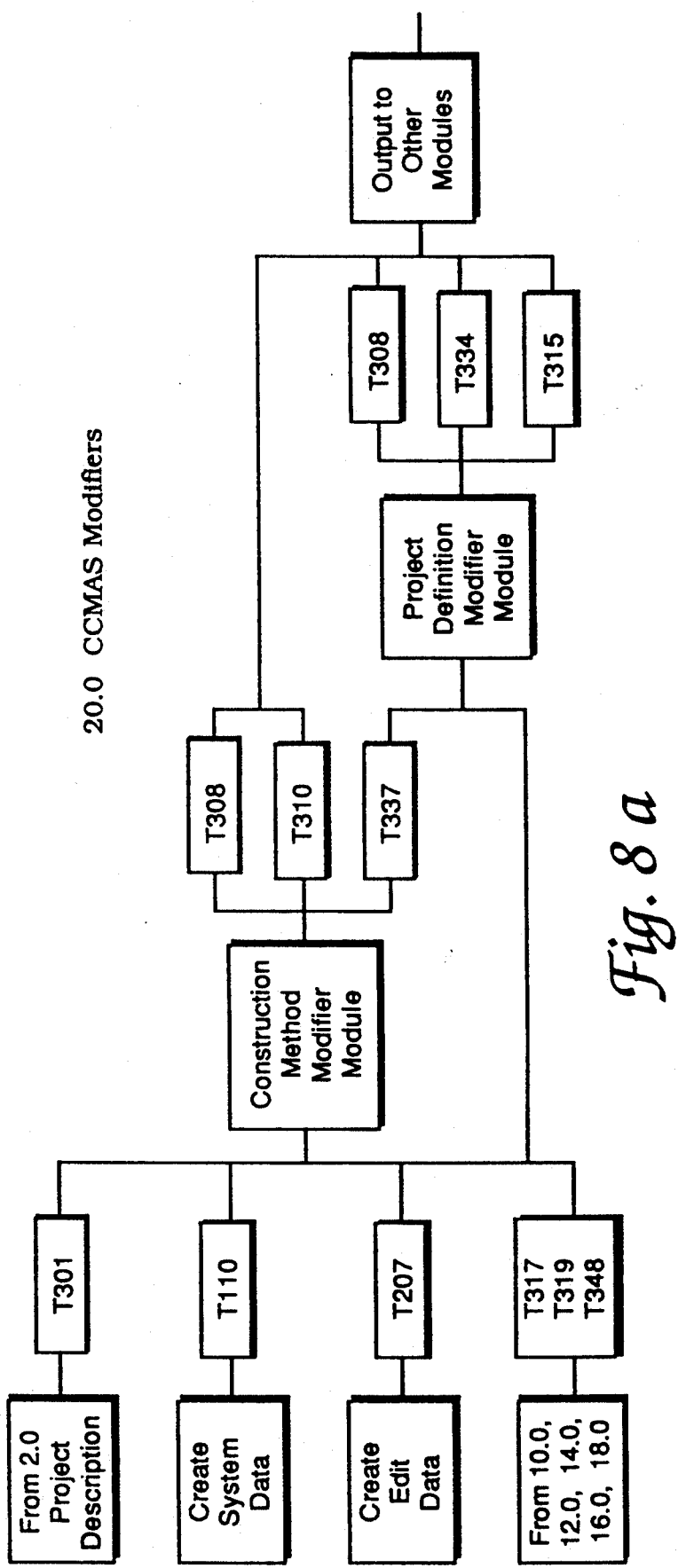
Figure 8B:
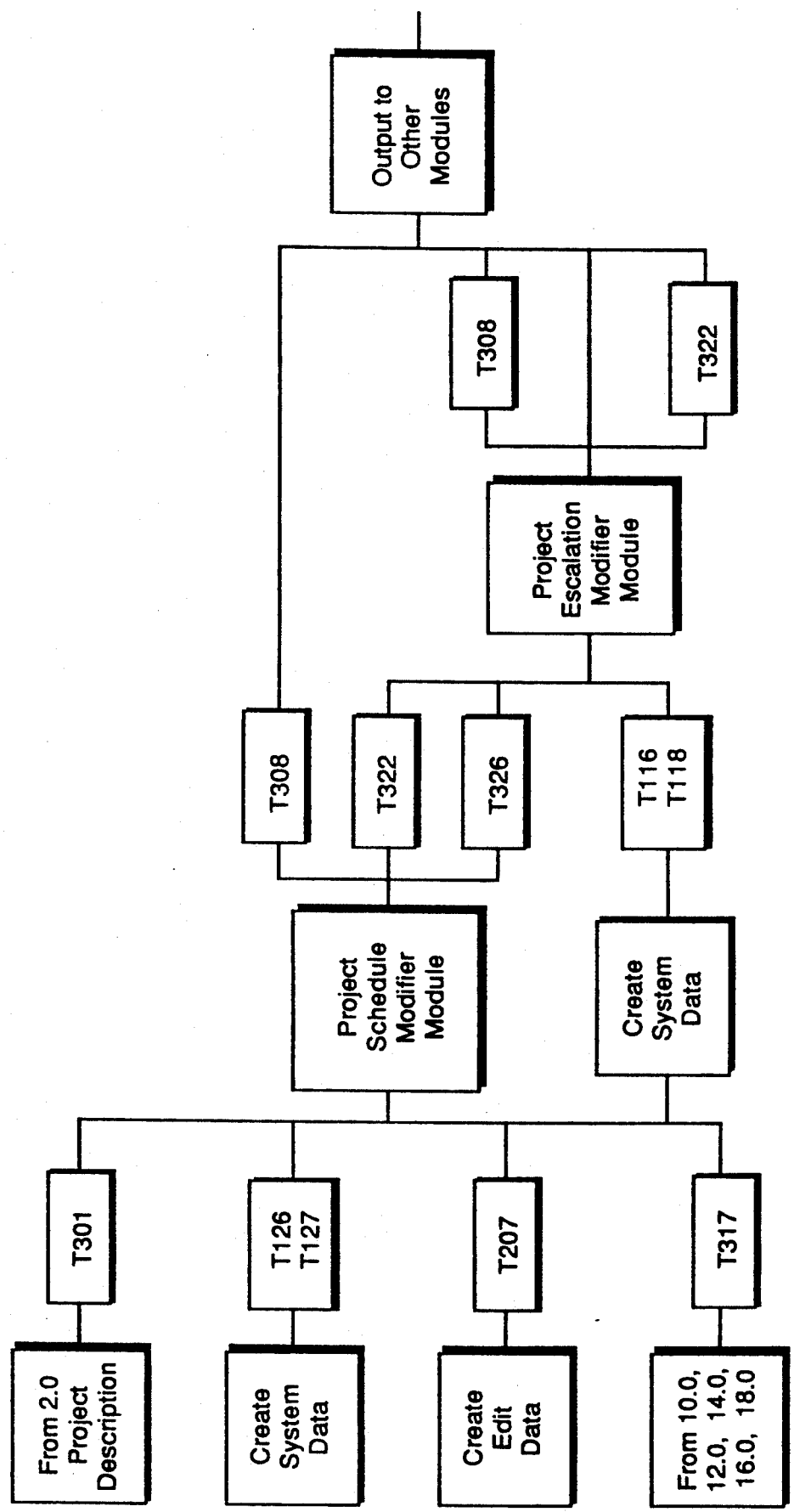
Figure 8C:
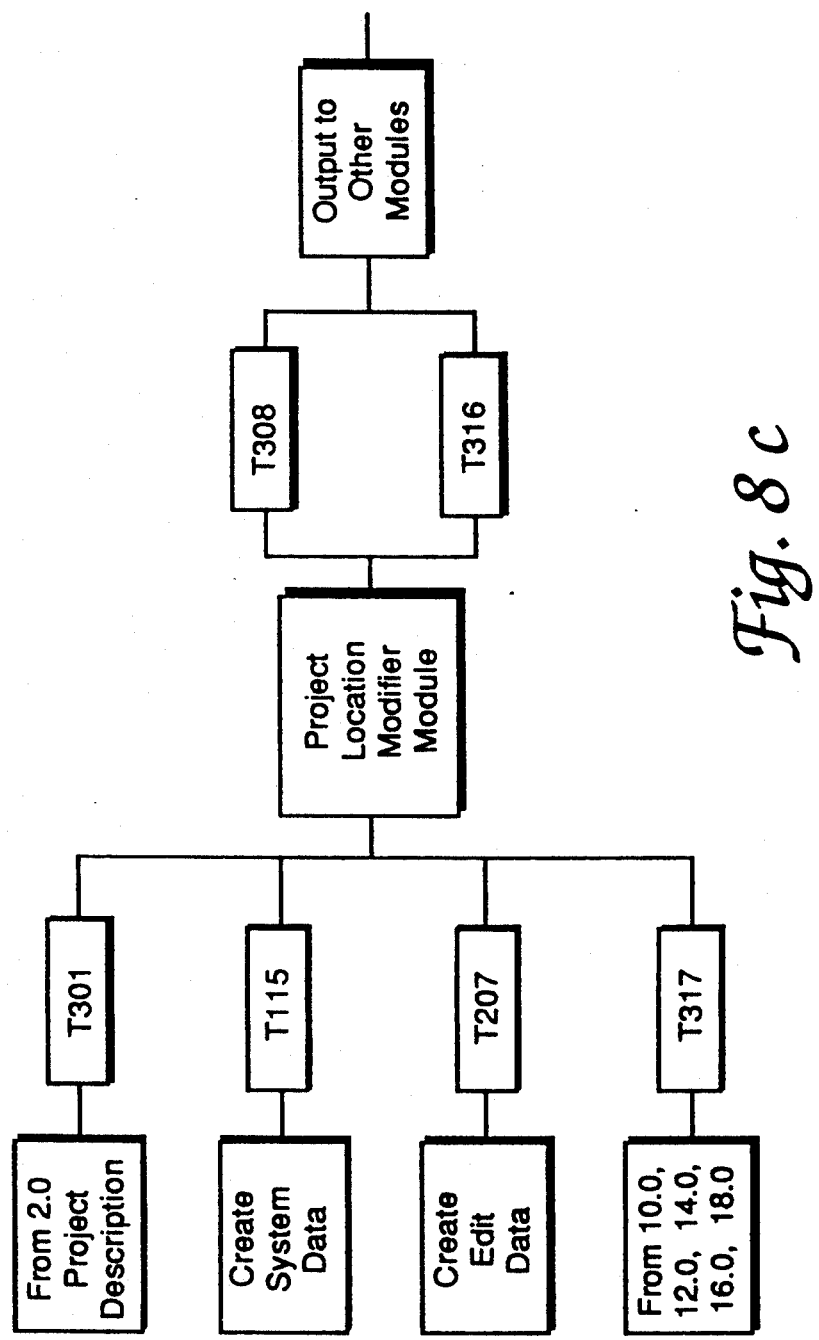
Figure 8D:
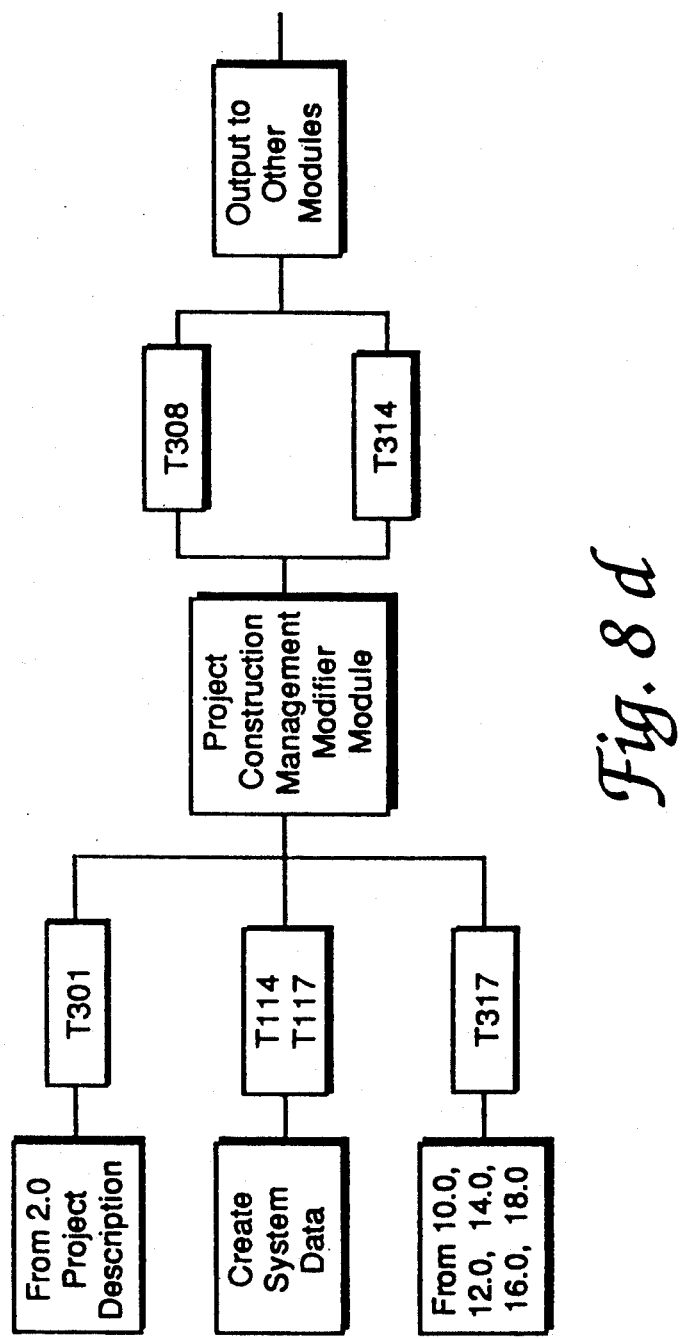
Figure 8E:
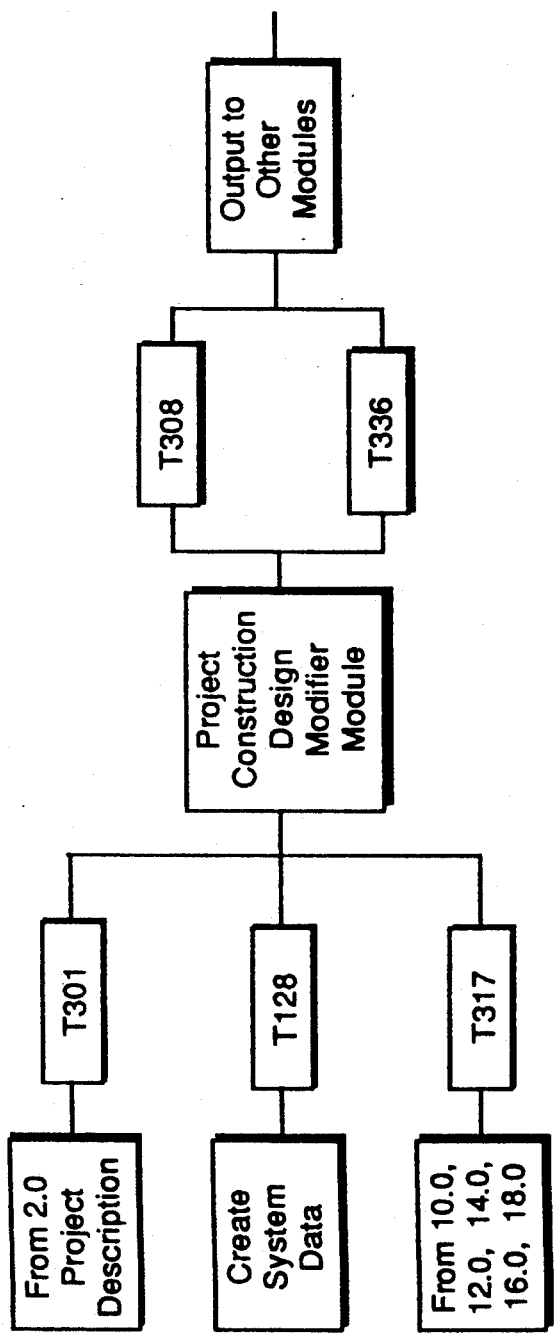

4. Create Modifier Sets. This section (FIG. 8, comprising FIGS. 8a-8e) of CCMAS processes modifiers to the direct costs. There are seven modifiers included in this section of CCMAS. They are for Construction Methods, Project Definition, Project Schedule, location, Escalation, Construction Management, and Project Design. All of the CCMAS cost data (historical, line items, etc.) is normalized to a specific location and time frame. This normalization also covers the productivity factors used to determine how much labor and equipment is used in the composite items. The modifiers are used to adjust the CCMAS costs to account for differences in construction techniques; labor productivity; costs for materials, labor, and equipment; account for supervision and inspection of the construction; pay for the design; and pay for unforeseen conditions that may be encountered. Following is a description on how these modifiers operate and how they are developed and used in CCMAS.

a. Construction Methods Modifier. This modifier is used to adjust project costs by the 18 CSI Divisions and five CCMAS resources (material cost, labor cost, equipment cost, labor hours, and equipment hours) by location. It is used to account for different materials, labor, and equipment used in different locations, especially overseas. It is not a location adjustment to account for different prices and wages, that is the location modifier. This modifier is used to account for one location using labor by hand to excavate a trench vs using equipment. This modifier adjusts the labor and equipment hours used to get the total cost. Factors are developed for every Air Force location based on experience working in the various locations and stored in Table T110. User modifications to the built-in factors are stored in Table T310. This module produces an adjusted direct cost table (T337) by applying the factors to the direct cost in Tables T319 and T348. Table T337 is used by the other modifiers as shown in the following paragraphs. The following Tables (knowledge base) are used by this module:

| Table | Description |
|---|---|
| T110 | CCMAS Construction Method Modifiers Table |
| T301 | CCMAS Project Description Table |
| T308 | CCMAS Modifier Set Number Table |
| T310 | CCMAS Project Construction Method Modifiers |
| T317 | CCMAS Direct Cost Run Number Table |
| T319 | CCMAS Direct Cost Output Table |
| T337 | CCMAS Project Direct Cost Modified by CMM |
| T348 | CCMAS CSI Direct Cost Summary Table | b. Project Definition Modifier. This modifier is used to adjust the project for unknown conditions. It is a risk factor to account for what stage of design the project is in and how much is known about the project by CCMAS-UNIFORMAT system. The project definition modifier factor allows CCMAS to produce a range estimate to show that the project cost could grow to if the worst conditions come true. The modifier consists of a series of algorithms, questions, and factors. The algorithm was developed based on actual project experience to produce an adjustment factor based on the percent of design complete. This adjustment factor is modified by a series of factors that were also based on actual project experience of experts. These factors are tied to a series of questions and possible answers. The questions, answers, and factors are stored in Table T113. This information is used in the calculate construction cost section shown below to produce a range estimate for the project. The Tchebycheff inequality method is used to determine the range. User responses are stored in Table T334. The following Tables (knowledge base) are used by this module:

| Table | Description |
|---|---|
| T113 | CCMAS Definition Modifier Factors |
| T301 | CCMAS Project Description Table |
| T308 | CCMAS Modifier Set Number Table |
| T317 | CCMAS Direct Cost Run Number Table |
| T334 | CCMAS Project Definition Modifier Factors | c. Schedule Modifier. This modifier is used to determine the project schedule. Two knowledge bases were developed to estimate the project schedule. The first is used to determine the duration of the project. This table (T127) has factors for project duration based on type of work, project scope, dollar value, and construction type. The table is built to show the user minimum and maximum duration for the project based on answers to the questions and overall project cost as modified by the Construction Methods Modifier above. The second knowledge base (T126) contains construction activity factors. These break the overall schedule down by activities such as design, bidding, mobilization, schedule, closeout, inspection, and move-in. These factors are developed by type of work. This data was developed based on actual project experience. The user supplies the project start date, type of work, and type of construction. The system retrieves the other information. The user is allowed to adjust the durations and dates. The main purpose of this module is to determine the mid-point of construction for escalation and to determine if any schedule compression is required to meet need dates. The following Tables (knowledge bases) are used by this module:

| Table | Description |
|---|---|
| T126 | CCMAS Construction Activities Schedule Table |
| T127 | CCMAS Construction Duration Schedule Table |
| T202 | CCMAS Type of Work Edit Table |
| T301 | CCMAS Project Description Table |
| T308 | CCMAS Modifier Set Number Table |
| T317 | CCMAS Direct Cost Run Number Table |
| T322 | CCMAS Project Escalation Factors Table |
| T326 | CCMAS Project Schedule Table | d. Location Modifiers. The location modifiers are developed based on surveys of a breadbasket of materials, labor, and equipment in the location. Factors are developed by CSI Division for material, labor, and equipment. These factors are normalized to the Department of Defense 144 city average. The 144 cities are three cities from each of the 48 continental states that are near major military installations. These location factors are used by other modules to normalize the knowledge base to this same 144 city average. The factors are used to adjust the data base costs to costs in the location of the project. The following Tables (knowledge base) are used by this module:

| Table | Description |
|---|---|
| T115 | CCMAS Location Modifier Factors Table |
| T207 | CCMAS Geographical Location Edit Table |
| T301 | CCMAS Project Description Table |
| T308 | CCMAS Modifier Set Number Table |
| T316 | CCMAS Project Location Modifier Factors |
| T317 | CCMAS Direct Cost Run Number Table | e. Escalation Factors. Escalation modifiers are developed by the Office of Management and Budget (OMB)

and distributed by the Department of Defense. These factors are developed by major program, appropriation type, and as of date. Each major Air Force project may use a different set of escalation factors depending upon the project and appropriation used for the project. CCMAS stores the escalation factors to account for each difference. In addition to having the data normalized to the 144 city average, all appropriate data in CCMAS is normalized to a specific point in time. This point in time is stored in the Table (T116). This reference point is used to determine the escalation factors used for the project. The following Tables (knowledge base) are used by this module:

| Table | Description |
| --- | --- |
| T116 | CCMAS Knowledge Base Catalog |
| T118 | CCMAS Escalation Modifier Factors |
| T301 | CCMAS Project Description Table |
| T308 | CCMAS Modifier Set Number Table |
| T317 | CCMAS Direct Cost Run Number Table |
| T322 | CCMAS Project Escalation Modifier Factors | f. Construction Management Modifier. This modifier is used to add cost to the project to pay for management of the construction and to cover unforeseen conditions. The factors are developed based on history or set by congress for different conditions. Two of the factors set by congress are Supervision, Inspection, and Overhead (SIOH) and Contingencies. An additional factor based on history for engineering and design after award is included in the data base. The following Tables (knowledge base) are used by this module:

| Table | Description |
| --- | --- |
| T114 | CCMAS SIOH and Management Factors Table |
| T117 | CCMAS Contingency Factors |
| T301 | CCMAS Project Description Table |
| T308 | CCMAS Modifier Set Number Table |
| T314 | CCMAS Project Construction Management Factors |
| T317 | CCMAS Direct Cost Run Number Table | g. Design Modifier. The last modifier is the design modifier. These factors are based on both limits set by congress and history for additional costs. They cover the cost to design the project, make site surveys, soil samples, and concept studies. The factors are based on history with part of the design cost set by congress. The following Tables (knowledge base) are used by this module:

| Table | Description |
| --- | --- |
| T128 | CCMAS Design Factors Table |
| T301 | CCMAS Project Description Table |
| T308 | CCMAS Modifier Set Number Table |
| T317 | CCMAS Direct Cost Run Number Table |
| T336 | CCMAS Project Design Factors |

5. Create Contractor Modifier. This section consists of three different ways of calculating the contractor overhead and profit for the project. The three methods parallel the three main direct cost methods. They are the Comparative method, a generic model, and a QTO method. The contractor modifier processes account for the construction contractor and subcontractors overhead and profit. This includes mobilization cost; bidding climate or competition; availability of manpower, materials, and equipment; weather effects on constructing the facility; working conditions; etc. Following is a description of the three methods available in CCMAS.

a. Comparative Contractor Modifier (CCM). This section (FIG. 9) uses a series of algorithms, questions, and knowledge bases to produce a percentage for contractor overhead and profit. Following is a description of each knowledge base, how it is developed, and how it is used by the module:

(1) Comparative Contractor Modifier Questions and Answers/Factors—Tables T171 and T172. This data includes a series of questions, answers, and factors to calculate contractor overhead and profit. The information was developed based on an extensive analysis of the relationship between contractors overhead and profit and certain key information about the project such as its complexity, working conditions, dollar value, bidding climate, and expert judgement. The factors are based on the answers and are used in an algorithm to determine the percentage for contractor overhead and profit. The following Tables for contractor overhead and profit. The following Tables (knowledge bases) are used by this module:

| Table | Description |
| --- | --- |
| T171 | Comparative Contractor Modifier Questions |
| T172 | Comparative Contractor Modifier Answers/Factors |

(2) Comparative Contractor Modifier S and F factors. This data is used along with the Comparative Contractor Modifier Factors and an algorithm to determine the Contractors overhead and profit. The S factors are the average percent subcontracted by state or country. The F factors are the average workmen's compensation by state or country. The factors are from commercial sources for the United States and experience for overseas countries. The equation used was developed based on extensive experience from construction contractors and validated on actual projects. The following Tables (knowledge bases) are used by this module:

| Table | Description |
| --- | --- |
| T170 | Comparative Contractor Modifier S and F Factors |

(3) Comparative Contractor Modifier Algorithms. This is a series of algorithms that use the data in the previous tables. Separate algorithms are developed for work in the US and overseas locations. The correct algorithm is used based on the location stored in the CCMAS Project Description Table (T301).

(4) Comparative Contractor Modifier Input/Output Tables. There are several tables used by the model to store the user selections and output from the model. The model applies the percentage calculated to the direct cost modified by the Construction Method Modifier to develop the Contractor Modifier direct cost. This data along with a summary by CSI Division are stored in tables T329, T330, and T349. Following is a list of the additional tables used by this model:

| Table | Description |
| --- | --- |
| T207 | CCMAS Geographical Location Edit Table |
| T301 | CCMAS Project Description Table |
| T308 | CCMAS Project Set Number Table |
| T317 | CCMAS Direct Cost Run Number Table |
| T319 | CCMAS Direct Cost Output Table |

-continued

Figures 10, 10A:
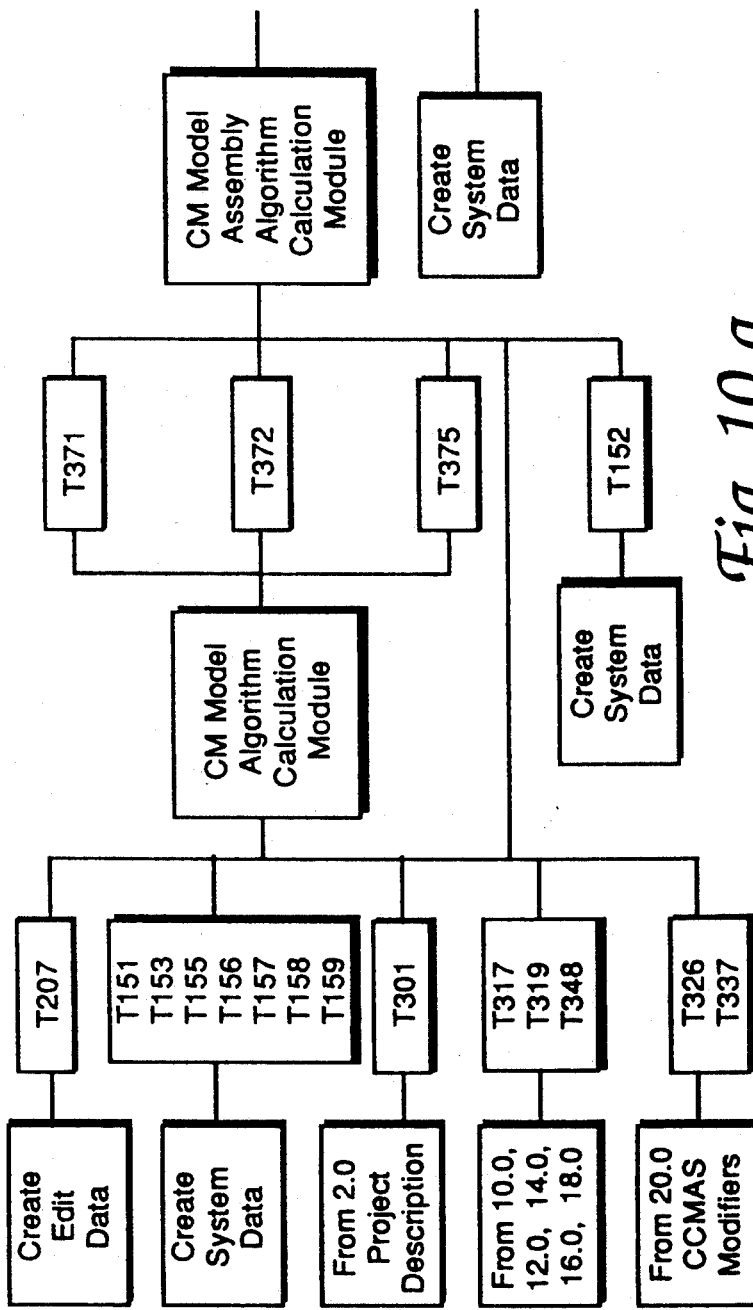
Figure 10:
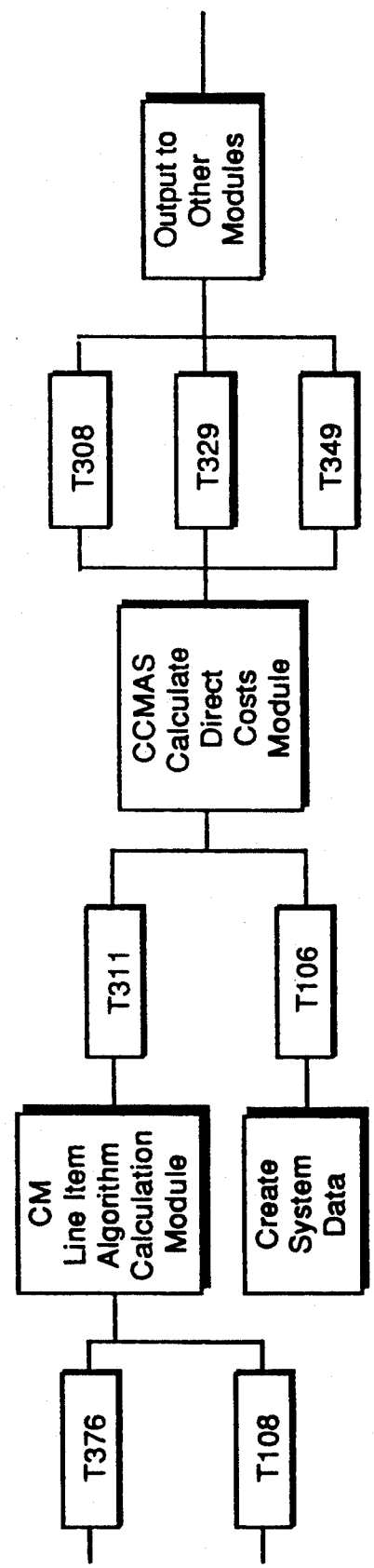

| Table | Description |
|---|---|
| T329 | CCMAS Contractor Modifier Direct Cost Table |
| T330 | CCMAS Project QTO Data Cost Table |
| T337 | CCMAS Project Direct Cost Modified by CMM |
| T348 | CCMAS CSI Direct Cost Summary Table |
| T349 | CCMAS Contractor Modifier Direct Cost by CSI |
| T376 | CCM Modifier Quantities Table |
| T380 | CCM User Answer Table | b. Contractor Modifier Generic Model (CMGM). This section (FIG. 10) uses a series of knowledge bases and algorithms to accomplish a full Quantity Take Off for the contractor overhead and profit without plans and specifications. The output from this module is a complete list of items at the Composite Level of the CCMAS Hierarchy. This module uses data created in the other CCMAS modules. The user does not have to enter any additional data unless they want to modify the defaults in the model. This model operates similar to the Generic Systems Model described above. Following is a description of each knowledge base, how it is developed, and how it is used by the model:

(1) CCMAS Geographic Location Edit Table—T207. This table contains location codes and key information used by every CCMAS module. The state code is the main piece of information used by this module. The state code is used in several tables to extract factors developed by state or major geographical region.

(2) Contractor Modifier Generic Model Prime Major/Minor Subcontractor Percentages Table—T153. This table contains factors which split the project cost by CSI Division for the prime contractor, major subcontractor, and minor subcontractors. It identifies the percentage distribution of costs for various categories of work for each contractor type (prime, sub, minor sub). It is the first table used in the contractor modifier process because most of the following modifiers are based on the dollar value of work accomplished by the prime, major subcontractor, or minor subcontractor, Items such as main office expense depend upon the total amount of work performed by each contractor rather than just the total cost of the project. This table was developed based on expert judgement.

(3) Contractor Modifier Generic Model Parameter Knowledge Base Table—T151. This table contains the default parameters used with the contractor model algorithms and additional data tables in the following paragraphs to determine the initial contractor modifier component values. There are over 50 parameters by major geographic region in this table. Most of the factors in this table identify whether the item is used by the specified type of work in the geographical region chosen. Additional tables shown below identify how much is used based on other information about the project such as the state, direct cost, etc. For example, this table identifies whether timekeepers are used on a building project in underdeveloped countries. Table T156 shown below shows how many are used per week by dollar value of the project for the prime contractor and major and minor subcontractors. The user can override any of the defaults to tailor the output to their project. These defaults were developed based on an analysis of existing Air Force and commercial projects all over the world. Some of the values in this table actually identify the final value or parameter to be used in the algorithm. For example, the default value for building insurance for developed overseas areas is 2.8% of project cost while the value for underdeveloped overseas areas is 1.8%. The value for the US is 0.0%. Again, these initial defaults are used with the contractor model algorithms and additional data tables in the following paragraphs to describe the contractor's overhead and profit requirements to the user.

(4) Contractor Modifier Generic Model Performance Bond Table—T155. This table contains coefficients for a performance bond algorithm. While Table T151 identifies whether performance bond applies to this project by geographical region and prime or major/minor subcontractor, this table provides the factors to use in the algorithm. The algorithm and factors were developed based on expert judgement.

(5) Contractor Modifier Generic Model Insurance, Bonds, and Permits Table—T157. These factors all operate on estimated total project cost rather than direct cost. Estimated total project cost is based on the following algorithm:

$$EPC = [1.7634 \times (DC)^{0.85}] + DC$$

EPC = Estimated Project Cost
DC = Direct Cost

The algorithm and factors were developed based on experience from several contractors.

(6) Contractor Modifier Generic Model Sales Tax and workmen's Compensation by State Table—T158. This table contains the latest state sales taxes and workmen's compensation by state. The workmen's compensation is further broken out by 23 trades. The following table maps the 23 trades for workmen's compensation to the CSI Division in order to properly apply the workmen's compensation factors. This data is obtained by the National Council on Compensation and Insurance.

(7) Contractor Modifier Generic Model Workman's Compensation by CSI Division Table—T159. This table maps the 23 trades used for workmen's compensation to the 18 CSI Divisions. This data was developed based on expert experience. It is used to apply the 23 workman's compensation factors by CSI Division. For example, CSI Division 08—Doors, Window, & Glass uses 35% General Carpentry, 35% Glaziers, and 30% Steel Erection—Doors & Sash. Therefore, the overall workmen's compensation factors for CSI Division 08 is weighted average of these three items using the percentages in this table.

(8) Contractor Modifier Generic Model Parameter Default Table—T156. This table contains over 25 factors by type of work, major geographical region, dollar value of the project, and split between prime/major/minor subcontractors. These factors expand the data in table T151. The factors are developed based on experience. They are used with the algorithms to calculate the initial model values. These factors cover items such as number of field engineers, for the prime, major and minor subcontractors, by dollar value of the project.

(9) Contractor Modifier Generic Model Algorithms. These are a series of over 50 algorithms used with the default parameters in the above tables to set the initial assembly category values. Following is an example of one of the algorithms:

| Parameter | Algorithm |
|---|---|
| Small Tools | $STe = DCe * STdb$ |

STe=Calculated Small Tools Cost
DC3=Calculated Direct Cost
STdb=Data Base Percentage for Small Tools The model uses an algorithm to compute the value, then the user can either accept the value or provide their own value. There are three major algorithm types developed for this model. One is based on applying a percentage to the direct cost as shown above. A second one extracts a total cost from a table (Surveying Expenses). The third one calculates a number of the item per week and the number of weeks (timekeepers). In either case, the output is shown to the user for modification.

(10) Contractor Modifier Generic Model Hierarchy & Factors Table—T152. This table contains the selection of assembly numbers from the library of assemblies (T108) and the factors for each assembly. These factors are used along with the CCMAS Assembly Category calculations above and the Assembly algorithms shown below to select the proper assemblies and quantity of each assembly. These factors are based on project history.

(11) Contractor Modifier Generic Model Assembly Algorithms. These are a series of algorithms used to calculate parameters values for the CCMAS Assemblies Following is an example of the algorithm:

| Assembly | Algorithm |
|---|---|
| All | AQe = AFdb * ACQu |

AQe=Calculated Assembly Quantity
AFdb=Assembly Data Base Value from Table T152
ACQu=Computed or User entered Assembly Category Quantity

(12) CCMAS Library of Assemblies—T108. This table is used by all of the CCMAS models. It contains all of the model assemblies and Composite/Element factors. This table links the UNIFORMAT and CSI Work Breakdown Structures together. The models output assembly quantities and this table is used to convert the assembly quantities into quantities of items at the Composite or Element level to match Table T106 items, the actual costed data base. This table contains over 3,000 assemblies with each assembly having from 1 to over 100 line-items associated with it. An example of an assembly for a Temporary Office 20' by 8' (Assembly—99240101) is as follows:

| CSI Item | Factor | Description |
|---|---|---|
| 011584250 | 1.0000 | Temporary Office Trailer 20X8 |
| 011584460 | 1.0000 | Add for AIR Conditioning |

(13) CCMAS Line Item Algorithms. These are a series of algorithms used to calculate parameters values for the QTO Line Items. The line item quantities are stored in table T311. These algorithms operate just like the CCMAS Assembly Algorithms. Following is an example of the algorithm:

| Line Item | Algorithm |
|---|---|
| All | LIe = LIdb * AQu |

LIe=Calculated QTO Line Item Quantity
LIdb=Line Item Data Base Value from Table T108
AQu=Computed or User entered Assembly Quantity

(14) CCMAS Line-Items Table—T106. This table contains over 40,000 individual Composites or Elements using the CSI WBS. These are the actual costed items used by the models and QTO system. These items are at what we call the Quantity Take Off level of detail.

(15) Contractor Modifier Generic Model Input/Output Tables. There are several tables used by the model to store the user selections and output from the model. Additionally, the final step in the process is to calculate the contractor modifier direct cost. While this cost does represent a modifier to the direct cost in section 2, it is still called direct cost to signify the costs are normalized costs at the CCMAS location and time frame. These costs are also adjusted by the modifiers in the previous section during the next section of CCMAS. The calculation consists of multiplying the line item quantities stored in table T311 by the appropriate costs from table T106. The results are stored in table T329 with a summary by CSI Division stored in table T349. Following is a list of the additional tables used by this model:

| Table | Description |
|---|---|
| T215 | CCMAS WBS Hierarchy Table |
| T301 | CCMAS Project Description Table |
| T308 | CCMAS Project Set Number Table |
| T311 | CCMAS Contractor Modifier Line Item Quantities |
| T317 | CCMAS Direct Cost Run Number Table |
| T326 | CCMAS Project Schedule Table |
| T329 | Contractor Modifier Direct Cost Table |
| T348 | CCMAS Direct Cost by CSI Summary Table |
| T349 | Contractor Modifier Direct Cost by CSI Summary |
| T371 | CMGM User Parameters Table |
| T372 | CMGM CSI Prime/Major/Minor Cost Table |
| T375 | CMGM Prime/Major/Minor Ratio Table |
| T376 | CMGM Assembly Quantities Table |

Figure 11:
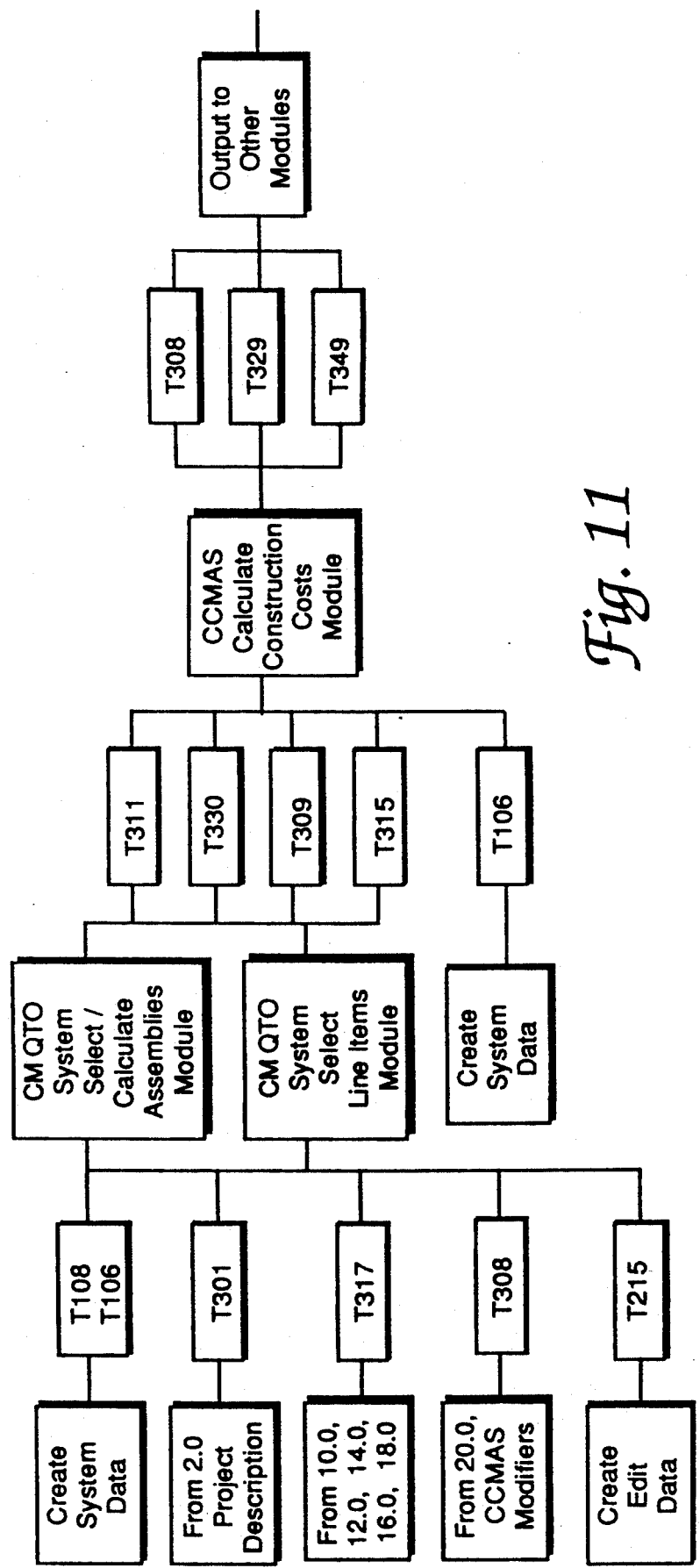

The first nine tables are used by other models in CCMAS. The last four are used only by the CMGM model to store all information specific to this model. This allows the user to edit the input and rerun the model or to copy the parameters for a different project.

c. Contractor Modifier Quantity Take Off (QTO) System. This section (FIG. 11) is a series of programs that allow the user to select Assemblies, Composites, or Elements from the CCMAS data bases (T108 and T106). This module operates exactly as the QTO module described in paragraph 3.e. above except the line item quantities are stored in table T311 instead of table T324; the direct costs are stored in table T329 instead of T319; and the direct cost by CSI Division summary is stored in table T349 instead of T348. Other than where the data is stored, this module operates exactly like the QTO module and the data for this module is from the same tables as for the QTO module. There are several tables used by the module to store the user selections and output from the module. Following is a list of the tables used by this module:

| Table | Description |
|---|---|
| T108 | CCMAS Library of Assemblies |
| T215 | CCMAS Uniformat WBS Code Edit Table |
| T301 | CCMAS Project Description Table |
| T308 | CCMAS Project Set Number Table |
| T309 | CCMAS User Defined Hierarchy Description Table |
| T311 | CCMAS Contractor Modifier Line Item Quantities |
| T315 | CCMAS Project Default Confidence Factor Table |

-continued

| Table | Description |
| --- | --- |
| T317 | CCMAS Direct Cost Run Number Table |
| T330 | CCMAS User Defined QTO Line Items Table |
| T329 | Contractor Modifier Direct Cost Table |
| T349 | Contractor Modifier Direct Cost by CSI Summary |

Figure 12:
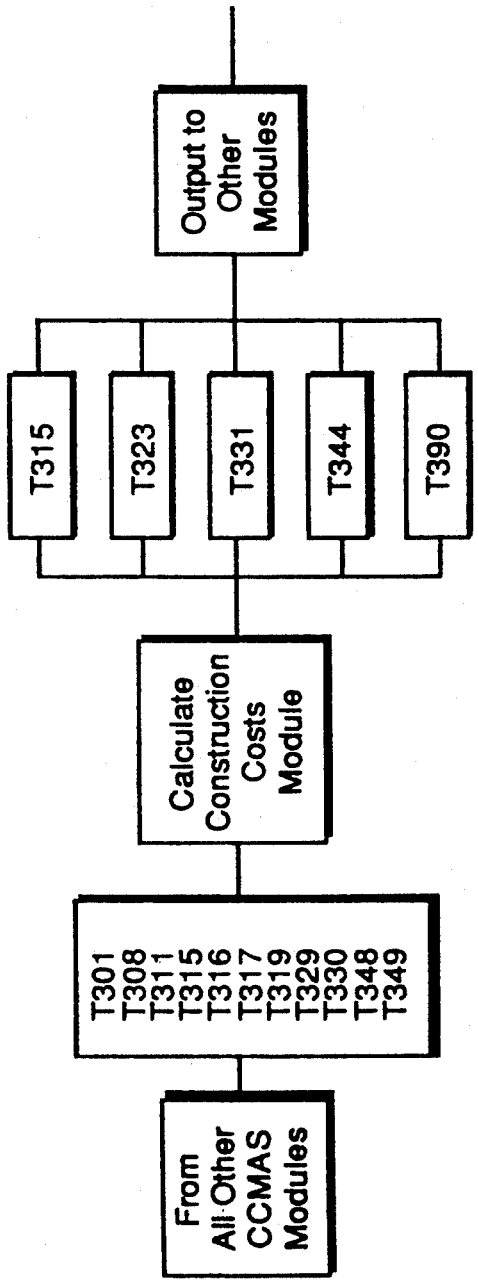

6. Calculate Construction Costs. This section (FIG. 12) only requires the user to enter the project identification code to execute. This process takes the data from the previous four processes and produces the estimated cost of construction for the time and location specified. This process uses several of the CCMAS knowledge bases along with a series of algorithms to calculate the construction cost. The results are stored in a series of knowledge bases that are used in the report module to show the results. The calculations accomplished in this module include the application of the Tchebycheff Inequality model to calculate an expected cost at 50% confidence along with a high cost at 95% confidence based on the information provided in the project definition section of the modifiers. Following is a list of the tables used by this module:

| Table | Description |
| --- | --- |
| T301 | CCMAS Project Description Table |
| T308 | CCMAS Project Set Number Table |
| T311 | CCMAS Contractor Modifier Line Item Quantities |
| T315 | CCMAS Project Default Confidence Factor Table |
| T316 | CCMAS Project Location Modifier Factors Table |
| T317 | CCMAS Direct Cost Run Number Table |
| T319 | CCMAS Direct Cost Table |
| T323 | CCMAS Construction Cost (Mid-Point) Table |
| T329 | Contractor Modifier Direct Cost Table |
| T330 | CCMAS User Defined QTO Line Items Table |
| T331 | CCMAS Modifier Lump Sum Value Table |
| T344 | CCMAS Construction Cost by CSI Summary |
| T348 | CCMAS Direct Cost by CSI Summary |
| T349 | Contractor Modifier Direct Cost by CSI Summary |
| T390 | CCMAS Project Location Modifier Direct Cost |

6. Reports. This section is used to produce several preformatted reports. The reports use the knowledge bases created by the calculate construction cost and calculate direct cost modules. The reports get the appropriate data and show it to the user. Following is a list of the preformatted reports available.

a. Cost Analysis Facility Report Summary. This report allows the user to compare two estimates at the summary level for direct cost and each modifier. It compares total cost, scope, and unit cost.

b. Cost Analysis Facility Report by System, Subsystem, Assembly, or Line Item Level. This series of reports compares two estimates at the level specified. This report allows the user to analyze difference in estimates quickly.

c. Cost Analysis Program Cost Variance Report. This report allows the user to select an entire program for comparison. A CCMAS program can contain as many individual facilities as the user wants. This report shows the differences in an entire program for individual facilities, by year, by appropriation, by location, and by project. This report can compare costs, quantities, or unit costs. It is designed by analyze an entire program from several to several hundred facilities.

d. Estimator's Detail Report Summary. This report shows the same data as the first report in paragraph 6.a. above, but, for just one facility.

e. Estimator's Detail Report by System, Subsystem, Assembly, or Line Item. This report just shows the data for one facility at the level specified.

f. Estimator's Program Reports. This is a series of reports designed to show entire programs summarized in different ways. Summaries can be by year, location, appropriation, project within the program, etc.

Figure 13:
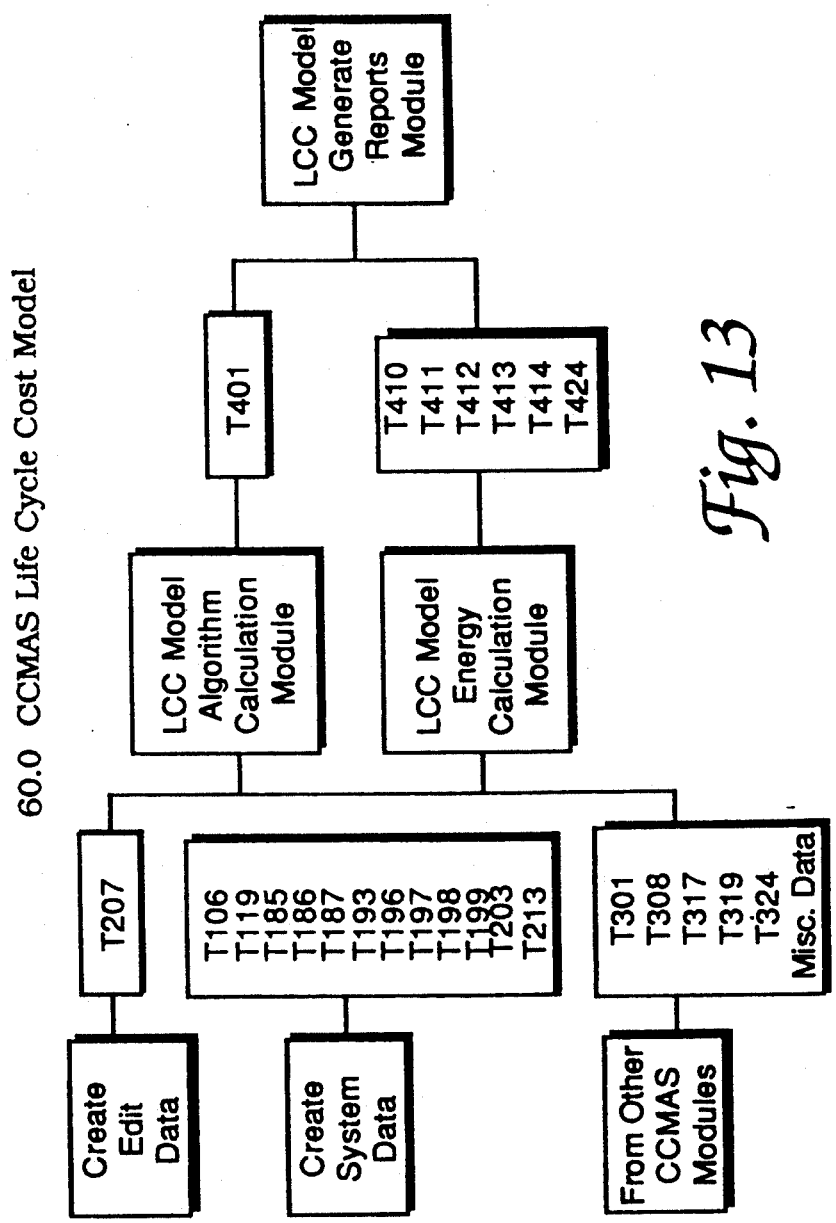

7. Life Cycle Cost (LCC) Model. This section (FIG. 13) uses a series of knowledge bases and algorithms to accomplish a full Life Cycle Cost Analysis of each individual line item in the facility. The output from this module is a complete list of costs by year for up to a 99 year span at the Composite Level of the CCMAS Hierarchy. All the user has to input is just the CCMAS identification code for the facility. The only restriction for this model is that the facility construction costs must be loaded onto CCMAS. This requirement is necessary because the LCC model uses a mapping scheme between CCMAS line items and the LCC line items. The construction cost portion of the Life Cycle Cost Analysis is accomplished in the previous sections of CCMAS. This section accomplishes the operations and maintenance cost analysis, financing, and economic analysis portions of the LCC analysis. Following is a description of each knowledge base used by the LCC Model, how it is developed, and how it is used by the models:

a. CCMAS QTO Line Item Cost Data—T106. The CCMAS basic line item cost table is used by the LCC module to compute maintenance, repair, replacement, and operating costs. The LCC model was developed to use a percentage of the original cost for material, equipment and labor to install the item in calculating the LCC cost components. For example, the cost for materials to replace vacuum seals and gaskets on a pneumatic message tube system is 15% of the material cost of the system. Most of the material cost data for the LCC model is directly tied to the construction cost data base. Therefore, as we update the construction cost data base, we are also updating most of the LCC material cost data base. The QTO knowledge base is described in section 2 of CCMAS above.

b. Annual Escalation Factors Table—T119. This table contains annual escalation rates for construction, operations and maintenance activities, and energy by federal region. The data is obtained from the Department of Defense for construction and operations and maintenance. Energy rates are obtained from the Department of Energy. This data is used to escalate the various cost data during the LCC analysis.

c. LCC Energy Component Factors Table—T185. This table contains energy use factors to split the total building energy use into heating, Air Conditioning, Lights, and fans. This data is by region and building type. The data is from the Department of Energy. It is used to take the total building energy use calculated from table T213 below and split it by major use. This data is then used in a series of algorithms to compute the energy use by type of fuel (electric, gas, oil, coal, etc.) in order to apply the appropriate energy rates from table T207 to the data.

d. LCC Deferred Maintenance Factors Table—T186. This Table contains factors that adjust the maintenance, repair, and operations costs and life expectancy of the item based on deferring maintenance. The deferred maintenance factors are based on how the component is used in the building. Six classifications are used to describe how each component is used—dynamic exterior, dynamic interior, transport exterior, transport interior, static exterior, and static interior. The factors are based on the number of years of deferral, classification of the item, and type of maintenance. For example factors are developed to adjust maintenance cost during deferral and after it is resumed, to adjust for repair during deferral and when maintenance is resumed, and also to adjust the life expectancy of the item. These factors were developed based on experience and manufactures data. They are used during the analysis to adjust the LCC cost for deferred maintenance.

e. LCC Energy Generation Life Expectancy Modifier Table—T187. This table is used to adjust the life expectancy of major energy generation components based on amount of use. The amount of use is based on heating and cooling degree days in table T207 (Geographical Location Edit Table). The modification factor is by building assembly code from the CCMAS Hierarchy. The data is based on experience and engineering judgement. The modification factor adjusts the life expectancy of the identified major components of the building by assembly code.

f. LCC Energy Deferred Maintenance Factors Table—T193. This table contains adjustment factors by energy component from Table T185 for deferred maintenance. This data is based on experience and engineers judgement. The factors adjust the energy use if maintenance is deferred on any of the systems affecting energy use.

g. LCC Operations and Maintenance Data Table—T196. This is the main LCC knowledge base table. It contains the LCC line item data. The data in this table includes the LCC item identification, maintenance activity type, frequency, man-hours or labor percent, material percentage or cost, equipment percent or cost, and removal cost. Individual costs or percentages are developed for annual maintenance, cyclic maintenance, and physical damage repair. Data for life expectancy is contained in table T197. This data was developed from extensive surveys of manufacturers, literature, trade associations, universities, hospitals, government agencies with the largest information coming from the Navy Engineering Performance Standards for building maintenance, General Services Administration Buildings Maintenance Management, Corps of Engineers Construction Engineering Research Laboratory survey of building systems, State of Maryland Maintenance and Repair Program, and surveys at several Air Force bases. This data is used to determine the cost by building component, maintenance activity type, and year. Several algorithms are used to adjust the costs based on additional data shown in the other tables for this section of CCMAS.

h. LCC Life Expectancy Table—T197. This table contains the life expectancy for all items that are replaced during the life of a building. This table only contains items that are replaced. The model uses this data to determine replacement times and residual value at the end of the study period. The data is from manufacturers recommendations and experience. The values in this table are modified by deferred maintenance factors in table T186 and energy usage factors in table T187.

i. LCC-QTO Line Item Mapping Table—T198. This table maps LCC line items to QTO line items from the construction cost estimate. Items are mapped by where they are used in the facility. The CCMAS Hierarchy assembly code is used to identify where the item is used in the facility. Therefore, a door that is used in the exterior closure has different maintenance costs than a door that is used in the interior of the building. This table also includes a quantity factor to adjust for different units of measure between LCC and QTO items. For example, the LCC costs for floor tiles may be based on per 100 square feet while the QTO line item is in square feet.

j. LCC Shop Rate Data Table—T199. This table contains labor rates for every Air Force Installation. The data is based on the Base Engineer Automated System (BEAMS) for tracking base engineer shop rates. This data is used as the labor rate when maintenance is performed by the Air Force engineering shops.

k. LCC Category Code-Energy Use Profile Mapping Table—T203 This table provides a mapping between Air Force Category Codes that identify building types with the Department of Energy Profiles. The energy use profiles are used to extract the energy use from table T213 described below. The data is based on an analysis of the Department of Energy description for their energy profiles to the Air Force Category Code descriptions.

l. CCMAS Geographical Location Edit Table—T207. This table contains location codes and key information used by every CCMAS module. This table stores information on degree days heating and cooling, and energy rates by region for the LCC Model. The degree days are obtained from weather data. The energy rates are obtained from the Department of Energy. The degree days and energy rates are used along with Table T185 (Component Energy Factors Table), Table T119 (Escalation Modifier Table), Table T213 (Energy Use Table), the building type, and a series of algorithms to calculate the annual energy cost.

m. LCC Energy Use Table—T213. This table contains the Department of Energy energy usage by region and building profile. It also contains the building operations schedule used to calculate the energy usage. The data is used along with the other energy tables described above to calculate the annual energy usage for the building.

n. LCC Algorithms and Factors. There are several pieces of information used by the LCC model that are requested of the user. Following is a list of each one and how it is used:

(1) Discount Rate. The user enters a discount rate to be used for the analysis. Standard rates are built into the algorithms, but, the user can override these rates by entering a different rate. The chosen rates are stored in table T401—LCC User Response Table. The rates are used to determine the present value of money in the analysis.

(2) Type of financing used for the construction and operation and maintenance of the facility, if any is used. This includes the rates, points, type of loan, and number of years. This information is stored in table T401—LCC User Response Table. The data is used to calculate the cost of loans per year during the economic life of the project.

(3) LCC Algorithms. Several algorithms are used to determine the costs. Following is the algorithm used to determine the residual value for an item that is replaced during the study period:

$$RS = ((CC1 * MLEI1) + (CC2 * MLEI2) + (CC7 * MLEI3)) * \\ ((1 + I1)**(P3 - Z2) * (1 - (DR * P2))) * I6 * \\ (1 - (P3 - Z1/CRC))$$

CC1 = Capital costs of material for the item
MLEI1 = Material Cost Index for the location
CC2 = Capital costs of equipment for the item
MLEI2 = Equipment Cost Index for the location
CC7 = Capital costs of labor for the item
MLEI3 = Labor Cost Index for the location
I1 = Discount rate in decimal form
P3 = Study Period in Years
Z2 = Numeric value of Present value base year
DR = Deterioration rate
P2 = Occupancy Period in Years
I6 = Inflation rate over period
Z1 = Numeric value of current year in study
CRD = Component Replacement Cycle
** = Represents raising the value to the power o. Other LCC Input/Output Tables. There are several other tables used by the LCC model to store information. The following Tables (knowledge base) are used by this module:

| Table | Description |
| --- | --- |
| T301 | CCMAS Project Description Table |
| T308 | CCMAS Modifier Set Number Table |
| T317 | CCMAS Direct Cost Run Number Table |
| T319 | CCMAS Direct Cost Output Table |
| T324 | CCMAS Project Line Item Quantity Table |
| T401 | LCC Response Table |
| T410 | LCC Assembly Variable Year Values Table |
| T411 | LCC Assembly Constant Year Values Table |
| T412 | LCC Facility Constant Year Values Table |
| T413 | LCC Facility Variable Year Values Table |
| T414 | LCC Interest & Principal Values Table |
| T424 | LCC Item Quantity Table | p. LCC Reports. Several preformatted reports are available from the LCC module. Following is a list of them and what they show:

(1) LCC Facility Level Cost Report. This report shows all of the user input and a summary of the total Life Cycle Costs for the facility in both present and actual dollars. Costs are summarized by construction, annual maintenance, cyclic maintenance, physical damage repair, replacement, residual value, energy, cleaning, and financing costs.

(2) LCC System, Subsystem, and Assembly Level Cost Reports. These show the same information as the facility level report, but, at the level specified.

(3) LCC Annual Cost Summary. This report shows the costs by year for the study period for each cost element for the total facility.

(4) LCC Assembly Report. This report shows all costs for each assembly by year.

(5) LCC Comparison Report. The report compares two LCC estimates. This report can be run at the facility, system, subsystem, or assembly level of the CCMAS Hierarchy.

8. Archive/Delete Estimate Data. This section of CCMAS lets the user remove project information from the on-line CCMAS system to tape or some other off-line storage mechanism. The process also lets the user put the information back onto the on-line part of CCMAS.

This Manual is Supplemented by the Microfiche Copies of the System Model, Design and Development Reports.

SYSTEM ARCHITECTURE

Figure 14:
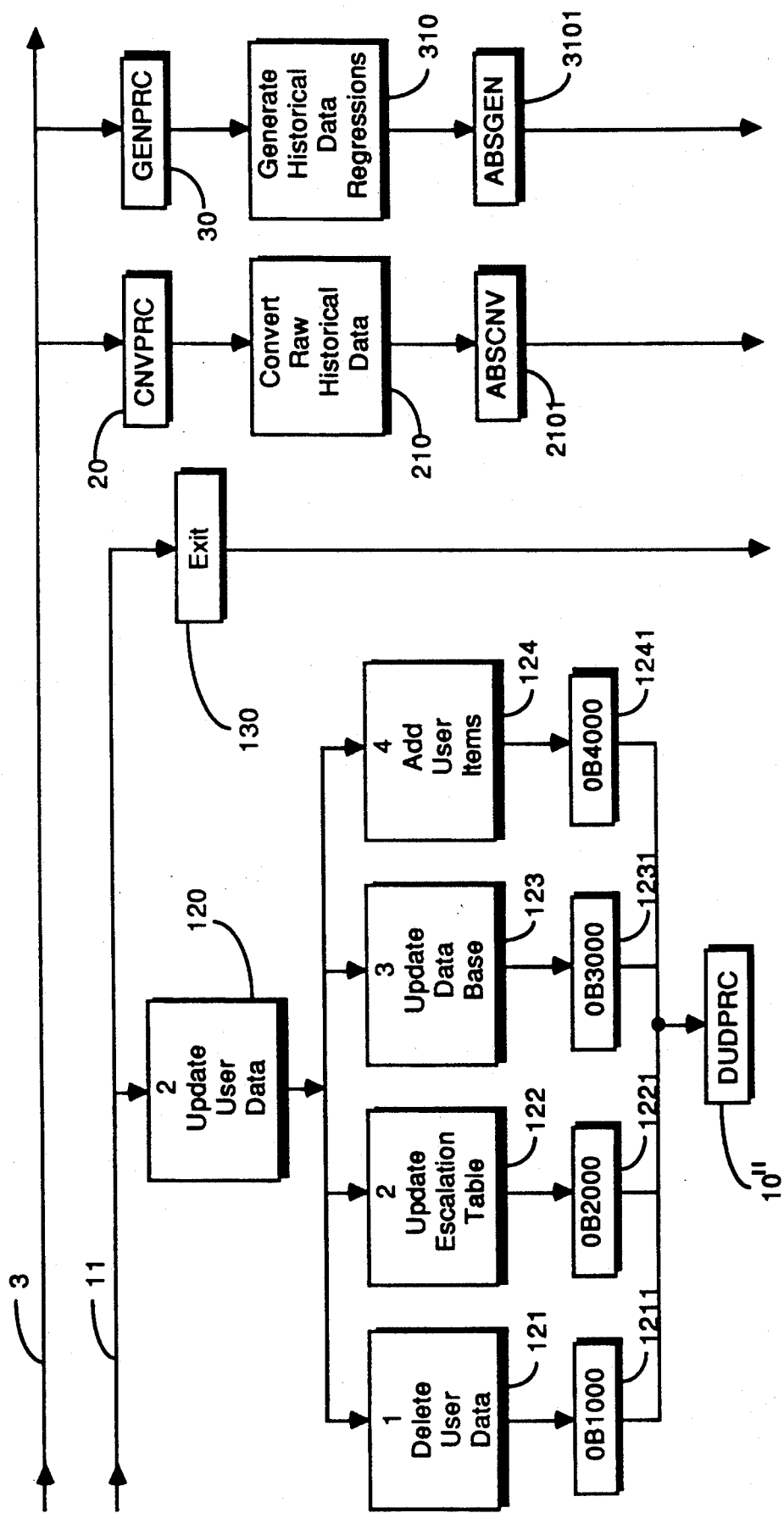
FIGS. 14a–14g inclusive, when arranged as shown in FIG. 14, comprise a block diagram of the system architecture.

The flow diagram of FIGS. 14a-14g inclusive, when arranged as shown in FIG. 14, is a presentation of the current overall CCMAS architecture. The flow diagram of FIGS. 1-13 is an alternate presentation of the CCMAS MAINPRC, Block 40, FIGS. 14c-14f. This alternative presentation shows the interrelationship between the various modules and knowledge bases used in CCMAS. The total system is comprised of over 1,000 application programs and knowledge bases which require over 200,000,000 bytes of computer storage.

Each of the executable modules on the chart such as ABSMID under CCMAS, MAINPRC, "1 Create/Edit Project Description", represents over 4,000,000 bytes of computer storage.

The diagram begins under the CCMAS block 2 via connector line 3 with the following procedures:

DUDPRC—Block 10, FIG. 14a Data Update Procedure

CNVPRC—Block 20, FIG. 14b Convert Raw Historical Data

GENPRC—Block 30, FIG. 14b Generate Historical Data Regressions Procedure

Figure 14C:
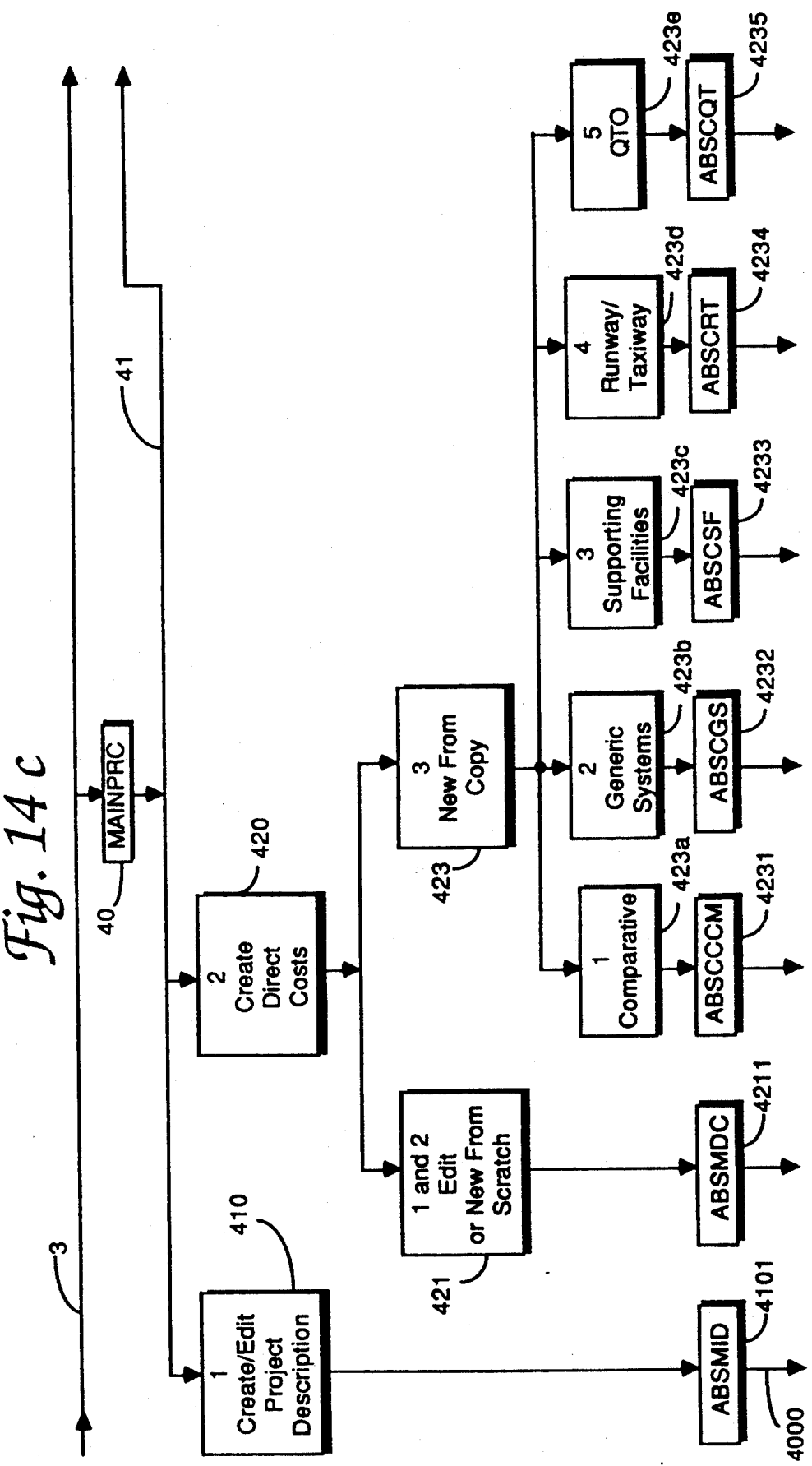
Figure 14:
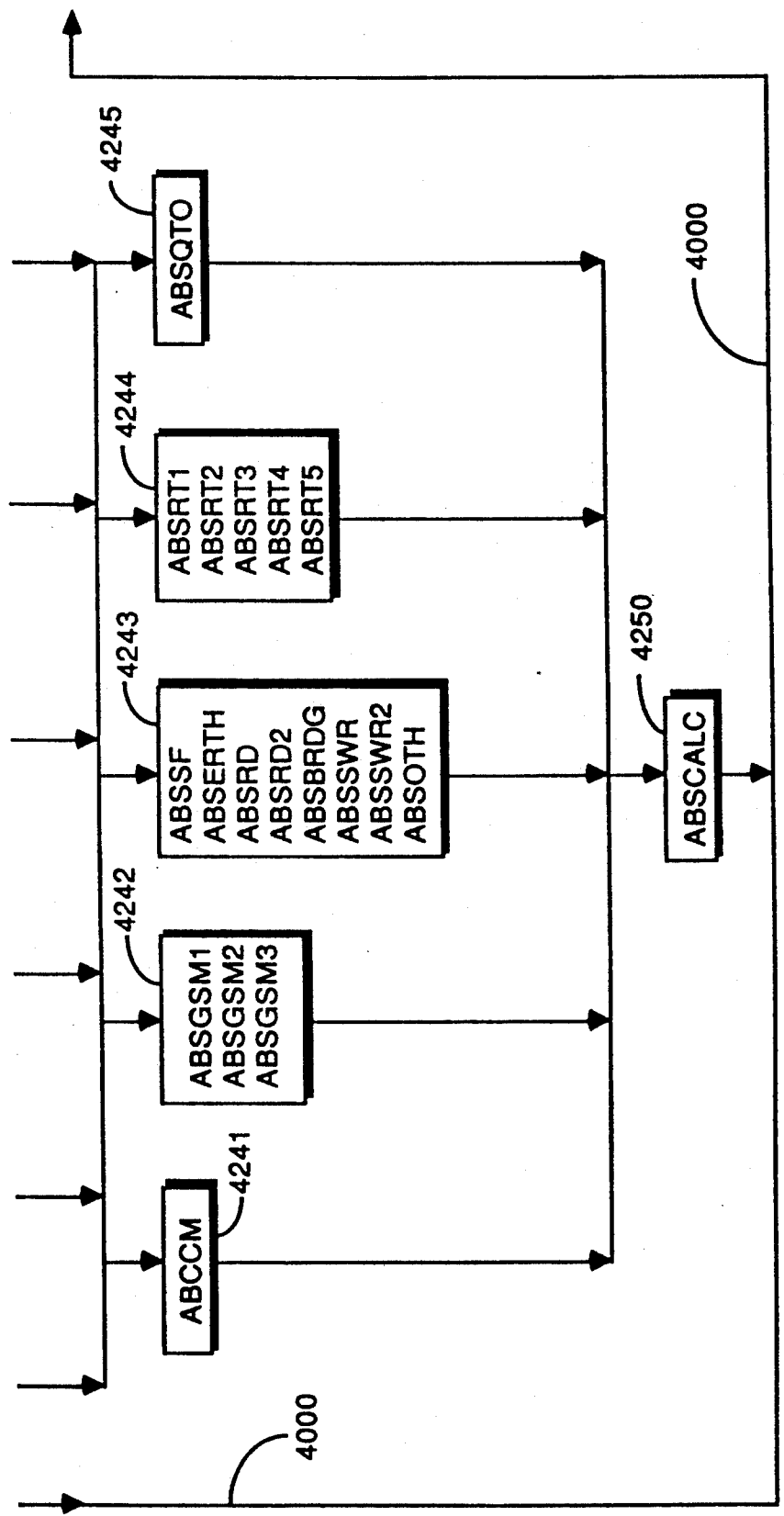
Figure 14:
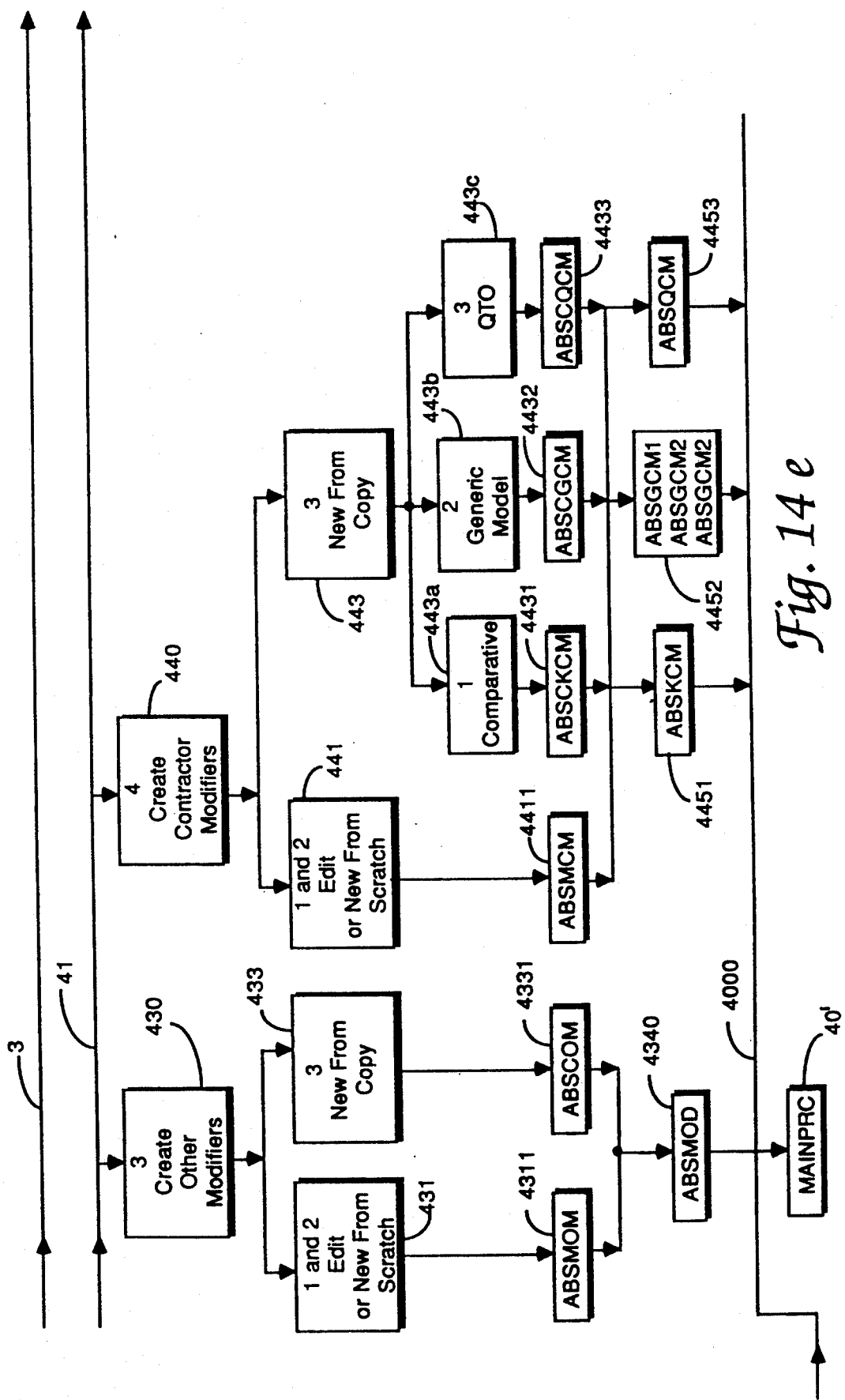
Figure 14F:
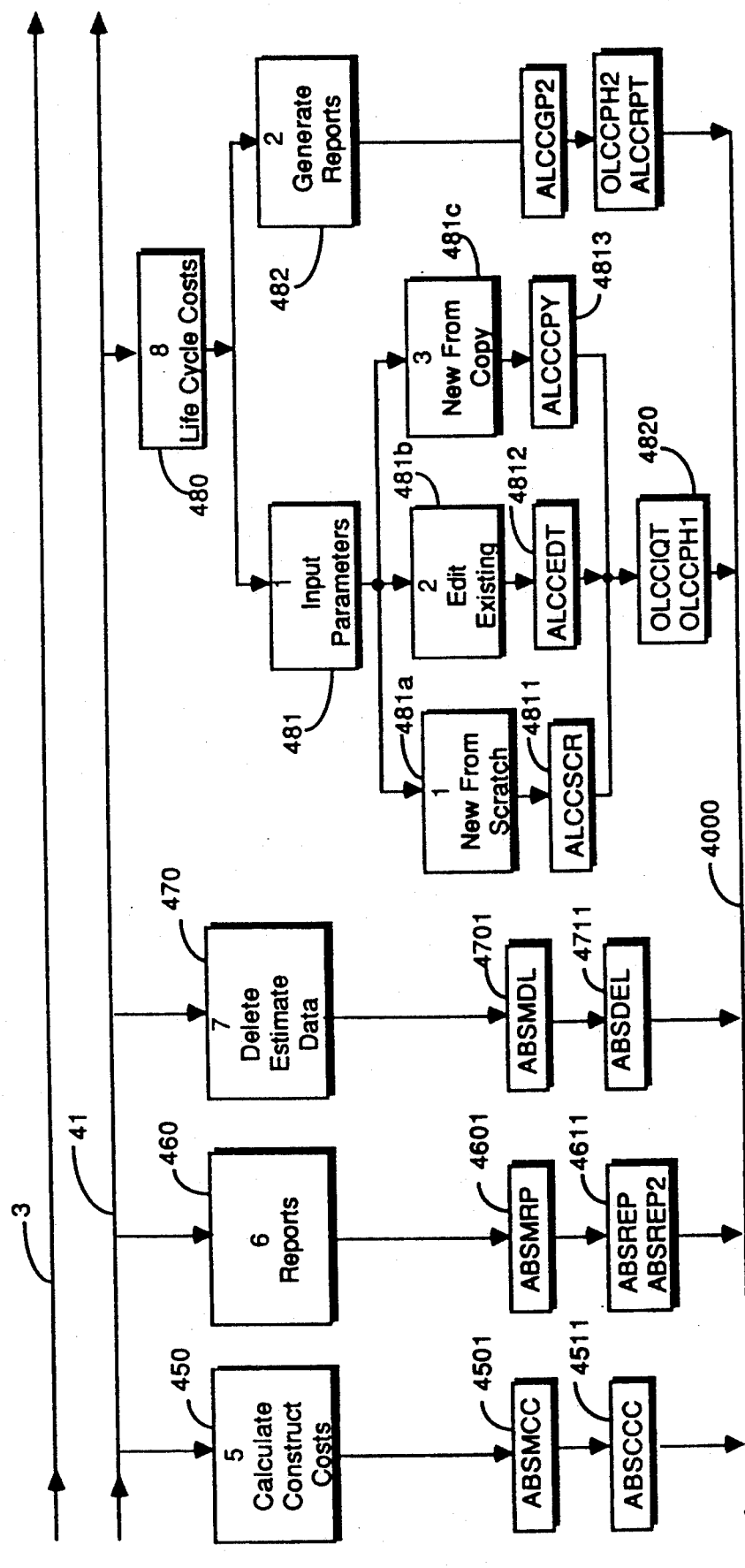

MAINPRC—Block 40, FIG. 14c Main Procedure

Figure 14G:
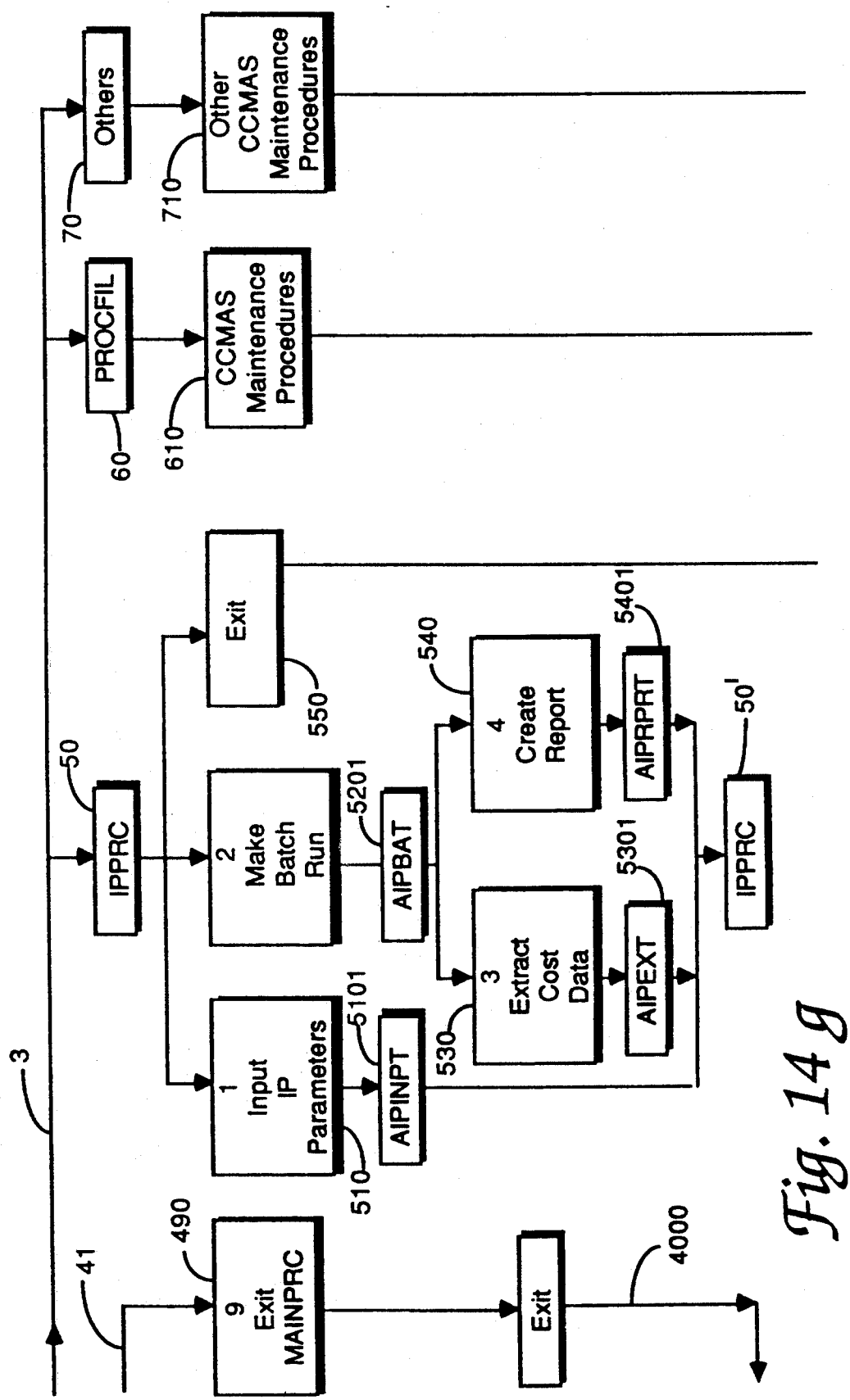

IPPPRC—Block 50, FIG. 14g Interactive Processor Procedure

PROC,FILES—Block 60, FIG. 14g CCMAS Maintenance Procedures

OTHER—Block 70, FIG. 14g Systems Maintenance Procedures

The modules which contain a number correspond to menu options within the above procedures. Once the use selects the desired option, CCMAS will then access one of several applicable codes. The primary designations of the codes are:

"O"—Object files, and

"A"—Absolute Code files

These codes are required to open various tables or knowledge bases, call up subprograms which perform the selected function, then close those knowledge bases and shift the processed data to the next procedural port.

Under the procedure DUDPRC (block 10) there are three options shown in FIGS. 14a & 14b, 1) Update QTO Data (block 110), 2) Update User Data (block 120), and Exit (block 130).

Under the Update QTO Data block 110, there are seven options, 1) Last Year vs. This Year (block 111) which accesses the object file OA1000 (block 1111), 2) Modify Source Table (block 112) which accesses the object file OA2000 (block 1121), 3) Modify Crew Table (block 113) which accesses the object file OA3000 (block 1131), 4) Update Trade Rates (block 114) which accesses the object file OA4000 (block 114), 5) Update Time/Location Tables (block 115) which accesses the object file OA5000 (block 1151), 6) Correct Division 1.1 (block 116) which accesses the object file OA6000 (block 1161), and 7) Update QTO Data Base (block 117) which accesses the object file OA7000 (block 1171). From these object files the program returns to the procedure DUDPRC, shown as block 10'.

Under the Delete User Data block 120 (FIG. 14b), there are 20 four options, 1) Update User Data (block 121) which accesses the object file OB100 (block 1211), 2) Update Escalation Table (block 122) which accesses the object file OB2000 (block 1221), 3) Update Data Base (block 123) which accesses the object file OB3000 (block 1231), and 4) Add User Items (block 124) which accesses the object file OB4000 (block 1241). From these object files the program returns to the procedure DUDPRC, shown as block 10".

Under the procedure CNVPRC (block 20) the program goes to block 210, Convert Raw Historical Data, which accesses the Absolute Code file ABSCNV (block 2101).

Under the procedure GENPRC (block 30) the program goes to block 310, Generate Historical Data Regressions, which accesses the Absolute Code file ABSGEN (block 3101).

Under the procedure MAINPRC (block 40) there are nine options shown in FIGS. 14c, 14e, 14f & 14g via connector line 41, 1) Create/Edit Project Description (block 410), 2) Create Direct Costs (block 420), 3) Create Other Modifiers (block 430), 4) Create Contractor Modifiers (block 440) 5) Calculate Construction Costs (block 450), 6) Reports (block 460), 7) Delete Estimate Data (block 470), 8) Life Cycle Costs (block 480), and 9) Exit MAINPROC (block 490).

From the Create/Edit Project Description block 410 the system accesses the Absolute Code file ABSMID (block 4101). From there, as shown by a connector line 4000, the system returns to the main procedure MAINPRC shown as block 40' in FIG. 14e.

From the Create Direct Costs block 420 the user may choose either 1 and 2) Edit or New From Scratch block 421 or 3) New From Copy block 423. From the Edit or New From Scratch block 421 the system accesses the Absolute Code file ABSMDC (block 4211).

From the New From Copy block 423 (FIG. 14c), the use may choose 1) Comparative (block 423a) which accesses the Absolute Code file ABSCCCM block 4231, 2) Generic Systems (block 423b) which accesses the Absolute Code file ABSCGS block 4232, 3) Supporting Facilities (block 423c) which accesses the Absolute Code file ABSCSF block 4233, 4) Runway/Taxiway (block 423d) which accesses the Absolute Code file ABSCRT block 4234, or 5) QTO (block 423e) which accesses the Absolute Code file ABSCQT block 4235. Under the Absolute Code file blocks 4211, 4231, 4232, 4233, 4234 & 4235, there are shown in FIG. 14d Absolute Code file block 4241 for ABSCCM; block 4242 for ABSGSM1, ABSGSM2, & ABSGSM3; block 4243 for ABSSF, ABSERTH, ABSRD, ABSRD2, ABSBRDG, ABSSWR, ABSSWR2, & ABSOTH; block 4244 for ABRT1, ABRT2, ABRT3, ABRT4 & ABRT5; and Block 4245 for ABSQTO. From blocks 4241, 4242, 4243, 4244 & 4245 the system goes to block 4250 for the Absolute Code file ABSCALC, and from there, as shown by a connector line 4000, the system returns to the main procedure MAINPRC shown as block 40' in FIG. 14e.

From the Create Other Modifiers block 430 (FIG. 14e) the user may chose either 1 and 2) Edit or New From Scratch block 431 or 3) New From Copy block 433. From the Edit or New From Scratch block 431 the system accesses the Absolute Code file ABSMOM (block 4311). From the New From Copy block 433 the system accesses the Absolute Code file ABSCOM (block 4331). From block 4311 or block 4331 the system goes to Absolute Code file ABSMOD (block 4340), from which the return is to the Main procedure MAINPRC shown as block 40'.

From the Create Contractor Modifiers block 440 (FIG. 14el ) the user may choose either 1 and 2) Edit or New From Scratch block 441 or 3) New From Copy block 443. From the Edit or New From Scratch block 431 the system accesses the Absolute Code file ABSMCM (block 4411). From the New From Copy block 433, the user may choose 1) Comparative (block 443a) which accesses the Absolute Code file ABSCKCM blcok 4431, 2) Generic Model (block 443b) which accesses the Absolute Code file ABSCGCM block 4232, or 3) QTO (block 443c) which accesses the Absolute Code file ABSCQCM block 4443. Under the Absolute Code file blocks 4411, 4431, 4432, & 4433, there are shown in FIG. 14e Absolute Code file block 4451 for ABSKCM; block 4452 for ABSGCM1, ABSGCM2, & ABSGCM3; and Block 4453 for ABSQCM, the system returns to the main procedure MAINPRC shown as block 40'.

From the Calculate Construct Costs block 450 the system accesses the Absolute Code file ABSMCC (block 4501), which is followed by the Absolute Code file ABSCCC (block 4511). From there, as shown by a connector line 4000, the system returns to the main procedure MAINPRC shown as block 40' in FIG. 14e.

From the Reports block 450 the system accesses the Absolute Code file ABSMRP (block 4601), which is followed by block 4611 for the Absolute Code file ABSREP & ABSREP2. From there, as shown by connector line 4000, the system returns to the main procedure MAINPRC shown as block 40' in FIG. 14e.

From the Delete Estimate Data block 470 the system accesses the Absolute Code file ABSMDL (block 4701), which is followed by the Absolute Code file ABSDEL (block 4711). From there, as shown by connector line 4000, the system returns to the main procedure MAINPRC shown as block 40' in FIG. 14e.

From the Life Cycle Costs block 480 (FIG. 14f) the user may choose either 1) Input Parameters block 481 or 2) Generate Reports block 482. From the Input Parameters block 481, the user may choose 1) New From Scratch (block 481a) which accesses the file ALCCSCR block 4811, 2) Edit Existing (block 481b) which accesses the file ALCCEDT block 4812, or 3) New From Copy (block 481c) which accesses the file ALCCCPY block 4813. From the file blocks 4811, 4812, & 4813, the system goes to block block 4820 for files OLCCIQT & OLCCPHI. From there, as shown by connector line 4000, the system returns to the main procedure MAINPRC shown as block 40' in FIG. 14e.

Under the procedure IPPRC (block 50) there are three options shown in FIG. 14g, 1) Input IP Parameters (block 510) which accesses file AIPINPT (block 5101), 2) Make Batch Run (block 520) which accesses file AIPBAT (block 5201), and Exit (block 550).

Under the file AIPBAT (block 5201), there are two options, 3) Extract Cost Data (block 530) which accesses file AIPEXT (block 5301), and 4) Create Report (block 450) which accesses file AIPRPRT (block 5401). From blocks 5101, 5301 and 5401, the system returns to the procedure IPPRC shown as block 50'.

Under the procedure PROCFIL (block 60) the the system goes to block 610, CCMAS Maintenance Procedures.

Under the Other procedure (block 70) the the system goes to block 710, Other CCMAS Maintenance Procedures.

THE EXPERT SYSTEM

CCMAS is a knowledge based system: much of the theoretical information can be referenced from *Expert Systems, Tools & Applications* by Paul Harmon et al, New York, John Wiley, 1988. Three key ideas from artificial intelligence research that apply to CCMAS are (1) new ways to represent knowledge, (2) heuristic search, and (3) the separation of knowledge from inference and control (Harmon, p7). In context of expert systems, Harmon defines the term knowledge as "a body of information about a particular topic that is organized to be useful" (p7). Harmon states "knowledge-based programs rely on rules of thumb (heuristics rather than mathematical certainty); therefore, they allow managers to look at problems even when they have incomplete information . . . (such that), techniques have been developed to allow any expert to examine to content in a program 'without' knowing how the content is manipulated (programmed)"(p11). A new field, knowledge engineering has grown from the marrying of behavioral sciences and physical sciences with specific development of eliciting techniques and organizing systems for managing the knowledge acquisition and retention. CCMAS uses knowledge engineering in the development of the models.

a. The first step in developing a CCMAS model is the development of the knowledge base. We use four sources interactively: (1) Air Force as build drawings, (2) Air Force regulations and design criteria, (3) commercial specifications an d construction techniques, and (4) construction engineers with expert knowledge in construction methods and many years of experience in the construction engineering fields. For example, AFM 88-2, Air Force Design Manual Definitive Designs of Air Force Structures gives a requirement of 151.2 KW in the utility requirements for lighting in an administrative-type building (Combined Base Personnel Office). We elicited from construction engineers knowledge of complete lighting systems that could meet the state design criteria. In addition, we inspected as build drawings to add specific lighting systems used in specific buildings that also met that criteria to add to the knowledge base. This knowledge acquisition was repeated for all known lighting systems and selected building types. It was also repeated for all building systems used in commercial construction and those system unique to the Department of Defense, such as hardened command and control centers. These techniques and results are described in detail in the previously submitted data and microfiche.

At the end of this specification there is an "INDEX OF CCMAS MANUALS" and a list of "REFERENCES" to Air Force regulations.

Page III-1 of the Generic Systems Model (ref 7a on the Index of CCMAS models) states in paragraph 2:

"Various Air Force Manuals and Regulations were reviewed in preparing the model. However, the actual data was prepared using actual projects recently constructed by the Air Force. The manuals and regulations were used to supplement the actual project data. The AF publications used in preparing data for the Generic Model were:
AFM 88-15: Air Force Design Manual—Criteria and Standards for Air Force Construction, 23 Feb. 1977.
AFM 88-29: Engineering Weather Data, 1Jul. 1978."

b. The second step is capturing and organizing the engineering rules and heuristics of the construction engineers. CCMAS does this in the work breakdown structure (WBS) provided on the microfiche appendix—table T-215. The key is organizing this data is modeling the interactions among the levels in the work breakdown structure. As different criteria are met at each successive layer of the WBS, a different path may be taken among the knowledge tables described in paragraph a. For example, under certain soil conditions, spread footings are chosen for building foundations, but under different conditions pile foundations are selected. A construction engineer KNOWS the reasons for the changes—CCMAS captures that knowledge in the WBS structure and heuristic rules of iteration. Another more complex example is when a seismic condition is modeled. A construction engineer knows that multiple system in the building must be redesigned or strengthened—the foundations changed, heavier load bearing steel, even down to changing the methods of hanging the steel members. CCMAS models the interactions, through heuristic rules that result in near infinite combinations of paths or decisions, that a construction engineer makes, sometimes without conscious system provide that ARE NOT and CANNOT be modeled with mathematical algorithms. These CCMAS-organized knowledge bases (i.e., Harmon's definition of an expert system) create a modeling system that "thinks" for itself or, that is, makes decisions normally done by a construction expert. CCMAS allows an inexperienced construction engineer to be as accurate in cost estimating as an "old timer". Reference again Harmon saying expert systems "allow managers to look at problems even when they have incomplete information" (p11)—or the CCMAS, when a construction engineer does not have complete experience.

c. Harmon's third key point is the separation of knowledge from inference and control. "Ideally, the inference and control techniques exist independent of the knowledge base and simply manipulate the knowledge during development or during the consultation according to the criteria established by the tool". This is true with CCMAS. The cost data files are separate from the construction engineering inference engine and are manipulated through the expert system. The CCMAS expert system automatically selects appropriate algorithms and knowledge-based factors. It is this automatic selection and modeling of the thought process of a construction engineer that makes CCMAS unique.

d. Another breakthrough in artificial intelligence that is adopted by CCMAS is the ability of a computer program to "learn" or "teach itself". When a new data element or algorithm is added to CCMAS, all existing models can access and use that new component without being completely reprogrammed. The organization of the knowledge bases and work breakdown structure allows multiple, almost unlimited paths through the decision steps in modeling construction engineering applications.

THE MODELS

It should be noted that the CCMAS system contains a large amount of information relating to models of facilities for different types, locations, and other factors. The following paragraphs are consise steps describing how to build a model. The description relates both the development of the system, using various sources; and also to how the system operates interactively with a user to provide a model for a particular facility.

a. CCMAS Parameters. CCMAS models are based on a hierarchical structure that was determined by the applicants, to adequately represent the requirements of the facility so that reasonable construction costs estimates can be determined based on parameters and facility requirements. The top level of the CCMAS hierarchy structure is the basic parameter level. At this level the total gross square footage of the particular facility, the location, and date of desired construction must be provided. Other parameters which were developed by the inventors can be determined as a function of these basic parameters combined with Air Force design criteria for a particular facility type. The model will divide the total gross floor area for a particular facility into distinct functional space types which are typically associated with that facility. These procedures for this allocation method are modeled based on interpretation by experts of Air Force design criteria as presented in AFM 88-15 and AFR 86-2and as built drawings of actual facilities. When most of the basic facility functional space areas are determined, the facility can be further divided into subsystems, assembly categories, assemblies, and actual quantities of construction material, labor and equipment. The optional parameters are described as follows:

Parameter 1: Floor-to-floor height above grade—This parameters is modeled as a function of the facility type. For example, knowledge-engineering rules for typical administrative spaces will lead to 14', but knowledge-engineering rules for Cold Storage lead to 25'.

Parameter 2: Floor-to-floor height below grade—This parameter is also modeled as a function of the facility type and may or may not be used depending on the geographic location and the total size of the facility. (It is the "may or may not be used" and the expert procedures modeled to make that decision that are breakthroughs.) For example, rules for typical administrative spaces will lead to 14', but cold storage leads to 12'.

Parameter 3: Floor-to-ceiling height above grade—This parameter is modeled as a function of the particular functional space areas within a facility. For example, rules for typical administrative spaces will lead to 9', but cold storage leads to 20'.

Parameter 4: Floor-to-ceiling height below grade—This parameter is also modeled as a function of the particular functional space types which may be included in the basement of a facility.

Parameter 5: Stores above grade—This parameter is modeled as a function of the type of facility and the overall size of the facility in question. For example, knowledge engineering rules for typical administration space over 150,000 SF are three stories, but rules for high-bay aircraft maintenance hangar always lead to one story.

Parameter 6: Stories below grade—This parameter is modeled as a function of the type of facility, the geographic location, and the overall size of the facility in question. For example, knowledge-engineering heuristics will lead to no stores below grade for typical Air Force facilities, but leads to one story below grade for blast hardened facilities.

Parameter 7: Footprint area—This parameter is modeled as a function of the type of facility, the total gross area of the facility in question, the number of floors above grade, and the number of floors below grade for the facility in question.

Parameter 8: Perimeter—This parameter is modeled as a function of the overall size and footprint area of the facility in question.

Parameter 9: Roof area—This parameter is modeled as a function of the overall size, type, and footprint area of the facility in question.

Parameter 10: Exterior wall area—This parameter is modeled as a function of the total size, the floor-to-floor height above grade, the number of stories above grade, and the perimeter of length of the facility in question.

Parameter 11: Exterior window area—This parameter is modeled as a function of the stories above grade, the floor-to-floor height above grade, the perimeter length, and the type of facility in question.

Parameter 12: Heating load—The heating load is modeled as a function of the geographic location of the facility, the type, the footprint area, the total stories above grade, and the fuel type to be used for the facility in question.

Parameter 13: Number of stairwells—This parameter is modeled as a function of the footprint area, the number of stories above grade, the number of stories below grade, and the type of facility in question.

Parameter 14: Cooling load—The cooling load is modeled as a function of the footprint area, total number of stories above grade, floor-to-floor height above grade, type, geographic location, and the fuel type to be used for the facility in question.

Parameter 15: Electric load—The electric load is modeled based on the facility type, the type of heating and cooling to be used, and the total area of the facility in question.

Parameter 16: Number of elevators—The number of elevators is modeled based on the footprint area of the facility, the number of stories below grade, and the type of facility in question.

Parameter 17: Refrigeration load—This parameter is modeled based on the type of facility in question and the requirements for the facility.

Parameter 18: Air changes per hour—This parameter is modeled based on the function of the total volume, type, and the geographic location of the facility in question.

Parameter 19: Soil type—This parameter is modeled based on the geographic location of the facility.

Parameter 20: Floor structure type—This parameter is modeled based on the facility requirements, type, and the geographic location of the facility in question.

Parameter 21: Roof structure type—This is based on the type, and geographic location of the facility in question.

Parameter 22: Bay size—This parameter is modeled based on the type of facility in question.

Parameter 23: Stair type—This parameter is modeled based on the type of facility in question.

Parameter 24: Roofing type—This parameter is modeled based on the type of facility in question.

Parameter 25: Interior partition density—This parameter is modeled as a function of the particular functional space types within a facility.

Parameter 26: Interior door density—This parameter is modeled as a function of the particular functional space types within a facility.

Parameter 27: Interior window density—This parameter is modeled as a function of the particular functional space types within a facility.

Parameter 28: Interior wall finish density—This parameter is modeled as a function of the particular functional space types within a facility.

Parameter 29: Interior overhead and special door density—This parameter is modeled as a function of the particular functional space types within a facility.

Parameter 30: Exterior wall type—This parameter is modeled as a function of the facility type in question and the geographic location.

Parameter 31: Exterior door density—This parameter is modeled as a function of the particular facility type and the size of the footprint area.

Parameter 32: Exterior overhead special door density—This parameter is modeled as a function of the facility type in question.

Parameter 33: Plumbing domestic water supply—This parameter is modeled as a function of the total number of plumbing fixtures, which are in turn determined by the particular functional space types within a facility.

Parameter 34: Plumbing sanitary waste system—This parameter is modeled as a function of the type of facility and the functional space types within that facility.

Parameter 35: Plumbing fixture density—This parameter is modeled based on the functional space types within a particular facility.

Parameter 36: Plumbing special systems density—This parameter is modeled as a function of the particular functional space types within a facility.

Parameter 37: Heat generating system—This parameter is modeled based on the facility type in question and the specific location where the facility is to be constructed.

Parameter 38: Cooling generating system—This parameter is modeled based on the particular facility type in question and the specific location where the facility is to be constructed.

b. Calculation Process for Construction Material, Labor, and Equipment Quantities. The CCMAS models determine facility requirements. Facility parameters are determined as described above. Once parameters are determined, specific subsystem quantities, assembly category quantities and assembly quantities are automatically selected and determined by forward chaining rules designed by construction experts. Once assembly category and assembly quantities are determined, the models can then generate specific material, labor, and equipment quantities that will be required to construct the particular facility. Within each assembly, a knowledge base to set the requirements for specific construction materials and the labor and construction equipment required to install those materials is used to develop the model quantities. The requirements for specific construction material, labor, and equipment can be calculated based on the stored knowledge base. Once particular construction material, labor and equipment requirements are determined, the model can be used to determine construction costs. Costs are mathematical calculations operating on current price data. Although this information could also be used for other purposes, such as procurement, scheduling and other related activities.

c. How the Models are Made. Given the CCMAS inference engine of forward chaining rules, creating new models for CCMAS depends on the user's understanding of the facility requirements, based on expert knowledge, standard design criteria as presented in Air Force Manual 86-2, and similar references for other agencies and/or other private parties.

The first step in creating the models is determining the particular facility type which is to be modeled and the composition of functional space types which are typically associated with that facility. Once this is determined, the model can be made by performing the following five steps:

Step 1.

Each model is dependent on developing an expert knowledge base. Define the parameters and their corresponding default values. Parameters that define the model must be determined and the "typical" values for those parameters must be defined. Indicate "typical" values for previously defined parameters and/or create new parameters. Define the "Functional Space Areas" (FSAs) for each type of building facility. Where appropriate, standard names should be used for FSAs. Existing CCMAS FSAs can be used if appropriate. The sum of the FSA floor areas must be equal to the total area of the facility.

Step 2.

Determine the subsystem algorithms. Once the parameters and their corresponding "typical" values are heuristically determined, algorithms (arithmetic equations) using these parameters must be knowledge engineered showing the relationship, interactions, and connectivity among the parameters and the subsystem values for the model.

Step 3.

Determine the assembly category factors. Once the subsystem algorithms are determined, the corresponding assembly category factors are determined as follows:

Define the factors through knowledge engineering by functional space area or for the building as a whole for each assembly category and assembly required by the model.

*Assembly Category Factor=Assembly Category Value/Subsystem Value*

Step 4.

In a similar fashion, once the assembly category value is calculated, the corresponding assembly factor(s) are determined as follows:

*Assembly factor=Assembly Value/Assembly Category Value*

This factor is engineered in one of two ways depending on the application.

a. If the assembly value is a percent of the assembly category, the value is simply a factor. This type of application works for cases where the quantity of materials to be purchased (or work to be done) is a linear function, i.e., cubic yards of concrete, square feet of gypsum board, linear feet of wire or pipe, etc. For example, in the existing models, ceiling finishes are determined based on factors of the assembly category value for each FSA. In the case of "Open Office Space" in the Administrative facilities Model, the assembly factor for 2'×4' suspended acoustical ceiling is 1.0000, which means that one square foot of suspended ceiling is heuristically derived for every square foot of open office space floor area.

b. If the assembly is to be selected based on one or more of the descriptive parameters, the assembly factor is selected based on the parameter value. This type of factor is currently used for two different types of applications: (1) descriptive parameters, and (2) "step functions" for the selection of different assemblies based on capacities. Examples of the first case include exterior wall type (brick, metal, etc.); roof types; etc. Examples of the second case include HVAC chillers (i.e., these are selected based on the cooling load in tons); boilers (in BTUs); power transformers (based on KW electric load); etc.

Step 5.

Define the Work Breakdown Structure and knowledge engineer all relationships, interactions, and connectivity among the knowledge bases, heuristic, and other information organizations.

a. Review the UNIFORMAT WBS Code Edit Table to determine what new systems, subsystems, assembly categories, and assemblies must be defined. Add any new items to the current WBS.

b. Review the CCMAS Library of Assemblies, to help build the new assemblies defined in a. If new line items need to be created to build a new assembly refer to 5.c. Define the new assemblies. The line item factor is the quantity of the line item required for the specific assembly being created.

c. Review the Line Item Description File to determine what new line items must be defined.

New line items need to be created only after careful examination of the Unit Price Book (UPB) and the listing of additional Unit Price Book items. If the particular construction item cannot be found in either the UPB or the additional listing of items already added, the estimator or project manager can make a determination if there is a logical substitution. If there is an existing item that compares to the description and cost of the item, then make a common sense substitution without altering the integrity of the job. If no logical substitution is available, then add the required line item(s).

To add new line items:

(1) The line item code created must 'fit in' with the knowledge bases. If a modifier is being created the record type is '8', otherwise the record type is '7'.

(2) The crew name (five character alpha code) should be selected consistent with existing knowledge systems. If a new crew or craft must be defined, enter the new crew and identify as new. On the bottom of the page, define the new crew.

(3) The daily output is the quantity of the item that can be produced by the crew in an eight-hour period.

(4) Material cost should be in dollars and cents.

(5) For modifiers only, the range of line items to which the modifier applies must be defined.

USER DESCRIPTION

INTRODUCTION

CCMAS is an automated cost estimating system developed by the United States Air Force HQ AFESC/-DEC to produce high reliability construction and life cycle cost estimates. The system uses multiple cost estimating techniques which operate within a single unique work breakdown structure and draw from an especially constructed data base.

CCMAS builds direct costs in one of two ways: comparative method or generic models. A third way, Quantity Take-Off, is contained within CCMAS but is dependent on either user inputs or prior use of a generic model.

Comparative direct costs are expressed in dollars per unit of measure, and can be adjusted for size, seismic zone, climate, and optional cost drivers. Optional Cost drivers are structural features (number of floors, anticipated subsurface conditions, and number of basement levels); architectural features (anticipated enclosure material and interior finishes); mechanical/electrical features (elevators, fire supervision systems HVAC from a central plant versus on site, emergency power, and uninterruptible power systems); and special items (shielding and clean rooms). Factors are developed based upon these optional features, and the added cost for each set of features is computed separately. The comparative direct costs are distributed first among CSI systems using algorithms and then by the material, labor, and equipment contribution within each system.

Generic models derive direct costs for material, labor, and equipment based on facility type, size, and location. CCMAS uses algorithms to break down this data into the appropriate types and quantities of systems, subsystems, assemblies, composites, and elements. CCMAS adds and/or deletes assemblies, composites, and elements automatically to account for seismic zone, climate heating and cooling loads, structural features, and architectural features. The CCMAS derived results can be overridden by the user in the generic model or the results copied into the Quantity Take-Off for further tailoring.

Direct costs are brought from the 144 City National Average of the data base to the specific place and time of construction using modifiers. Material, labor, and equipment costs can be adjusted by CSI and then escalated to the appropriate period of construction. Contractor costs and profits are added to modified directs costs to create the construction contract cost.

CCMAS can report either direct or construction costs at the facility, system, subsystem, assembly, or composite/element level.

DEFINITIONS

ASSEMBLY (WBS Level IV)

A measurable portion of a subsystem, e.g., 50 LF of 2 ft ×4 ft continuous footing.

COMPOSITE (WBS Level V)

The parts and tasks required to build an assembly, e.g., a foot of the 2 ft ×4 ft continuous footing requires specific materials and the tasks are excavate, set forms, place rebar, pour concrete, and strip forms.

CSI (Construction Specifications Institute)

A uniform numbering system divided into 16 divisions based on materials/trades used in construction.

DEFAULT VALUES

Values provided by CCMAS, when a user is unable to provide more specific overriding quantities; the values are based on algorithmic calculations.

DIRECT COSTS

Material, labor, and equipment costs without contractor overhead and profit.

ELEMENT (WBS Level VI)

A composite divided into the material, labor, and equipment required.

FACILITY (WBS Level III)

An entire building or civil work.

SUBSYSTEM (WBS LEVEL III)

A distinguishable part of a system, e.g., pilings and footings are subsystems of foundations.

SUBSYSTEM (WBS LEVEL II)

A system is a general area of work required to construct a facility, e.g., the foundation, superstructure, mechanical, or electrical system, etc.

UNIFORMAT
A uniform numbering system based on the functional use of materials/trades used in construction.
WBS (Work Breakdown Structure)
The hierarchical structure through which a facilities cost is disaggregated from a total cost to priceable items of work.

FACILITY (WBS Level III)
    An entire building or civil work.
SUBSYSTEM (WBS Level III)
    A distinguishable part of a system, e.g., pilings and
    footings are subsystems of foundations.
SYSTEM (WBS Level II)
    A system is a general area of work required to construct a
    facility, e.g., the foundation, superstructure, mechanical,
    or electrical system, etc.
UNIFORMAT
    A uniform numbering system based on the functional use of
    materials/trades used in construction.
WBS (Work Breakdown Structure)
    The hierarchial structure through which a facilities cost is
    disaggregated from a total cost to priceable items of work.

CONSTRUCTION COST MANAGEMENT ANALYSIS SYSTEM
(CCMAS)

CCMAS users begin by selecting from the following options on the initial menu:

1  CREATE/EDIT PROGRAM DESCRIPTION
    2  BUILD DIRECT COSTS
    3  BUILD MODIFIER SETS
    4  BUILD CONTRACTOR MODIFIER SETS
    5  CALCULATE CONSTRUCTION COSTS
    6  REPORTS
    7  LIFE CYCLE COST DATA
    8  DELETE ESTIMATE DATA
    9  EXIT FROM SYSTEM.

For a new facility estimate, a user must first create the program description, menu item "1".

PROGRAM DESCRIPTION

The program description begins with a CCMAS Identification (CCMAS ID). The CCMAS ID consists of the Program, Project, and Facility and is requested by CCMAS as shown below.

ENTER PROGRAM, PROJECT, FACILITY-ID (CCMAS-ID):

STEP 1: A user may enter either a new CCMAS-ID or "M". An "M" instructs CCMAS to provide a user with a menu from which a selection may be made. To an "M" entered here, the system asks:

ENTER DISPLAY OPTION:

1 = DISPLAY ALL COMPLETE CCMAS-ID'S

2 = DISPLAY ALL PROGRAM ID'S

3 = ALL PROJECT ID'S WITHIN A PROGRAM

4 = ALL FACILITY ID'S WITHIN A PROGRAM/PROJECT

The user enters the menu number of the display desired and is provided with additional menus until a complete CCMAS-ID has been identified. This CCMAS-ID, together with its project description, is then used for the estimate. For a completely new program, the user must enter the CCMAS-ID.

ENTER PROGRAM, PROJECT, FACILITY-ID (CCMAS-ID):

SICBM,WHITE,VOQ

NOTE: Each entry has a maximum of five characters which are separated by commas.

STEP 2: The system prompts a user, through a series of screens, to enter program data. Data is entered by specifying the menu number followed by a comma and the data requested. The screens which a user will see are shown below.

PROJECT DESCRIPTION DATA FOR:

CCMAS ID:

01 = PROGRAM TITLE: _____

02 = PROJECT TITLE: _____

03 = FACILITY TITLE: _____

04 = TYPE OF WORK: \_

05 = ESTIMATE DATE: DDMMYY

06 = CCMAS PROJECT CODE: _____

07    CCMAS PROJECT DESCRIPTION: _____

08 = FACILITY DESCRIPTION: _____

NOTE: Type of Work is "1" for buildings, "2" for civil, and "3" for renovation.

MAJCOM CONTACT INFORMATION:

09 = MAJCOM: \_\_\_\_

10 = MAJCOM OFFICE: \_\_\_\_

11 = MAJCOM MGR: _____ _____

12 = AUTOVON PHONE: _____

13 = COMMERCIAL PHONE: _____

AFRCE CONTACT INFORMATION:

14 = AFRCE:  
    15 = AFRCE OFFICE:  
    16 = AFRCE MGR:  
    17 = AUTOVON PHONE:  
    18 = COMMERCIAL PHONE:

AFESC/DEC CONTACT INFORMATION:

19 = AFESC/DEC PROJECT OFFICER:  
    20 = AUTOVON PHONE:  
    21 = COMMERCIAL PHONE:

CONSTRUCTION DATA:

22 = DESIGN CODE:  
    23 = PERCENT DESIGN COMPLETE: ___%  
    24 = DESIGN AGENT ID:  
    25 = CONSTRUCTION AGENT ID:

NOTE: Design codes are currently MCP or DAR.

SCHEDULE/ESCALATION DATA:

26 = PROJECT START DATE:    MMYY  
    27 = AF NEED DATE:    MMYY  
    28 = ESTIMATE YEAR:    MMYY  
    29 = BASE YEAR:    MMYY  
    30 = FUNDING YEAR    MMYY

ENTER GEOLOC CODE:

NOTE: A user may enter "M" and the system responds:

ENTER STATE/COUNTRY CODE, OR 'ALL'

For example, if a user responds "FL" for Florida the system will display all the geographical location codes (GEOLOC) in Florida. The user then enters the appropriate GEOLOC code.

ENTER FACILITY CATEGORY CODE:
A user may enter "M" and the system responds:
    DO YOU WANT TO DISPLAY ALL FACILITY CATEGORIES?
To a "YES" the system provides the user a list of valid category codes (CATCODE). A CATCODE is a six digit number describing a facilities function. The first two digits of the CATCODE give the general function, e.g., CATCODE 610000 are Administrative Facilities. The remaining four digits identify a specific type of Administrative Facility. The first menu is composed of the first two digits of the CATCODE.

|  | FACILITY CATEGORY CODE | DESCRIPTION |
|---|---|---|
| 1 = | 110000 | AIRFIELD |
| 2 = | 120000 | PETROLEUM DISPENSING & OPERATING FACILITIES |
| 3 = | 130000 | COMMUNICATIONS, NAVAIDS, & AIRFIELD LIGHTING |
| 4 = | 140000 | LAND OPERATIONAL FACILITIES |
| 5 = | 170000 | TRAINING FACILITIES |
| 8 = | 210000 | MAINTENANCE FACILITIES |
| 9 = | 220000 | PRODUCTION FACILITIES |
| 10 = | 300000 | RESEARCH & DEVELOPMENT |
| 11 = | 370000 | TESTING FACILITIES |
| 12 = | 410000 | LIQUID FUEL STORAGE |
| 13 = | 420000 | EXPLOSIVES STORAGE |
| 14 = | 430000 | COLD STORAGE |
| 15 = | 440000 | GENERAL STORAGE (CLOSED) |
| 16 = | 450000 | GENERAL STORAGE (OPEN) |
| 17 = | 500000 | MEDICAL FACILITIES |
| 18 = | 610000 | ADMINISTRATIVE FACILITIES |
| 19 = | 620000 | UNDERGROUND ADMIN FACILITIES |
| 20 = | 690000 | OTHER ADMIN FACILITIES |
| 21 = | 710000 | FAMILY HOUSING |
| 22 = | 720000 | DORMITORIES, OFFICERS QUARTERS & DINING HALLS |
| 23 = | 730000 | PERSONNEL SUPPORT FACILITIES |
| 24 = | 740000 | WELFARE & RECREATION (INDOOR) |
| 25 = | 750000 | WELFARE & RECREATION (OUTDOOR) |
| 26 = | 760000 | MUSEUMS & MEMORIALS |
| 27 = | 800000 | ENERGY CONSERVATION INVESTMENT |
| 28 = | 810000 | ELECTRICITY |
| 29 = | 820000 | HEATING & AIR CONDITIONING |
| 30 = | 830000 | SEWAGE & WASTE |
| 31 = | 840000 | WATER |
| 32 = | 850000 | ROADS & STREETS |
| 33 = | 860000 | RAILROAD TRACKAGE |
| 34 = | 870000 | GROUND IMPROVEMENT STRUCTURES |
| 35 = | 880000 | FIRE & OTHER ALARM SYSTEMS |
| 36 = | 890000 | MISCELLANEOUS UTILITIES |
| 37 = | 910000 | LAND |
| 38 = | 920000 | LAND, OTHER RIGHTS |
| 39 = | 930000 | LAND IMPROVEMENTS |

The user can receive a further shredout of an individual CATCODE by specifying the menu item for one of the general functions. If a user specified item "28" from the general function menu, the system would provide:

FACILITY CATEGORY CODE : 81

|  | FACILITY CATEGORY CODE | DESCRIPTION |
|---|---|---|
| 1 = | 810000 | ELECTRICITY |
| 2 = | 811145 | ELECT POWER GENERATION PLANT |
| 3 = | 811147 | EMERGENCY PWR GENERATOR PLANT |
| 4 = | 811149 | ELECT POWER STATION BUILDING |

```
 5 =         812223      PRIMARY OVERHEAD DIST
 6 =         812224      SECONDARY OVERHEAD DIST
 7 =         812225      PRIMARY UNDERGROUND DIST
 8 =         812226      SECONDARY UNDERGROUND DIST
 9 =         812921      ELECTRICAL AIRCRAFT OUTLETS
10 =         812926      EXTERIOR AREA LIGHTING
11 =         812928      TRAFFIC LIGHT
12 =         813213      ELECTRIC SUBSTATION
13 =         813228      ELECTRIC SWITCHING STATION
```

After a user enters a CATCODE which is recognized by the system, the user is asked to provide escalation data.

ESCALATION FACTORS TABLE:

ENTER AF-PROGRAM NAME:

"M" input by a user gives a list of existing escalation tables.

AF PROGRAM NAME

```
1 =         BASE YR FY 1986
2 =         BASE YR FY 1987
3 =         BASE YR FY 1988
4 =         BASE YR FY 1989
5 =         BASE YR FY 1990
```

As before, a user selects the appropriate base year by menu number, and the system provides the list of tables available for a given BASE YR.

ESCALATION TABLE DATE

```
1 =         01 JAN 87
2 =         22 MAR 88
```

After the escalation table is selected, the system asks for the appropriation type, i.e., 3300, 3400, etc.

ENTER APPN:

With this entry, the PROGRAM DESCRIPTION IS COMPLETE.

DIRECT COSTS

Initial menu item "2" is selected to build direct costs. Direct costs are unmodified c. "raw" costs for the material, labor and equipment needed to construct a facility. The direct cost data for CCMAS is maintained by CSI systems and subsystems. However, CCMAS can aggregate this data both by CSI systems and subsystems abd by UNIFORMAT systems and subsystems. CCMAS direct costs are based on a 144 city average at a specific point in time.

A single CCMAS ID may have up to 99 direct cost "Runs", thus allowing the user to vary construction parameters for a single facility, or create multiple facilities for a given CCMAS ID. The options within build direct costs are:

```
1  EDIT EXISTING ESTIMATE
2  CREATE NEW ESTIMATE FROM SCRATCH
3  CREATE NEW ESTIMATE FROM COPY
```

For a completely new facility, the user creates a new estimate from scratch, or copies a previously created estimate from any CCMAS ID. To create an estimate from scratch, the user has the following methods to chose from:

```
1  COMPARATIVE SYSTEM
2  BUILDING SYSTEMS GENERIC MODEL
3  SUPPORTING FACILITIES GENERIC MODEL
4  RUNWAY/TAXIWAY GENERIC MODEL
5  QUANTITY TAKE-OFF.
```

COMPARATIVE SYSTEM

The Comparative System produces raw construction costs on a dollars per square foot basis for common primary facility types, e.g., avionics shops, hangars, data processing facilities, etc. These common facility types are defined by Air Force Category Code, a six digit number based on the facility function. There are over 760 different category codes. Common facility types can also be combined to form a unique facility type if required.

STEP 1: The user is prompted to enter a Comparative ID (Estimate Name and Facility Type). If the user responds with an "M" for menu, all display options are presented.

```
ENTER ESTIMATE-NAME, FACILITY-TYPE (COMPARATIVE ID)
M
```

```
ENTER DISPLAY OPTION:
    1 =  ALL ESTIMATE NAMES AND ALL METHODS:
    2 =  ALL ESTIMATE NAMES DOD METHOD ONLY
    3 =  ALL ESTIMATE NAMES NON DOD METHOD ONLY
```

A user input of "2" will result in the following type of output:

```
 1 = ACFT AVIONICS SHOP
 2 = ACFT OPS BLDG
 3 = ACFT MACHINE SHOP
 4 = APPLIED INSTRUCTION BLDG
 5 = BOQ
 6 = BOWLING FACILITY
 7 = CHAPEL CENTER
 8 = CHILD CARE CENTER
 9 = COLD STOR WHS HI-BAY
10 = COLD STOR WHS LO-BAY
11 = COMMISSARY SALES
12 = COMMUNITY FIRE STATION
13 = CORROSION CNTL HANGAR
14 = DATA PROCESSING FACILITY
15 = DENTAL CLINIC
16 = DORMITORIES
17 = EDUCATION CENTER
18 = ELEMENTARY SCHOOL(OCONUS)
```

```
    19 = ELEMENTARY SCHOOL(CONUS)
    20 = ENLISTED DINING FACILITY
    21 = ENLISTED SERVICE CLUB
    22 = EXCHANGE STORE
    23 = FAMILY HOUSING
    24 = FAMILY SERVICES CENTER
    25 = FIRE CRASH STATION
    26 = GEN PURP MAGAZINE
    27 = GEN PURP MAINT HANGAR
    28 = GEN PURP OPS FACILITY
    29 = GEN PURP WHS HI-BAY
    30 = GEN PURP WHS LO-BAY
    31 = HI BAY MAINT HANGAR
    32 = HI EXPL IGLOO
    33 = HIGH SCHOOL (OCONUS)
    34 = HIGH SCHOOL (CONUS)
*   35 = HQ OPS FACILITY
    36 = INSTLTN MAINT FACILITY
    37 = JR HIGH SCHOOL(CONUS)
    38 = LIBRARY
```

A "*" beside an entry indicates that the grouping includes the CATCODE input as part of the Program Description.

STEP 2: Once a comparative ID is selected that is ready for use, the CCMAS provides the user with the following options:

```
ENTER USER OPTION:
COMPARATIVE-ID: DOD METHOD    /HQ OPS BLDG
1 DISPLAY OR PRINT INFORMATION
2 RE-ENTER COMPARATIVE-ID
3 CONTINUE PROCESSING
```

Option "3" takes the user to STEP 4. Option "2" returns the user to STEP 1. Option "1" takes the user to STEP 3.

STEP 3: The model presents the following:

```
ENTER USER OPTION:
1 DISPLAY DEFINITION CRITERIA
2 DISPLAY SELECTION CRITERIA
3 DISPLAY STATISTICAL INFORMATION
4 PRINT DEFINITION CRITERIA
5 PRINT SELECTION CRITERIA
6 PRINT STATISTICAL INFORMATION
7 CONTINUE PROCESSING
```

Option "1" or "4" will display or print the following type data:

```
CURRENT DEFINITION CRITERIA
FACILITY GROUPING TYPE:        DOD
FAMILY CAT CODE:               ADMIN

NUMBER OF SELECTION CAT CODES: 8
    SELECTION CAT CODES
    610-243
    610-249
    610-281
    610-282
    610-284
    610-285
    610-286
610-287
```

Option "2" or "5" will display or print the following type data:

```
CURRENT SELECTION CRITERIA
ESTIMATE NAME:              DOD METHOD
FACILITY TYPE:              HQ OPS BLDG
YEARS:                      1982-1987
DATA SOURCE:                PDC
UNIT OF MEASURE:            SF
SIZE:                       ALL
LOCATION:                   ALL
```

Option "3" or "6" will display or print the following type data:

```
CURRENT STATISTICAL INFORMATION
STATISTICAL OPTION:          DOD SIZE ADJUSTMENT CURVE & AVERAGE
NUMBER OF PRIMARY DATA POINTS:   9
NUMBER OF SUP FAC DATA POINTS:   9
HISTORICAL SUP FCTY PERCENTAGE   15.1
AIR FORCE PROGRAM NAME:          BASE YR FY 1984
ESCALATION TABLE DATE:           01FEB83
APPROPRIATION:                   3300
PRIMARY COEFFICIENT A:           82.00
BEGINNING BOUNDRY:               12000
ENDING BOUNDRY:                  259275
STANDARD SIZE DEFAULT:           11000
STANDARD SIZE USER:              0
```

STEP 4: CCMAS displays the primary facility equation and asks the user for the total facility quantity.

```
PRIMARY FACILITY EQUATION:    Y =    82.000
DOD METHOD -- SIZE ADJUSTMENT CURVE WILL BE APPLIED
CALCULATED BOUNDRY RANGE:     12000  -    259275
UNIT OF MEASURE:              SF
ENTER TOTAL FACILITY QUANTITY:
```

Here the user enters the size of the facility to be estimated.

STEP 5: The primary facility cost adjustments consist of the siesmic factor and the climate factor and the optional cost drivers. CCMAS first presents the defaults for the siesmic and climate factors and allows the user to input overrides:

```
                        DEFAULT        USER
1 SIESMIC FACTOR        0.000
2 CLIMATE FACTOR        0.021
ENTER MENU NUMBER, VALUE TO CHANGE FACTORS
```

CCMAS allows a user to override the defaults, then displays the base primary facility costs and additional costs of the factors:

```
BASE PRIMARY FACILITY COST:    $  1,558,492.00
ADDITIONAL SEISMIC COST:       $          0.00
ADDITIONAL CLIMATE COST:       $     32,728.33
```

STEP 6: CCMAS asks if optional cost drivers are applied:

DO YOU WISH TO APPLY THE OPTIONAL COST DRIVERS (Y/N)

A "NO" response takes the user to STEP 7. To a "YES" response, CCMAS displays:

STRUCTURAL FEATURES QUESTIONS

1. WHAT ARE THE ANTICIPATED NUMBER OF FLOORS (INC BASEMENT, EXC ROOF)?
    A. 1-3
    B. 4
    D. 6
    E. 7
    F. 8
    G. 9
    H. 10
    I. DONT' KNOW

ANSWER:

2. WHAT IS THE ANTICIPATED SUBSURFACE CONDITION?
    A. GOOD, DRY
    B. GOOD, WET
    C. POOR, DRY
    D. POOR, WET
    E. DON'T KNOW

ANSWER:

3. HOW MANY BASEMENT LEVELS ARE ANTICIPATED?
    A. 0
    B. 1
    C. 2
    D. 3
    E. DON'T KNOW

ANSWER:

ARCHITECTURAL FEATURES QUESTIONS

1. WHAT IS THE ANTICIPATED EXTERIOR CLOSURE MATERIAL?
    A. BRICK
    B. PRE-CAST
    C. GLASS CURTAIN WALL
    D. HISTORIC
    E. METAL SKIN
    F. CONCRETE MASONRY UNITS
    G. DON'T KNOW

ANSWER:

2. HOW IS THE INTERIOR FINISHED?
    A. OPEN (OFFICE LANDSCAPING)
    B. INDIVIDUAL OFFICE SPACES
    C. DON'T KNOW

ANSWER:

MECHANICAL/ELECTRICAL FEATURES QUESTIONS

1. WILL THE BUILDING BE EQUIPPED WITH PASSENGER ELEVATORS?
    A. YES
    B. NO
    C. DON'T KNOW

ANSWER:

2. WILL THE BUILDING CONTAIN A SPRINKLER SYSTEM FOR FIRE PROTECTION?
    A. YES
    B. NO
    C. DON'T KNOW

ANSWER:

3. WILL THE BUILDING OBTAIN HEAT/AC FROM AN OFF SITE CENTRAL PLANT?
    A. YES
    B. NO
    C. DON'T KNOW

ANSWER:

4. IS THERE AN EMERGENCY POWER SYSTEM?
    A. YES
    B. NO
    C. DON'T KNOW

ANSWER:

5. IS THERE AN UNINTERRUPTIBLE POWER SYSTEM IN THE BUILDING?
    A. YES
    B. NO
    C. DON'T KNOW

ANSWER:

SPECIAL ITEMS QUESTIONS

1. IS THE BUILDING SHIELDED FOR TEMPEST/EMP?
    A. YES
    B. NO
    C. DON'T KNOW

ANSWER:

2. IF YES, IS THIS SHIELDING INTEGRATED WITH THE BUILDING?
    A. YES
    B. NO
    C. DON'T KNOW OR NOT APPLICABLE

ANSWER:

3. IF NO, WHAT IS THE CUBAGE OF THE SHIELDED ENCLOSURES?
    A. LESS THAN 6,250 CUBIC FEET
    B. BETWEEN 6,250 AND 25,000 CUBIC FEET
    C. BETWEEN 25,000 AND 250,000 CUBIC FEET
    D. DON'T KNOW OR NOT APPLICABLE

ANSWER:

4. WHAT IS THE SQUARE FOOTAGE OF CLEAN ROOMS?
    A. NONE
    B. LESS THAN 625 SQUARE FEET
    C. BETWEEN 625 AND 2,500 SQUARE FEET
    D. BETWEEN 2,500 AND 25,000 SQUARE FEET
    E. DON'T KNOW OR NOT APPLICABLE

ANSWER:

After the questions have been displayed and answered, default values are calculated by the system and displayed to the user. These defaults may be overridden by the user.

```
                                    DEFAULT      USER
    1 STRUCTURAL FEATURES            0.102
    2 ARCHITECTURAL FEATURES         0.023
    3 MECHANICAL/ELECTRICAL FEATURES 0.050
    4 SPECIAL ITEMS                  0.000
    ENTER MENU NUMBER, VALUE TO CHANGE FACTORS
```

After allowing the user to override these defaults, the system displays the base primary facility costs and the additional costs of the factors:

```
    BASE PRIMARY FACILITY COST:             $   1,558,492.00
    STRUCTURAL FEATURES COSTS:              $     158,996.18
    ARCHITECTURAL FEATURES COSTS:           $      88,834.04
    MECHANICAL/ELECTRICAL FEATURES COSTS:   $      77,924.60
    SPECIAL ITEMS COSTS:                    $           0.00
```

CCMAS presents the user with three options:

```
    ENTER USER OPTION:
    1  CHANGE COST DRIVER SELECTIONS
    2  PRINT PRIMARY FACILITY COST ADJUSTMENTS
    3  CONTINUE PROCESSING
```

Selecting option "1" returns the user to the beginning of STEP 6.

STEP 7: CCMAS gives the user an opportunity to select the total supporting facility cost calculation source. In STEP 8, the user can refine supporting facility costs.

```
    ENTER USER OPTION:
    SUPPORTING FACILITY COSTS
    1  HISTORICAL AVERAGE:              $     290,635.38
       (NUMBER OF HISTORICAL DATA POINTS =    9)
    2  COMPUTED AVERAGE:                $     193,560.78
```

The computed average is based on algorithms tied to the Family Category Code, and is displayed even if no historical average is available. The user selects the desired option, and the system distributes the costs into Utilities, Site Improvements and Pavements. In the example below, the user selected Option "2".

```
SUPPORTING FACILITY COSTS:    $      193,560.78

DEFAULT          USER
    1  UTILITIES              $      7,315.94
    2  SITE IMPROVEMENTS      $     72,666.17
    3  PAVEMENTS              $    113,578.67
ENTER MENU NUMBER, VALUE TO CHANGE DOLLARS,
<CR> TO DISPLAY VALUES; DONE TO END DISPLAY
```

When the user is "DONE" the systeme asks:

DO YOU WISH TO PRINT THE ABOVE SUPPORTING FACILITY COSTS (Y/N)

and following the user response:

DO YOU WISH TO ENTER INDIVIDUAL SUPPORTING FACILITY LINE ITEMS (Y/N)

A "NO" response takes the user to STEP 9.

STEP 8: Before entering supporting facility line items, a menu is displayed which identifies the CSI system and resource distribution that will be used for supporting facilities. CCMAS assigns supporting facility costs to a CSI division 18.

```
SUPPORTING FACILITIES DISTRIBUTION FACTORS
          TOTAL            PCT            PCT             PCT
CSI        PCT            LABOR         MATERIALS       EQUIPMENT
SYS    DEFAULT/USER    DEFAULT/USER    DEFAULT/USER    DEFAULT/USER
          (A)             (B)             (C)             (D)
18      100.0/           43.3/           45.0/           11.7/
ENTER COLUMN , VALUE OR CSI-COLUMN VALUE TO CHANGE FACTORS,
     <CR> TO DISPLAY FACTORS, DONE TO END DISPLAY.
```

When the user is "DONE" with the display, CCMAS asks for the UNIFORMAT system into which the data will be placed. The user has the option of entering "MENU" at the system prompt, and CCMAS will display the applicable systems.

```
ENTER SYSTEM:
MENU
    30 =           UTILITIES
    31 =           EXTERIOR ELECTRICAL SYSTEMS
    32 =           WATER SYSTEM
    33 =           SANITARY SEWER SYSTEM
    34 =           STORM DRAINAGE SYSTEM
    35 =           GAS DISTRIBUTION SYSTEM
    36 =           HEAT DISTRIBUTION SYSTEM
    37 =           COLLECTION & DISTRIBUTION SYSTEMS
    38 =           TREATMENT SYSTEMS
    40 =           SITE IMPROVEMENTS
    41 =           CLEAR & GRUB
    42 =           EXCAVATION
    43 =           BACKFILL
    44 =           COMPACTION/STABILIZATION
    45 =           GRADING
    46 =           HAULING
    47 =           ROCK REMOVAL
    48 =           MATERIALS PLANT
    49 =           LANDSCAPING/CLEANUP
    50 =           PAVEMENTS
    51 =           ROADS
    52 =           PARKING
    53 =           SIDEWALKS
    54 =           CURBS & GUTTERS
    55 =           RESURFACING
    56 =           RESTRIPING
    60 =           DEMOLITION
```

```
61 =            BUILDING DEMOLITION
62 =            PAVEMENT DEMOLITION
63 =            UTILITY DEMOLITION
64 =            OTHER DEMOLITION
70 =            REAL PROPERTY INSTALLED EQUIPMENT
71 =            SYSTEM FURNITURE
72 =            MEDICAL EQUIPMENT
73 =            OTHER EQUIPMENT
80 =            OTHER CONSTRUCTION
81 =            BRIDGES
82 =            STRUCTURES
83 =            REVETMENTS
84 =            UNDERGROUND
85 =            FENCING
90 =            OTHER CONSTRUCTION
ENTER ITEM NUMBER, <CR> TO CONTINUE, DONE TO END DISPLAY
```

If the user responds "31", CCMAS issues a subsystem prompt. The user can enter the required subsystem or, as shown below, enter "MENU", and and CCMAS will display the applicable subsystems.

ENTER SUBSYSTEM:

```
MENU

00 =            EXTERIOR ELECTRIC SYSTEMS
10 =            OVERHEAD ELECTRIC       DISTRIBUTION
11 =            OVERHEAD 0-5      KV    DISTRIBUTION
12 =            OVERHEAD 5-15     KV    DISTRIBUTION
13 =            OVERHEAD 15-30    KV    DISTRIBUTION
14 =            OVERHEAD 30-60    KV    DISTRIBUTION
15 =            OVERHEAD 60-120   KV    DISTRIBUTION
16 =            OVERHEAD ABOVE 120 KV   DISTRIBUTION
20 =            UNDERGROUND ELECTRIC    DISTRIBUTION
21 =            UNDERGROUND 0-5     KV  DISTRIBUTION
22 =            UNDERGROUND 5-15    KV  DISTRIBUTION
23 =            UNDERGROUND 15-30   KV  DISTRIBUTION
24 =            UNDERGROUND 30-60   KV  DISTRIBUTION
25 =            UNDERGROUND 60-120  KV  DISTRIBUTION
```

ENTER ITEM NUMBER, <CR> TO CONTINUE, DONE TO END DISPLAY

The user is asked to enter the individual line items.

SYSTEM:            31            EXTERIOR ELECTRIC SYSTEMS

SUBSYSTEM:13       OVERHEAD 15-30   KV    DISTRIBUTION

ENTER ACTION (A,C,D), LINE-ITEM, QUANTITY, HIGH QUANTITY, COMMENTS, SEQUENCE #;

A,1812345678,50

NOTE: A = Add, C = Change, and D = Delete

If the user enters an add (A) transaction for a line item that does not exist in the CCMAS data base, the user is prompted to provide the missing data.

```
SYSTEM:             31          EXTERIOR ELECTRIC SYSTEMS

SUBSYSTEM:13        OVERHEAD    15-30   KV    DISTRIBUTION

ENTER ACTION (A,C,D), LINE-ITEM, QUANTITY, HIGH QUANTITY,
COMMENTS, SEQUENCE #;

LINE ITEM DOES NOT EXIST

ENTER LINE ITEM FACTORS:

MAT COST, LABOR COST, EQUIP COST, LABOR HOURS, EQUIP HOURS:

200.50,100,75.1,20,60

ENTER DESCRIPTION, U/M:

USER ENTERED LINE ITEM,EA

NEW LINE ITEM CREATED FOR THIS RUN
```

The user may list the items created at the ENTER ACTION prompt.

```
ENTER ACTION (A,C,D), LINE-ITEM, QUANTITY, HIGH QUANTITY,
COMMENTS, SEQUENCE #;

LIST

SYSTEM:                      31   EXTERIOR ELECTRIC SYSTEMS

SUBSYSTEM:       13          OVERHEAD 15-30  KV    DISTRIBUTION

LINE ITEM         QTY        HIGH QTY           REMARK   SEQ NO 1812345678       50.0        0.0
   USER ENTERED LINE ITEM 1832112233       80.0        0.0
   EXTERIOR WIRING
```

When all line items are entered, <CR> takes a user to subsystem
level, a second <CR> to system level, and a third <CR> gives the
prompt:

DO YOU WISH TO MAKE FURTHER CHANGES TO SUPPORTING FACILITY
COSTS(Y/N)?

STEP 9: CCMAS distributes primary facility costs into the
appropriate CSI systems, and resource categories based on the
FAMILY CAT CODE, e.g., 610XXX is the ADMIN FAMILY CAT CODE.

PRIMARY FACILITY DISTRIBUTION FACTORS

| CSI SYS | TOTAL PCT DEFAULT/USER (A) | PCT LABOR DEFAULT/USER (B) | PCT MATERIALS DEFAULT/USER (C) | PCT EQUIPMENT DEFAULT/USER (D) |
|---|---|---|---|---|
| 02 | 1.2/ | 43.3/ | 45.0/ | 11.7/ |
| 03 | 11.3/ | 43.7/ | 54.7/ | 1.6/ |
| 04 | 14.0/ | 65.9/ | 33.5/ | 0.6/ |
| 05 | 6.8/ | 25.6/ | 72.7/ | 1.7/ |
| 06 | 1.6/ | 57.6/ | 41.1/ | 1.3/ |

```
07      6.8/           40.6/         58.8/          0.6/
08      6.1/           33.4/         66.1/          0.5/
09     17.1/           48.1/         51.4/          0.5/
10      6.1/           33.9/         65.5/          0.6/
11      0.4/           25.0/         75.0/          0.0/
12      0.1/           50.0/         50.0/          0.0/
13      5.7/           26.9/         73.1/          0.0/
15      9.4/           46.9/         52.3/          0.8/
16      8.7/           48.3/         51.0/          0.7/
17      4.7/           46.9/         52.5/          0.6/
```

ENTER COLUMN, VALUE OR CSI-COLUMN VALUE TO CHANGE FACTORS, <CR> TO DISPLAY FACTORS, DONE TO END DISPLAY.

The user may change the defaults, but the sum of TOTAL PCT, and PCT LABOR, MATERIALS and EQUIPMENT by CSI SYS must equal 100%.

STEP 10: CCMAS calculates the direct cost for facility construction.

BUILDING SYSTEMS GENERIC MODEL

The Building Systems Generic Model includes four separate models which produces raw construction costs at the Line Item quantity level. The method of producing these costs is selected from an options table:

1. ADMINISTRATIVE FACILITY
2. MEDICAL FACILITY
3. FUNCTIONAL SPACE TYPE FACILITY
4. USER DEFINED FACILITY.

The <u>ADMINISTRATIVE FACILITY</u> model uses six parameters, gross floor area, functional space areas, location modifiers, quantity parameters, descriptive parameters, and density parameters.

STEP 1: The model reads the desired location from the Program Description and prompts the user to input the gross floor area. Based on this data, the model algorithms compute the following:

| LOCATION MODIFIERS | GEOLOC DEFAULT | USER INPUT |
|---|---|---|
| 1 SEISMIC ZONE | X | |
| 2 A/C WEATHER ZONE | X | |
| 3 HEATING/INSULATION ZONE | X | |
| 4 FROST PENETRATION ZONE | X | |

| FUNCTIONAL SPACE AREAS IN SQFT | MODEL VALUE | USER INPUT |
|---|---|---|
| 1 OPEN OFFICE SPACE | X | |
| 2 CLOSED OFFICE SPACE | X | |
| 3 SECURITY | X | |
| 4 AUDITORIUM | X | |
| 5 DATA PROCESSING | X | |
| 6 BUILDING SUPPORT AREA | X | |

In each instance, the user can override the calculated model default values.

STEP 2: The model computes the default QUANTITY PARAMETERS:

| QUANTITY PARAMETERS | MODEL VALUE | USER INPUT | RECALCULATED VALUE |
|---|---|---|---|
| 01 STORIES ABOVE GRADE | X | | |
| 02 STORIES BELOW GRADE | X | | |
| 03 FLR TO FL: ABOVE GRADE | X | | |
| 04 FLR TO FLR BELOW GRADE | X | | |
| 05 FLR TO CEILING ABOVE GRADE | X | | |

| QUANTITY PARAMETERS | MODEL VALUE | USER INPUT | RECALCULATED VALUE |
|---|---|---|---|
| 06 FLR TO CEILING BELOW GRADE | X | | |
| 07 FOOTPRINT | X | | |
| 08 PERIMETER | X | | |
| 09 ROOF AREA | X | | |
| 10 EXTERIOR WALL AREA | X | | |
| 11 EXTERIOR WINDOW AREA* | X | | |
| 12 HEATING LOAD | X | | |
| 13 COOLING LOAD | X | | |
| 14 ELECTRIC LOAD | X | | |

| QUANTITY PARAMETERS | MODEL VALUE | USER INPUT | RECALCULATED VALUE |
|---|---|---|---|
| 15 NUMBER OF STAIRWELLS | X | | |
| 16 EXTERIOR DOOR DENSITY | X | | |
| 17 PLUMB DOMESTIC WATER | X | | |
| 18 PLUMB SANITARY WASTE SYS | X | | |
| 19 PLUMB SPECIAL SYS | X | | |

As before, the user can override the model values with user inputs. Also in this section appear recalculated values based upon any user overrides in the LOCATION MODIFIER or FUNCTIONAL SPACE AREAS. Recalculated values are presented for information only, and are not used in the estimate unless entered by the user.

STEP 3: The model computes the DESCRIPTIVE PARAMETERS any or all of which may be overridden by the user.

| DESCRIPTIVE PARAMETERS | MODEL VALUE | USER INPUT |
|---|---|---|
| 1 FOUNDATION TYPE<br>  1=STANDARD FOUNDATION<br>  2=PILE FOUNDATIONS | X | |
| 2 SOIL TYPE<br>  1=LOW BEARING CAPACITY<br>  2=AVERAGE BEARING CAPACITY<br>  3=HIGH BEARING CAPACITY | X | |
| 3 SUPERSTRUCTURE TYPE<br>  1=CONCRETE FRAME<br>  2=STEEL FRAME-LIGHT LOAD<br>  3=HEAVY STEEL-HEAVY LOAD | X | |

```
4  BAY SIZE                                        X
       1=SMALL 300-600 SF
       2=AVERAGE 600-1200 SF
       3=LARGE 1200-1600 SF
       4=SPECIAL 1600-3000SF

5  STAIR TYPE                                      X
       1=CONCRETE
       2=METAL PAN

6  ROOFING TYPE                                    X
       1=SINGLE MEMBRANE
       2=BUILT-UP
       3=SHINGLE
       4=METAL

7  EXTERIOR WALL TYPE                              X
       1=BRICK VENEER
       2=TILT-UP CONCRETE
       3=EXPOSED AGGREGATE PRECAST
       4=METAL SANDWICH

8  HEAT GENERATING SYSTEMS                         X
       1=STEAM BOILERS
       2=HOT WATER BOILER
       3=OFFSITE CENTRAL PLANT

9  COOLING GENERATING SYSTEMS                      X
       1=RECIPROCATING
       2=CENTRIFUGAL
       3=ABSORPTION
       4=OFFSITE CENTRAL PLANT.
```

STEP 4: The model calculates the DENSITY PARAMETERS for each of the FUNCTIONAL SPACE AREAS.

```
                                        MODEL       USER
   INTERIOR PARTITION DENSITY           VALUE       INPUT

1  OPEN OFFICE SPACE                 X.XXX
   2  CLOSED OFFICE SPACE               X.XXX
   3  SECURITY                          X.XXX
   4  AUDITORIUM                        X.XXX
   5  DATA PROCESSING                   X.XXX
   6  BUILDING SUPPORT AREA             X.XXX

MODEL       USER
   INTERIOR DOOR DENSITY                VALUE       INPUT

1  OPEN OFFICE SPACE                 X.XXX
   2  CLOSED OFFICE SPACE               X.XXX
   3  SECURITY                          X.XXX
   4  AUDITORIUM                        X.XXX
   5  DATA PROCESSING                   X.XXX
   6  BUILDING SUPPORT AREA             X.XXX

MODEL       USER
   INTERIOR WINDOW DENSITY              VALUE       INPUT

1  OPEN OFFICE SPACE                 X.XXX
   2  CLOSED OFFICE SPACE               X.XXX
   3  SECURITY                          X.XXX
   4  AUDITORIUM                        X.XXX
   5  DATA PROCESSING                   X.XXX
   6  BUILDING SUPPORT AREA             X.XXX
```

| INTERIOR WALL FINISH DENSITY | MODEL VALUE | USER INPUT |
|---|---|---|
| 1  OPEN OFFICE SPACE | X.XXX | |
| 2  CLOSED OFFICE SPACE | X.XXX | |
| 3  SECURITY | X.XXX | |
| 4  AUDITORIUM | X.XXX | |
| 5  DATA PROCESSING | X.XXX | |
| 6  BUILDING SUPPORT AREA | X.XXX | |

| INTERIOR PLUMBING FIXTURE DENSITY | MODEL VALUE | USER INPUT |
|---|---|---|
| 1  OPEN OFFICE SPACE | X.XXX | |
| 2  CLOSED OFFICE SPACE | X.XXX | |
| 3  SECURITY | X.XXX | |
| 4  AUDITORIUM | X.XXX | |
| 5  DATA PROCESSING | X.XXX | |
| 6  BUILDING SUPPORT AREA | X.XXX | |

As before, the user can override these density parameters.

STEP 5: The model calculates facility system and subsystem values. The Systems are in UNIFORMAT, i.e., Substructure, Superstructure, Roofing, Exterior Closure, Interior Construction, Interior Finishes, Specialties, Plumbing, HVAC, Special Mechanical, Electrical, Equipment and Conveying Systems. Below are two examples. System 01, Substructure, is the same for facility functional areas while System 05, Interior Construction, Subsystem 01, Partitions, varies by functional area. (NOTE: At this point in the model, quantities of the systems/subsystems are still based solely upon the floor area. These floor areas drive algorithms which calculate assembly category quantities.) At the users option, the Systems and Subsystems can be displayed and the default values overridden.

| SYSTEM: 01 SUBSTRUCTURE SUBSYSTEM: | UM | MODEL CALCULATED QUANTITY | USER QUANTITY |
|---|---|---|---|
| 1 = 01 STANDARD FOUNDATIONS | SF | X | |
| 2 = 02 SPECIAL FOUNDATION CONDITIONS | SF | X | |
| 3 = 03 SLAB ON GRAD | SF | X | |
| 4 = 04 BASEMENT EXCAVATION | SF | X | |
| 5 = 05 BASEMENT WALLS | SF | X | |

| SYSTEM: 05 INTERIOR CONSTRUCTION SUBSYSTEM: 01 PARTITIONS | UM | MODEL CALCULATED QUANTITY | USER QUANTITY |
|---|---|---|---|
| 1 = OPEN OFFICE SPACE | SF | X | |
| 2 = CLOSED OFFICE SPACE | SF | X | |

```
3 = SECURITY                    SF      X
4 = AUDITORIUM                  SF      X
5 = DATA PROCESSING             SF      X
6 = BUILDING SUPPORT AREA       SF      X
```

STEP 6: The model calculates Assembly Category Quantities. At the users option, the Assembly Category Quantities can be displayed and the default values overridden.

```
                                        MODEL
                                        CALCULATED    USER
                              UM        QUANTITY      QUANTITY
SYSTEM: 01 SUBSTRUCTURE
SUBSYSTEM: 01 SPECIAL FOUNDATION CONDITIONS

ASSEMBLY CATEGORY:

1 = 01 PILE FOUNDATIONS        LF        X
2 = 02 CAISSONS                LF        X
3 = 03 UNDERPINNING            SF        X
4 = 04 DEWATERING              SF        X
5 = 05 RAFT FOUNDATIONS        SF        X
6 = 06 OTHER SPECIAL FOUNDATIONS SF      X

SYSTEM: 05 INTERIOR CONSTRUCTION
SUBSYSTEM: 01 PARTITIONS
ASSEMBLY CATEGORY: FIXED PARTITIONS
                                        MODEL
                                        CALCULATED    USER
                              UM        QUANTITY      QUANTITY

1 = OPEN OFFICE SPACE          SF        X
2 = CLOSED OFFICE SPACE        SF        X
3 = SECURITY                   SF        X
4 = AUDITORIUM                 SF        X
5 = DATA PROCESSING            SF        X
6 = BUILDING SUPPORT AREA      SF        X
```

STEP 7: The model calculates Assembly Quantities. At the users option, the Assembly Quantities can be displayed and the default values overridden. The Assembly Quantities contains the hierarchy of titles and a list of the assemblies by Functional Space Area if applicable. The model lists both the default assemblies which it created and the available assemblies which were not used. Thus, the user has the option to change both the quantity and type of assembly which the model will use in calculating direct costs. Below is a sample of the Assembly Quantity menu.

OPEN OFFICE SPACE

SYSTEM: 05 INTERIOR CONSTRUCTION
SUBSYSTEM: 01 PARTITIONS
ASSEMBLY CATEGORY: FIXED PARTITIONS
ASSEMBLY:

|   | UM | | TITLE | MODEL CALCULATED QUANTITY | USER QUANTITY |
|---|---|---|---|---|---|
| 1 = | 0101 | LF | NON-LOAD BRG PARTITION - 16" O.C. | X.XXX | |
| 2 = | 0102 | LF | NON-LOAD BRG PARTITION - 24" O.C. | 0.000 | |
| 3 = | 0103 | LF | SHIELDED PARTITION WITH LEAD LINED GYPSUM BOARD | 0.000 | |
| 4 = | 0104 | LF | 10' NON-LOAD BRG PARTITION - 16" O.C. | 0.000 | |
| 5 = | 0105 | LF | 10' NON-LOAD BRG PARTITION - 24" O.C. | 0.000 | |

STEP 8: The model calculates Line Item quantities. These quantities are displayed in the Building Systems Generic Model, but can only be edited by copying the generic model into the Quantity Take-Off portion of the Direct Cost Module.

STEP 9: The model calculates the direct cost for facility construction.

The <u>MEDICAL FACILITY</u> model uses the same six parameters as the Administrative Facility model. The difference is in the Functional Space Areas the model generates at STEP 1. Location Modifiers and Facility Functional Space Areas are shown below for STEP 1 of the Medical Facility model.

STEP 1: The model reads the desired location from the Program Description and prompts the user to input the gross floor area. Based on this data, the model algorithms compute the following:

| | LOCATION MODIFIERS | GEOLOC DEFAULT | USER INPUT |
|---|---|---|---|
| 1 | SEISMIC ZONE | X | |
| 2 | A/C WEATHER ZONE | X | |
| 3 | HEATING/INSULATION ZONE | X | |
| 4 | FROST PENETRATION ZONE | X | |

| | FUNCTIONAL SPACE AREAS IN SQFT | MODEL VALUE | USER INPUT |
|---|---|---|---|
| 1 | NURSING | X | |
| 2 | SURGICAL | X | |
| 3 | OBSTETRICAL | X | |
| 4 | PATIENT WELFARE | X | |
| 5 | FOOD SERVICE | X | |
| 6 | AIR FORCE CLINICS | X | |
| 7 | DENTAL CLINIC | X | |
| 8 | PHARMACY | X | |
| 9 | RADIOLOGY | X | |
| 10 | PATHOLOGY | X | |
| 11 | PHYSICAL THERAPY | X | |
| 12 | ADMINISTRATIVE AREA | X | |
| 13 | MEDICAL LOGISTICS | X | |
| 14 | FACILITIES MANAGEMENT | X | |
| 15 | SUPPORT SYSTEMS | X | |
| 16 | MECHANICAL | X | |

In each instance, the user can override the calculated model default values.

Steps 2 thru 9 of the Medical Facility model are the same as the Administrative Facility model except Functional Space Areas are those of a medical facility.

The <u>FUNCTIONAL SPACE TYPE FACILITY</u> model uses the same six parameters as the Administrative and Medical Facility models. The difference is that the Functional Space Type Facility model <u>does not</u> automatically generate values for the Functional Space Areas at STEP 1; these values must be input by the user. STEP 1 development of Location Modifiers and Facility Functional Space Areas for the Functional Space Type Model is shown below.

STEP 1: The model reads the desired location from the Program Description and asks the user to input the gross floor area. The model then asks the user to:

CHOOSE THE MODEL TYPE DEFAULTS TO BE USED:

001 = ADMINISTRATIVE
002 = MEDICAL.

The default selected initializes the quantity and descriptive parameters only. Based on this data, the model algorithms compute the following:

| LOCATION MODIFIERS | GEOLOC DEFAULT | USER INPUT |
|---|---|---|
| 1 SEISMIC ZONE | X | |
| 2 A/C WEATHER ZONE | X | |
| 3 HEATING/INSULATION ZONE | X | |
| 4 FROST PENETRATION ZONE | X | |

Next, the user is asked to enter values in the appropriate Functional Space Areas; first for the Administrative Facility model default Functional Space Areas and then for the Medical Facility model Functional Space Areas..

| FUNCTIONAL SPACE AREAS IN SQFT | USER INPUT |
|---|---|
| 1 OPEN OFFICE SPACE | X |
| 2 CLOSED OFFICE SPACE | X |
| 3 SECURITY | X |
| 4 AUDITORIUM | X |
| 5 DATA PROCESSING | X |
| 6 BUILDING SUPPORT AREA | X |

| FUNCTIONAL SPACE AREAS IN SQFT | USER INPUT |
|---|---|
| 1 NURSING | X |
| 2 SURGICAL | X |
| 3 OBSTETRICAL | X |
| 4 PATIENT WELFARE | X |

```
 5  FOOD SERVICE                      X
 6  AIR FORCE CLINICS                 X
 7  DENTAL CLINIC                     X
```

|  | USER |
|---|---|
| FUNCTIONAL SPACE AREAS IN SQFT | INPUT |

```
 8  PHARMACY                          X
 9  RADIOLOGY                         X
10  PATHOLOGY                         X
11  PHYSICAL THERAPY                  X
12  ADMINISTRATIVE AREA               X
13  MEDICAL LOGISTICS                 X
14  FACILITIES MANAGEMENT             X
15  SUPPORT SYSTEMS                   X
16  MECHANICAL                        X
```

When the the user inputs are complete, the Functional Space Type Facility Model operates the same both the Administrative and Medical Facility models. The only difference the user sees is the Functional Space Areas, when displayed at STEPS 2 thru 9, will be those individually selected at STEP 1.

The USER DEFINED FACILITY model uses five parameters, gross floor area, location modifiers, quantity parameters, descriptive parameters, and density parameters.

STEP 1: The model reads the desired location from the Program Description and prompts the user to input the gross floor area. Based on this data, the model algorithms compute the following:

| LOCATION MODIFIERS | GEOLOC DEFAULT | USER INPUT |
|---|---|---|
| 1  SEISMIC ZONE | X | |
| 2  A/C WEATHER ZONE | X | |
| 3  HEATING/INSULATION ZONE | X | |
| 4  FROST PENETRATION ZONE | X | |

The user can override the default values.

STEP 2: The user is asked to enter the QUANTITY PARAMETERS:

| QUANTITY PARAMETERS | USER INPUT |
|---|---|
| 01 STORIES ABOVE GRADE | O |
| 02 STORIES BELOW GRADE | O |
| 03 FLR TO FLR ABOVE GRADE | O |
| 04 FLR TO FLR BELOW GRADE | O |
| 05 FLR TO CEILING ABOVE GRADE | O |
| 06 FLR TO CEILING BELOW GRADE | O |
| 07 FOOTPRINT | O |
| 08 PERIMETER | O |
| 09 ROOF AREA | O |
| 10 EXTERIOR WALL AREA | O |
| 11 EXTERIOR WINDOW AREA | O |
| 12 HEATING LOAD | O |
| 13 COOLING LOAD | O |
| 14 ELECTRIC LOAD | O |
| 15 NUMBER OF STAIRWELLS | O |

```
16 EXTERIOR DOOR DENSITY          0
17 PLUMB DOMESTIC WATER           0
18 PLUMB SANITARY WASTE SYS       0
19 PLUMB SPECIAL SYS              0
```

STEP 3: The model asks for the DESCRIPTIVE PARAMETERS.

| DESCRIPTIVE PARAMETERS | USER INPUT |
|---|---|
| 1 FOUNDATION TYPE<br>   1=STANDARD FOUNDATION<br>   2=PILE FOUNDATIONS | X |
| 2 SOIL TYPE<br>   1=LOW BEARING CAPACITY<br>   2=AVERAGE BEARING CAPACITY<br>   3=HIGH BEARING CAPACITY | X |
| 3 SUPERSTRUCTURE TYPE<br>   1=CONCRETE FRAME<br>   2=STEEL FRAME-LIGHT LOAD<br>   3=HEAVY STEEL-HEAVY LOAD | X |
| 4 BAY SIZE<br>   1=SMALL 300-600 SF<br>   2=AVERAGE 600-1200 SF<br>   3=LARGE 1200-1600 SF<br>   4=SPECIAL 1600-3000SF | X |
| 5 STAIR TYPE<br>   1=CONCRETE<br>   2=METAL PAN | X |
| 6 ROOFING TYPE<br>   1=SINGLE MEMBRANE<br>   2=BUILT-UP<br>   3=SHINGLE<br>   4=METAL | X |
| 7 EXTERIOR WALL TYPE<br>   1=BRICK VENEER<br>   2=TILT-UP CONCRETE<br>   3=EXPOSED AGGREGATE PRECAST<br>   4=METAL SANDWICH | X |
| 8 HEAT GENERATING SYSTEMS<br>   1=STEAM BOILERS<br>   2=HOT WATER BOILER<br>   3=OFFSITE CENTRAL PLANT | X |
| 9 COOLING GENERATING SYSTEMS<br>   1=RECIPROCATING<br>   2=CENTRIFUGAL<br>   3=ABSORPTION<br>   4=OFFSITE CENTRAL PLANT. | X |

STEP 4: The model lists the required DENSITY PARAMETERS. The user must enter the values for the <u>total gross floor area</u>.

|  | USER INPUT |
|---|---|
| DENSITY PARAMETERS FOR TOTAL GFA | |
| 1  INTERIOR PARTITION DENSITY | 0.000 |
| 2  INTERIOR DOOR DENSITY | 0.000 |
| 3  INTERIOR WINDOW DENSITY | 0.000 |
| 4  INTERIOR WALL FINISH DENSITY | 0.000 |
| 5  INTERIOR PLUMBING FIXTURE DENSITY | 0.000 |

STEP 5: The model calculates facility system and subsystem values. The Systems are in UNIFORMAT, i.e., Substructure, Superstructure, Roofing, Exterior Closure, Interior Construction, Interior Finishes, Specialties, Plumbing, HVAC, Special Mechanical, Electrical, Equipment and Conveying Systems. Below is an example using System 01, Substructure.

|  | UM | MODEL CALCULATED QUANTITY | USER QUANTITY |
|---|---|---|---|
| SYSTEM: 01 SUBSTRUCTURE SUBSYSTEM: | | | |
| 1 = 01 STANDARD FOUNDATIONS | SF | 0 | |
| 2 = 02 SPECIAL FOUNDATION CONDITIONS | SF | 0 | |
| 3 = 03 SLAB ON GRAD | SF | 0 | |
| 4 = 04 BASEMENT EXCAVATION | SF | 0 | |
| 5 = 05 BASEMENT WALLS | SF | 0 | |
| SYSTEM: 05 INTERIOR CONSTRUCTION SUBSYSTEM: | | | |
| 1 = 01 PARTITIONS | SF | 0 | |
| 2 = 02 INTERIOR DOORS | LEAF | 0 | |
| 3 = 03 INTERIOR WINDOWS | SF | 0 | |

STEP 6: The model lists all Assembly Categories. Assembly Category Quantities must be input by the user.

|  | UM | USER QUANTITY |
|---|---|---|
| SYSTEM: 01 SUBSTRUCTURE SUBSYSTEM: 01 SPECIAL FOUNDATION CONDITIONS ASSEMBLY CATEGORY: | | |
| 1 = 01 PILE FOUNDATIONS | LF | 0 |
| 2 = 02 CAISSONS | LF | 0 |
| 3 = 03 UNDERPINNING | SF | 0 |
| 4 = 04 DEWATERING | SF | 0 |
| 5 = 05 RAFT FOUNDATIONS | SF | 0 |
| 6 = 06 OTHER SPECIAL FOUNDATIONS | SF | 0 |

SYSTEM: 05 INTERIOR CONSTRUCTION
SUBSYSTEM: 01 PARTITIONS
ASSEMBLY CATEGORY:

|   |   | UM | USER QUANTITY |
|---|---|---|---|
| 1 = 01 | FIXED PARTITIONS | SF | 0 |
| 2 = 02 | DEMOUNTABLE PARTITIONS | SF | 0 |
| 3 = 03 | RETRACTABLE PARTITIONS | SF | 0 |
| 4 = 04 | INTERIOR BALUSTRADES & SCREENS | LF | 0 |

STEP 7: The model lists all assemblies within each Assembly Category. Assembly Quantities must be input by the user. Below is a sample of the Assembly Quantity menu.

SYSTEM: 05 INTERIOR CONSTRUCTION
SUBSYSTEM: 01 PARTITIONS
ASSEMBLY CATEGORY: FIXED PARTITIONS
ASSEMBLY:

|   |   | UM | TITLE | USER QUANTITY |
|---|---|---|---|---|
| 1 = | 0101 | LF | NON-LOAD BRG PARTITION - 16" O.C. | 0.000 |
| 2 = | 0102 | LF | NON-LOAD BRG PARTITION - 24" O.C. | 0.000 |
| 3 = | 0103 | LF | SHIELDED PARTITION WITH LEAD LINED GYPSUM BOARD | 0.000 |
| 4 = | 0104 | LF | 10' NON-LOAD BRG PARTITION - 16" O.C. | 0.000 |
| 5 = | 0105 | LF | 10' NON-LOAD BRG PARTITION - 24" O.C. | 0.000 |

STEP 8: The model calculates Line Item quantities. These quantities are displayed in the Building Systems Generic Model, but can only be edited by copying the generic model into the Quantity Take-Off portion of the Direct Cost Module.

STEP 9: The model calculates the direct cost for facility construction.

SUPPORTING FACILITIES GENERIC MODEL

The Supporting Facilities Generic Model includes eight general categories of models that produce raw construction costs at Line Item quantity level. The general category is selected from the options table:

```
1 =       BRIDGES/STRUCTURES
2 =       EARTHWORK
3 =       GAS/WATER/STEAM DISTRIBUTION
4 =       OTHER
5 =       ROADS/PARKING FACILITIES
6 =       SEWER
7 =       SITE ELECTRICAL
8 =       TREATMENT PLANTS/ LIFT STATIONS
```

In each general categories are specific types of Supporting Facility models, e.g., within general category 6, SEWER, are:

1 =      INLETS
    2 =      MANHOLES
    3 =      SANITARY
    4 =      STORM.

Each specific type of Supporting Facility models in turn has multiple submodels, e.g., within specific type 4, STORM, are:

1 =      CORRUGATED METAL PIPE CULVERTS (12" <= 18" < 24")
    2 =      CORRUGATED METAL PIPE CULVERTS (24" <= 36" < 48")
    3 =      CORRUGATED METAL PIPE CULVERTS (48" <= 60" < 72")
    4 =      REINFORCE CONCRETE PIPE SYSTEMS - LARGE (60")
    5 =      REINFORCE CONCRETE PIPE SYSTEMS - MEDIUM (36")
    6 =      REINFORCE CONCRETE PIPE SYSTEMS - SMALL (18")

STEP 1: The user first selects the submodel to be run. The three menus shown above prompt the user for the general model category, specific model type, and submodel to be used.

STEP 2: The submodel identifies the selections and asks the user for the quantity and comments.

SEWER
    STORM
    CORRUGATED METAL PIPE CULVERTS (12" <= 18" < 24")
    U/M: LF

ENTER QUANTITY:
    0000

ENTER COMMENTS
    DRAIN FIELD

This is the minimum amount of data needed for the estimate.

STEP 3: The model asks for Work Breakdown Structure (WBS):

DO YOU WANT TO RUN THE MODEL WITH THE DEFAULT WBS?

NOTE: Default WBS is a modified UNIFORMAT uses Systems 30 thru 98 to uniquely identify categories and types of supporting facilities.

A "YES" response automatically creates Assembly Quantities and takes the user to STEP 4. To a "NO" response, the model asks:

ENTER SYSTEM

DEF    DATA        DESCRIPTION
    1 =    *                 37 COLLECTION & DISTRIBUTION
    2 =    *                 40 SITE IMPROVEMENTS

NOTE: The lack of a "*" in the DATA column indicates no data exists for this run of the submodel.

In response to "2", the model asks:

```
ENTER SUBSYSTEM

DEF   DATA      DESCRIPTION
  1 =  *              02 EXCAVATION
  2 =  *              03 LOAD & HAUL
  3 =  *              04 BACKFILL
  4 =  *              05 COMPACTION
  5 =  *              99 MISCELLANEOUS
```

In response to "1", the model asks:

```
ENTER OPTION

DEF   DATA      DESCRIPTION
  1 =  *              NORMAL (CLAY)
  2 =                 SAND
  3 =                 CLAY/SAND
  4 =                 CLAY/SAND WITH BOULDERS
  5 =                 ROCK
  6 =                 TRENCHBOX
```

In response to "2", the model responds:

```
ENTER OPTION

DEF   DATA      DESCRIPTION
  1 =  *              NORMAL (CLAY)
  2 =        *        SAND
  3 =                 CLAY/SAND
  4 =                 CLAY/SAND WITH BOULDERS
  5 =                 ROCK
  6 =                 TRENCHBOX
```

In response to <CR>, the model responds:

```
ENTER SUBSYSTEM

DEF   DATA      DESCRIPTION
  1 =  *     *        02 EXCAVATION
  2 =  *              03 LOAD & HAUL
  3 =  *              04 BACKFILL
  4 =  *              05 COMPACTION
  5 =  *              99 MISCELLANEOUS
```

The remaining systems, subsystems and options can likewise be "tailored" for an estimate. Those systems, subsystems, and options for this submodel are:

```
SYSTEM           SUBSYSTEM                OPTION
37 COLLECTION AND DISTRIBUTION
                 01 PIPING                18" CORRUGATED METAL PIPE
40 SITE IMPROVEMENT
                 03 LOAD & HAUL           HAULOFF SAND; SPECIAL
                                          HAULOFF ROCK
                                          HAULOFF TRENCH NORMAL
                                          HAULOFF SOIL; NORMAL
                                          HAULOFF SAND; STD
                                          HAULOFF SOIL; SPECIAL
                 04 BACKFILL              EXCAVATION MATERIAL
                                          NORMAL
                                          STANDARD
```

```
                                        SPECIAL
                                        ROCK (NORMAL & BORROW)
                                        TRENCH BOX NORMAL
                  05 COMPACTION         EXCAVATION MATERIAL
                                        NORMAL
                                        STANDARD
                                        SPECIAL
                                        ROCK (NORMAL & BORROW)
                                        TRENCH BOX NORMAL
  40 SITE IMPROVEMENT
              99 MISCELLANEOUS          DEWATERING PUMP
                                        WELLPOINT
```

When all user selections are completed, the subsystem entry menu will appear as follows:

ENTER SUBSYSTEM

```
       DEF   DATA     DESCRIPTION
  1 =   *     *       02 EXCAVATION
  2 =   *     *       03 LOAD & HAUL
  3 =   *     *       04 BACKFILL
  4 =   *     *       05 COMPACTION
  5 =   *     *       99 MISCELLANEOUS
```

A <CR> returns the user to the system entry menu which appears as follows:

ENTER SYSTEM

```
       DEF   DATA     DESCRIPTION
  1 =   *     *       37 COLLECTION & DISTRIBUTION
  2 =   *     *       40 SITE IMPROVEMENTS
```

A second <CR> returns the user to the submodel selection menu which appears as follows:

```
  1 =   *    CORRUGATED METAL PIPE CULVERTS (12" <= 18" < 24")
  2 =        CORRUGATED METAL PIPE CULVERTS (24" <= 36" < 48")
  3 =        CORRUGATED METAL PIPE CULVERTS (48" <= 60"-< 72")
  4 =        REINFORCE CONCRETE PIPE SYSTEMS - LARGE (60")
  5 =        REINFORCE CONCRETE PIPE SYSTEMS - MEDIUM (36")
  6 =        REINFORCE CONCRETE PIPE SYSTEMS - SMALL (18")
```

A third <CR> returns the user to the specific model selection menu which appears as follows:

```
  1 =        INLETS
  2 =        MANHOLES
  3 =        SANITARY
  4 =   *    STORM.
```

A fourth <CR> returns the user to the category selection menu which appears as follows:

```
  1 =        BRIDGES/STRUCTURES
  2 =        EARTHWORK
  3 =        GAS/WATER/STEAM DISTRIBUTION
  4 =        OTHER
  5 =        ROADS/PARKING FACILITIES
  6 =   *    SEWER
  7 =        SITE ELECTRICAL
  8 =        TREATMENT PLANTS/ LIFT STATIONS
```

Each general category contains multiple specific models and submodels. A complete listing of of the general categories, specific models and submodels is given below.

| CATEGORY | SPECIFIC MODEL | SUBMODEL |
|---|---|---|
| BRIDGES/STRUCTURES | | |
| | BRIDGES | CAST IN PLACE T BEAM |
| | | PRECAST I BEAM |
| | | PRECAST BOX SECTIONS |
| | | CONCRETE & STEEL COMPOSITE |
| | | TIMBER-LAMINATED DECK |
| | STRUCTURES | CONCRETE RETAINING WALL |
| | | CULVERT-LARGE PIPE ARCH |
| | | CULVERT-CONCRETE DBL BARREL |
| EARTHWORK | | |
| | CLEAR & GRUB | NORMAL |
| | | WET |
| | MASS EXCAVATION | DOZER |
| | | TRACK LOADER |
| | | WHEEL LOADER |
| | | EXCAVATOR |
| | | SCRAPER-STANDARD |
| | | SCRAPER-ELEVATING |
| | | SCRAPER-TANDEM |
| | | SCRAPER-TANDEM ELEVATING |
| | TRENCH/CHANNEL | EXCAVATOR |
| | | DRAGLINE & CLAMSHELL |
| | | DOZER |
| | RIPPING | DOZER |
| | ROCK BLASTING | PRESPLITTING |
| | | PRODUCTION REMOVAL |
| | HAULING | HIGHWAY DUMP TRUCKS |
| | | OFF HIGHWAY END DUMPS |
| | MATERIALS PLANT | SCREEN/WASH PLANT |
| | | CRUSHER |
| GAS/WATER/STEAM DISTRIBUTION | | |
| | WATER STORAGE TANK | AT GRADE |
| | | ABOVE GRADE |
| | PIPING | PVC |
| | | CAST IRON PIPE |
| | | BLACK STEEL W/ FITTINGS |
| | IRRIGATION | DISTRIBUTION SYSTEMS |
| OTHER | | |
| | MISCELLANEOUS | FENCING |
| | | LANDSCAPING |
| | | CLEANUP |
| ROADS/PARKING FACILITIES | | |
| | ONE LANE ACCESS | CROWN SECTION-DIRT |
| | | CROWN SECTION-GRAVEL |
| | | CROWN SECTION-ASPHALT |
| | TWO LANE ACCESS | CROWN SECTION-DIRT |
| | | CROWN SECTION-GRAVEL |
| | | CROWN SECTION-ASPHALT |

| CATEGORY | SPECIFIC MODEL | SUBMODEL |
|---|---|---|
| | TWO LANE ARTERIAL | CROWN SECTION-GRAVEL |
| | | CROWN SECTION-ASPHALT |
| | | CROWN SECTION-CONCRETE |
| | | DEPRESSED SECTION-CONCRETE |
| | | CURB & GUTTER-ASPHALT |
| | FOUR LANE ARTERIAL | CROWN SECTION-CONCRETE |
| | | CURB & GUTTER-ASPHALT |
| | FOUR LANE INTERSTATE | STANDARD SECTION-ASPHALT |
| | | STANDARD SECTION-CONCRETE |
| | PARKING | GRAVEL WITH DRAINS |
| | | GRAVEL WITHOUT DRAINS |
| | | ASPHALT WITH DRAINS |
| | | ASPHALT WITHOUT DRAINS |
| ROADS/PARKING FACILITIES | | |
| | RESURFACING | ACCESS 1 LANE-GRAVEL |
| | | ACCESS 1 LANE-ASPHALT |
| | | ACCESS 2 LANE-GRAVEL |
| | | ACCESS 2 LANE-ASPHALT |
| | | ARTERIAL 2 LANE-GRAVEL |
| | | ARTERIAL 2 LANE-ASPHALT |
| | | ARTERIAL 2 LANE CONCRETE |
| | | ARTERIAL 4 LANE-ASPHALT |
| | | ARTERIAL 4 LANE CONCRETE |
| | RESURFACING PARKING | GRAVEL |
| | | ASPHALT |
| | RESTRIPING | ARTERIAL |
| | | INTERSTATE |
| | | INTERSECTIONS |
| | | PARKING |
| SEWER | | |
| | STORM | CORRUGATED METAL PIPE CULVERTS (12"<=18"<24") |
| | | CORRUGATED METAL PIPE CULVERTS (24"<=36"<48") |
| | | CORRUGATED METAL PIPE CULVERTS (48"<=60"<72") |
| | | REINFORCED CONCRETE PIPE SYSTEMS-SMALL (18") |
| | | REINFORCED CONCRETE PIPE SYSTEMS-MEDIUM (36") |
| | | REINFORCED CONCRETE PIPE SYSTEMS-LARGE (60") |
| | SANITARY | ASBESTOS CEMENT |
| | | CAST IRON PIPE |
| | | VITRIFIED CLAY PIPE |
| | INLETS | CURB AREA |
| | | AREA DRAIN |
| | MANHOLES | STORM |
| | | SANITARY |

| CATEGORY | SPECIFIC MODEL | SUBMODEL |
|---|---|---|
| SITE ELECTRICAL | | |
| | LIGHTING | PARKING AREA |
| | | ROADWAY |
| | | INTERSTATE |
| | DISTRIBUTION | UNDERGROUND RESIDENTIAL |
| | | 15 KV POWER OVERHEAD |

TREATMENT PLANTS/
LIFT STATIONS
              WATER

```
                                    PACKAGED PLANT-      360 GPD
                                    PACKAGED PLANT-      720 GPD
                                    PACKAGED PLANT-     2880 GPD
                                    PACKAGED PLANT-     6480 GPD
                                    PACKAGED PLANT-    12240 GPD
                                    PACKAGED PLANT-    24480 GPD
                                    PACKAGED PLANT-    36000 GPD
```

TREATMENT PLANTS/
LIFT STATIONS
              SEWAGE

```
                                    PACKAGED PLANT-   200000 GPD
                                    PACKAGED PLANT-   500000 GPD
                                    PACKAGED PLANT-   800000 GPD
                                    PKGD LIFT STN -   200000 GPD
                                    PKGD LIFT STN -   500000 GPD
                                    PKGD LIFT STN -   800000 GPD
```

STEP 4: The model asks the user:

DO YOU WANT TO DISPLAY/EDIT VARIABLES IN THE ALGORITHM?

A "NO" response takes the user to STEP 6. To a "YES" response, the model displays the submodel title and reference page.

CORRUGATED METAL PIPE CULVERTS (12" <= 18" < 24") (PAGE 81)

For submodels that contain pipes, and where pipe variables of the Inside Diameter (ID), Type, and Class are changeable by the user, there is a special edit which is described below. All other models go to STEP x. :

DO YOU WANT TO EDIT PIPE ID, TYPE OR CLASS?

A "No" response takes the user to STEP 5. To a "YES" response, the model responds:

```
    DEFAULT PIPE VALUES:
    ID:         TYPE:       CLASS:         ID RANGE  MIN:    MAX:
      18.000    CMP         14GA                     2.000   24.000
``` and provides the user with available pipe type alternatives.

```
    PIPE TYPE
    1 = CMP
    2 = CPP
    3 = BF
```

ENTER MENU NUMBER OF TYPE OF PIPE DESIRED; OR
ENTER 'DEFAULT' TO RESET USER PIPE VALUES TO DEFAULT PIPE VALUES.

To a user response of "3", the model lists the pipes of that type:

```
          CLASS:     ID:          COMMENT
    1 =              2.000        BF DRAIN-SEWER PIPE
    2 =              3.000        BF DRAIN-SEWER PIPE
    3 =              4.000        BF DRAIN-SEWER PIPE
    4 =              5.000        BF DRAIN-SEWER PIPE
    5 =              6.000        BF DRAIN-SEWER PIPE
    6 =              8.000        BF DRAIN-SEWER PIPE
    7 =              3.000        PLAIN
```

```
 8 =                    4.000      PLAIN
 9 =                    5.000      PLAIN
10 =                    6.000      PLAIN
11 =                    3.000      PERFORATED
12 =                    4.000      PERFORATED
13 =                    5.000      PERFORATED
14 =                    6.000      PERFORATED
```

ENTER MENU NUMBER OF PIPE DESIRED:

The user then enters the menu item for the desired pipe.

STEP 5: After a PIPE EDIT, or in those cases where there is no PIPE EDIT, the submodel displays the algorithm variable which the user can either accept or override.

```
                    DEFAULT    USER
    VARIABLE  UM    VALUE      VALUE       DESCRIPTION
1 =    D      FT    4.5000     4.5000    DEPTH TO TRENCH BOTTOM
2 =    H1     FT    3.0000     3.0000    VERT TRENCH HT, NORMAL
3 =    H2     FT    2.0000     2.0000    VERT TRENCH HT, CLAY/SAND
4 =    H3     FT     .0000      .0000    VERT TRENCH HT, SAND
5 =    H4     FT    2.0000     2.0000    VERT TRENCH HT, C/S W/ BOULDER
6 =    ID     IN   18.0000     8.0000    INSIDE DIAMETER OF PIPE
7 =    T      FT    1.0000     1.0000    PIPE OD TO TRENCH WALL
```

NOTE: The H4 variable is 0.0000 because a sloped cut is required in sand. The ID variable USER VALUE is 8.0000 reflecting selection of BF DRAIN-SEWER PIPE, item 6, as the user desired pipe.

The user can edit the variables in the algorithm by inputting the menu number the appropriate user value. When the user inputs ate complete, the model calculates Assembly Quantities.

STEP 6: The model asks the user:

DO YOU WANT TO DISPLAY/EDIT ASSEMBLIES?

A "NO" response takes the user to STEP 7. To a "YES" response, the model asks the user what systems to display.

ENTER HIERARCHY, OR "ALL"

At the users option, the Assembly Quantities can be displayed and the default values overridden, in the same manner as the Building Systems Generic Model. The Supporting Facilities model assembly display contains and additional field for which the default quantities can be overridden; that field is the assembly production rate per day. Thus, the user has the option to change both the quantity and production rate of assembly which the model will use in calculating direct costs. Below is a sample of the Assembly Quantity menu.

SYSTEM: 40 SITE IMPROVEMENTS
SUBSYSTEM: 02 EXCAVATION

```
    UM   QUANTITY  EFFECTIVE  PRODUCTION   PRODUCTION   COMMENT
                   QUANTITY   RATE/DAY     RATE  USER

40024330  TRENCHING, SOIL/SAND, CAT. 225, 1.5 CY
1 =       BCY  1990.63   0.00      1241.0000   0.0000   DRAIN FLD
```

NOTE: EFFECTIVE QUANTITY is based upon the PRODUCTION
    RATE USER, i.e., if the user does not change input a new
    production rate, the EFFECTIVE QUANTITY will be zero.
    EFFECTIVE QUANTITY is not used in calculations unless it
    does not equal zero.

STEP 7: The model calculates Line Item quantities. These quantities are displayed in the Supporting Facilities Generic Model, but can only be edited by copying the generic model into the Quantity Take-Off portion of the Direct Cost Module.

STEP 8: The model asks if the user wishes to rerun the model. If the user answers "YES", the model goes to STEP 4. IF the user answers "NO", the model goes to STEP 1, with the following display:

```
    1 =       BRIDGES/STRUCTURES
    2 =       EARTHWORK
    3 =       GAS/WATER/STEAM DISTRIBUTION
    4 =       OTHER
    5 =       ROADS/PARKING FACILITIES
    6 =   *   SEWER
    7 =       SITE ELECTRICAL
    8 =       TREATMENT PLANTS/ LIFT STATIONS
```

This indicates there is data in the SEWER category. The user has the option of running the model again for the same category or other categories and appending those results to the current data. When the user enters a <CR> in response to the menu, the model model calculates the direct cost for facility construction, and returns the user to the initial system menu.

RUNWAY/TAXIWAY GENERIC MODEL

The Runway/Taxiway Generic Model uses aircraft type and location as the parameters to determine the complete cost of a new airfield. This complete cost includes clearing, drainage, runway(s), taxiways, aprons, service pads, lighting, markings, arresting barriers, and security fencing.

STEP 1: The model reads the desired location from the Program Description and prompts the user to input the design aircraft.

ENTER DESIGN AIRCRAFT:

If the user specifies "MENU" the following options are presented:

ENTER LOAD DESIGNATION (LIGHT(L), MEDIUM(M), HEAVY(HV), OR ALL)

If the user inputs "M" the following menu is provided.

AIRCRAFT FOR MEDIUM LOAD DESIGNATION:

```
 1 = A-300
 2 = AC-130A
 3 = AC-130H
 4 = B-1B
 5 = B-727
 6 = B-737-20
 7 = B-747
 8 = B707-120
 9 = B707-320
10 = C-130B
11 = C-130E
12 = C-130H
13 = C-135A
14 = C-135B
15 = C-137B
16 = C-137C
17 = C-140A
18 = C-141A
ENTER OPTION:
(MORE ITEMS TO FOLLOW)
```

If a user selects "7" at this point, CCMAS prompts:

LOAD DESIGNATION: MEDIUM LOAD
ENTER ANY CHANGE:

A <CR> indicates no change and CCMAS prompts:

ENTER NUMBER OF RUNWAYS: (DEFAULT = 1)

If the user enters <CR>, indicating acceptance of the default of one runway, CCMAS prompts:

YOU MAY CHOOSE TO RUN THE MODEL USING MIN, DEF OR MAX VALUES
ENTER CHOICE OR (CR) TO CONTINUE:

STEP 2: If a user enters <CR>, CCMAS presents the Design Aircraft and Dimensions Table.

DESIGN-AIRCRAFT & DIMENSIONS TABLE
MEDIUM LOAD DESIGNATION
B-747

| | ITEM | MIN | DEFAULT | MAX | USER |
|---|---|---|---|---|---|
| 1 = | WINGSPAN, FT | 160.0 | 160.0 | 160.0 | |
| 2 = | LENGTH, FT | 145.0 | 145.0 | 168.3 | |
| 3 = | HEIGHT, FT | 39.3 | 39.3 | 39.3 | |
| 4 = | REVETMENT WINGTIP CLEAR, FT | 20 | 20 | 50 | |
| 5 = | REVETMENT NOSE CLEAR, FT | 20 | 20 | 50 | |
| 6 = | REVETMENT TAIL CLEAR, FT | 20 | 20 | 50 | |
| 7 = | NO. AIRCRAFT PER SQUADRON | 18 | 18 | 18 | |

ENTER MENU NUMBER, VALUE; OR 'MIN', 'DEF', OR 'MAX':

STEP 3: CCMAS asks the user for basic airfield dimensions:

AIRFIELD RUNWAY DIMENSIONS (FT) - MEDIUM LOAD DESIGNATION ITEM

|   | | MIN | DEFAULT | MAX | USER |
|---|---|---|---|---|---|
| 1 = | R/W LENGTH | 6,000 | 10,000 | 12,000 | |
| 2 = | R/W WIDTH | 150 | 200 | 300 | |
| 3 = | OVERRUN LENGTH | 200 | 1,000 | 1,000 | |
| 4 = | OVERRUN WIDTH | 150 | 200 | 300 | |

ENTER MENU NUMBER, VALUE; OR 'MIN', 'DEF', OR 'MAX':

AIRFIELD TAXIWAY DIMENSIONS (FT) - MEDIUM LOAD DESIGNATION

|   | | MIN | DEFAULT | MAX | USER |
|---|---|---|---|---|---|
| 1 = | T/W LENGTH-PRIMARY | 8,000 | 12,000 | 14,000 | |
| 2 = | T/W LENGTH-SECONDARY | 2,000 | 2,000 | 2,000 | |
| 3 = | T/W WIDTH | 75 | 75 | 75 | |

ENTER MENU NUMBER, VALUE; OR 'MIN', 'DEF', OR 'MAX':

APRON INFORMATION:

DESIGN AIRCRAFT:    B-747     LOAD DESIGNATION:   MEDIUM LOAD
AIRCRAFT LENGTH, FT:    145.0      WINGSPAN, FT:        160.0
NUMBER OF SQUADRONS:     2   AIRCRAFT-PER-SQUADRON:   18

|   | ITEM | CALCULATED | USER |
|---|---|---|---|
| 1 = | NUMBER APRON AIRCRAFT | 36 | |
| 2 = | APRON AREA (NO REVETMENTS), SY | 324,809 | |

ENTER MENU NUMBER, VALUE:

CCMAS asks if revetments are required, as this will change the total Apron area requirement. A "NO" response bypasses the revetment questions.

DO YOU WANT REVETMENTS? (DEFAULT = NO)

If the user responds "YES", CCMAS provides the following data:

REVETMENT AIRCRAFT: B-747

ENTER ANY CHANGE:

REVETMENT INFORMATION:

DESIGN AIRCRAFT: B-747          REVETMENT AIRCRAFT: B-747
WINGSPAN, FT:    160.0          WINGSPAN, FT:    160.0
AIRCRAFT LEN, FT: 145.0         AIRCRAFT LEN, FT:    145.0

|   | ITEM | CALCULATED | USER |
|---|---|---|---|
| 1 = | NO. REVETMENT AIRCRAFT | 36 | |
| 2 = | WINGTIP CLEARANCE, FT | 20 | |
| 3 = | TAIL CLEARANCE, FT | 20 | |

ENTER MENU NUMBER, VALUE:

REVETMENT DIMENSIONS TABLE (FT) - B-747

|   | | MIN | DEFAULT | MAX | USER |
|---|---|---|---|---|---|
| 1 = | BIN WIDTH | 5.25 | 6.92 | 7.70 | |
| 2 = | BIN HEIGHT | 12 | 16 | 16 | |

ENTER 'MIN', 'DEF' OR 'MAX':

APRON DIMENSIONS (FT):

COMPUTED AREA, SF:   3,348,900        USER AREA, SF: -

```
ITEM                    CALCULATED              USER
1 = APRON WIDTH              915
2 = APRON LENGTH           3,660
ENTER MENU NUMBER, VALUE:

AIRCRAFT PADS:

1 = WARM-UP PAD
2 = POWER CHECK PAD
3 = DANGEROUS CARGO PAD
4 = WASHRACK PAD
5 = ALL
ENTER MENU NUMBER:

WARM-UP PAD (FT) - MEDIUM LOAD DESIGNATION

MIN   DEFAULT    MAX     USER
1 = WIDTH               145     145      145
2 = LENGTH              375     375      375
3 = PERIMETER LENGTH    290     290      290
4 = NUMBER REQUIRED       0       2        2
ENTER MENU NUMBER, VALUE; OR 'MIN', 'DEF', OR 'MAX':

POWER CHECK PAD (FT) - MEDIUM LOAD DESIGNATION

MIN   DEFAULT    MAX     USER
1 = WIDTH               250     250      250
2 = LENGTH              320     320      320
3 = PERIMETER LENGTH    500     500      500
4 = NUMBER REQUIRED       0       1        2
ENTER MENU NUMBER, VALUE; OR 'MIN', 'DEF', OR 'MAX':

DANGEROUS CARGO PAD (FT) - MEDIUM LOAD DESIGNATION

MIN   DEFAULT    MAX     USER
1 = WIDTH               250     250      250
2 = LENGTH              320     320      320
3 = TAXIWAY LENGTH      500     500      500
4 = PERIMETER LENGTH  2,065   2,065    2,065
5 = NUMBER REQUIRED       0       1        2
ENTER MENU NUMBER, VALUE; OR 'MIN', 'DEF', OR 'MAX':

WASHRACK PAD (FT) - MEDIUM LOAD DESIGNATION

MIN   DEFAULT    MAX     USER
1 = WIDTH               160     160      160
2 = LENGTH              146     146      146
3 = T/W LENGTH          130     130      130
4 = PERIMETER LENGTH    797     797      797
5 = NUMBER REQUIRED       0       1        2
ENTER MENU NUMBER, VALUE; OR 'MIN', 'DEF', OR 'MAX':

SHOULDER WIDTHS (FT) - MEDIUM LOAD DESIGNATION

MIN   DEFAULT    MAX     USER
    1 = RUNWAY            0      50      200
    2 = TAXIWAY           0      25       50
    3 = APRON/PAD         0      25       50
    4 = OVERRUN           0       0        0
    ENTER MENU NUMBER, VALUE; OR 'MIN', 'DEF', OR 'MAX':
```

STEP 4: Having established the airfield dimensions, CCMAS asks about the earthwork which is required for the airfield.

CLEAR & GRUB TABLE (FT) - MEDIUM LOAD DESIGNATION

```
                               MIN    DEFAULT    MAX      USER
    1 =  RUNWAY WIDTH          150    2,000      2,000
    2 =  SUPPORT AREA WIDTH    0      2,000      2,000
    3 =  CLEAR ZONE WIDTH      0      3,000      3,000
    4 =  CLEAR ZONE LENGTH     0      3,000      3,000
    ENTER MENU NUMBER, VALUE; OR 'MIN', 'DEF', OR 'MAX':
```

SITE VEGETATION: MEDIUM

ENTER ANY CHANGE (LIGHT, MEDIUM, HEAVY):

MEDIUM VEGETATION

```
                               MIN   DEFAULT    MAX       USER
1 =  NUMBER OF TREES PER ACRE  250   400        550
ENTER MENU NUMBER, VALUE; OR 'MIN', 'DEF', OR 'MAX':
```

CURRENT TERRAIN: ROLLING

TERRAIN SLOPE (%) PARALLEL TO RUNWAY:

```
1 =      FLAT         LESS THAN 2.0
2 =    * ROLLING        2.0 - 5.0
3 =      HILLY          5.0 - 10.0
ENTER MENU NUMBER:
```

EARTHWORK CALCULATIONS (FT) - ROLLING TERRAIN

```
                               MIN    DEFAULT    MAX      USER
    1 =  RUNWAY WIDTH     150  2,000  2,000      2,000
    2 =  PARALLEL TW WIDTH     75     240        475
    3 =  CLEAR ZONE WIDTH      0      3,000      3,000
    4 =  CLEAR ZONE LENGTH     0      1,000      1,000
    5 =  APRON CLEARANCE       125    125        125
    ENTER MENU NUMBER, VALUE; OR 'MIN', 'DEF', OR 'MAX':
```

EARTHWORK VOLUMES (CY/KSF) - ROLLING TERRAIN

```
GROUND-SLOPE/RW-SLOPE, RATIO:
                          2/1         3.5/1      5/1
                          MIN         DEFAULT    MAX      USER
    1 =  CUT-FILL FACTOR  418         1,039      1,665
    2 =  UNDERCUT FACTOR  247         247        247
ENTER MENU NUMBER, VALUE; OR 'MIN', 'DEF', OR 'MAX':
```

ENTER PERCENT UNSUITABLE MATERIAL (DEFAULT = 0):

ENTER PERCENT ROCK MATERIAL (DEFAULT = 0):

STEP 5: CCMAS asks for data to establish the construction requirements for the airfield pavements. This includes the soil conditions of the airfield site.

AIRFIELD PAVEMENTS

CURRENT SOIL TYPE: SILT & CLAY (LL < 50)

| SOIL TYPE | ASSUMED CBR | ASSUMED K | FROST GROUP |
|---|---|---|---|
| COURSE GRAIN SOIL: | | | |
| 1 = GRAVEL & GRAVELY SOILS | 50 | 300 | F1 |
| 2 = SAND & SANDY SOILS | 25 | 150 | F2 |
| FINE GRAIN SOIL: | | | |
| 3 = * SILT & CLAY (LL < 50) | 10 | 75 | F3 |
| 4 = SILT & CLAY (LL > 50) | 4 | 25 | F3 |

ENTER MENU NUMBER:

GEO-LOCATION: MISSOURI

DEFAULT DEGREE DAYS: 0000   USER VALUE: 0000

ENTER ANY CHANGES:

BASIC PAVEMENT DESIGN - MENU OF PAVEMENT MATERIALS

FLEXIBLE PAVEMENT:
    1 = BITUMINOUS CONCRETE WITH BASE (FLEX)
RIGID PAVEMENT:
    2 = JOINTED CONCRETE - NO BASE (JC-0)
    3 = JOINTED CONCRETE -WITH- BASE (JC-18)
    4 = JOINTED REINFORCED CONCRETE - NO BASE (JRC-0)
    5 = JOINTED REINFORCED CONCRETE - WITH BASE (JRC-18)
    6 = JOINTED FIBROUS CONCRETE - NO BASE (JFC-0)
    7 = JOINTED FIBROUS CONCRETE - WITH BASE (JFC-18)
    8 = CONTINUOUSLY REINFORCED CONCRETE - WITH BASE (CRC-18)
ENTER PAVEMENT MATERIAL FOR:

CCMAS enters the default pavement types by traffic area and asks the user for changes.

TRAFFIC AREA A: JRC-18
ENTER MENU NUMBER TO CHANGE:

TRAFFIC AREA B: JRC-18
ENTER MENU NUMBER TO CHANGE:

TRAFFIC AREA C: JC-18
ENTER MENU NUMBER TO CHANGE:

TRAFFIC AREA D: JC-18
ENTER MENU NUMBER TO CHANGE:

TRAFFIC AREA S: FLEX
ENTER MENU NUMBER TO CHANGE:

STEP 6: CCMAS presents data based on the location in the Project Description and rainfall intensity for that location, and asks a user for information on airfield drainage.

AIRFIELD SUPPORTING FACILITIES

GEO-LOCATION: MISSOURI

DEFAULT RAINFALL INTENSITY (IN): 1   USER VALUE: 1

ENTER ANY CHANGES:

STORM DRAINAGE PIPE SIZE (IN)
(ALLOWABLE PIPE SIZES: 30, 36, 42, 48, 60, 72, 96, 120)

| | ITEM | DEFAULT | USER |
|---|---|---|---|
| 1 = | APRON DRAINAGE | 30 | |
| 2 = | APRON DRAINAGE OUTFALL | 48 | |
| 3 = | RW-TW-COLLECTOR | 36 | |
| 4 = | RW-TW-OUTFALL | 36 | |
| 5 = | CENTRAL OUTFALL | 60 | |

ENTER MENU NUMBER, VALUE:

STORM DRAINAGE PIPE LENGTHS (FT)

| | ITEM | CALCULATED | USER |
|---|---|---|---|
| 1 = | APRON DRAINAGE LENGTH | 5,415 | |
| 2 = | APRON DRAINAGE OUTFALL | 975 | |
| 3 = | RW-TW COLLECTOR LENGTH | 6,600 | |
| 4 = | RW-TW OUTFALL | 2,400 | |
| 5 = | CENTRAL OUTFALL | 1,200 | |

ENTER MENU NUMBER, VALUE:

JUNCTION BOX DEPTH (FT)
(ALLOWABLE DEPTH: 8, 12)

| | ITEM | DEFAULT | USER |
|---|---|---|---|
| 1 = | APRON DRAINAGE | 8 | |
| 2 = | APRON OUTFALL | 8 | |
| 3 = | RW-TW-COLLECTOR | 8 | |
| 4 = | RW-TW-OUTFALL | 8 | |
| 5 = | CENTRAL OUTFALL | 8 | |

ENTER MENU NUMBER, VALUE:

JUNCTION BOX QUANTITIES (EACH)

| | ITEM | CALCULATED | USER |
|---|---|---|---|
| 1 = | APRON DRAINAGE | 11 | |
| 2 = | APRON OUTFALL | 1 | |
| 3 = | RW-TW COLLECTOR | 6 | |
| 4 = | RW-TW OUTFALL | 2 | |
| 5 = | CENTRAL OUTFALL | 1 | |

ENTER MENU NUMBER, VALUE:

HEADWALL SIZES (FT)
(ALLOWABLE SIZES: 6X12, 8X14, 10X16, 12X20)

| | ITEM | DEFAULT | USER |
|---|---|---|---|
| 1 = | RW-TW-OUTFALL | 6X12 | 6X12 |
| 2 = | CENTRAL OUTFALL | 8X14 | 8X14 |

ENTER MENU NUMBER, VALUE:

HEADWALL QUANTITIES (EACH)

| | ITEM | CALCULATED | USER |
|---|---|---|---|
| 1 = | RW-TW-OUTFALL | 2 | |
| 2 = | CENTRAL OUTFALL | 1 | |

ENTER MENU NUMBER, VALUE:

STEP 7: CCMAS asks the user to provide data on Security Fencing, Airfield Lighting, Balst Deflectors, Arresting Systems, and Airfield Markings.

SECURITY FENCE

| ITEM | DEFAULT | USER |
|---|---|---|
| 1* = FENCE LENGTH, LF | 42,000 | |
| 2 = NUMBER OF GATES, EACH | 17 | |

ENTER MENU NUMBER, VALUE:

AIRFIELD LIGHTING QUANTITIES

| ITEM | DEFAULT | USER |
|---|---|---|
| 1 = RW APPROACH LIGHTING, EACH | 2 | |
| 2 = RW END LIGHTING, EACH | 2 | |
| 3 = TOUCHDOWN ZONE LIGHTING, EACH | 2 | |
| 4 = RW EDGE LIGHTING, KLF | 20.0 | |
| 5 = RW CENTERLINE LIGHTING, KLF | 10.0 | |
| 6 = TW EDGE LIGHTING, KLF | 28.0 | |
| 7 = TW CENTERLINE LIGHTING, KLF | 14.0 | |
| 8 = APRON PARKING LIGHTING, KLF | 12.5 | |
| 9 = SECURITY FENCE LIGHTING, KLF | 42.0 | |
| 10 = CONTROL TOWER LIGHTING, EACH | 1 | |

ENTER MENU NUMBER, VALUE:

QUANTITY OF BLAST DEFLECTORS (EACH)

| ITEM | MIN | DEFAULT | MAX | USER |
|---|---|---|---|---|
| 1 = NO. STRAIGHT-LINE DEFLECTORS | 0 | 9 | 36 | |
| 2 = NO. 'U'-SHAPE DEFLECTORS | 0 | 1 | 2 | |

ENTER MENU NUMBER, VALUE; OR 'MIN', 'DEF', OR 'MAX':

QUANTITY OF AIRCRAFT ARRESTING SYSTEMS (EACH)

| ITEM | MIN | DEFAULT | MAX | USER |
|---|---|---|---|---|
| 1 = BAK12/BAK14-BELOW-GND | 0 | 2 | 2 | |
| 2 = BAK12/61QS2-BELOW-GND | 0 | 2 | 2 | |
| 3 = BAK12/BAK14-ABOVE-GND | 0 | 2 | 2 | |
| 4 = BAK12/61QS2-ABOVE-GND | 0 | 2 | 2 | |

ENTER MENU NUMBER, VALUE; OR 'MIN', 'DEF', OR 'MAX':

AIRFIELD MARKING QUANTITIES (LF)

| ITEM | DEFAULT | USER |
|---|---|---|
| 1 = REFLECTIVE WHITE | 89,310 | |
| 2 = REFLECTIVE YELLOW | 913,368 | |
| 3 = NON-REFLECTIVE YELLOW | 122,745 | |
| 4* = NON-REFLECTIVE BLACK | 34,026 | |

ENTER MENU NUMBER, VALUE:

STEP 8: The model asks the user:

DO YOU WANT TO DISPLAY/EDIT ASSEMBLIES?

A "NO" response takes the user to STEP 9. To a "YES" response, the model asks the user what systems to display.

ENTER HIERARCHY, OR "ALL"

At the users option, the Assembly Quantities can be displayed and the default values overridden, in the same manner as the Building Systems Generic Model. The Runway/Taxiway model, like the Supporting Facilities model assembly display contains and additional field for which the default quantities can be overridden; that field is the assembly production rate per day. Thus, the user has the option to change both the quantity and production rate of assembly which the model will use in calculating direct costs. Below are samples of the Assembly Quantity menu:

```
SYSTEM: 01 AIRFIELD SITE WORK
SUBSYSTEM: 01 CLEAR AND GRUB

UM       QUANTITY   EFFECTIVE   PRODUCTION    PRODUCTION
                            QUANTITY    RATE/DAY      RATE USER
31010006 - CLEARING - MEDIUM W/O GRUB
   1 =  AC       1124.89      0.00       28.0000        0.0000
31010019 - BURNING - MEDIUM (D)
   2 =  AC       1124.89      0.00        1.7500        0.0000
31010025 - STUMP REMOVAL < 24" (D)
   3 =  EA       449954.00    0.00       16.0000        0.0000
31010032 - GRUBBING & STACKING - DOZER 200 HP D7
   4 =  BCY      1361110.85   0.00     1050.0000        0.0000
ENTER MENU NUMBER, QUANTITY, PRODUCTION RATE TO CHANGE; (CR) TO
CONTINUE; 'DONE' TO END DISPLAY:
```

NOTE: EFFECTIVE QUANTITY is based upon the PRODUCTION
   RATE USER, i.e., if the user does not change input a new
   production rate, the EFFECTIVE QUANTITY will be zero.
   EFFECTIVE QUANTITY is not used in calculations unless it
   does not equal zero.

```
SYSTEM: 01 AIRFIELD SITE WORK
SUBSYSTEM: 02 AIRFIELD EXCAVATION

UM       QUANTITY   EFFECTIVE   PRODUCTION    PRODUCTION
                            QUANTITY    RATE/DAY      RATE USER
31020200 - ROADWAY SOIL EXCAV.-ELEV. SCRAPER (613); SPOIL-NEARBY
   1 =  BCY      4571958.91   0.00      645.0000        0.0000
ENTER MENU NUMBER, QUANTITY, PRODUCTION RATE TO CHANGE; (CR) TO
CONTINUE; 'DONE' TO END DISPLAY:

SYSTEM: 01 AIRFIELD SITE WORK
SUBSYSTEM: 05 AIRFIELD COMPACTION

UM       QUANTITY   EFFECTIVE   PRODUCTION    PRODUCTION
                            QUANTITY    RATE/DAY      RATE USER
31050002 - COMPACT SUBGRADE - 2 LIFTS
   1 =  BCY      4571958.91   0.00    13360.0000        0.0000
ENTER MENU NUMBER, QUANTITY, PRODUCTION RATE TO CHANGE; (CR) TO
CONTINUE; 'DONE' TO END DISPLAY:

SYSTEM: 01 AIRFIELD SITE WORK
SUBSYSTEM: 09 AIRFIELD LANDSCAPING
```

```
           UM         QUANTITY  EFFECTIVE   PRODUCTION   PRODUCTION
                                QUANTITY    RATE/DAY     RATE USER
31070004 - SCARIFYING 12G - 2 PASS
1 =       SY       4453472.76       0.00   33863.0000      0.0000
39020007 - FERTILIZER - HYDR. SPREAD
2 =       AC           920.14       0.00       0.5000      0.0000
39020010 - SEEDING - .67 LEVEL & .33 SLOPE - HYDR. SPREAD
3 =       AC           920.14       0.00       0.6700      0.0000
39020900 - SPREAD LIMESTONE
4 =       SY       4453472.76       0.00    5400.0000      0.0000
ENTER MENU NUMBER, QUANTITY, PRODUCTION RATE TO CHANGE; (CR) TO
CONTINUE; 'DONE' TO END DISPLAY.
```

STEP 9: The model calculates Line Item quantities. These quantities are displayed in the Runway/Taxiway Generic Model, but can only be edited by copying the generic model into the Quantity Take-Off portion of the Direct Cost Module.

STEP 10: The model calculates the direct cost for the Runway/Taxiway construction.

QUANTITY TAKE-OFF

The Quantity Take-Off (QTO) method of building direct costs requires the user to input the CSI Line items for each system and subsystem of a facility.

STEP 1: In QTO, CCMAS asks the user which Work Breakdown Structure (WBS) to use:

ENTER WBS:

The user may enter the three character code for the WBS desired or "MENU" will provide the prompt:

```
           WBS
 1 = UNIFORMAT     (UNI)
 2 = CSI           (CSI)
 3 = USER DEFINED  (USR)
```

CCMAS uses an extended form of UNIFORMAT. This extended form is used to keep building systems separate from non-building systems. The major CCMAS UNIFORMAT systems are:

```
  01   SUBSTRUCTURE
  02   SUPERSTRUCTURE
  03   ROOFING
  04   EXTERIOR CLOSURE
  05   INTERIOR CONSTRUCTION
```

```
06    INTERIOR FINISHES
07    SPECIALTIES
08    PLUMBING
09    HVAC
10    FIRE PROTECTION
11    ELECTRICAL
12    SPECIAL ELECTRICAL SYSTEMS
13    EQUIPMENT
14    CONVEYING SYSTEMS
21    AIRFIELD SITE WORK
22    AIRFIELD PAVEMENT
23    AIRFIELD STORM DRAINAGE
24    OTHER AIRFIELD
25    AIRFIELD ELECTRICAL
30    UTILITIES
31    EXTERIOR ELECTRICAL SYSTEMS
32    WATER SYSTEMS
33    SANITARY SEWER SYSTEMS
34    STORM DRAINAGE SYSTEMS
35    GAS DISTRIBUTION SYSTEMS
36    HEAT DISTRIBUTION SYSTEMS
37    COLLECTION AND DISTRIBUTION SYSTEMS
38    TREATMENT SYSTEMS
40    SITE IMPROVEMENTS
41    CLEAR & GRUB
42    EXCAVATION
43    BACKFILL
44    COMPACTION & STABILIZATION
45    GRADING
46    HAULING
47    ROCK BLASTING
48    MATERIALS PLANT
49    LANDSCAPING & CLEANUP
50    PAVEMENTS
51    ROADS
52    PARKING
53    SIDEWALKS
54    CURBS & GUTTERS
55    RESURFACING
56    RESTRIPING
60    DEMOLITION
61    DEMOLITION - BUILDING
62    DEMOLITION - PAVEMENT
63    DEMOLITION - UTILITY
64    DEMOLITION - OTHER
70    REAL PROPERTY INSTALLED EQUIPMENT
71    SYSTEM FURNITURE
72    MEDICAL EQUIPMENT
80    OTHER CONSTRUCTION
81    BRIDGES
82    STRUCTURES
83    REVETMENTS
84    UNDERGROUND CONSTRUCTION
90    FENCING
99    CONTRACTOR OVERHEAD & PROFIT
```

CCMAS used standard CSI. The major CSI systems are:

```
01    GENERAL REQUIREMENTS
02    SITE WORK
03    CONCRETE
04    MASONRY
05    METALS
06    WOOD & PLASTICS
```

```
07    MOISTURE-THERMAL CONTROL
08    DOORS, WINDOWS & GLASS
09    FINISHES
10    SPECIALTIES
11    EQUIPMENT
12    FURNISHINGS
13    SPECIAL CONSTRUCTION
14    CONVEYING SYSTEMS
15    MECHANICAL
16    ELECTRICAL
```

CCMAS has available the user defined WBS. A user can establish a unique set of systems to estimate facilities which cannot be readily estimated using either UNIFORMAT or CSI systems.

STEP 2: The user is asked:

FACILITY
ENTER QUANTITY, UNIT OF MEASURE

STEP 3: After the facility quantity and unit of measure are entered, CCMAS prompts the user to enter the system:

ENTER SYSTEM:

The major system is entered here. If the user wishes to see the major systems, "MENU" is entered and the systems shown in STEP 1 are presented depending on which WBS was chosen. The CCMAS prompt is:

AVAILABLE SYSTEMS - ENTER MENU CHOICE:

After the system is entered, CCMAS asks:

SYSTEM
ENTER QUANTITY, UNIT OF MEASURE

If the user is establishing a USER DEFINED WBS, CCMAS asks:

ENTER SYSTEM, DESCRIPTION, QUANTITY, UNIT OF MEASURE

STEP 4: CCMAS asks for the subsystem. If UNIFORMAT or CSI are being used the prompt is:

ENTER SUBSYSTEM:

As at the system level, the user may enter either a number or "MENU". If the user has chose UNIFORMAT WBS and is entering System 01, SUBSTRUCTURE, "MENU" entered at this point will result in CCMAS responding:

AVAILABLE SUBSYSTEMS - ENTER MENU CHOICE:

```
01   STANDARD FOUNDATION
02   SPECIAL FOUNDATION CONDITIONS
03   SLAB ON GRADE
04   BASEMENT EXCAVATION
05   BASEMENT WALLS
```

For both the CSI and USER DEFINED WBS CCMAS prompts:

ENTER SUBSYSTEM, DESCRIPTION, UNIT OF MEASURE

STEP 5: CCMAS prompts the user to enter an Assembly ID.

ENTER ASSEMBLY:

If using UNIFORMAT and the Assembly ID is not known, a user may review the available assemblies in a given system and subsystem by responding "MENU", e.g., CCMAS provides the following list of assemblies to the user who has selected System 01, SUBSTRUCTURE, and Subsystem 03, SLAB ON GRADE:

AVAILABLE ASSEMBLIES - ENTER MENU CHOICE:

```
01 = 0101  4" THICK CONCRETE SLAB ON GRADE
02 = 0102  6" THICK CONCRETE SLAB ON GRADE
03 = 0401  ELEVATOR PIT IN SLAB ON GRADE
04 = 0501  DRAINAGE
```

If the desired assembly is not found, the user may respond with <CR> until the ENTER ASSEMBLY: prompt is reached again and then repond:

A,XXXX <CR> where XXXX is any four digit number which does not identify an existing assembly for that system and subsystem. This will add a user defined assembly XXXX. CCMAS will prompt the user to:

ENTER ASSEMBLY DESCRIPTION, UOM:

The user will then have to create the components of the assembly by entering the CSI Line Item data as described in STEP X.

If the user specified the CSI or User defined WBS, no prebuilt assemblies exist based upon those WBSs. The user will have to enter each assembly number, description, and unit of measure. The CSI Line Item detail can then be added as shown in STEP 6.

STEP 6: In CCMAS, CSI Line Items can be added, changed, or deleted within an existing assembly or user defined assembly. The user is placed into the edit mode regardless of whether or not CSI Line items exist.

If UNIFORMAT pre-built assemblies are being used, CCMAS responds:

CSI LINE ITEM DATA EXISTS

If prebuilt assemblies are not being used CCMAS responds:

CSI LINE ITEM DATA DOES NOT EXIST

In both cases, CCMAS requests:

ENTER ACTION (A,C,D), LINE-ITEM ID, QUANTITY, HIGH-QUANTITY, COMMENTS, SEQUENCE #:

HIGH-QUANTITY, COMMENTS, and SEQUENCE # are optional inputs. HIGH-QUANTITY is used to calculate the standard deviation for that line item if input, otherwise the default is used. COMMENTS is used for making annotations within the estimate. SEQUENCE # is assigned automatically by the QTO estimating method, and can be disregarded by the user when adding line items. The SEQUENCE # is used within an assembly to distinguish between CSI Line Items that use the same CSI Line Item ID.

If CSI Line Items exist, a user may view those items by entering "L" (List) at the prompt. IF the user has selected System 01, SUBSTRUCTURE, Subsystem 03, SLAB ON GRADE, and ASSEMBLY 0101, 4" THICK CONCRETE SLAB ON GRADE, with a UOM of 1000 SF, CCMAS would respond as follows to an "L":

SYSTEM: 01 SUBSTRUCTURE
SUBSYSTEM 03 SLAB ON GRADE
ASSEMBLY 0101 4" THICK CONCRETE SLAB ON GRADE

LINE-ITEM          QTY      HIGH QTY     REMARK    SEQ NO
021440500M         81.9
SAW CUT, CONCRETE SLAB, PER INCH OF DEPTH, MESH REINFORCED
023050360M         12.2
BORO BUYLOD 2M HOUL PLC&SPRED 180HP DZR NOCMPCT CRSHD STN 3/8"
023222100M         112.0
FINE GRADE, 3 PASSES WITH MOTOR GRADER
033081600M         2.2
CONCRETE SEALER, HARDNER & DUSTPROOFER, CLEAR, MEDIUM
033144650M         12.2
CONCRETE IN PLACE INCL.FORMS & REINFORCING, SLAB ON GRADE, 4" THK
033260250M         1000.0
FINISHING FLOOR, MONOLITHIC STEEL TROWEL FINISH FOR FINISH FLOOR
071150900M         10.0
POLYETHYLENE VAPOR BARRIER, STANDARD, .006" THICK
072300700M         7.7
PERIMETER INSULATION POLYSTYRENE BEAD BOARD, 2" THICK

A user may Add (A), Change (C), or Delete (D) individual CSI Line Items. To add a LINE-ITEM, the user enters an "A", the new LINE-ITEM, and the QUANTITY of the new LINE-ITEM desired followed by a <CR>. To change a LINE-ITEM, the user enters an "C", the LINE-ITEM, and the new QUANTITY desired followed by a <CR>. To delete a LINE-ITEM, the user enters an "D" and the LINE-ITEM followed by a <CR>.

If CSI Line Items do not exist, a user has three ways to build the assembly LINE-ITEM data. The user may enter each individual LINE-ITEM, use the prebuilt library of assemblies, or use the two in combination, i.e., access a prebuilt assembly and edit it.

The library of assemblies is accessed by entering "LA" at the ENTER ACTION prompt. To an "LA" CCMAS responds:

ENTER ASSEMBLY-ID OR "M" FOR MENU:

If the user does not know the ASSEMBLY-ID, to an "M" CCMAS continues:

ENTER PARTIAL ASSEMBLY-ID OR "ALL":

If the partial ASSEMBLY-ID is not known, CCMAS will present a full list of all existing assemblies beginning with System 01.

To a partial ASSEMBLY-ID of "0103" CCMAS will provide the same list of assemblies shown in STEP 5, but in the following format:

| ASSEMBLY-ID | DESCRIPTION | U/M |
|---|---|---|
| 01030101 | 4" THICK CONCRETE SLAB ON GRADE | SF |
| 01030102 | 6" THICK CONCRETE SLAB ON GRADE | SF |
| 01030401 | ELEVATOR PIT IN SLAB ON GRADE | LF |
| 01030501 | DRAINAGE | LF |

ENTER <CR> TO CONTINUE; "DONE" TO END DISPLAY:

A "DONE" takes the user back to the prompt:

ENTER ASSEMBLY-ID OR "M" FOR MENU:

If as before the user wants the 4" THICK CONCRETE SLAB ON GRADE, the user enters "01030101", and CCMAS replies:

ASSEMBLY-ID:    01030101
    DESCRIPTION:    4" THICK CONCRETE SLAB ON GRADE
    U/M:    SF

ENTER AMOUNT OF ASSEMBLY:

The user now specifies the quantity, and all the line items specified by the assembly are added to the estimate in the correct mixture of quantities.

STEP 7: The user must iterate STEPs 3 thru 6 until all Systems, Subsystems, Assemblies, and Line Items are inserted into the estimate.

STEP 8: The model calculates the direct cost for the QTO estimate.

MODIFIER SETS

Initial menu item "3" is selected to build modifier sets. The modifier sets serve two purposes, modifying the direct costs for construction methods, project definition, construction duration, project location, and construction start date; and developing factors to estimate design and construction management costs.

A single direct cost "Run" may have up to 99 modifier sets, thus allowing the user to vary the modifiers for a single facility.

The options within build modifier sets are:

1  EDIT EXISTING MODIFIER SET
    2  CREATE NEW MODIFIER SET FROM SCRATCH
    3  CREATE NEW MODIFIER SET FROM COPY

For new facility where the user created a direct cost "Run" from scratch, or copied a direct cost "Run" from another CCMAS ID, the user must create a modifier set from scratch.

For a completely new modifier set, CCMAS first asks the user how Contractor Costs will be calculated:

SELECT CONTRACTOR MODIFIER METHOD:

1 COMPARATIVE CONTRACTOR METHOD
2 GENERIC CONTRACTOR COST MODEL
3 QTO CONTRACTOR MODIFIER

NOTE: A single modifier set can be used with only one method for calculating contractor costs. If the user wants to examine the effects of different contractor modifier methods, multiple modifier sets must be built.

After the contractor modifier method is selected, CCMAS provides the user with the following modifier menu:

ENTER MODIFIER:

1 = CONSTRUCTION METHODS MODIFIER (CMM)
    2 = SCHEDULE MODIFIER (SM)
    3 = DEFINITION MODIFIER (DFM)
    4 = LOCATION MODIFIER (LM)
    5 = ESCALATION MODIFIER (EM)
    6 = CONSTRUCTION MANAGEMENT MODIFIER (CMGT)
    7 = DESIGN MODIFIER (DM)
    8 = ALL

For a new modifier set "8" is selected, and CCMAS steps the user through each of the modifiers.

CONSTRUCTION METHODS MODIFIER

The Construction Methods Modifier is used to adjust direct costs for cost variations caused by unique regional construction techniques, labor productivity, equipment availability, and the schedule impacts of weather.

STEP 1: CCMAS begins by drawing the GEOLOC from the Project Description and provides opportunity to change it. Here it is assumed that the project is occurring at Tyndall AFB FL.

CONSTRUCTION METHOD MODIFIER

| GEOLOC CODE | PROJECT DESCRIPTION | USER INPUT |
|---|---|---|
| | XLWU | |
| | TYNDALL AFB FL | |

DO YOU WISH TO CHANGE THE MODIFIER GEOLOC?

If the user responds "YES", CCMAS responds:

ENTER GEOLOC CODE:

NOTE: A user may enter "M" and the system responds:

ENTER STATE/COUNTRY CODE, OR 'ALL'

For example, if a user responds "FL" for Florida the system will display all the geographical location codes (GEOLOC) in Florida. The user then enters the appropriate GEOLOC code.

This is the same process used in the Project Description portion of CCMAS.

If a user changes the GEOLOC, CCMAS reminds them:

YOU MUST RERUN SM, LM, AND DFM MODIFIERS

STEP 2: CCMAS asks the user:

DO YOU WISH TO CHANGE CMM FACTORS?

NOTE: All CMM factors have a default value of 1.000

If the user responds "NO", CCMAS takes them to the SCHEDULE MODIFIER. If the user responds "YES", the following menu is displayed:

|       | CSI SYSTEM | MAT (A) | LAB (B) | EQ (C) | MANHR (D) | EQHR (E) |
|-------|------------|---------|---------|--------|-----------|----------|
| 1 =   | 01         | 1.000   | 1.000   | 1.000  | 1.000     | 1.000    |
| 2 =   | 02         | 1.000   | 1.000   | 1.000  | 1.000     | 1.000    |
| 3 =   | 03         | 1.000   | 1.000   | 1.000  | 1.000     | 1.000    |
| 4 =   | 04         | 1.000   | 1.000   | 1.000  | 1.000     | 1.000    |
| 5 =   | 05         | 1.000   | 1.000   | 1.000  | 1.000     | 1.000    |
| 6 =   | 06         | 1.000   | 1.000   | 1.000  | 1.000     | 1.000    |
| 7 =   | 07         | 1.000   | 1.000   | 1.000  | 1.000     | 1.000    |
| 8 =   | 08         | 1.000   | 1.000   | 1.000  | 1.000     | 1.000    |
| 9 =   | 09         | 1.000   | 1.000   | 1.000  | 1.000     | 1.000    |
| 10 =  | 10         | 1.000   | 1.000   | 1.000  | 1.000     | 1.000    |
| 11 =  | 11         | 1.000   | 1.000   | 1.000  | 1.000     | 1.000    |
| 12 =  | 12         | 1.000   | 1.000   | 1.000  | 1.000     | 1.000    |
| 13 =  | 13         | 1.000   | 1.000   | 1.000  | 1.000     | 1.000    |
| 14 =  | 14         | 1.000   | 1.000   | 1.000  | 1.000     | 1.000    |
| 15 =  | 15         | 1.000   | 1.000   | 1.000  | .000      | 1.000    |
| 16 =  | 16         | 1.000   | 1.000   | 1.000  | 1.000     | 1.000    |

ENTER ALL, ROW, COLUMN OR ROW-COLUMN AND VALUE TO CHANGE FACTORS, <CR> TO DISPLAY FACTORS; DONE TO EXIT:

When the user has completed changing the CMM factors, and enters "DONE", CCMAS takes the user to the SCHEULDE MODIFIER.

SCHEDULE MODIFIER

The Schedule Modifier does not directly modify construction costs, but computes Mid-Point of Construction so the Escalation Modifier can calculate the escalation factor in the Construction Cost algorithm. The Schedule Modifier retrieves data it needs from the Project Description and displays it to the user. If the data required is not in the Project Description, CCMAS asks the user to provide the data and updates the Project Description.

STEP 1: CCMAS checks the Project Description for the type of work. If it is not found, CCMAS asks:

ENTER TYPE OF WORK:

01 = BUILDING OR RENOVATION
   02 = CIVIL

In response to the user input, CCMAS then asks for the work component within the Type of Work. Within Buildings or Renovation the components are:

ENTER WORK COMPONENT:

01.= COMMERCIAL
      02.= INDUSTRIAL

03 = INSTITUTIONAL
04 = RESEARCH & DEVELOPMENT

For Civil, the components are:

ENTER WORK COMPONENT:

01 = ROADS - SIMPLE
02 = ROADS - HIGHWAY
03 = ROADS - INTERSTATE
04 = OTHER MAJOR CIVIL WORKS

STEP 2: Based on Type of Work, Work Component, and Direct Costs as modified by the Construction Methods Modifier, CCMAS computes and displays the construction project minimum and maximum in months. The user is then asked for the construction duration desired, and to validate project dates input as part of the Project Description.

CALCULATED CONSTRUCTION DURATION IN MONTHS:

MIN DURATION:     15     MAX DURATION:     28

ENTER CONSTRUCTION DURATION:

PROJECT DATES:

START DATE INPUT:     0685

ENTER ANY CHANGE:

NEED DATE INPUT:     0687

ENTER ANY CHANGE:

STEP 3: Using the user provided data and algorithms, CCMAS prepares a schedule divided into three phases, pre-construction, construction, and post-construction. CCMAS then presents the schedule to the user allowing changes in the subelements of each phase.

CONSTRUCTION ACTIVITIES DURATION, MTHS:

|  |  | DEFAULT | USER |  |
|---|---|---|---|---|
|  | PROJECT START DATE |  |  | 0685 |
| 1 = | DESIGN | 05 |  |  |
| 2 = | BIDDING | 03 |  |  |
| 3 = | MOBILIZATION | 01 |  |  |
|  | START CONSTRUCTION |  |  | 0386 |
| 4 = | CONSTRUCTION | 0015-0028 | 18 |  |
|  | MID-POINT OF CONSTRUCTION |  |  | 1286 |
|  | END OF CONSTRUCTION |  |  | 0987 |
| 5 = | CLOSE OUT | 01 |  |  |
| 6 = | MOVE-IN | 01 |  |  |
|  | OPERATIONAL DATE |  |  | 1187 |
|  | AF NEED DATE |  |  | 0687 |

ENTER MENU NUMBER,VALUE; <CR> TO DISPLAY OR EXIT:

The user can thus view the total project schedule, and make adjustments to meet the desired need date.

CCMAS then takes the user to the Definition Modifier.

DEFINITION MODIFIER

The Definition Modifier is a function of Percent Design Complete and the Direct Costs as modified by the Construction Methods Modifier. It accounts for those portions of a project which cannot be directly costed because of incomplete design detail, lack of certainty in the scope, lack of certainty in the implementation schedule, and/or lack of site knowledge STEP 1: CCMAS retrieves the Percent Design Complete from the Project Description and allows the user to change it.

DEFINITION MODIFIER

PERCENT DESIGN COMPLETE:      25

ENTER ANY CHANGE:

STEP 2: CCMAS displays the Modified Direct Cost and the computed Definition Modifier and allows the user to override the computed value.

MODIFIED DIRECT COST                    $12,465,382.00

COMPUTED        USER
DEFINITION MODIFIER FACTOR              1.044

ENTER ANY CHANGE TO USER INPUT:

STEP 3: CCMAS takes the user to the Location Modifier.

LOCATION MODIFIER

The Location Modifier is a function of project location and uses factors to adjust the direct Material, Labor and Equipment costs from the CCMAS data base 144 City National Average to the construction site. Factors can be varied by CSI System. The Location Modifier Factors are retrieved by CCMAS using the GEOLOC from the Project Description or the Construction Method Modifier if the two GEOLOCs are not the same. The GEOLOC cannot be changed in the Location Modifier.

STEP 1: CCMAS displays the two GEOLOCs, then asks the user if they wish to change the Location Modifier factors.

LOCATION MODIFIER

|  | PROJECT DESCRIPTION | MODIFIER SET |
|---|---|---|
| GEOLOC CODE | XLWU | XLWU |
|  | TYNDALL AFB FL | TYNDALL AFB FL |

DO YOU WANT TO CHANGE THE LOCATION MODIFIER FACTORS?

If the user responds "YES", CCMAS takes them to STEP 2. If the user responds "NO", CCMAS takes them to STEP 3.

STEP 2: To a "YES" response at STEP 1, CCMAS presents the Location Modifier Factors and allows the user to modify them.

|   | CSI SYSTEM | MAT (A) | LAB (B) | EQ (C) |
|---|---|---|---|---|
| 1 = | 01 | 1.000 | 1.000 | 1.000 |
| 2 = | 02 | 1.000 | 1.000 | 1.000 |
| 3 = | 03 | 1.000 | 1.000 | 1.000 |
| 4 = | 04 | 1.000 | 1.000 | 1.000 |
| 5 = | 05 | 1.000 | 1.000 | 1.000 |
| 6 = | 06 | 1.000 | 1.000 | 1.000 |
| 7 = | 07 | 1.000 | 1.000 | 1.000 |
| 8 = | 08 | 1.000 | 1.000 | 1.000 |
| 9 = | 09 | 1.000 | 1.000 | 1.000 |
| 10 = | 10 | 1.000 | 1.000 | 1.000 |
| 11 = | 11 | 1.000 | 1.000 | 1.000 |
| 12 = | 12 | 1.000 | 1.000 | 1.000 |
| 13 = | 13 | 1.000 | 1.000 | 1.000 |
| 14 = | 14 | 1.000 | 1.000 | 1.000 |
| 15 = | 15 | 1.000 | 1.000 | 1.000 |
| 16 = | 16 | 1.000 | 1.000 | 1.000 |

ENTER ALL, ROW, COLUMN OR ROW-COLUMN AND VALUE TO CHANGE FACTORS; <CR> TO DISPLAY FACTORS; DONE TO EXIT:

STEP 3: CCMAS takes the user to the Escalation Modifier.

ESCALATION MODIFIER

The Escalation Modifier adjusts the direct construction cost estimate from the CCMAS data base date to the Mid-Point of Construction. The Escalation Modifier draws AF Program Name, Escalation Table Date, and Appropriation from the Project Description, and the Period of Construction from the Schedule Modifier.

STEP 1: CCMAS displays the Escalation Factor data drawn from the Project Description and allows the user to make changes.

ESCALATION MODIFIER

ESCALATION FACTORS TABLE:

AF-PROGRAM-NAME:    BASE YR FY 1986

ENTER ANY CHANGES:

EST-TABLE-DATE:    22 MAR 88

ENTER ANY CHANGES:

APPN:    3300

ENTER ANY CHANGES:

STEP 2: CCMAS retrieves the Project Dates from the Project Description and allows the user to make changes.

CURRENT BASE YEAR:    1088
ENTER ANY CHANGES:

```
CURRENT ESTIMATE YEAR:    1088
ENTER ANY CHANGES:

CURRENT FUNDING YEAR:     1091
ENTER ANY CHANGES:
```

STEP 3: Based on the data in STEPs 1 & 2, CCMAS retrieves the appropriate factors, displays them to the user, and allows the user to override the default factors.

CONSTRUCTION MANAGEMENT MODIFIER

The Construction Management Modifier is a function of the Construction Agent and Type of Construction. The Construction Management Modifier has three primary factors; Contingencies, Supervision Inspection and Overhead (SIOH), and Engineering & Design (E&D) after award. CCMAS also allows two user defined factors in addition to these primary factors.

STEP 1: CCMAS retrieves the Construction Agent data from the Project Description and asks the user for changes.

CONSTRUCTION MANAGEMENT MODIFIER

CURRENT CONST-AGENT ID:   COE

ENTER ANY CHANGE:

```
 1 = AF
 2 = COE
 3 = NAV
```

STEP 2: CCMAS prompts the user for Type of Construction, if this is a new modifier set.

CURRENT CONSTRUCTION TYPE:

ENTER ANY CHANGE:

```
01 = NEW CONSTRUCTION
02 = ADDITIONS
03 = ALTERATIONS
04 = ADDITION/ALTERATION
```

STEP 3: CCMAS displays the default factors and allows the user to override those factors.

CONSTRUCTION MANAGEMENT AGENT:          COE

```
                                     DEFAULT      USER

1 = CONTINGENCY                     0.050
  2 = SIOH                            0.050
  3 = E & D AFTER AWARD               0.005
      USER DEFINED:
  4 = 1.
  5 = 2.
ENTER MENU NUMBER, VALUE; <CR> TO DISPLAY OR EXIT:
```

STEP 4: CCMAS takes the user to the Design Modifier.

```
AF PROGRAM NAME:       BASE YR FY 1986
ESCALATION TABLE DATE: 22 MAR 88
APPROPRIATION CODE:    3300

DATE     DEFAULT    USER

1 = CCMAS COST TABLE                0388     1.000
2 = MID-POINT OF CONSTRUCTION       1286     0.939
3 = PROJECT BASE YEAR               1088     1.023
4 = FUNDING YEAR                    1091     1.111

ENTER MENU NUMBER, VALUE; <CR> TO DISPLAY OR EXIT:
```

STEP 4: CCMAS takes the user to the Construction Management Modifier.

DESIGN MODIFIER

The Design Modifier is a function of the Design Agent and MCP Code. The Design Modifier has two primary factors; Design and Other A/E Fees. CCMAS also allows two user defined factors in addition to these primary factors.

STEP 1: CCMAS retrieves the Design Agent data from the Project Description and asks the user for changes.

```
DESIGN MODIFIER

CURRENT DESIGN-AGENT ID: COE

ENTER ANY CHANGE:

1 = AF
  2 = COE
  3 = NAV
```

STEP 2: CCMAS prompts the user for Design Codes from the Project Description and asks the user for changes.

```
CURRENT DESIGN CODE:

ENTER ANY CHANGE:

01 = MCP
02 = DAR
```

STEP 3: CCMAS displays the default factors and allows the user to override those factors.

```
DESIGN AGENT:     COE

DEFAULT      USER

1 = DESIGN                               0.060
  2 = OTHER A/E FEES                       0.020
      USER DEFINED:
  4 = 1.
  5 = 2.
ENTER MENU NUMBER, VALUE; <CR> TO DISPLAY OR EXIT:
```

STEP 4: CCMAS returns the user to the Build Modifier Sets menu from which the user may either change one or more of the modifiers or enter a <CR> to return to the main menu.

CONTRACTOR MODIFIER SETS

Initial menu item "4" is used to build contractor modifier sets. This modifier is used to estimate the contractors cost of doing business and profit.

The options within build contractor modifier sets are:

01 = COMPARATIVE CONTRACTOR MODIFIER
        02 = GENERIC CONTRACTOR COST MODEL
        03 = QTO CONTRACTOR MODIFIER

COMPARATIVE CONTRACTOR MODIFIER

The Comparative Contractor Modifier develops a single factor which is multiplied times the modified Direct Costs in order to obtain the contractors cost of doing business and profit. The user must have developed both the direct cost estimate and have run the Construction Methods Modifier before this modifier can be prepared.

STEP 1: CCMAS retrieves the type of work from the Project Description and allows the user to change it.

ENTER TYPE OF WORK

B = BUILDING
    C = CIVIL
    CURRENT VALUE:

STEP 2: CCMAS asks a series of questions. The answers are used in the algorithm used to calculate the Contractor Modifier factor. If a current response to the questions exit, the response is also displayed.

1.    RATE THE BIDDING CLIMATE, CURRENT BACKLOG, WORK IN PROGRESS.
           A.    COMPETITIVE, LITTLE WORK
           B.    HEIGHTENED COMPETITION AND DIMINISHING WORK
           C.    NORMAL
           D.    REDUCED COMPETITION, NEAR CAPACITY
           E.    POOR COMPETITION, BOOM TIMES

CURRENT VALUE:
ANSWER:

2.    GIVEN REASONABLE ACCESS, RATE THE CONDITIONS AT THE PROJECT SITE.
           A.    VERY CRAMPED, THOUGH HOISTING
           B.    ENOUGH ROOM, HOISTING PROBLEMS
           C.    AVERAGE LIMITATIONS
           D.    ADEQUATE ROOM, EASY LIFTS
           E.    NO LIMITS, NO LIFTING CONSTRAINTS

CURRENT VALUE:
ANSWER:

3.    RATE THE CONTRACTOR'S FAMILIARITY/BACKGROUND FOR THIS FACILITY.
           A.    LITERALLY ROUTINE/SYSTEMATIC
           B.    ROUTINE WITH SOME UNIQUENESS
           C.    UNIQUE, NOT DONE BEFORE

CURRENT VALUE:
ANSWER:

4.  THE TIME TO PERFORM CONSTRUCTION IS:
    A.  NORMAL, SINGLE SHIFT
    B.  PARTS ARE TIGHT, SOME OVERTIME
    C.  MAJORITY OF OVERTIME (DOUBLE SHIFT) REQUIRED
    D.  CRASHED/MULTIPLE SHIFTS

CURRENT VALUE:
ANSWER:

5.  IS THE TOTAL DIRECT COST:
    A.  GREATER THAN $50 MILLION
    B.  BETWEEN $15 AND $50 MILLION
    C.  BETWEEN $1 AND $15 MILLION
    D.  BETWEEN $0.1 AND $1 MILLION
    E.  LESS THAN $100,000

CURRENT VALUE:
DIRECT COST MODIFIED BY CONSTRUCTION METHOD MODIFIER = $000,000,000
ANSWER:

STEP 3:   CCMAS next shows the user the default values for Workmen's Compensation and percent of the project subcontracted. These values are based upon project location and project size.

|   |                              | DEFAULT | USER |
|---|------------------------------|---------|------|
| 1.| WORKMEN'S COMPENSATION        | 1.07    |      |
|   | (RELATIVE TO US AVG)          |         |      |
| 2.| PORTION OF DIRECT COST        |         |      |
|   | SUBCONTRACTED                 | 0.75    |      |

ENTER MENU NUMBER, VALUE TO CHANGE FACTORS
<CR> TO DISPLAY FACTORS; DONE TO END DISPLAY:

STEP 4:   CCMAS computes the Comparative Contractor Modifier factor, displays it to the user, and allows the user to override.

COMPARATIVE CONTRACTOR MODIFIER FACTOR:    0.317

ENTER USER VALUE OR <CR> TO CONTINUE:

STEP 5: CCMAS calculates the contractor costs and returns the user to the main menu.

GENERIC CONTRACTOR COST MODEL

The Generic Contractor Cost Model consists of six basic models. There are separate models for Buildings or Civil in three separate geographical regions; Continental US (CONUS), developed OCONUS (countries outside the US), and third world OCONUS. CCMAS places the costs developed by these models in System 99 of the CSI WBS.

STEP 1:  CCMAS retrieves the type of work from the Project Description and allows the user to change it.

ENTER TYPE OF WORK
  B = BUILDING
  C = CIVIL
  CURRENT VALUE:

STEP 2: CCMAS asks the user which model to use.

ENTER LOCATION:　　C　　CONUS
　　　　　　　　　　D　　OCONUS, DEVELOPED COUNTRY
　　　　　　　　　　T　　OCONUS, THIRD WORLD COUNTRY
CURRENT VALUE:

STEP 3: CCMAS distributes the Direct Costs, modified with the Construction Methods Modifier among three contractor types; the Prime Contractor, the Major Subcontractor, and the minor Subcontractors using default ratios for the model selected. The user is allowed to override these default ratios.

|  | (A) PRIME CONTRACTOR | | | (B) MAJOR SUBCONTRACTOR | | | (C) MINOR SUBCONTRACTOR | | |
|---|---|---|---|---|---|---|---|---|---|
|  | $(000) | DEF | USER | $(000) | DEF | USER | $(000) | DEF | USER |
| 01 GEN'L REQ | 0 | 100 |  | 0 | 0 |  | 0 | 0 |  |
| 02 SITE WORK | 0 | 85 |  | 0 | 5 |  | 0 | 10 |  |
| 03 CONCRETE | 0 | 85 |  | 0 | 0 |  | 0 | 15 |  |
| 04 MASONRY | 0 | 75 |  | 0 | 5 |  | 0 | 20 |  |
| 05 METALS | 0 | 0 |  | 0 | 100 |  | 0 | 0 |  |
| 06 WOOD/PLASTIC | 0 | 85 |  | 0 | 0 |  | 0 | 15 |  |
| 07 MST,THERMAL | 0 | 30 |  | 0 | 0 |  | 0 | 70 |  |
| 08 DOOR,WINDOW | 0 | 10 |  | 0 | 0 |  | 0 | 90 |  |
| 09 FINISHES | 0 | 25 |  | 0 | 0 |  | 0 | 75 |  |
| 10 SPECIALTIES | 0 | 5 |  | 0 | 5 |  | 0 | 90 |  |
| 11 EQUIPMENT | 0 | 5 |  | 0 | 5 |  | 0 | 90 |  |
| 12 FURNISHINGS | 0 | 0 |  | 0 | 0 |  | 0 | 100 |  |
| 13 SPEC CONSTR | 0 | 5 |  | 0 | 95 |  | 0 | 0 |  |
| 14 CONVY SYSTEM | 0 | 5 |  | 0 | 10 |  | 0 | 85 |  |
| 15 MECHANICAL | 0 | 5 |  | 0 | 95 |  | 0 | 0 |  |
| 16 ELECTRICAL | 0 | 5 |  | 0 | 95 |  | 0 | 0 |  |
| TOTAL | 0 | 0 | 85 | 0 | 7 |  | 0 | 9 |  |

The user can change default values by entering CSI column, value; e.g.,03A,50 changes the ratio for Prime Contractor, CSI 03, to 50%. To exit the user enters "QUIT".

STEP 4: CCMAS next displays the PRE-DETERMINED CONTRACTOR MODEL PARAMETERS. These parameters were developed in other CCMAS modules and cannot be changed here, but are displayed so the user can exit the Contractor Cost Model if they are incorrect.

PRE-DETERMINED CONTRACTOR MODEL PARAMETERS

| PRIME CONTRACTOR | TOTAL DIRECT COST | 0 |
|---|---|---|
|  | TOTAL DIRECT LABOR COST | 0 |
|  | TOTAL DIRECT MATERIAL COST | 0 |
|  | TOTAL DIRECT EQUIPMENT COST | 0 |
| MAJOR SUBCONTRACTOR | TOTAL DIRECT COST | 0 |
|  | TOTAL DIRECT LABOR COST | 0 |
|  | TOTAL DIRECT MATERIAL COST | 0 |
|  | TOTAL DIRECT EQUIPMENT COST | 0 |
| MINOR SUBCONTRACTOR | TOTAL DIRECT COST | 0 |
|  | TOTAL DIRECT LABOR COST | 0 |
|  | TOTAL DIRECT MATERIAL COST | 0 |
|  | TOTAL DIRECT EQUIPMENT COST | 0 |

| FACILITY QUANTITY | 1 |
|---|---|
| UNIT OF MEASURE | LS |
| GEOLOC | FL |

PROJECT DURATION (MONTHS) 19
PROJECT DURATION (WEEKS) 83

ENTER C (CONTINUE), E (EXIT), OR R (RETURN TO RATIOS)

STEP 5: CCMAS next presents the Generic Contractor Cost Model parameters. These parameters may be processed in any order.

ENTER PARAMETER SET TO BE PROCESSED:
```
 1 =   FIELD OFFICE STAFF
 2 =   MAIN OFFICE EXPENSE
 3 =   INSURANCE, BONDS, AND PERMITS
 4 =   TEMPORARY PLANT AND UTILITIES
 5 =   CONSTRUCTION EXPENSES
 6 =   TAXES
 7 =   MOBILIZATION AND DEMOBILIZATION
 8 =   OPERATIONAL EXPENSES
 9 =   PRIME CONTRACTOR PROFIT
10 =   MAJOR SUBCONTRACTOR PROFIT
11 =   MINOR SUBCONTRACTOR PROFIT
12 =   PRIME CONTRACTOR PROFIT ON SUBCONTRACTORS
13 =   DONE
```

The parameter set is selected for processing by entering the menu number. The four profit parameter sets must be processed before continuing with the model. Processing of the other sets is not required. Sets may be processed any number of times. A menu is displayed for each parameter set selected for processing. The menu displays the parameter, default value, and user overrides if entered. A user may simply review the default values and return to the parameter selection menu if overrides are not required..

FIELD OFFICE STAFF:

|  |  | DEFAULT VALUE | USER INPUT |
|---|---|---|---|
| PRIME CONTRACTOR: | | | |
| 01 | SITE PROJECT MANAGER | 0.50 | |
| 02 | SUPERINTENDENT | 1.00 | |
| 03 | CLERKS | 1.00 | |
| 04 | FIELD ENGINEER | 1.00 | |
| 05 | TIME KEEPER | 1.00 | |
| 06 | GENERAL PURPOSE LABORER | 0.50 | |
| MAJOR SUBCONTRACTOR: | | | |
| 07 | SUPERINTENDENT | 0.10 | |
| 08 | CLERKS | 0.10 | |
| 09 | FIELD ENGINEER | 0.45 | |
| 10 | TIME KEEPER | 0.10 | |
| 11 | GENERAL PURPOSE LABORER | 0.25 | |
| MINOR SUBCONTRACTOR: | | | |
| 12 | SUPERINTENDENT | 0.15 | |
| 13 | GENERAL PURPOSE LABORER | 0.10 | |

MAIN OFFICE EXPENSE (% OF DIRECT COST):

|  |  | DEFAULT VALUE | USER INPUT |
|---|---|---|---|
| 01 | PRIME CONTRACTOR | 4.00 | |
| 02 | MAJOR SUBCONTRACTOR | 4.00 | |
| 03 | MINOR SUBCONTRACTOR | 3.50 | |

INSURANCE, BONDS, AND PERMITS

|  | MINIMUM | MAXIMUM | DEFAULT VALUE | USER INPUT |
|---|---|---|---|---|
| ALL CONTRACTORS: | | | | |
| 01 BUILDERS RISK, STANDARD | 0.10% | 0.50% | 0.30% | |
| 02 ALL-RISK TYPE | 0.12% | 0.68% | 0.40% | |
| 03 PUBLIC LIABILITY | 0.50% | 1.25% | 0.82% | |
| 04 SPECIAL BUILDER INSURANCE | | | 0.00% | |
| PRIME CONTRACTOR ONLY: | | | | |
| 05 PERMITS | 0.50% | 2.00% | 0.00% | |

FIELD EXPENSES: TEMPORARY PLANT AND UTILITIES

|  | DEFAULT VALUE | USER INPUT |
|---|---|---|
| PRIME CONTRACTOR: | | |
| 01 TEMPORARY OFFICES, # PER MONTH | 2.00 | |
| 02 TEMPORARY STORAGE FACILITIES, # PER MONTH | 2.00 | |
| 03 SECURITY FENCING, LF | 700.00 | |
| 04 CONSTRUCTION SIGNS, SF | 200.00 | |
| 05 PORTABLE TOILETS, # PER MONTH | 4.00 | |
| 06 TEMPORARY HEAT, WEEKS | 0.00 | |
| MAJOR SUBCONTRACTOR: | | |
| 07 TEMPORARY OFFICES, # PER MONTH | 1.00 | |
| 08 TEMPORARY STORAGE FACILITIES, # PER MONTH | 1.00 | |
| MINOR SUBCONTRACTOR: | | |
| 09 TEMPORARY STORAGE FACILITIES, # PER MONTH | 1.00 | |

FIELD EXPENSES: CONSTRUCTION EXPENSES

|  | DEFAULT VALUE | USER INPUT |
|---|---|---|
| PRIME CONTRACTOR: | | |
| 01 PHOTOGRAPHS, # OF SETS FOR THE PROJECT | 24.00 | |
| 02 SURVEYING EXPENSES, DAYS OF 3 PERSON CREW | 54.00 | |
| 03 WATCHMEN - DAYS PER WEEK | 7.00 | |
| 04 WATCHMEN - HOURS PER SHIFT | 8.00 | |
| 05 WATCHMEN - # WATCHMEN PER SHIFT | 1.00 | |
| 06 WATCHMEN - # SHIFTS PER DAY | 2.00 | |
| 07 CONTINUOUS CLEAN UP, PERSON DAYS PER WEEK | 9.00 | |
| 08 MATERIAL TESTS, TOTAL DOLLARS | 30,000.00 | |
| 09 FINAL CLEAN UP, TOTAL DOLLARS | 12,500.00 | |
| MAJOR SUBCONTRACTOR: | | |
| 10 PHOTOGRAPHS, # OF SETS FOR THE PROJECT | 0.00 | |

TAXES:

|  | DEFAULT VALUE | USER INPUT |
|---|---|---|
| 01 STATE SALES TAX (APPLIED TO MATLS & EQUIP) | 0.00% | |
| NOTE: FL STATE SALES TAX = 5.000% | | |
| 02 LOCAL SALES TAX (APPLIED TO MATLS & EQUIP) | 0.00% | |
| 03 SOCIAL SECURITY TAX | 7.05% | |
| 04 UNEMPLOYMENT TAX | 0.94% | |
| 05 SPECIAL LABOR TAX | 0.00% | |

MOBILIZATION AND DEMOBILIZATION (% OF DIRECT COST):

|  | DEFAULT VALUE | USER INPUT |
|---|---|---|
| PRIME CONTRACTOR: | | |
| 01 PERSONNEL MOBILIZATION | 0.60 | |
| 02 EQUIPMENT MOBILIZATION | 0.70 | |

| | | |
|---|---|---|
| 03 | OFF-SITE CONSTRUCTION CAMP | 2.80 |
| 04 | CONSTRUCTION PLANT | 4.00 |
| 05 | DEMOBILIZATION | 2.30 |

OPERATIONAL EXPENSES (% OF DIRECT COST):

| | | DEFAULT VALUE | USER INPUT |
|---|---|---|---|
| 01 | OFF-SITE CONSTRUCTION CAMP | 1.50 | |
| 02 | CONSTRUCTION PLANT AND EQUIPMENT | 2.00 | |

PROFIT: PRIME CONTRACTOR

| | | DEFAULT VALUE | USER INPUT | CALCULATED WEIGHT |
|---|---|---|---|---|
| 01 | DEGREE OF RISK (1-10) | 5 | | 1.40 |
| 02 | RELATIVE DIFFICULTY OF WORK (1-10) | 5 | | 1.05 |
| 03 | CONTRACTOR'S INVESTMENT (1-10) | 5 | | 0.35 |
| 04 | ASSISTANCE BY THE GOVERNMENT (1-10) | 5 | | 0.35 |
| | PERCENT SUBCONTRACTED | | | 2.59 |
| | SIZE OF JOB | | | 0.45 |
| | PERIOD OF PE' ORMANCE | | | 1.51 |
| | PROFIT PERCENTAGE SUBTOTAL | | | 7.70 |
| 05 | NUMBER OF BIDDERS (2-18) | 7 | | 1.00 |
| 06 | PROFIT PERCENTAGE TOTAL | | | 7.70 |

PROFIT: MAJOR SUBCONTRACTOR

| | | DEFAULT VALUE | USER INPUT | CALCULATED WEIGHT |
|---|---|---|---|---|
| 01 | DEGREE OF RISK (1-10) | 5 | | 1.40 |
| 02 | RELATIVE DIFFICULTY OF WORK (1-10) | 5 | | 0.35 |
| 03 | LOCATION (1-10) | 5 | | 0.35 |
| 04 | LOCAL ECONOMIC CONDITIONS (1-10) | 5 | | 2.10 |
| 05 | EQUIPMENT REQUIREMENTS (1-10) | 5 | | 0.70 |
| 06 | PERIOD OF PERFORMANCE (1-24 MONTHS) | 12 | | 1.10 |
| | SIZE OF JOB | | | 1.05 |
| 07 | PROFIT PERCENTAGE TOTAL | | | 7.05 |

PROFIT: MINOR SUBCONTRACTOR

| | | DEFAULT VALUE | USER INPUT | CALCULATED WEIGHT |
|---|---|---|---|---|
| 01 | DEGREE OF RISK (1-10) | 5 | | 1.40 |
| 02 | RELATIVE DIFFICULTY OF WORK (1-10) | 5 | | 0.35 |
| 03 | LOCATION (1-10) | 5 | | 0.35 |
| 04 | LOCAL ECONOMIC CONDITIONS (1-10) | 5 | | 2.80 |
| 05 | EQUIPMENT REQUIREMENTS (1-10) | 5 | | 0.70 |
| 06 | PERIOD OF PERFORMANCE (1-24 MONTHS) | 6 | | 0.74 |
| | SIZE OF JOB | | | 0.25 |
| 07 | PROFIT PERCENTAGE TOTAL | | | 6.59 |

PROFIT: PRIME CONTRACTOR ON SUBS

| | | DEFAULT VALUE | USER INPUT | CALCULATED WEIGHT |
|---|---|---|---|---|
| 01 | DEGREE OF RISK (1-10) | 5 | | 0.50 |
| 02 | MARKET CONDITIONS (1-10) | 5 | | 1.00 |

|  |  |  |
|---|---|---|
| PERCENT SUBCONTRACTED | | 2.09 |
| AMOUNT SUBCONTRACTED | | 1.35 |
| 03 PROFIT PERCENTAGE TOTAL | | 4.94 |

STEP 6: CCMAS, when parameter processing is complete, asks the user:

DO YOU WANT TO PERFORM CALCULATIONS?

A "NO" response exits the user from the model to the main menu. To a "YES" response, CCMAS calculates assembly quantities and, when calculations are complete, asks the user if they want to review/edit assembly category quantities.

CALCULATING ASSEMBLY CATEGORY QUANTITIES
CALCULATIONS COMPLETE

DO YOU WANT TO EDIT/REVIEW ASSEMBLY CATEGORY QUANTITIES?

A "NO" response takes the user to STEP 7. To A "YES" response CCMAS prompts:

ENTER HIERARCHY OR "ALL"

The hierarchy response is System 99 and the appropriate Subsystem, e.g, if 9904 is entered CCMAS responds:

SYSTEM: 99 CONTRACTOR OVERHEAD AND PROFIT
SUBSYSTEM: 04 PRIME CONTRACTOR FIELD EXPENSES

| AC | TITLE | UM | CALCULATED QUANTITY | USER QUANTITY |
|---|---|---|---|---|
| 01 | TEMPORARY OFFICES | MONTH | 38.00 | |
| 02 | TEMPORARY STORAGE FACILITIES | MONTH | 38.00 | |
| 03 | SECURITY FENCING | LF | 700.00 | |
| 04 | CONSTRUCTION SIGNS | SF | 200.00 | |
| 05 | PORTABLE TOILETS | MONTH | 76.00 | |
| 06 | TEMPORARY HEAT | CSF | 0.00 | |
| 07 | TEMPORARY LIGHTING | CSF | 0.00 | |
| 08 | TEMPORARY ELECTRIC POWER | CSF | 0.00 | |
| 09 | SMALL TOOLS | LS | 34,635.96 | |
| 10 | TEMPORARY ELECTRIC POWER | CSF | 8,196.76 | |

ENTER: AC, QUANTITY; <CR> TO CONTINUE; OR "DONE" TO EXIT.

STEP 7: CCMAS calculates Assembly quantities and asks a user if they wish to edit or review the quantities.

CALCULATING ASSEMBLY QUANTITIES
CALCULATIONS COMPLETE

DO YOU WANT TO EDIT/REVIEW ASSEMBLY QUANTITIES?

A "NO" response takes the user to STEP 8. To A "YES" response CCMAS prompts:

ENTER HIERARCHY OR "ALL"

The hierarchy response is System 99, appropriate Subsystem, and the desired Assembly Category e.g, if 990401 is entered CCMAS responds:

```
SYSTEM:     99    CONTRACTOR OVERHEAD AND PROFIT
SUBSYSTEM:       04    PRIME CONTRACTOR FIELD EXPENSES
ASSEMBLY CATEGORY:   01    TEMPORARY OFFICES

CALCULATED   USER
ASSM TITLE                        UM          QUANTITY     QUANTITY
0101 TEMPORARY OFFICE 20' X 8'    MONTH           0.00
0102 TEMPORARY OFFICE 32' X 8'    MONTH           0.00
0103 TEMPORARY OFFICE 50' X 10'   MONTH          38.00
0104 TEMPORARY OFFICE 50' X 12'   MONTH           0.00
```

ENTER: ASSM,QUANTITY; <CR> TO CONTINUE; OR DONE TO EXIT.

NOTE: The Generic Contractor Cost Model, like the Generic Systems model, displays both the used and unused assemblies for each assembly category, thus allowing the user to make changes easily.

STEP 8: CCMAS calculates the line item quantities and asks the user if they wish to display those quantities. *The user can't change the line item quantities without copying the model results into the QTO.*

CALCULATING LINE-ITEM QUANTITIES
CALCULATIONS COMPLETE

DO YOU WISH TO DISPLAY LINE ITEM QUANTITIES?

A "NO" response takes the user to STEP 9. To A "YES" response CCMAS prompts:

ENTER HIERARCHY OR "ALL"

Hierarchy response, as before, is System 99, Subsystem, and the desired Assembly Category, e.g, if 990401 is entered CCMAS responds:

```
SYSTEM:     99    CONTRACTOR OVERHEAD AND PROFIT
SUBSYSTEM:       04    PRIME CONTRACTOR FIELD EXPENSES
ASSEMBLY CATEGORY:   01    TEMPORARY OFFICES
ASSEMBLY: 0103 TEMPORARY OFFICE 50' X 10'

LINE-ITEM         TITLE                                    UM    QUANTITY
011584400M    TEMP CONST OFFTRLR NOHKUP 50X10 RNT/M
                                                           EA      38.0
011584460M    TEMP CNSTR OFC TRLR AIRCOND RENT AD
                                                           EA      38.0
```

ENTER <CR> TO CONTINUE; "DONE" TO EXIT

STEP 9: CCMAS calculates line item costs, and displays profit calculations to the user.

CALCULATING LINE-ITEM COSTS
CALCULATIONS COMPLETE

CALCULATING PROFIT
PRIME CONTRACTOR PROFIT          $         0.00
PRIME PROFIT ON SUBCONTRACTORS   $         0.00
MAJOR SUBCONTRACTOR PROFIT       $         0.00
MINOR SUBCONTRACTOR PROFIT       $         0.00
CALCULATIONS COMPLETE

CCMAS returns the user to the initial menu.

CALCULATE CONSTRUCTION COSTS

Initial menu item "5" is selected to calculate construction costs. Construction costs are calculated by CCMAS based on CCMAS-ID, the Run #, and the Set #. In response to initial menu item "5", CCMAS asks:

ENTER PROGRAM, PROJECT, FACILITY-ID (CCMAS-ID):

A user has the same options shown in PROGRAM DESCRIPTION, STEP 1.

After entering the CCMAS-ID, CCMAS asks for the Run #:

ENTER RUN NUMBER:

A user may either enter the desired run number, or enter "M" for menu to obtain a list of the available run numbers.

After entering the Run #, CCMAS asks for the Set #:

ENTER SET NUMBER:

A user may either enter the desired set number, or enter "M" for menu to obtain a list of the available set numbers.

With these items CCMAS proceeds to calculate construction costs, and returns the user to the initial menu when done.

CALCULATING CONSTRUCTION COSTS

CALCULATIONS COMPLETE

REPORTS

Initial menu item "6" is selected to obtain CCMAS reports. CCMAS responds to this item by providing the user with a list of report types.

ENTER REPORT:

01 = ESTIMATORS DETAIL FACILITY REPORT - SUMMARY
   02 = ESTIMATORS DETAIL FACILITY REPORT - SYSTEM
   03 = ESTIMATORS DETAIL FACILITY REPORT - SUBSYSTEM
   04 = ESTIMATORS DETAIL FACILITY REPORT - ASSEMBLY
   05 = ESTIMATORS DETAIL FACILITY REPORT - CSI LINE-ITEM
   06 = 1178 REPORT - PROJECT COST ESTIMATE SUMMARY

After the user selects the report type desired, CCMAS asks for data on how to prepare the report.

ENTER COST-YEAR

01 = BASE YEAR
   02 = ESTIMATE YEAR
   03 = FUNDING YEAR
   04 = MID-POINT OF CONSTRUCTION

ENTER DATA FOR ESTIMATE 1

ENTER PROGRAM, PROJECT, FACILITY-ID (CCMAS-ID):

ENTER RUN NUMBER:

ENTER SET NUMBER:

NOTE: For the ESTIMATORS DETAIL FACILITY REPORT at the
   System, Subsystem, Assembly, and CSI Line Item levels,
   the user in also asked to provide the following:

ENTER TYPE COST:

01 = DIRECT COSTS
   02 = CONSTRUCTION COSTS

Report format samples are provided in the following pages.

ESTIMATORS DETAIL FACILITY REPORT - SUMMARY

```
HQ AFESC/DEC       PREPARED BY:                    DATE:          QTO COST TABLE AS OF:        PAGE 1
  PROGRAM-ID:                  PROJECT-ID:            FACILITY-ID:        RUN #:    SET #:
FACILITY QUANTITY:           UM:     WBS:         COSTS CALCULATED FOR:
                                   EXPECTED VALUE                      LOW RISK VALUE
                   $/FAC QTY       COST (000)     PERCENT    $/FAC QTY    COST (000)    PERCENT
```
-----------------------------------------------------------------------

TOTAL DIRECT COST
CONTRACTOR MODIFIER
CONSTRUCTION METHODS MODIFIER
DEFINITION MODIFIER
LOCATION MODIFIER
ESCALATION TO:

CONSTRUCTION COST

CONTINGENCY
SIOH
ENGINEERING & DESIGN

CONSTRUCTION MGT COST

TOTAL MCP COST

DESIGN
   OTHER A/E FEES

DESIGN MODIFIER COST

PROJECT COST

ESTIMATORS DETAIL FACILITY REPORT - SYSTEM

```
HQ AFESC/DEC      PREPARED BY:                    DATE:          QTO COST TABLE AS OF:        PAGE 1
  PROGRAM-ID:                  PROJECT-ID:            FACILITY-ID:        RUN #:   SET #:
FACILITY QUANTITY:           UM:     WBS:         COSTS CALCULATED FOR:
SYSTEM           QTY   $ MAT    $ LAB    $ EQ   $ TOTAL  $/SYS QTY  % TOT   $/FAC QTY   TOT MH  TOT EH
DESCRIPTION      UM   (000)    (000)   (000)   (000)
```
-----------------------------------------------------------------------

SYSTEM 01 SUBSTRUCTURE
      XXXXXXX   SF   0000.0   0000.0  0000.0  0000.0    00.00     00.0%    00.00      0000    0000

SYSTEM 02 SUPERSTRUCTURE
      XXXXXXX   SF   0000.0   0000.0  0000.0  0000.0    00.00     00.0%    00.00      0000    0000

.
   .
   .

| | | | | | | | | |
|---|---|---|---|---|---|---|---|---|
| ====== | ====== | ====== | ====== | ==== | ===== | ==== | ==== | |
| FACILITY TOTAL (000) | 0000.0 | 0000.0 | 0000.0 | 0000.0 | | 00.0% | 00.00 | 0000 | 0000 |
| PERCENT OF TOTAL | 00.0% | 00.0% | 00.0% | | | | | | |

ESTIMATORS DETAIL FACILITY REPORT – SUBSYSTEM

```
HQ AFESC/DEC       PREPARED BY:                      DATE:           QTO COST TABLE AS OF:        PAGE 1
   PROGRAM-ID:                   PROJECT-ID:           FACILITY-ID:          RUN #:    SET #:
FACILITY QUANTITY:          UM:       WBS:        COSTS CALCULATED FOR:
SYSTEM  SUBSYSTEM   $ MAT    $ LAB     $ EQ    $ TOTAL  $/SYS QTY  % TOT   $/FAC QTY  TOT MH  TOT EH
DESCRIPTION         (000)    (000)    (000)    (000)
-------------------------------------------------------------------------------------------------------

SYSTEM 01 SUBSTRUCTURE                                 SYSTEM QTY:    XXXXXX     UM:  SF
   SUBSYSTEM 01 STANDARD FOUNDATIONS
                    0000.0   0000.0   0000.0   0000.0    00.00       00.0%      00.00     0000    0000
   SUBSYSTEM 02 SPECIAL FOUNDATION CONDITIONS
                    0000.0   0000.0   0000.0   0000.0    00.00       00.0%      00.00     0000    0000
                    ------   ------   ------   ------    -----       -----      -----     ----    ----
SYSTEM 01 TOTAL (000) 0000.0 0000.0   0000.0   0000.0    00.00       00.0%      00.00     0000    0000
PERCENT OF SYSTEM TOTAL  00.0%  00.0%   00.0%
```

| | | | | | | | | |
|---|---|---|---|---|---|---|---|---|
| ====== | ====== | ====== | ====== | ==== | ===== | ==== | ==== | |
| FACILITY TOTAL (000) | 0000.0 | 0000.0 | 0000.0 | 0000.0 | | 00.0% | 00.00 | 0000 | 0000 |
| PERCENT OF TOTAL | 00.0% | 00.0% | 00.0% | | | | | | |

ESTIMATORS DETAIL FACILITY REPORT – ASSEMBLY

```
HQ AFESC/DEC       PREPARED BY:                      DATE:           QTO COST TABLE AS OF:        PAGE 1
   PROGRAM-ID:                   PROJECT-ID:           FACILITY-ID:          RUN #:    SET #:
FACILITY QUANTITY:          UM:       WBS:        COSTS CALCULATED FOR:
SYSTEM  SUBSYSTEM   $ MAT    $ LAB     $ EQ    $ TOTAL  $/SYS QTY  % TOT   $/FAC QTY  TOT MH  TOT EH
ASSEMBLY DESCRIPTION (000)   (000)    (000)    (000)
-------------------------------------------------------------------------------------------------------

SYSTEM 01 SUBSTRUCTURE

SYSTEM 05 INTERIOR CONSTRUCTION
SUBSYSTEM 01 PARTITIONS
ASSEMBLY CATEGORY:  01 FIXED PARTITIONS
0101 NON-LOAD BRG PARTITION - 16" O.C.
              5000  0000.0   0000.0   0000.0   0000.0    00.00       00.0%      00.00     0000    0000
0102 NON-LOAD BRG PARTITION - 24" O.C.
               400  0000.0   0000.0   0000.0   0000.0    00.00       00.0%      00.00     0000    0000
0103 SHIEDED PARTITION WITH LEAD LINED GYPSUM BOARD
                50  0000.0   0000.0   0000.0   0000.0    00.00       00.0%      00.00     0000    0000
0104 10' NON-LOAD BRG PARTITION - 24" O.C.
               200  0000.0   0000.0   0000.0   0000.0    00.00       00.0%      00.00     0000    0000
                    ------   ------   ------   ------    -----       -----      -----     ----    ----
SUBSYSTEM 01 TOTAL (000) 0000.0 0000.0 0000.0  0000.0    00.00        0.0%      00.00     0000    0000
PERCENT OF SYSTEM TOTAL  00.0%   00.0%   00.0%

SYSTEM 05 TOTAL (000)  0000.0  0000.0  0000.0   0000.0   00.00       00.0%      00.00     0000    0000
PERCENT OF SYSTEM TOTAL  00.0%   00.0%   00.0%
```

| | | | | | | | | |
|---|---|---|---|---|---|---|---|---|
| ====== | ====== | ====== | ====== | ==== | ===== | ==== | ==== | |
| FACILITY TOTAL (000) | 0000.0 | 0000.0 | 0000.0 | 0000.0 | | 00.0% | 00.00 | 0000 | 0000 |
| PERCENT OF TOTAL | 00.0% | 00.0% | 00.0% | | | | | | |

LIFE CYCLE COST DATA

Initial menu item "7" is selected to build Life Cycle Costs Data (LCC). The user must create the construction costs from initial menu items "1" through "5" before running Life Cycle Cost Data.

The options within Life Cycle Cost Data are:

LCC COST MODEL OPTIONS

1   CREATE/EDIT AN LCC RUN
2   GENERATE LCC REPORTS
3   QUIT LCC PROCESS

Option 1, Create/Edit and LCC Run, is the first phase of the process.

STEP 1: The user is prompted to select the desired option within Phase 1.

AVAILABLE LCC PHASE I OPTIONS

1   EDIT EXISTING
2   CREATE NEW FROM SCRATCH
3   CREATE NEW FROM COPY
4   QUIT LCC PHASE I OPTIONS

For a new LCC run the user selects option 2.

STEP 2: The user is promted to enter the CCMAS-ID of the construction cost run and modifier set number. A user may enter "M" for menu to be taken through a series of menus to see all of the existing construction cost run and set combinations on the system.

ENTER PROGRAM, PROJECT, FACILITY (CCMAS-ID):

ENTER RUN NUMBER:    0

ENTER SET NUMBER:    0

STEP 3: For a new LCC run the system assigns the next available LCC run number and displays it to the user and asks for a run number comment.

NEXT LCC RUN NUMBER IS --> X

ENTER LCC RUN COMMENT:

Up to 99 runs can be made for each construction cost run and set combination.? lcc sample run STEP 4: The user is prompted by the system to specify if the LCC Run will be for a new or existing facility.

MODEL NEW OR EXISTING STRUCTURE? (DEFAULT IS NEW)

The LCC module will create LCC cost for either a new or existing facility. In the existing facility run, the user identifies the age of the facility components. The system then assumes there is no construction costs and starts the LCC costs at the year specified for each component.

STEP 5: The user is prompted to either accept the default economic variable information or to provide user specified information.

```
            *** ECONOMIC VARIABLE INFORMATION ***
                    DISCOUNT RATE DEFAULTS
```

DEFAULT RATE TYPE: REAL

ENTER 'NOMINAL', 'REAL', OR <CR> TO ACCEPT DEFAULT

DEFAULT DISCOUNT RATE: 10%

ENTER RATE (I.E. 40) OR <CR> TO ACCEPT DEFAULT

The system will accept any rate.

ENTER LENGTH OF STUDY PERIOD (99 YEARS MAX):

The system gets the construction start from the construction cost run as the default construction start year for the study, displays it to the user, and allows the user to change it if necessary.

INITIAL YEAR OF CONSTRUCTION IS: 1989

ENTER START OF CONSTRUCTION YEAR OR <CR> TO ACCEPT:

The system next asks for the first year of occupancy for the Operations and Maintenance cost portion of the LCC_run.

ENTER PROJECT OCCUPANCY YEAR:

The system asks for the present value year to use for the study.

ENTER PRESENT VALUE YEAR (I.E. 1987):

STEP 6: The system retrieves current labor rates based on the loction of the project, displays them to the user, and allows the user to modify them as required.

```
                        *LABOR RATES*

MENU NO          LABOR CATEGORY           RATE

1      =    ENGINEERING & CONSTR       14.00
           2      =    LABOR CATEGORY B           14.00
           3      =    PAVEMENTS & GROUND         12.50
           4      =    STRUCTURES                 13.00
           5      =    MECHANICAL                 13.00
           6      =    ELECTRICAL                 15.00
           7      =    POWER PRODUCTION           15.00
           8      =    SANITATION                 12.50
```

STEP 7: The system calculates energy use based on the facility type, size, location, and occupancy. Presents it to the user and allows the user to override the value.

TOTAL BUILDING-RELATED ENERGY USE IS:   119999 MBTU'S

ENTER NEW VALUE OR <CR> TO ACCEPT:

The system distributes the energy using a default use pattern based on facility type, size, and location. The user can modify the usage and energy rates retrieved from the system based on the location. The user can also enter additional energy usage not accounted for by the typical facility of the type chosen.

| NO | ENERGY SOURCE | QTY | ENERGY TYPE (*) | RATE | UM |
|----|---------------|-----|-----------------|------|-----|
| 1 = | HEAT | 591304 | NAT GAS | 42.8490 | MCF |
| 2 = | A/C | 9493114 | ELECTRIC | .1259 | KWH |
| 3 = | FANS & LIGHTS | 7735130 | ELECTRIC | .1259 | KWH |
| 4 = | USER DEF 1 | | | .0000 | |
| 5 = | USER DEF 2 | | | .0000 | |
| 6 = | USER DEF 3 | | | .0000 | |
| 7 = | USER DEF 4 | | | .0000 | |

(*) VALID ENERGY TYPES: ELECTRICITY (E), NATURAL GAS (N), DISTILLATE FUEL OIL (D), RESIDUAL FUEL OIL (R), CENTRAL STEAM (C), ANTHROCITE COAL (A), BITUMINOUS COAL (B), LPG

TO CHANGE VALUE ENTER MENU#, QUANTITY, ENERGY,TYPE, RATE, AND (RATE DESCRIPTION--USER DEF) OR <CR> TO QUIT (NOTE: IF NO CHANGE TO AN ITEM, ENTER A BLANK -- E.G. 1,,ELECTRIC,2.54)

STEP 8: The system allows the user to review and modify the default escalation rates for construction, operations and maintenance, and energy source.

DO YOU WISH TO REVIEW INFLATION RATES? (Y/N)

If "NO" the user goes to STEP 9. If "YES" the system displays:

*CONSTRUCTION/O&M INFLATION RATES*

| ITEM | YEAR | CONSTR | O&M |
|------|------|--------|------|
| 1 | 1989 | 1.104 | 1.104 |
| 2 | 1990 | 1.141 | 1.141 |
| 3 | 1991 | 1.174 | 1.174 |
| 4 | 1992 | 1.202 | 1.202 |
| 5 | 1993 | 1.231 | 1.231 |
| 6 | 1994 | 1.261 | 1.261 |
| 7 | 1995 | 1.291 | 1.291 |
| 8 | 1996 | 1.322 | 1.322 |
| 9 | 1997 | 1.353 | 1.353 |
| 10 | 1998 | 1.386 | 1.386 |
| 11 | 1999 | 1.419 | 1.419 |
| 12 | 2000 | 1.453 | 1.453 |
| 13 | 2001 | 1.488 | 1.488 |
| 14 | 2002 | 1.524 | 1.524 |
| 15 | 2003 | 1.560 | 1.560 |

ENTER ITEM #, CONSTRUCTION RATE, O&M RATE OR <CR> TO QUIT:

*ENERGY INFLATION RATES*

| ITEM NO | YEAR | ELEC | NAT GAS | DIST FUEL | RESID FUEL | STEAM | LPG COAL |
|---|---|---|---|---|---|---|---|
| 1 | 1989 | 1.14 | 1.21 | 1.26 | 1.20 | 1.09 | 1.09 |
| 2 | 1990 | 1.14 | 1.28 | 1.35 | 1.30 | 1.12 | 1.13 |
| 3 | 1991 | 1.13 | 1.40 | 1.43 | 1.35 | 1.13 | 1.16 |
| 4 | 1992 | 1.14 | 1.54 | 1.52 | 1.42 | 1.15 | 1.18 |
| 5 | 1993 | 1.18 | 1.66 | 1.59 | 1.50 | 1.21 | 1.22 |
| 6 | 1994 | 1.16 | 1.76 | 1.68 | 1.57 | 1.27 | 1.27 |
| 7 | 1995 | 1.17 | 1.83 | 1.77 | 1.67 | 1.31 | 1.31 |
| 8 | 1996 | 1.18 | 1.93 | 1.86 | 1.75 | 1.36 | 1.37 |
| 9 | 1997 | 1.19 | 2.01 | 1.95 | 1.82 | 1.40 | 1.43 |
| 10 | 1998 | 1.19 | 2.09 | 2.02 | 1.90 | 1.45 | 1.49 |
| 11 | 1999 | 1.20 | 2.17 | 2.10 | 1.96 | 1.50 | 1.54 |
| 12 | 2000 | 1.21 | 2.23 | 2.15 | 2.02 | 1.54 | 1.58 |
| 13 | 2001 | 1.22 | 2.33 | 2.26 | 2.11 | 1.59 | 1.65 |
| 14 | 2002 | 1.22 | 2.44 | 2.37 | 2.22 | 1.64 | 1.73 |
| 15 | 2003 | 1.23 | 2.56 | 2.47 | 2.32 | 1.70 | 1.82 |

ENTER ITEM #, ELECTRIC RATE, NAT GAS RATE, DISTILLATE FUEL RATE, RESIDUAL FUEL RATE, STEAM/COAL RATE, LPG RATE --- OR HIT <CR> TO QUIT

STEP 9: The system shows the user the facility size as the default area to be cleaned and allows adjustments to the size, rate, and number of days cleaned per week.

THE AREA TO BE CLEANED IS: 120000 SQUARE FEET

ENTER NEW AREA OR <CR> TO ACCEPT:

FREQUENCY OF CLEANING: 6 (TIMES/WEEK)

DO YOU WANT TO ACCEPT THIS VALUE? (Y/N)

THE CLEANING RATE IS: 0.0351 ($/SQFT/CLEANING)

DO YOU WANT TO ACCEPT THIS VALUE? (Y/N)

STEP 10: The system asks for the salvage rate to use for the study.

ENTER SALVAGE VALUE (% OF ORIGINAL VALUE) AT END OF STUDY:

STEP 11: The system prompts the user to enter financing options used for construction and operation and maintenance. This allows comparison of various options for financing the facility. The user selects the type of loan, rate, and points paid as well as the period and number of payments per period.

DO YOU HAVE FINANCING? (Y/N)

If the user responds "NO" then the system takes the user to STEP 13. IF a "YES" response is given then the system prompts the user for inputs to the econometric package.

STEP 13: The system takes all of the inputs and calculates the LCC costs at the Element level of detail for each item in the facility.

```
***************************************************************
*                                                             *
*       THIS IS THE END OF THE USER-INPUT SEGMENT             *
*                                                             *
*=============================================================*
*                                                             *
*                     NOTE:                                   *
*                                                             *
*   PLEASE WAIT --- BUILDING ITEM-QUANTITY TABLE AND          *
*                   CALCULATING CONSTANT $ COSTS              *
*                                                             *
***************************************************************
```

The system returns the user to the LCC Data menu to select the reports to be printed.

Option 2, Generate LCC Reports, is the second phase of the process.

STEP 1: The user is promted to enter the CCMAS-ID of the construction cost run and modifier set number. A user may enter "M" for menu to be taken through a series of menus to see all of the existing construction cost run and set combinations on the system.

ENTER PROGRAM, PROJECT, FACILITY (CCMAS-ID):

ENTER RUN NUMBER:    0

ENTER SET NUMBER:    0

STEP 2: The user can elect to apply life stages modifiers to adjust the initial break-in and final end-of-life costs.

USE LIFE STAGES MODIFIERS (DEFAULT : NO)?

RPT NO      REPORT TITLE                    PRINT OPTION

01  =      FACILITY-LEVEL COST
 02  =      SYSTEM-LEVEL COST
 03  =      SUBSYSTEM-LEVEL COST
 04  =      ASSEMBLY-LEVEL COST
 05  =      ASSEMBLY ANNUAL COST
 06  =      DBA REPORT (LARGE!!!)

TO SELECT A REPORT ENTER          :   ITEM NO
TO DELETE A SELECTION ENTER       :   ITEM NO,D
TO SELECT REPORTS 1 - 5 ENTER     :   ALL
TO CONTINUE PROCESSING ENTER      :   <CR>

Asterisks appear in the print option column to denote which reports have been selected.

STEP 3: After selecting the reports, the system asks the user whether the reports should show present or inflated costs.

WOULD YOU LIKE THE COSTS:

1 = ACTUAL/INFLATED (DEFAULT)
    2 = PRESENT VALUE

With the response to this question the user is returned to the LCC Option menu to perform additional LCC costing or exit to the main CCMAS menu.

```
                                          FACILITY LEVEL REPORT
   HQ AFESC/DEC              PREPARED BY:                            DATE: 07/27/89        PAGE:  1
   PROGRAM ID: AFLC          PROJECT ID: ROBIN                       FACILITY ID: F15
   RUN NUMBER:  01           SET NUMBER:  01                         LCC RUN NUMBER: 06
                             COSTS CALCULATED ARE:  ACTUAL (INFLATED)
===============================================================================================
===============================================================================================

*** ECONOMIC VARIABLE INFORMATION ***

RATE TYPE:                  REAL
   DISCOUNT RATE:              10.00       %
   STRUCTURE TYPE:             NEW
   STUDY PERIOD:               015
   INITIAL YEAR OF STUDY:      1989
   OCCUPANCY YEAR:             1991
   PRESENT VALUE YEAR:         1989

*LABOR RATES*

MENU NO     LABOR CATEGORY        RATE

1   =  ENGINEERING & CONSTR    14.00
   2   =  LABOR CATEGORY B        14.00
   3   =  PAVEMENTS & GROUND      12.50
   4   =  STRUCTURES              13.00
   5   =  MECHANICAL              13.00
   6   =  ELECTRICAL              15.00
   7   =  POWER PRODUCTION        15.00
   8   =  SANITATION              12.50

*** ENERGY SOURCE INFORMATION***

BUILDING ENERGY USE:              000119999999     MBTU'S

NO     ENERGY          QTY           ENERGY         RATE      UM
       SOURCE                        TYPE (*)

1 = HEAT            591304.00      NAT GAS        42.8490    MCF
2 = A/C            9493114.00      ELECTRIC         .1259    KWH
3 = FANS & LIGHT   7735130.00      ELECTRIC         .1259    KWH
4 = USER DEF 1           .00                        .0000
5 = USER DEF 2           .00                        .0000
6 = USER DEF 3           .00                        .0000
7 = USER DEF 4           .00                        .0000

FACILITY LEVEL REPORT
   HQ AFESC/DEC              PREPARED BY:                            DATE: 07/27/89        PAGE:  2
   PROGRAM ID: AFLC          PROJECT ID: ROBIN                       FACILITY ID: F15
   RUN NUMBER:  01           SET NUMBER:  01                         LCC RUN NUMBER: 06
                             COSTS CALCULATED ARE:  ACTUAL (INFLATED)
===============================================================================================
===============================================================================================

*** INFLATION INFORMATION***

FEDERAL REGION CODE:         01            (ME, MASS, NH)

CONSTRUCTION/O&M INFLATION RATES ==>

ITEM    YEAR      CONSTR         O&M 1     1989      1.104         1.104
  2     1990      1.141         1.141
  3     1991      1.174         1.174
  4     1992      1.202         1.202
  5     1993      1.231         1.231
  6     1994      1.261         1.261
  7     1995      1.291         1.291
  8     1996      1.322         1.322
  9     1997      1.353         1.353
 10     1998      1.386         1.386
 11     1999      1.419         1.419
 12     2000      1.453         1.453
 13     2001      1.488         1.488
 14     2002      1.524         1.524
 15     2003      1.560         1.560
```

```
HQ AFESC/DEC                  PREPARED BY:            FACILITY LEVEL REPORT     DATE:  07/27/89          PAGE:   3
PROGRAM ID:  AFLC             PROJECT ID:  ROBIN                                FACILITY ID:  F15
RUN NUMBER:  01               SET NUMBER:  01                                   LCC RUN NUMBER: 06
                              COSTS CALCULATED ARE:  ACTUAL (INFLATED)
```

ENERGY INFLATION RATES ==>

| ITEM NO | YEAR | ELEC | NAT GAS | DIST FUEL | RESID FUEL | STEAM COAL | LPG |
|---|---|---|---|---|---|---|---|
| 1  | 1989 | 1.14 | 1.21 | 1.26 | 1.20 | 1.09 | 1.09 |
| 2  | 1990 | 1.14 | 1.28 | 1.35 | 1.30 | 1.12 | 1.13 |
| 3  | 1991 | 1.13 | 1.40 | 1.43 | 1.35 | 1.13 | 1.16 |
| 4  | 1992 | 1.14 | 1.54 | 1.52 | 1.42 | 1.15 | 1.18 |
| 5  | 1993 | 1.18 | 1.66 | 1.59 | 1.50 | 1.21 | 1.22 |
| 6  | 1994 | 1.16 | 1.76 | 1.68 | 1.57 | 1.27 | 1.27 |
| 7  | 1995 | 1.17 | 1.83 | 1.77 | 1.67 | 1.31 | 1.31 |
| 8  | 1996 | 1.18 | 1.93 | 1.86 | 1.75 | 1.36 | 1.37 |
| 9  | 1997 | 1.19 | 2.01 | 1.95 | 1.82 | 1.40 | 1.43 |
| 10 | 1998 | 1.19 | 2.09 | 2.02 | 1.90 | 1.45 | 1.49 |
| 11 | 1999 | 1.20 | 2.17 | 2.10 | 1.96 | 1.50 | 1.54 |
| 12 | 2000 | 1.21 | 2.23 | 2.15 | 2.02 | 1.54 | 1.58 |
| 13 | 2001 | 1.22 | 2.33 | 2.26 | 2.11 | 1.59 | 1.65 |
| 14 | 2002 | 1.22 | 2.44 | 2.37 | 2.22 | 1.64 | 1.73 |
| 15 | 2003 | 1.23 | 2.56 | 2.47 | 2.32 | 1.70 | 1.82 |

* CLEANING INFORMATION *

```
THE AREA TO BE CLEANED IS:      00000120000      SQUARE FEET
FREQUENCY OF CLEANING:          06               (TIMES/WEEK)
CLEANING RATE IS:               .0351            ($/SQFT/CLEANING)
```

* SALVAGE VALUE INFORMATION *

SALVAGE VALUE:                  10.00            %

```
HQ AFESC/DEC                  PREPARED BY:            FACILITY LEVEL REPORT     DATE:  07/27/89          PAGE:   4
PROGRAM ID:  AFLC             PROJECT ID:  ROBIN                                FACILITY ID:  F15
RUN NUMBER:  01               SET NUMBER:  01                                   LCC RUN NUMBER: 06
                              COSTS CALCULATED ARE:  ACTUAL (INFLATED)
```

*SNAPSHOT OF T207 BASED ON GEOLOC*

```
GEOLOC:                    XLWU
STATE COUNTRY CODE:        FL
GEOLOC DESCRIPTION:        TYNDALL AFB
DESIGN AGENT ID:           COE
CONST AGENT ID:            COE
SEISMIC ZONE:              0
HEAT INSULATION ZONE:      C
AC WEATHER ZONE:           B
FROST ZONE:                01
DEGREE DAYS:               0
RAINFALL:                  3
FEDERAL REGION CODE:       01
DEGREE DAYS HEATING:       4132
DEGREE DAYS COOLING:       D7371
UNIT COST ELECTRICITY:     3690
UNIT COST NATURAL GAS:     4140
UNIT COST FUEL OIL:        5880
UNIT COST FUEL OIL R:      0000
UNIT COST STEAM:           0000
UNIT COST COAL A:          0000
UNIT COST COAL:            0000
UNIT COST LPG:             9890
```

```
HQ AFESC/DEC                  PREPARED BY:            SYSTEM LEVEL REPORT       DATE:  07/27/89          PAGE:   1
PROGRAM ID:  AFLC             PROJECT ID:  ROBIN                                FACILITY ID:  F15
RUN NUMBER:  01               SET NUMBER:  01                                   LCC RUN NUMBER: 06
                              COSTS CALCULATED ARE:  ACTUAL (INFLATED)
```

|  | CONSTR $ | ANN MAINT $ | CYC MAINT $ | PDR $ | REPLACE $ | SUBTOTAL $ | RESID VAL $ | TOTAL $ |
|---|---|---|---|---|---|---|---|---|
| SYSTEM 01 TOTAL | 826.16 | 7.34 | 7.30 | 1.16 | 0.00 | 841.98 | 114.81 | 956.80 |
| % OF SYSTEM SUBTOTAL | 98.12% | 0.87% | 0.86% | 0.13% | 0.00% | | | |
| SYSTEM 02 TOTAL | 4,822.86 | 0.00 | 0.00 | 0.00 | 0.00 | 4,822.86 | 670.26 | 5,493.12 |
| % OF SYSTEM SUBTOTAL | 100.00% | 0.00% | 0.00% | 0.00% | 0.00% | | | |
| SYSTEM 03 TOTAL | 733.45 | 8.57 | 0.50 | 0.00 | 0.00 | 742.53 | 435.66 | 1,178.20 |
| % OF SYSTEM SUBTOTAL | 98.77% | 1.15% | 0.06% | 0.00% | 0.00% | | | |
| FACILITY TOTAL | 13,708.38 | 1,888.20 | 215.33 | 30.42 | 0.00 | 15,842.35 | 4,498.84 | 20,341.19 |
| % OF FACILITY TOTAL | 86.53% | 11.91% | 1.35% | 0.19% | 0.00% | | | |

SUBSYSTEM LEVEL REPORT

HQ AFESC/DEC  
PROGRAM ID: AFLC  
RUN NUMBER: 01  
PREPARED BY:  
PROJECT ID: ROBIN  
SET NUMBER: 01  
COSTS CALCULATED ARE: ACTUAL (INFLATED)  
DATE: 07/27/89  
FACILITY ID: F15  
LCC RUN NUMBER: 06  
PAGE: 1

| | CONSTR $ | ANN MAINT $ | CYC MAINT $ | PDR $ | REPLACE $ | SUBTOTAL $ | RESID VAL $ | TOTAL $ |
|---|---|---|---|---|---|---|---|---|
| SYSTEM 01 - SUBSTRUCTURE SUBSYSTEM | | | | | | | | |
| 01 STANDARD FOUNDATION | 388.67 | 3.43 | 5.37 | 0.22 | 0.00 | 397.70 | 54.01 | 451.72 |
| 03 SLAB ON GRADE | 437.49 | 3.90 | 1.93 | 0.93 | 0.00 | 444.27 | 60.80 | 505.07 |
| SYSTEM 01 TOTAL | 826.16 | 7.34 | 7.30 | 1.16 | 0.00 | 841.98 | 114.81 | 956.80 |
| % OF SYSTEM SUBTOTAL | 98.12% | 0.87% | 0.86% | 0.13% | 0.00% | | | |
| SYSTEM 02 - SUPERSTRUCTURE SUBSYSTEM | | | | | | | | |
| 02 ROOF CONSTRUCTION | 4,822.86 | 0.00 | 0.00 | 0.00 | 0.00 | 4,822.86 | 670.26 | 5,493.12 |
| SYSTEM 02 TOTAL | 4,822.86 | 0.00 | 0.00 | 0.00 | 0.00 | 4,822.86 | 670.26 | 5,493.12 |
| % OF SYSTEM SUBTOTAL | 100.00% | 0.00% | 0.00% | 0.00% | 0.00% | | | |
| SYSTEM 03 - ROOFING SUBSYSTEM | | | | | | | | |
| 01 ROOFING | 733.45 | 8.57 | 0.50 | 0.00 | 0.00 | 742.53 | 435.66 | 1,178.20 |
| SYSTEM 03 TOTAL | 733.45 | 8.57 | 0.50 | 0.00 | 0.00 | 742.53 | 435.66 | 1,178.20 |
| % OF SYSTEM SUBTOTAL | 98.77% | 1.15% | 0.06% | 0.00% | 0.00% | | | |
| SYSTEM 12 - SPECIAL ELECTRICAL SYSTEMS SUBSYSTEM | | | | | | | | |
| 01 COMMUNICATION & ALARM SYSTEMS | 27.12 | 119.32 | 0.00 | 0.00 | 0.00 | 146.46 | 5.71 | 152.17 |
| 02 OTHER SPECIAL ELECTRICAL SYSTEMS | 48.07 | 14.30 | 0.00 | 0.00 | 0.00 | 62.38 | 8.09 | 70.47 |
| SYSTEM 12 TOTAL | 75.19 | 133.63 | 0.00 | 0.00 | 0.00 | 208.84 | 13.81 | 222.65 |
| % OF SYSTEM SUBTOTAL | 36.00% | 63.99% | 0.00% | 0.00% | 0.00% | | | |
| FACILITY TOTAL | 13,708.38 | 1,888.20 | 215.33 | 30.42 | 0.00 | 15,842.35 | 4,498.84 | 20,341.19 |
| % OF FACILITY TOTAL | 86.53% | 11.91% | 1.35% | 0.19% | 0.00% | | | |

ASSEMBLY LEVEL REPORT

HQ AFESC/DEC  
PROGRAM ID: AFLC  
RUN NUMBER: 01  
PREPARED BY:  
PROJECT ID: ROBIN  
SET NUMBER: 01  
COSTS CALCULATED ARE: ACTUAL (INFLATED)  
DATE: 07/27/89  
FACILITY ID: F15  
LCC RUN NUMBER: 06  
PAGE: 1

| | CONSTR $ | ANN MAINT $ | CYC MAINT $ | PDR $ | REPLACE $ | SUBTOTAL $ | RESID VAL $ | TOTAL $ |
|---|---|---|---|---|---|---|---|---|
| SYSTEM 01 - SUBSTRUCTURE | | | | | | | | |
| SUBSYSTEM - 01 STANDARD FOUNDATION ASSEMBLY | | | | | | | | |
| 0101 1'-0" X 3'-0" STRIP FOOTING, 3000 PSI CONCRETE | 43.58 | 0.00 | 0.00 | 0.00 | 0.00 | 43.58 | 6.05 | 49.64 |
| 0102 1'-6" X 4'-0" STRIP FOOTING, 3000 PSI CONCRETE | 93.15 | 0.00 | 0.00 | 0.00 | 0.00 | 93.15 | 12.94 | 106.10 |
| 0106 80" DEEP FOUNDATION WALL | 201.05 | 3.43 | 5.37 | 0.22 | 0.00 | 210.09 | 27.94 | 238.03 |
| 0226 SPREAD FTG, STEEL FRM, LT LOAD, LOW BRG SOIL, SPC SPAN | 40.16 | 0.00 | 0.00 | 0.00 | 0.00 | 40.16 | 5.58 | 45.74 |
| 0262 SPREAD FTG, RF STEEL, STL FRAME, LL, LOW BRG SOIL, SPC SPN | 10.71 | 0.00 | 0.00 | 0.00 | 0.00 | 10.71 | 1.48 | 12.19 |
| SUBSYSTEM 01 TOTAL | 388.67 | 3.43 | 5.37 | 0.22 | 0.00 | 397.70 | 54.01 | 451.72 |
| % OF SUBSYSTEM SUBTOTAL | 97.72% | 0.86% | 1.35% | 0.05% | 0.00% | | | |
| SYSTEM 04 - EXTERIOR CLOSURE | | | | | | | | |
| SUBSYSTEM - 01 EXTERIOR WALLS ASSEMBLY | | | | | | | | |
| 0106 INTERLOCKING METAL SANDWICH PANELS | 1,225.31 | 5.55 | 2.91 | 0.07 | 0.00 | 1,233.86 | 1,164.73 | 2,398.60 |
| 0201 POLYSTYRENE RIGID WALL INSULATION, 1" THICK | 70.66 | 0.00 | 0.00 | 0.00 | 0.00 | 70.66 | 9.82 | 80.48 |
| 0301 REINFORCED 8" CONCRETE MASONRY UNIT BACK-UP WALL | 618.65 | 0.00 | 0.00 | 0.00 | 0.00 | 618.65 | 85.97 | 704.63 |
| 0501 FIXED BLADE EXTERIOR LOUVER WITH BAKED ENAMEL FINISH | 126.57 | 0.12 | 10.63 | 0.00 | 0.00 | 137.33 | 119.62 | 256.95 |
| 0801 GYPSUM PLASTER EXTERIOR SOFFITS | 37.73 | 23.72 | 5.15 | 0.00 | 0.00 | 66.62 | 5.53 | 72.16 |
| SUBSYSTEM 01 TOTAL | 2,078.95 | 29.40 | 18.70 | 0.07 | 0.00 | 2,127.15 | 1,385.69 | 3,512.84 |
| % OF SUBSYSTEM SUBTOTAL | 97.73% | 1.38% | 0.87% | 0.00% | 0.00% | | | |
| FACILITY TOTAL | 13,708.38 | 1,888.20 | 215.33 | 30.42 | 0.00 | 15,842.35 | 4,498.84 | 20,341.19 |
| % OF FACILITY TOTAL | 86.53% | 11.91% | 1.35% | 0.19% | 0.00% | | | |

```
HQ AFESC/DEC                PREPARED BY:              DBA   REPORT              DATE:  07/27/89          PAGE:  8
PROGRAM ID:  AFLC           PROJECT ID:  ROBIN                                   FACILITY ID:  F15
RUN NUMBER:  01             SET NUMBER:  01                                      LCC RUN NUMBER: 06
                            COSTS CALCULATED ARE:  CONSTANT $
==========================================================================================================================
 01010106     80" DEEP FOUNDATION WALL
ANNUAL MAINTENANCE                  .00           194.60              .00
PHYSICAL DAMAGE REPAIRS             .23            12.54              .00
RESIDUAL VALUE                                                                   17911.39
1989
DIR CONSTRUCTION               32617.01         47230.38           9709.60
CYCLICAL MAINTENANCE                .00              .00              .00
REPLACEMENT                         .00              .00              .00
1990
DIR CONSTRUCTION               32617.01         47230.38           9709.60
CYCLICAL MAINTENANCE                .00              .00              .00
REPLACEMENT                         .00              .00              .00
1991
DIR CONSTRUCTION                    .00              .00              .00
CYCLICAL MAINTENANCE                .00              .00              .00
REPLACEMENT                         .00              .00              .00
1992
DIR CONSTRUCTION                    .00              .00              .00
CYCLICAL MAINTENANCE                .00              .00              .00
REPLACEMENT                         .00              .00              .00
1993
DIR CONSTRUCTION                    .00              .00              .00
CYCLICAL MAINTENANCE                .00              .00              .00
REPLACEMENT                         .00              .00              .00
1994
DIR CONSTRUCTION                    .00              .00              .00
CYCLICAL MAINTENANCE                .00              .00              .00
REPLACEMENT                         .00              .00              .00
1995
DIR CONSTRUCTION                    .00              .00              .00
CYCLICAL MAINTENANCE                .00              .00              .00
REPLACEMENT                         .00              .00              .00
1996
DIR CONSTRUCTION                    .00              .00              .00
CYCLICAL MAINTENANCE                .00              .00              .00
REPLACEMENT                         .00              .00              .00
1997
DIR CONSTRUCTION                    .00              .00              .00
CYCLICAL MAINTENANCE                .00              .00              .00
REPLACEMENT                         .00              .00              .00
```

```
HQ AFESC/DEC                PREPARED BY:              DBA   REPORT              DATE:  07/27/89          PAGE:  9
PROGRAM ID:  AFLC           PROJECT ID:  ROBIN                                   FACILITY ID:  F15
RUN NUMBER:  01             SET NUMBER:  01                                      LCC RUN NUMBER: 06
                            COSTS CALCULATED ARE:  CONSTANT $
==========================================================================================================================
   ASSEMBLY                 MATERIAL           LABOR          EQUIPMENT          MISC
1998
DIR CONSTRUCTION                    .00              .00              .00
CYCLICAL MAINTENANCE                .00              .00              .00
REPLACEMENT                         .00              .00              .00
1999
DIR CONSTRUCTION                    .00              .00              .00
CYCLICAL MAINTENANCE                .00              .00              .00
REPLACEMENT                         .00              .00              .00
2000
DIR CONSTRUCTION                    .00              .00              .00
CYCLICAL MAINTENANCE            7806.32          5894.00              .00
REPLACEMENT                         .00              .00              .00
2001
DIR CONSTRUCTION                    .00              .00              .00
CYCLICAL MAINTENANCE                .00              .00              .00
REPLACEMENT                         .00              .00              .00
2002
DIR CONSTRUCTION                    .00              .00              .00
CYCLICAL MAINTENANCE                .00              .00              .00
REPLACEMENT                         .00              .00              .00
2003
DIR CONSTRUCTION                    .00              .00              .00
CYCLICAL MAINTENANCE                .00              .00              .00
REPLACEMENT                         .00              .00              .00
```

INDEX OF CCMAS MANUALS

1. Comparative Cost Estimating System
   a. Development Report
   b. Data Acquisition and Database Structure, Book 1, Jul 86
   c. Data Acquisition and Database Structure, Book 2, Sep 86
2. Supporting Facility Generic Model
   a. Model Report, Vol. II, Dec 85
   b. Design Report—"System Dictionary", Mar 85
3. Runaway/Taxiways Generic Model
   a. Model Report, Mar 84
   b. Design Report—"System Dictionary", Mar 85
4. Quantity Take Off (QTO) System
   a. Development Report: "Database update and Modification Report", Mar 87
5. Generic Contractor Modifier Cost Model
   a. Model Report, Jul 86
   b. Design Report, May 87
   c. Development Report
6. Life Cycle Cost Model
   a. Design Report, Apr 87 (Automation)
   b. Data Base Enhancement Report (Data Files)
   c. Model Report (model)
7. "CCMAS Conversion—Phase I, Final Development Report", Dec. 88 This document provides the underlying detail for the following modules:

a. Project Description Module—gives a detailed description of the development and design of this module.
b. Generic Systems Model Module—includes the actual development data for this model.
c. "Other Modifiers" Module
d. Contractor Modifiers, Comparative
e. Calculate Construction Costs, Reports and Delete Data Module.

8. "CCMAS Design System Dictionary", Volumes I and II, Mar 84 and Nov 84 respectively. This document provides the underlying detail for the following modules:
a. Construction Methods Modifier
b. Project Definition Modifier
c. QTO System
d. QTO Contractor Modifier System
e. Also data relating to CCMAS, test version 1—Calculate Construction Costs and Reports, Project Description Module, Generic System Model, administrative, medical, runway/taxiway models, QTO model, contractor modifier model and "other" modifiers module.

REFERENCES

AFR 85-8 (3/77): Maintenance and Repair of Surface Area
AFM 86-2 Chap. 3 (3/73): Airfield Pavements
AFM 86-6 (2/59): Air Base Master Planning Manual
AFR 86-13 (8/75): Hasty Revetments for Parked Aircraft
AFR 86-14 (5/81): Airfield and Heliport Planning Criteria
AFM 88-5 Chap. 1 (4/77): Surface Drainage Facilities for Airfields and Heliports
AFM 88-5 Chap. 3 (8/64): Drainage and Erosion—Control Structures for Airfields and Heliports
AFM 88-6 Chap. 1 (4/77): General Provisions for Airfield Design
AFM 88-6 Chap. 2 (8/78): Flexible Pavement Design for Airfields
AFM 88-6 Chap. 3 (8/79): Rigid Pavements for Airfields Other than Army (DRAFT)
AFM 88-6 Chap. 4 (5/62): Pavement Design for Frost Conditions
AFM 88-12 Chap. 2 (6/70): Storage, Distribution and Dispensing of Aircraft and Automotive Fuels
AFM 88-14 (9/79): Visual Navigation Facilities
AFM 88-16 (9/77): Standards for Making Airfields
AFM 88-17 Chap. 2 (10/61): Planting Turf
AFM 88-19 Chap. 1 (2/66): Arctic and Subarctic Construction: General Provisions
AFM 88-19 Chap. 2 (7/66): Arctic and Subarctic Construction: Site Selection and Development
AFM 88-19 Chap. 3 (10/54): Artic and Subarctic Construction: Runway and Road Design
AFM 88-19 Chap. 4 (10/54): Artic and Subarctic Construction: Building Foundations
AFM 88-19 Chap. 5 (10/54): Artic and Subarctic Construction: Utilities
AFM 88-19 Chap. 6 (1/66): Artic and Subarctic Construction: Calculation . . . of Depths of Freeze
AFM 88-19 Chap. 7 (4/81): Surface Drainage Design for Airfields and Heliports in Artic and Subartic Regions
AFM 88-24 Chap. 1 (3/81): Airfield Pavement Evaluation Concepts
AFM 88-24 Chap. 2 (4/81): Flexible Airfield Pavement Evaluation
AFM 88-24 Chap. 3 (2/59): Rigid Airfield Pavement Evaluation
AFM 88-29 (7/78): Engineering Weather Data
AFM 93-5 (5/81): Airfield Pavement Evaluation Program
AFESC Publication (1/83): Aircraft Characteristics for Airfield Pavement Design and Evaluation p0 U.S. Dept. of Commerce (6/68): Weather Atlas of the United States
AFR 173-13: United States Air Force Cost and Planning Factors, October 1989.
AFR 173-11: Independent Cost Analysis Program, October 1986.
AFR 173-15: Economic Analysis and Program Evaluation for Resource Management, March 1988.
OMB Circular A-76: Policies for Acquiring Commercial or Industrial Products and Services Needed by the Government, September 1988.
OMB Circular A-94: Discount Rates to Be Used in Evaluating Time-Distributed Costs and Benefits, March 1972.
ORNL/TM-10476/VI: Military Construction Program Economic Analysis Manual: Text and Appendix; /V2: Sample Economic Analyses, December 1987.

CONCLUSION

Track Record (accomplishments made in-house using CCMAS):

CCMAS estimates are 300% more accurate than conventional estimating methods as validated during a mere 9 month span when used to analyze over $10 Billion of construction projects, e.g.:

The construction of 100,000,000 square feet of new facilities. Equivalent to 17 new Air Bases.

The construction cost of 15,000 miles of roadway. Equal to an 8-lane highway from New York to Los Angeles!

The construction cost for a facility required to store 90,000,000 gallons of fuel—enough for 500,000 cars to make a round trip from New York to Los Angeles.

For a 50,000 square foot facility, CCMAS reduces the man-hours needed to produce a detailed cost estimate by a factor of 40. CCMAS uses eight man-hours, conventional methods require 320 man-hours.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. In a totally integrated construction estimating, analysis, and reporting computer system having procedures which automatically determine, based on input parameters, individual algorithms and knowledge-based factors representative of various functional, physical, and geographic requirements of a facility, including a breakdown of materials at a facility system level which includes functional areas of primary and supporting facilities, and decreasing levels of a hierarchy down to an elemental level which includes material, labor, and equipment;

wherein said system comprises:

manual-entry means for entering initial input parameters which include parameters indicative of the type, size and location of the facility;

knowledge base file means comprising data on functional, physical, and geographical construction requirements of the facility, and a plurality of algorithms representative of knowledge construction principles and human judgments applicable to the facility at said facility systems level, and other levels on down to the elemental level;

means for generating a model of the facility at said facility systems level and other levels on down to the elemental level including:

inference and control means using said knowledge base file means and said initial input parameters for determining a set of system parameters and default values thereof relating to the facility at a system level, with typical values being defined, means for modifying the system parameters by manual entries;

inference and control means using said knowledge base file means for determining subsystem parameters for a plurality of subsystems within the facility, as a function of said initial input parameters and said system parameters, means for modifying the subsystem parameters by manual entries;

inference and control means using said knowledge base file means for determining assembly category parameters for a plurality of assembly categories within the facility, as a function of said initial input parameters and said system and subsystem parameters, means for modifying the assembly category parameters by manual entries;

inference and control means using said knowledge base file means for determining assembly parameters for a plurality of assemblies within the facility, as a function of said initial input parameters and said system, subsystem and assembly category parameters, means for modifying the assembly parameters by manual entries;

inference and control means using said knowledge base file means for determining parameters for a plurality of line item elements within the facility, as a function of said initial input parameters and said system, subsystem, assembly category and assembly parameters, to determine material, equipment and labor inclusive in individual line items, means for modifying the parameters for the line items elements by manual entries.

2. A system according to claim 1 further including inference and control means using knowledge-base file means to adjust the body of procedures and selected algorithms in accordance with the functional requirements of the facility.

3. A system according to claim 1 further including inference and control means using knowledge-base file means to adjust the body of procedures and selected algorithms for physical requirements of the facility.

4. A system according to claim 1 further including inference and control means using knowledge-base file means to adjust the body of procedures and selected algorithms for geographic requirements of the facility.

5. A system according to claim 1 further including inference and control means using knowledge-base file means to adjust the body of procedures and selected algorithms for functional requirements of supporting facilities.

6. A system according to claim 1 further including inference and control means using knowledge-base file means to adjust the body of procedures and selected algorithms for physical requirements of supporting facilities.

7. A system according to claim 1 further including inference and control means using knowledge-base file means to adjust the body of procedures and selected algorithms for geographic requirements of supporting facilities.

8. A system according to claim 1 further including inference and control means for making adjustments for functional requirements of the facility which include administration, open office, closed office, automatic data processing, auditorium, and security control.

9. A system according to claim 1 further including inference and control means for making adjustments for physical requirements of the facility which include total facility square footage, number of stories above and below ground, perimeter length, footprint, floor to floor height of the stories above ground, floor to ceiling height of the stories above ground, floor to floor height of the stories below ground, floor to ceiling height of the stories below ground, and electrical loads.

10. A system according to claim 1 further including inference and control means for making adjustments for geographic requirements of the facility which include seismic zone, heating degree days, cooling degree days, and frost penetration depths.

11. A system according to claim 1 further including inference and control means for making adjustments for functional requirements of supporting facilities which include site development, roads, parking, above ground utilities, underground utilities, railroads, airfields, and storage and distribution systems.

12. A system according to claim 1 further including inference and control means for making adjustments for physical requirements of supporting facilities which include total facility size, dimensions of facility components, and type of facility components.

13. A system according to claim 1 further including inference and control means for making adjustments for geographic requirements of supporting facilities which include soil type, rainfall intensity, seismic zone, and frost penetration depths.

14. In a totally integrated construction cost estimating, analysis, and reporting computer system having a body of procedures organized into sections and a series of modules under each section which automatically selects appropriate algorithms and factors from knowledge base tables to meet functional, physical, and geographic requirements of a total facility which includes a primary facility and associated supporting facilities organized in a work breakdown structure hierarchy;

said system comprising:

a means for adding modules to each section to enhance the overall system capability; including means for providing for the addition of capabilities in one section which does not require modification to other sections, each section including means for automatically using the capabilities provided by any added modules in other sections;

a data file means comprising historic, generic modeling and detailed cost buildup techniques; inference and control means for selecting the historic, generic modeling, or detailed cost buildup techniques from said data file means;

inference and control means using said knowledge-base file means to adjust the body of procedures and selected algorithms for functional, physical, and geographic requirements of primary and supporting facilities;

inference and control means for parametrically translating functional, physical, and geographic requirements and need dates into specific systems, subsystems, assembly categories, assemblies, composites and elements necessary for construction; and a means for analyzing and reporting a facility cost estimate at the total facility, at the facility system level, at the facility subsystem level, at the assembly level; and the elemental level.

15. A system according to claim 14 wherein said sections include a section having means for describing a project; a section having means for estimating and analyzing direct construction cost; a section having inference and control means for identifying modifiers or adjustments to the project for location, time, method of construction, and schedule of construction; a section having means for estimating and analyzing a contractors overhead and profit; a section having means for calculating construction cost or applying the modifiers to the direct cost; a section having means for estimation and analyzing the supervision, inspection, and overhead associated with construction management, and a section having means for estimating and analyzing cost to operate, maintain, and repair the facility over its life.

16. A system according to claim 15, which includes inference and control means using a procedure that combines facility categories together into facility types; allows the user to select limits on facility size, location, data sources, and units of measure; selects the facility family to assign to this facility type; allows the user to select the escalation rates used; and then performs a regression on the data using one of the following equations at the users option to determine the equation coefficients for the primary facility:

| | |
|---|---|
| Non-Linear: | $y = a * x^b$ |
| Department of Defense Non-Linear: | $y = a * e^{(-bx)}$ |
| Linear: | $y = a + b * x$ | where y is unit cost, a is a first regression coefficient, b is a second regression coefficient, and x is facilities scope.

17. A system according to claim 15, which includes inference and control means for using a process that shows the user all available equations for the particular facility category identified in the project description phase of the process; getting the appropriate parameter from the user; and calculating the results of the equation;

inference and control means using a procedure for automatically adjusting the primary facility costs to account for different seismic conditions, climates, number of stories, subsurface conditions, number of basement levels, exterior closure type, interior layout, elevators, sprinklers, heating, emergency generators, uninterruptible power, and clean room requirements at the facility type level of the hierarchy based on the location selected during the project description process and answers to questions on applicability of each item to the facility being analyzed;

which includes a table (table T117) having a knowledge base that contains a type of construction code that links the type of construction to the cost of unforeseen conditions during construction;

inference and control means for showing the user the available codes and allowing the user to enter only valid codes;

means for determining the relationship between the type of construction and cost of unforeseen conditions experienced during construction based on historical data, storing the information, and retrieving the information for use in calculating the facility cost;

including a knowledge base (table T207) that contains seismic and climate codes that link the location to an adjustment factor that is used in a process to adjust the results of the equation for seismic and climate effects on the facility construction cost;

means for determining the relationship between the seismic and climate zones and cost of construction based on historical data, expert judgment, and results of analysis from the generic models; storing the information; retrieving the information; and calculating the adjustment to the facility cost;

including two knowledge-base file means (tables T166 and T167) that contain questions, answers, and adjustment factors for the remaining adjustments to the primary facility costs;

means using a procedure for showing the user the questions and all possible answers, getting the users answer, storing the results, and retrieving the appropriate adjustment factor;

means for determining the relationship between the adjustment items and cost of construction based on historical data, expert judgment, and results from analysis of from the generic models; storing the information; retrieving the information; and calculating the adjustment to the facility cost at the facility type level of the hierarchy.

* * * * *